United States Patent
Bettman et al.

(10) Patent No.: US 11,196,195 B2
(45) Date of Patent: Dec. 7, 2021

(54) INTERCONNECT SYSTEM HAVING RETENTION FEATURES

(71) Applicant: SAMTEC, INC., New Albany, IN (US)

(72) Inventors: R. Brad Bettman, Mountain View, CA (US); Liam Parkes, New Albany, IN (US); Eric Zbinden, Santa Clara, CA (US); Keith Guetig, Louisville, KY (US); Jignesh H. Shah, Santa Clara, CA (US); Jean Karlo Williams Barnett, New Albany, IN (US); Chadrick Paul Faith, Corydon, IN (US); Edwin Loy, Freemont, CA (US)

(73) Assignee: SAMTEC, INC., New Albany, IN (US)

(*) Notice: Subject to any disclaimer, the term of this patent is extended or adjusted under 35 U.S.C. 154(b) by 0 days.

(21) Appl. No.: 16/604,023

(22) PCT Filed: Apr. 10, 2018

(86) PCT No.: PCT/US2018/026860
§ 371 (c)(1),
(2) Date: Oct. 9, 2019

(87) PCT Pub. No.: WO2018/191248
PCT Pub. Date: Oct. 18, 2018

(65) Prior Publication Data
US 2020/0220286 A1    Jul. 9, 2020

Related U.S. Application Data

(60) Provisional application No. 62/483,932, filed on Apr. 10, 2017, provisional application No. 62/595,579, filed on Dec. 6, 2017, provisional application No. 62/639,492, filed on Mar. 6, 2018.

(51) Int. Cl.
| | | |
|---|---|---|
| H01R 12/70 | (2011.01) | |
| G02B 6/42 | (2006.01) | |
| H01R 12/73 | (2011.01) | |

(52) U.S. Cl.
CPC ....... *H01R 12/7058* (2013.01); *G02B 6/4269* (2013.01); *G02B 6/4284* (2013.01); *H01R 12/73* (2013.01)

(58) Field of Classification Search
CPC ..... H01R 12/7058; H01R 12/73; H01R 12/83
USPC .......................................... 439/326
See application file for complete search history.

(56) References Cited

U.S. PATENT DOCUMENTS

| | | | |
|---|---|---|---|
| 2,760,174 A | | 8/1956 | Burtt et al. |
| 4,477,142 A | * | 10/1984 | Cooper ........... H01R 12/58 439/567 |
| 4,544,225 A | | 10/1985 | Raus et al. |

(Continued)

FOREIGN PATENT DOCUMENTS

| | | |
|---|---|---|
| CN | 201464681 U | 5/2010 |
| CN | 102780103 A | 11/2012 |

(Continued)

OTHER PUBLICATIONS

Samtec, .8MM Q-Rate Terminal Assembly by Clay W, Dwg. No. QRM8-XXX-XX.X-X-D-XX-A-XX, Aug. 27, 2008, 4 sheets.

*Primary Examiner* — Neil Abrams
(74) *Attorney, Agent, or Firm* — BakerHostetler

(57) ABSTRACT

Interconnect systems having anti-backout latches and securement members are disclosed.

59 Claims, 65 Drawing Sheets

(56) References Cited

U.S. PATENT DOCUMENTS

| | | | |
|---|---|---|---|
| 4,639,063 A * | 1/1987 | Mueller | H01R 12/79 439/325 |
| 4,678,252 A * | 7/1987 | Moore | H01R 12/83 439/326 |
| 5,167,523 A | 12/1992 | Crimmins et al. | |
| 5,224,873 A * | 7/1993 | Duffet | G06K 7/003 439/326 |
| 5,396,402 A * | 3/1995 | Perugini | H01L 23/4093 257/718 |
| 5,462,441 A * | 10/1995 | Renn | H01R 12/79 439/495 |
| 5,507,657 A | 4/1996 | Seto et al. | |
| 5,722,849 A | 3/1998 | Alwine | |
| 5,775,957 A | 7/1998 | Fink et al. | |
| 6,048,221 A * | 4/2000 | McCleerey | H01R 13/24 439/326 |
| 6,176,725 B1 * | 1/2001 | Kobayashi | H01R 12/83 439/326 |
| 6,638,105 B1 * | 10/2003 | Wu | H01R 12/7029 439/567 |
| 7,001,200 B2 | 2/2006 | Yoshie | |
| D528,985 S | 9/2006 | Peng | |
| D529,443 S | 10/2006 | Chien | |
| 7,134,895 B1 * | 11/2006 | Choy | H05K 7/1404 439/326 |
| 7,329,054 B1 | 2/2008 | Epitaux et al. | |
| 7,479,017 B1 | 1/2009 | Koopman et al. | |
| D589,891 S | 4/2009 | Peng | |
| D589,901 S | 4/2009 | Peng et al. | |
| 7,648,287 B2 | 1/2010 | Epitaux et al. | |
| 7,682,179 B1 * | 3/2010 | Tsai | H01R 12/7005 439/326 |
| 7,766,559 B2 | 8/2010 | Epitaux et al. | |
| 7,824,112 B2 | 11/2010 | Epitaux et al. | |
| 7,924,567 B2 * | 4/2011 | Zha | H01L 23/467 361/710 |
| 8,057,248 B1 * | 11/2011 | Sherman | H01R 12/714 439/324 |
| D697,031 S | 1/2014 | Yoshisuji | |
| D708,145 S | 7/2014 | McCartin et al. | |
| D708,580 S | 7/2014 | McCartin et al. | |
| D721,332 S | 1/2015 | Yokoo | |
| D722,968 S | 2/2015 | Takemoto | |
| D729,173 S | 5/2015 | Fukumoto | |
| D736,714 S | 8/2015 | Mongold et al. | |
| 9,246,280 B2 | 1/2016 | Neer et al. | |
| 9,374,165 B2 | 6/2016 | Zbinden et al. | |
| D800,070 S | 10/2017 | Manba | |
| D820,216 S | 6/2018 | Wu et al. | |
| D822,611 S | 7/2018 | Bettman et al. | |
| D835,048 S | 12/2018 | Arai et al. | |
| 10,290,962 B2 | 5/2019 | Harmon | |
| 10,297,963 B2 * | 5/2019 | Herring | H01R 13/6587 |
| 10,367,282 B2 * | 7/2019 | Harmon, III | H01R 13/62988 |
| D860,140 S | 9/2019 | Wu | |
| D886,066 S | 6/2020 | Williams et al. | |
| 2002/0052131 A1 | 5/2002 | Hashimoto | |
| 2007/0218759 A1 | 9/2007 | Liang et al. | |
| 2008/0222351 A1 | 9/2008 | Verdiell et al. | |
| 2009/0305528 A1 | 12/2009 | Hirata et al. | |
| 2010/0120268 A1 | 5/2010 | Cheng-Chi | |
| 2010/0130044 A1 | 5/2010 | Taketomi | |
| 2011/0123150 A1 | 5/2011 | Zbinden et al. | |
| 2011/0123151 A1 | 5/2011 | Zbinden et al. | |
| 2012/0257360 A1 | 10/2012 | Sun | |
| 2012/0289066 A1 | 11/2012 | Wang et al. | |
| 2013/0004120 A1 | 1/2013 | Zbinden et al. | |
| 2013/0129346 A1 | 5/2013 | Zbinden et al. | |
| 2013/0148973 A1 | 6/2013 | Zbinden et al. | |
| 2013/0344710 A1 | 12/2013 | Sasaki et al. | |
| 2014/0017914 A1 | 1/2014 | Endo et al. | |
| 2014/0082977 A1 | 3/2014 | Pilon | |
| 2014/0161407 A1 | 6/2014 | Lee et al. | |
| 2015/0357734 A1 | 12/2015 | Copper et al. | |
| 2015/0364865 A1 | 12/2015 | Sutter et al. | |
| 2016/0079692 A1 | 3/2016 | Sasame et al. | |
| 2017/0062963 A1 | 3/2017 | Tagami et al. | |
| 2017/0174167 A1 | 6/2017 | Collazo Gomez | |
| 2020/0185849 A1 | 6/2020 | Chi | |
| 2020/0220286 A1 * | 7/2020 | Bettman | H01R 13/502 |
| 2020/0403334 A1 * | 12/2020 | Parkes | G02B 6/4269 |

FOREIGN PATENT DOCUMENTS

| | | |
|---|---|---|
| CN | 204243357 U | 4/2015 |
| CN | 104810683 A | 7/2015 |
| CN | 204668509 U | 9/2015 |
| CN | 105514708 A | 4/2016 |
| CN | 105655784 A | 6/2016 |
| CN | 207765710 U | 8/2018 |
| JP | 2002-093495 A | 3/2002 |
| JP | 2011-222273 A | 11/2011 |
| KR | 10-2015-0044212 A | 4/2015 |
| KR | 10-2016-0071753 A | 6/2016 |
| TW | I223479 B | 11/2004 |
| TW | D164746 | 12/2014 |
| TW | D183201 | 8/2016 |
| TW | D180510 | 1/2017 |
| TW | D184085 | 7/2017 |
| WO | 2018/035108 | 2/2018 |

\* cited by examiner

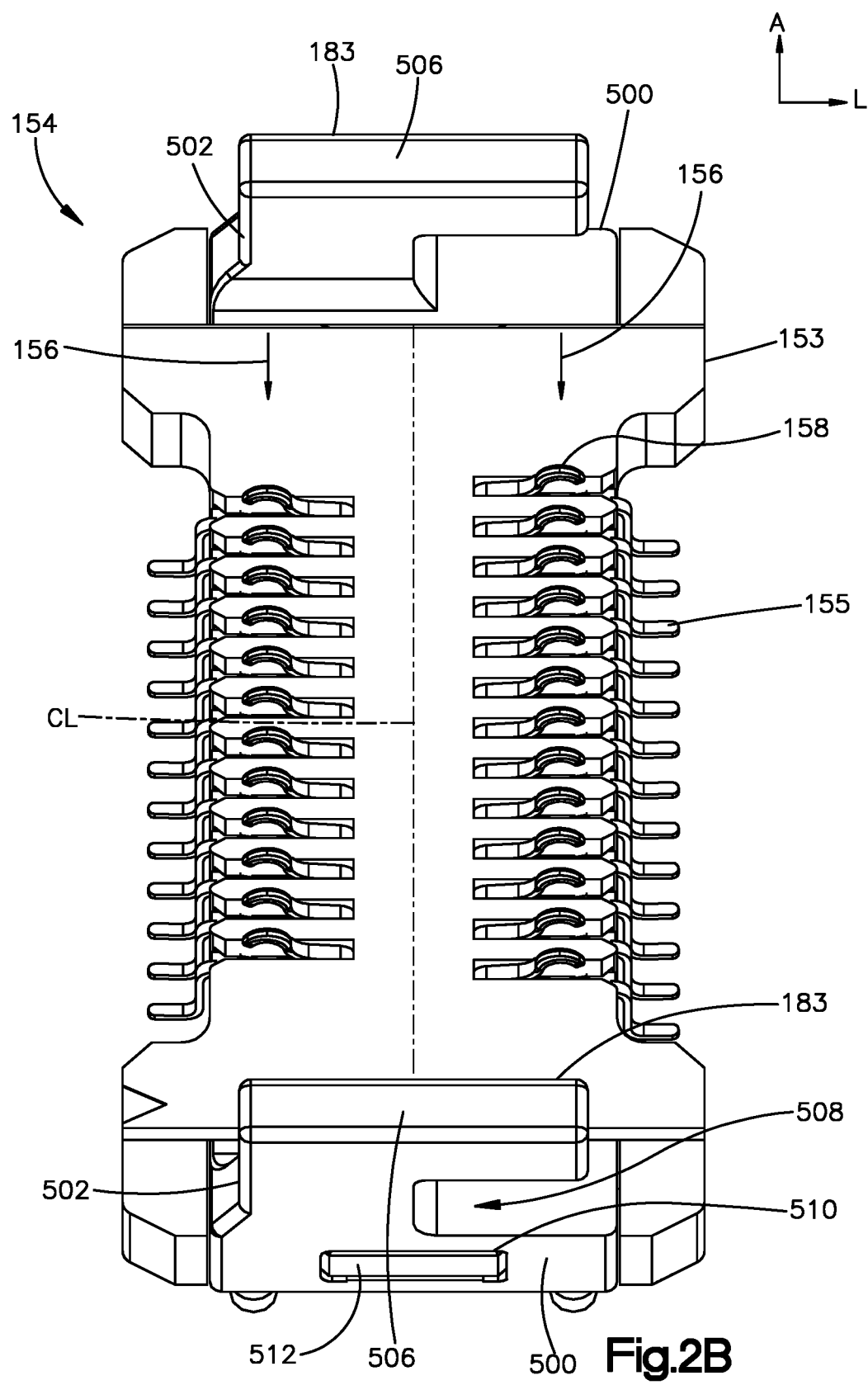

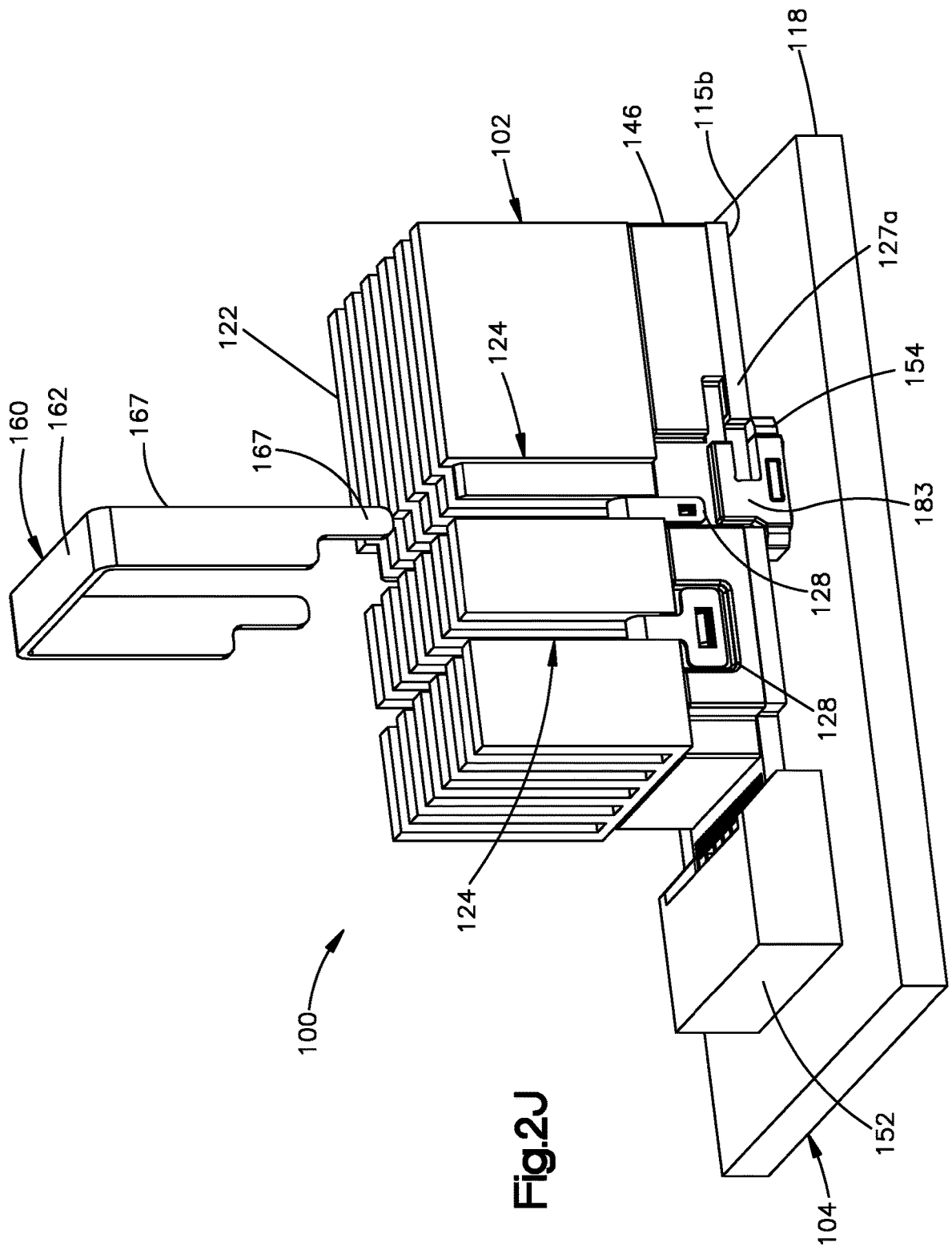

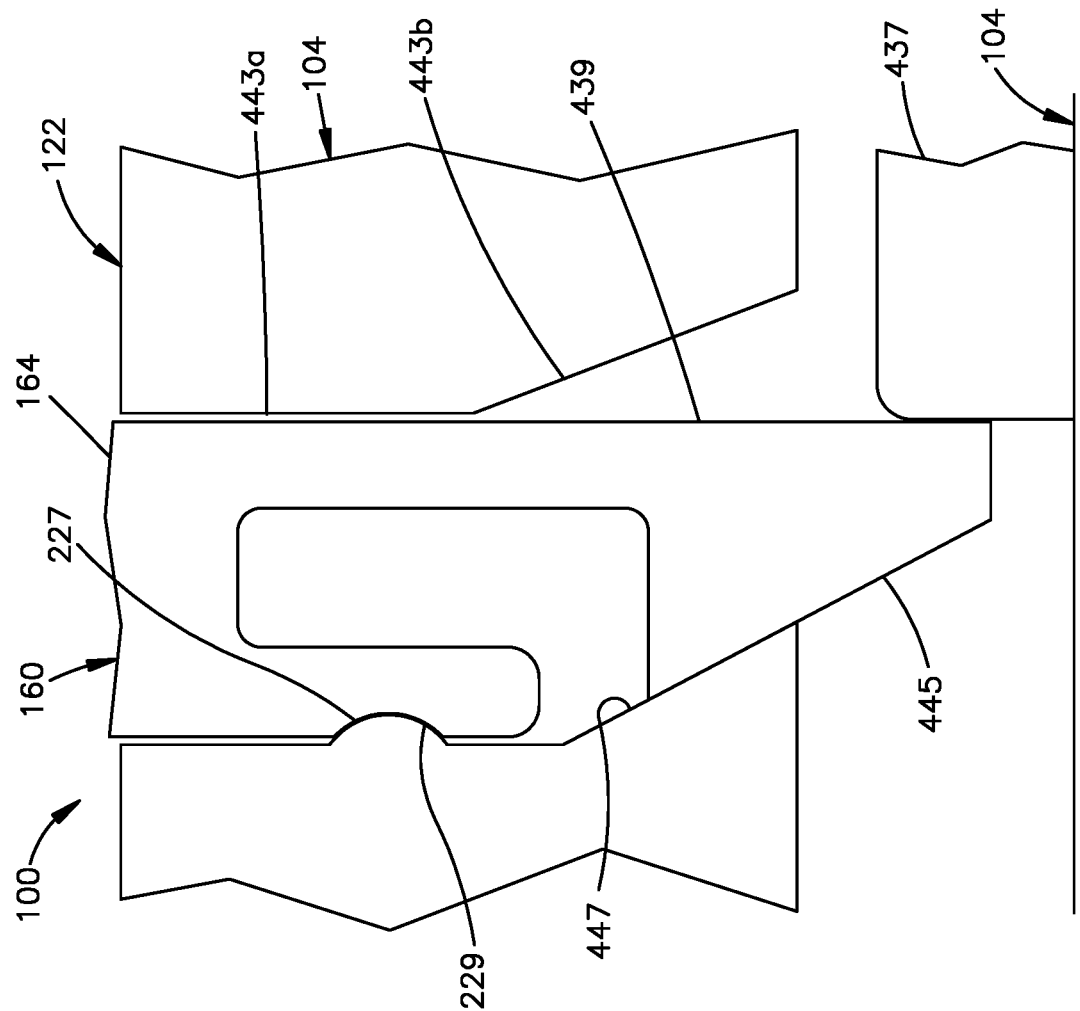
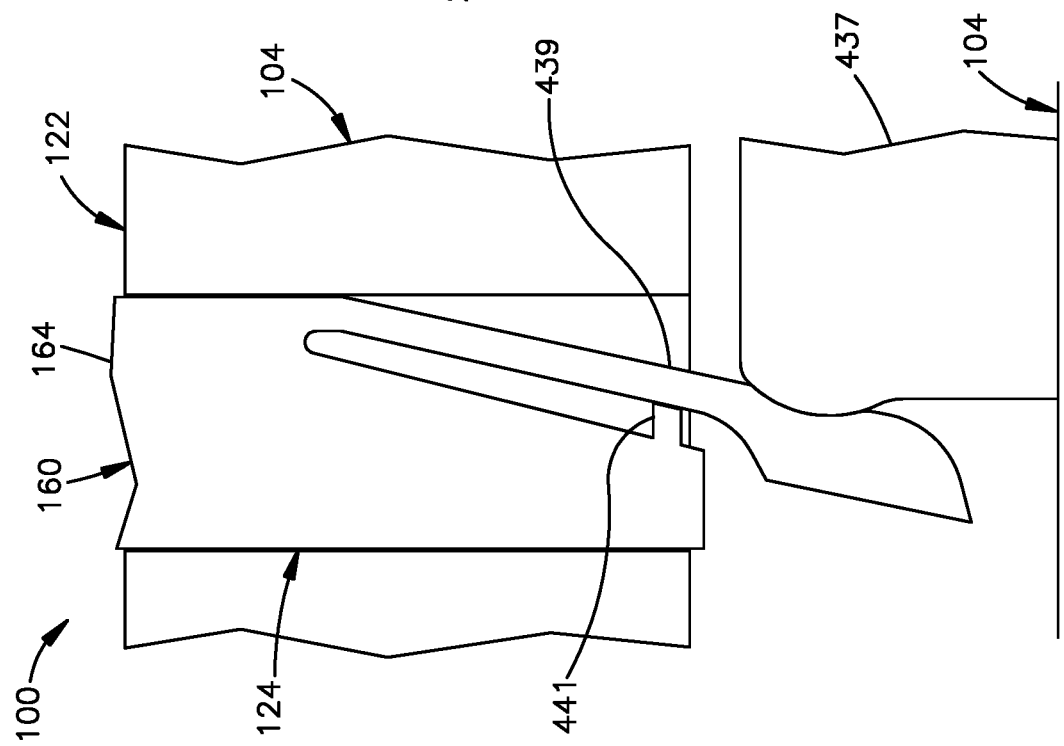

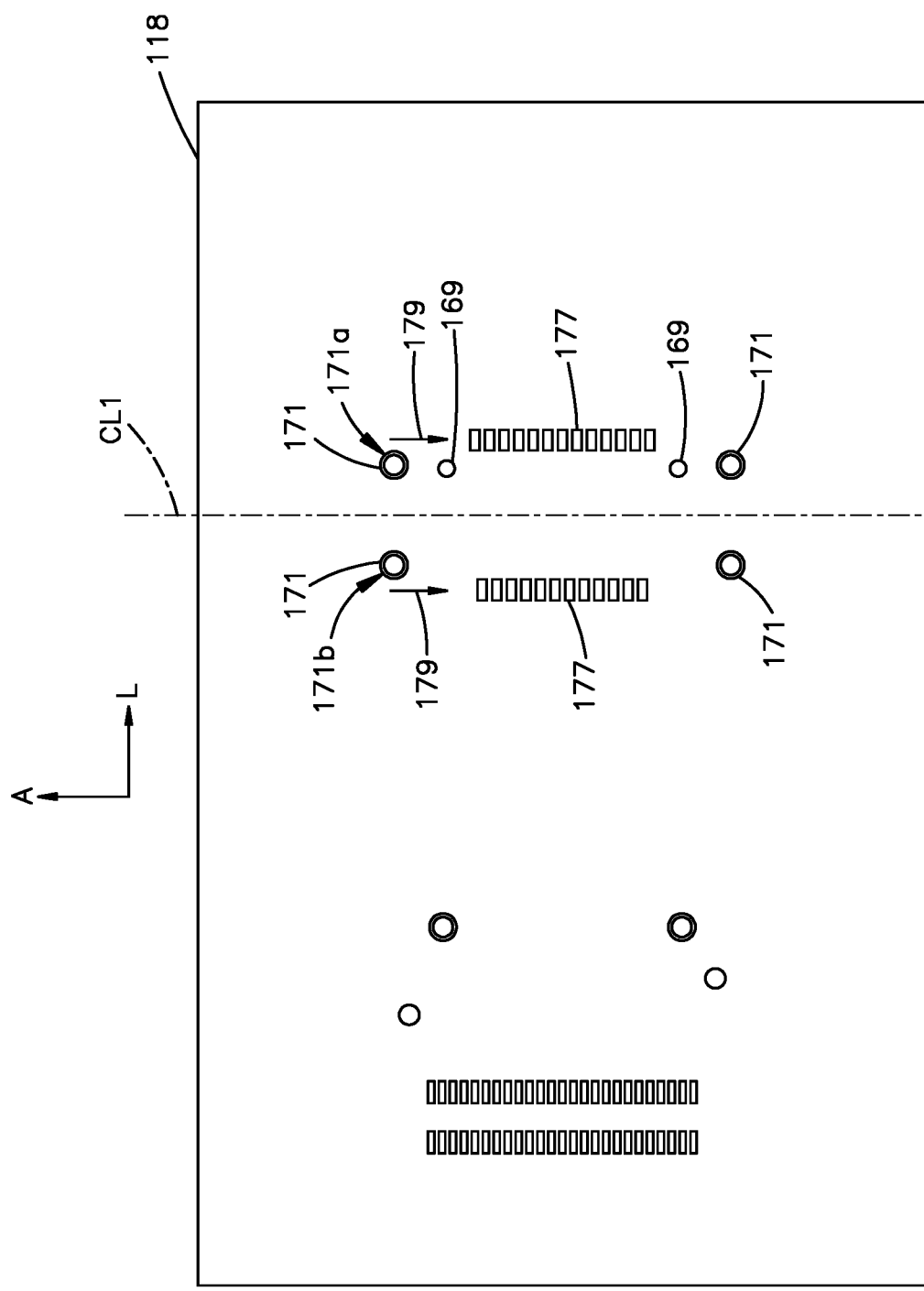

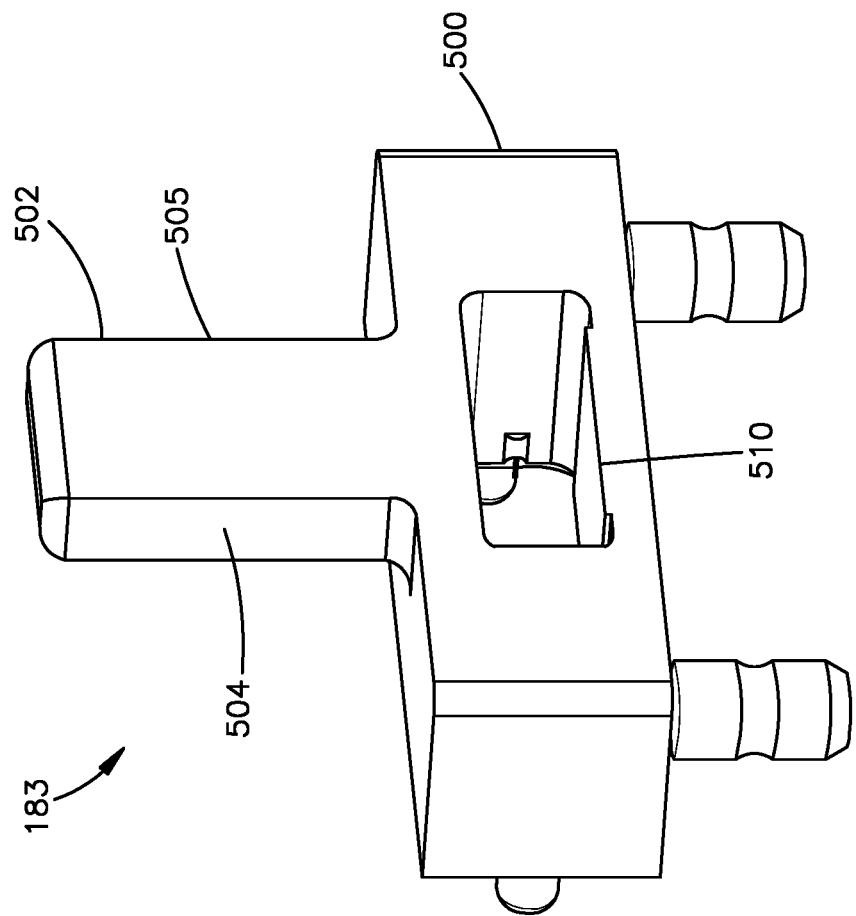

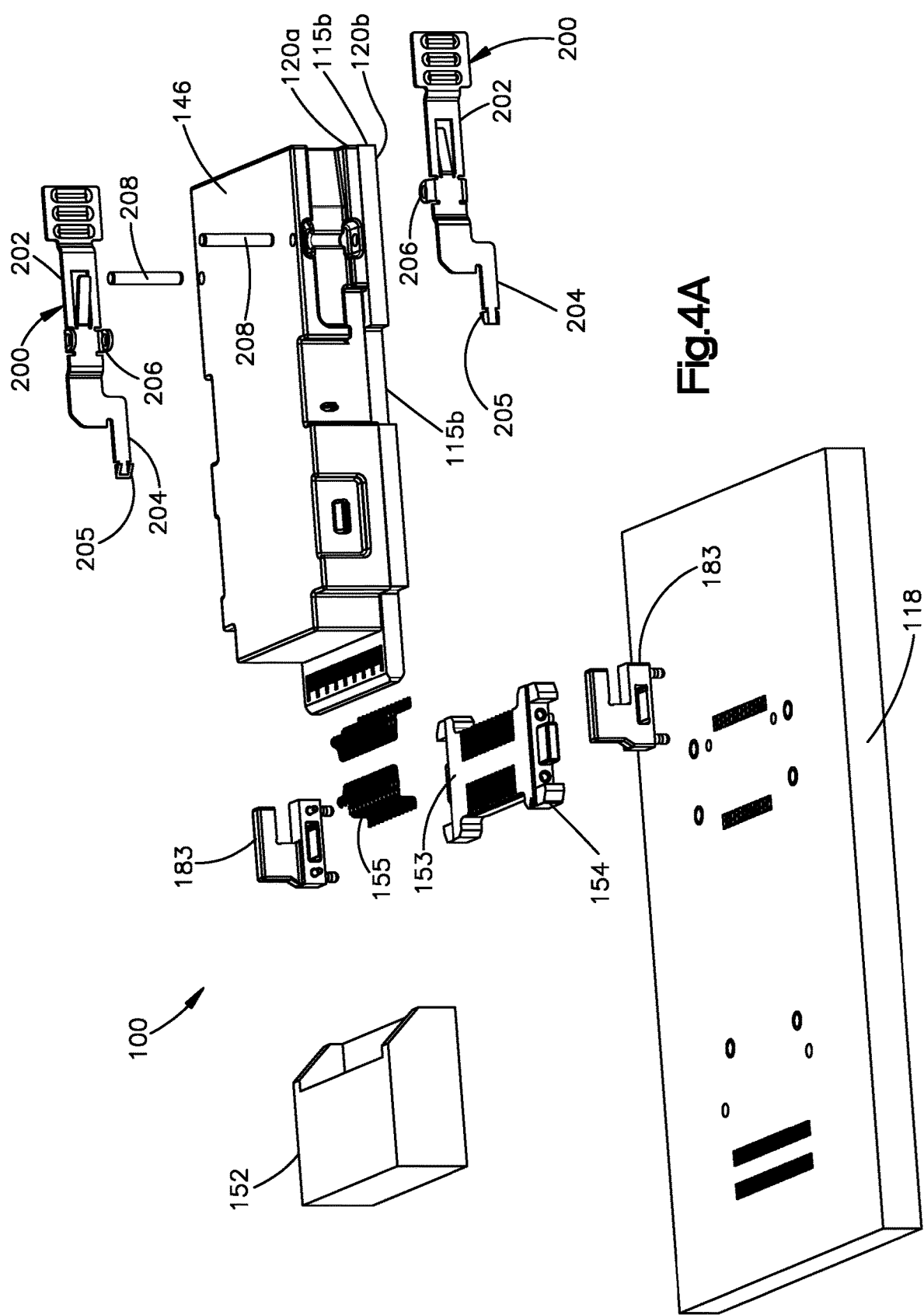

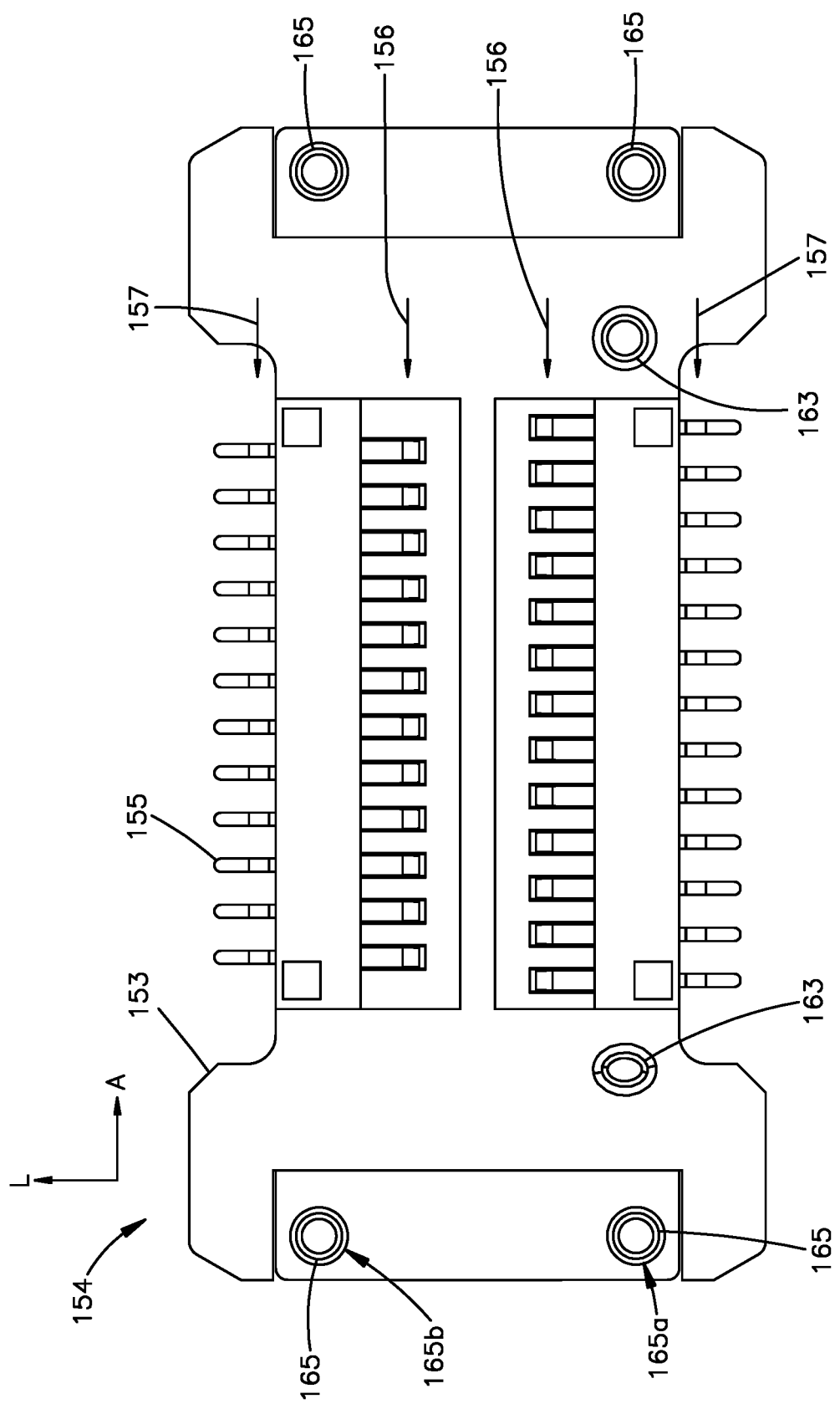

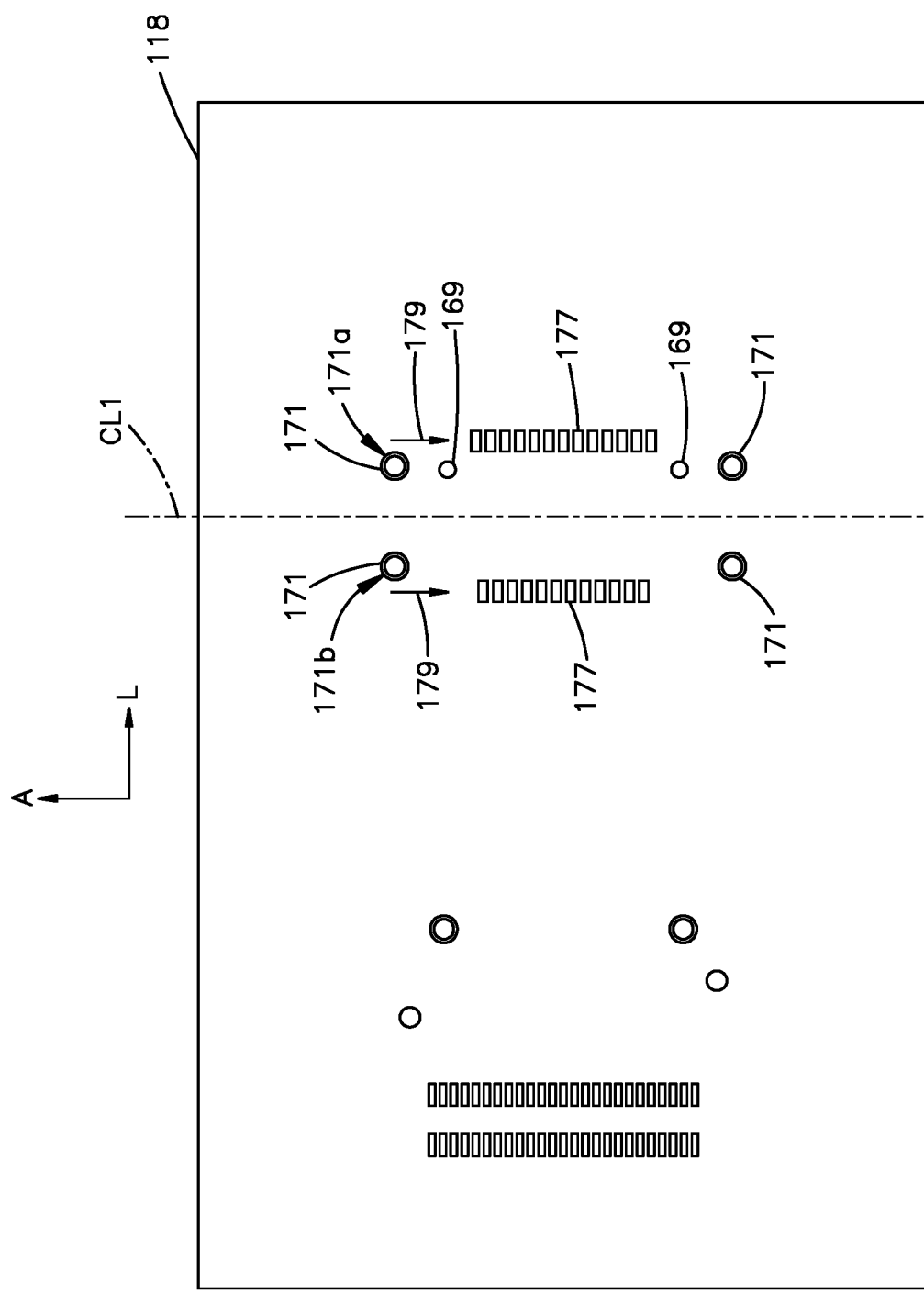

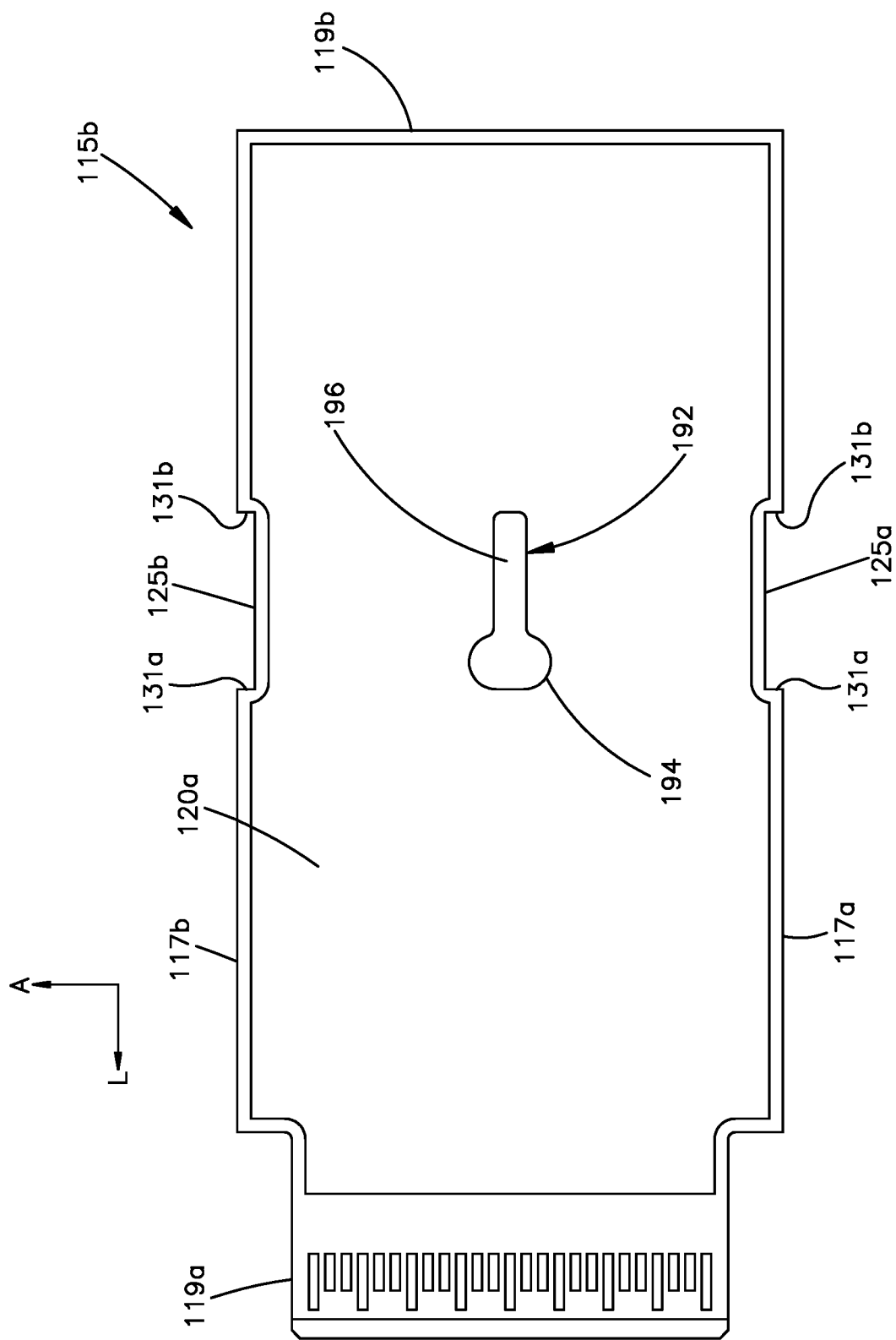

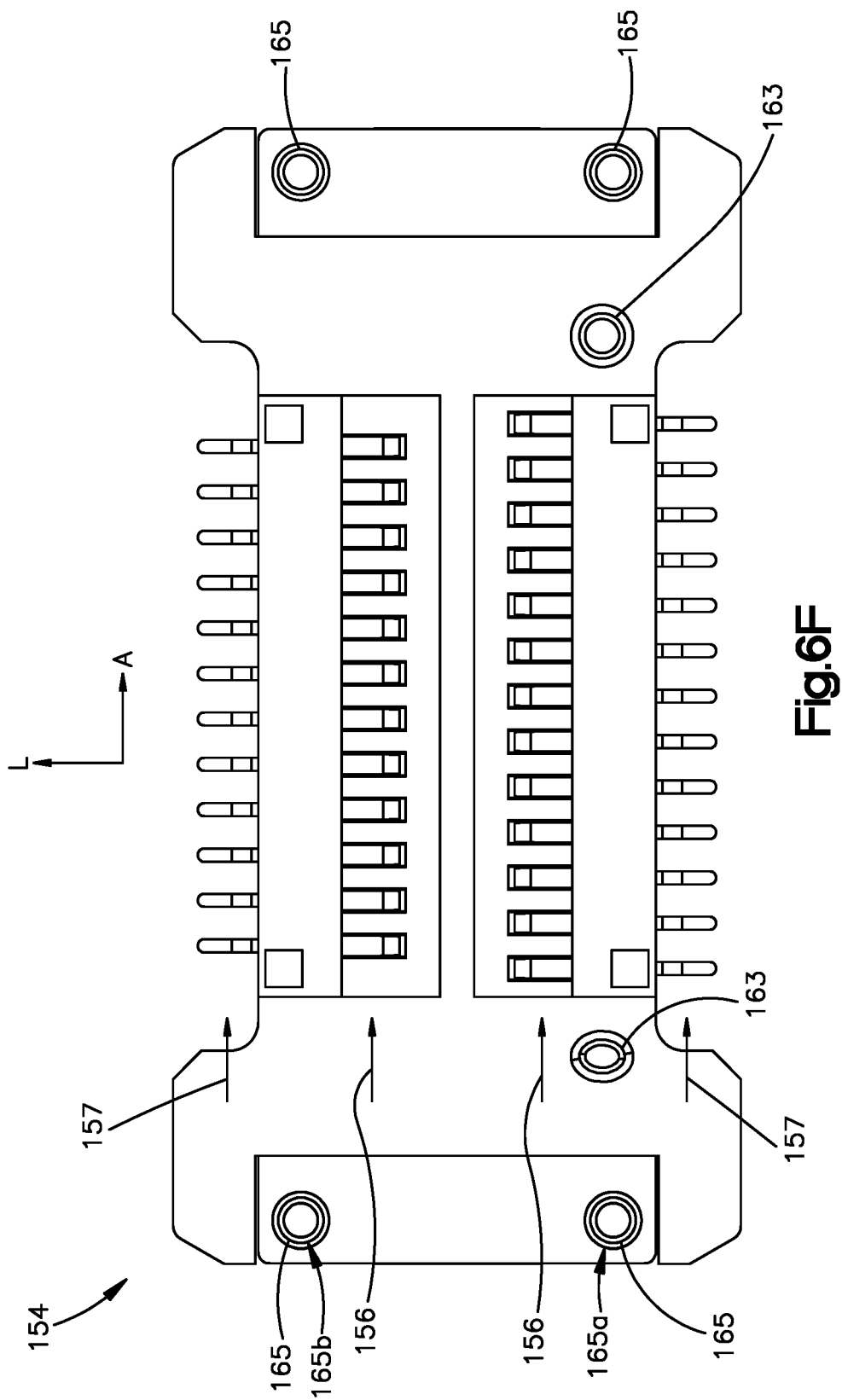

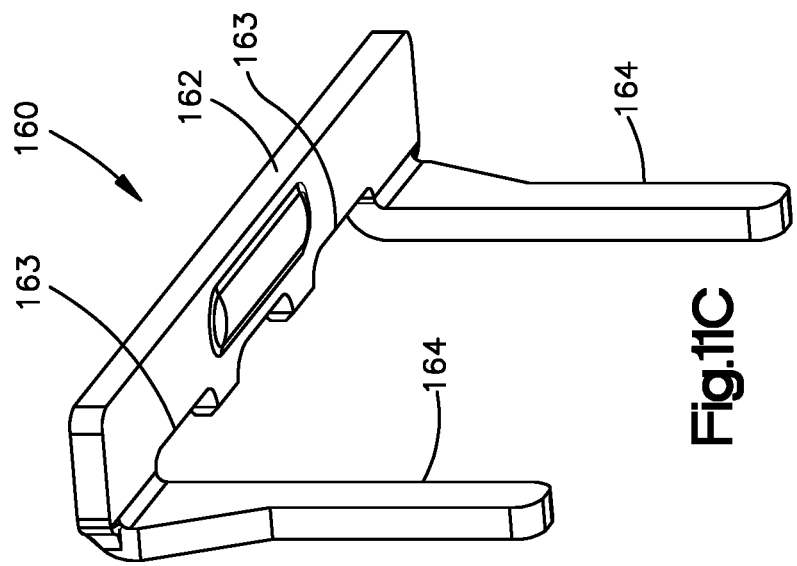
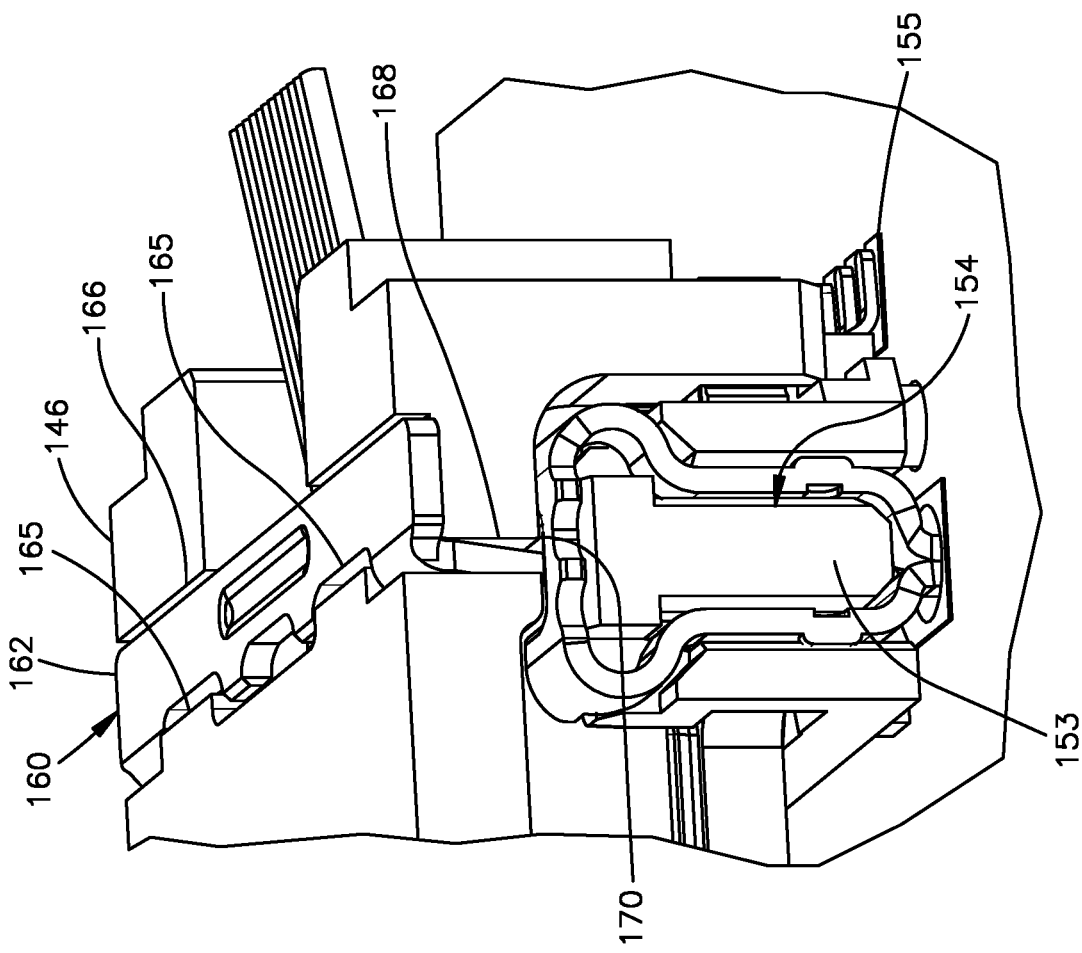

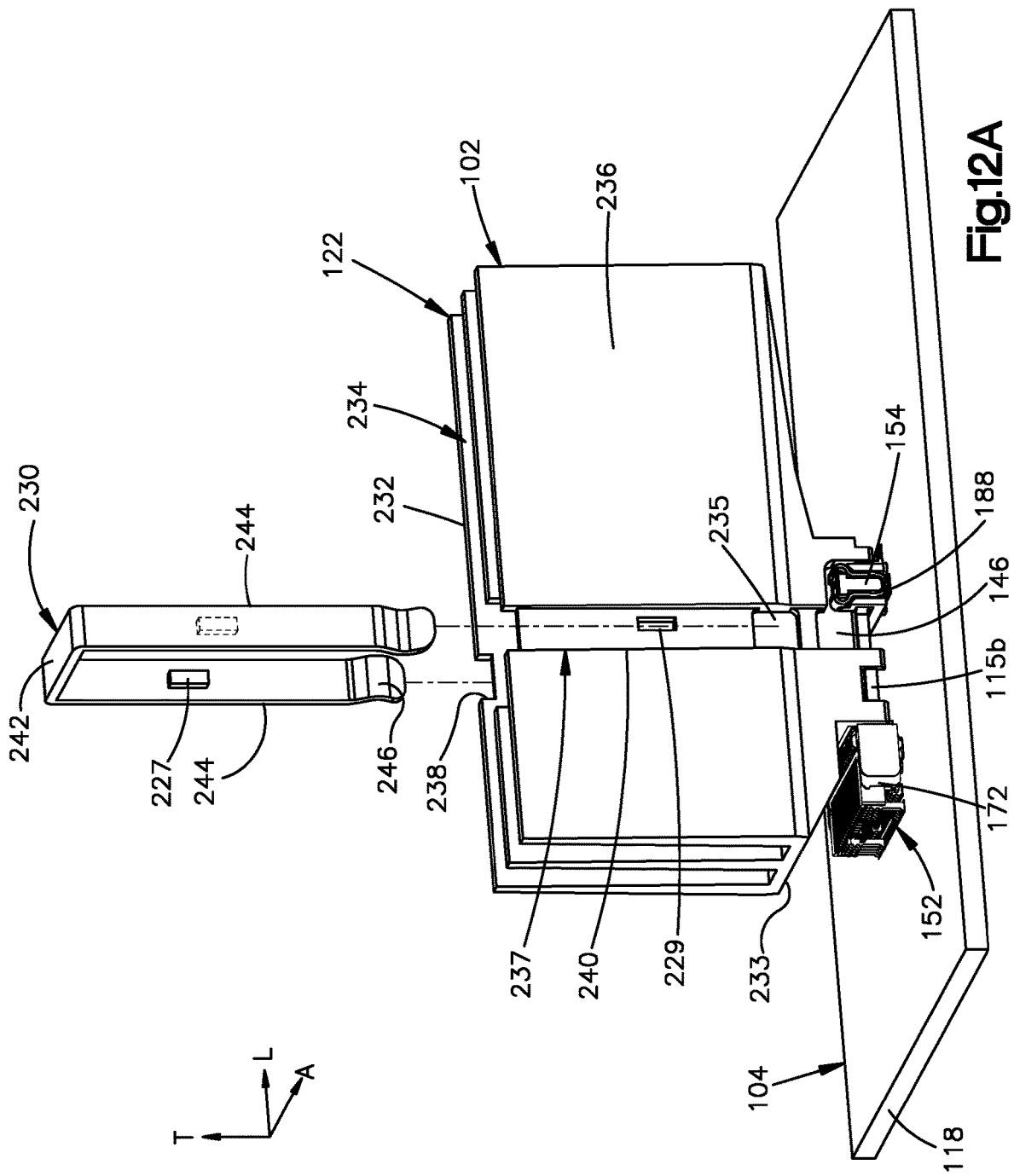

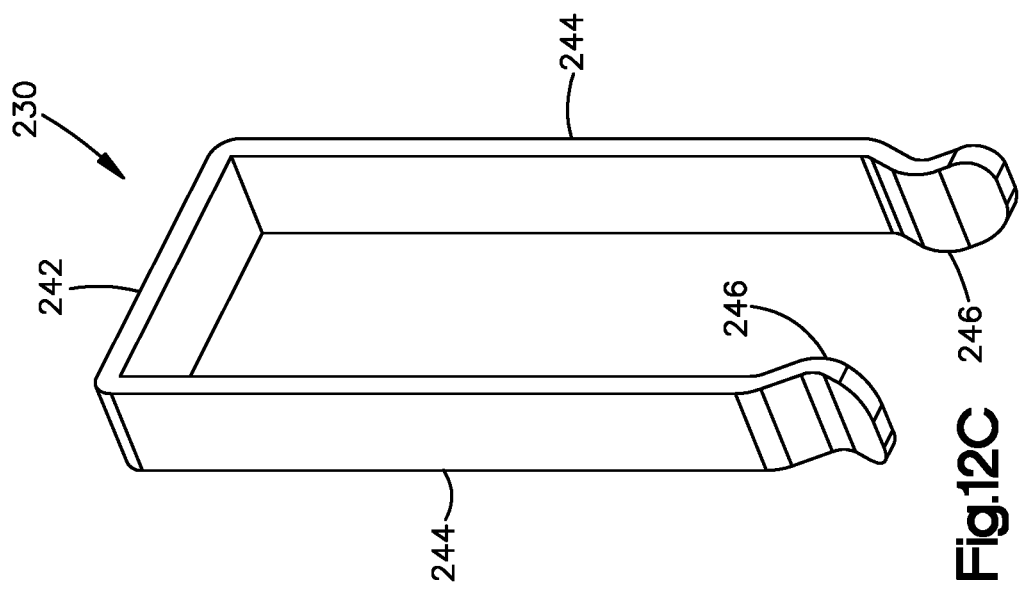
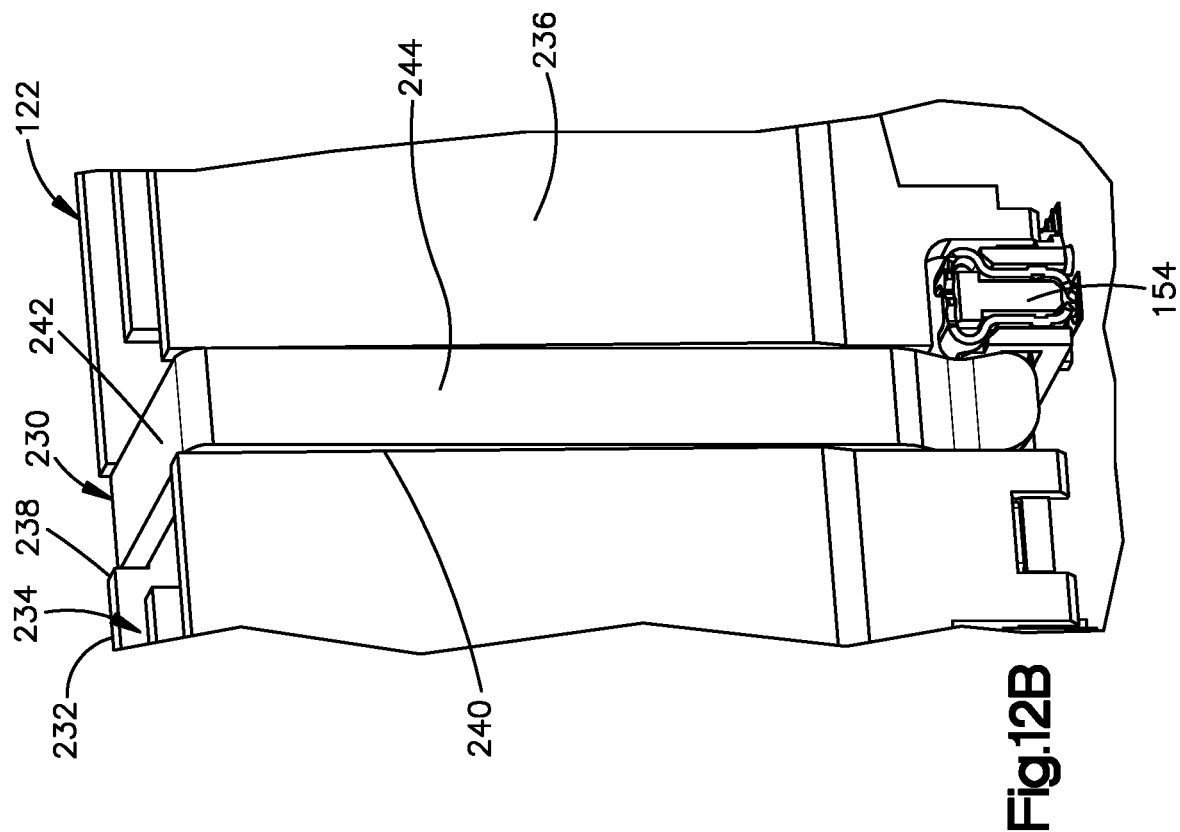

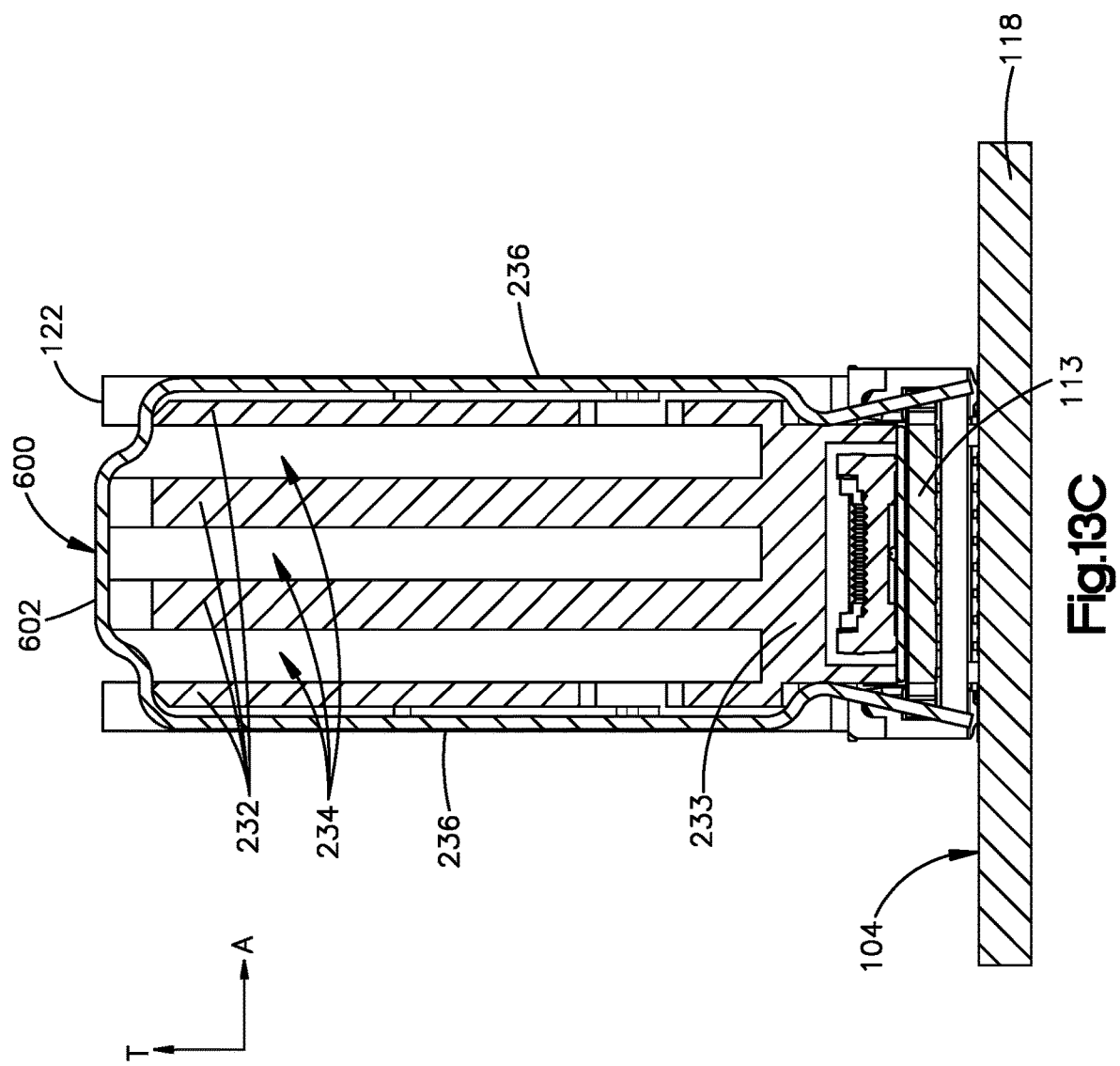

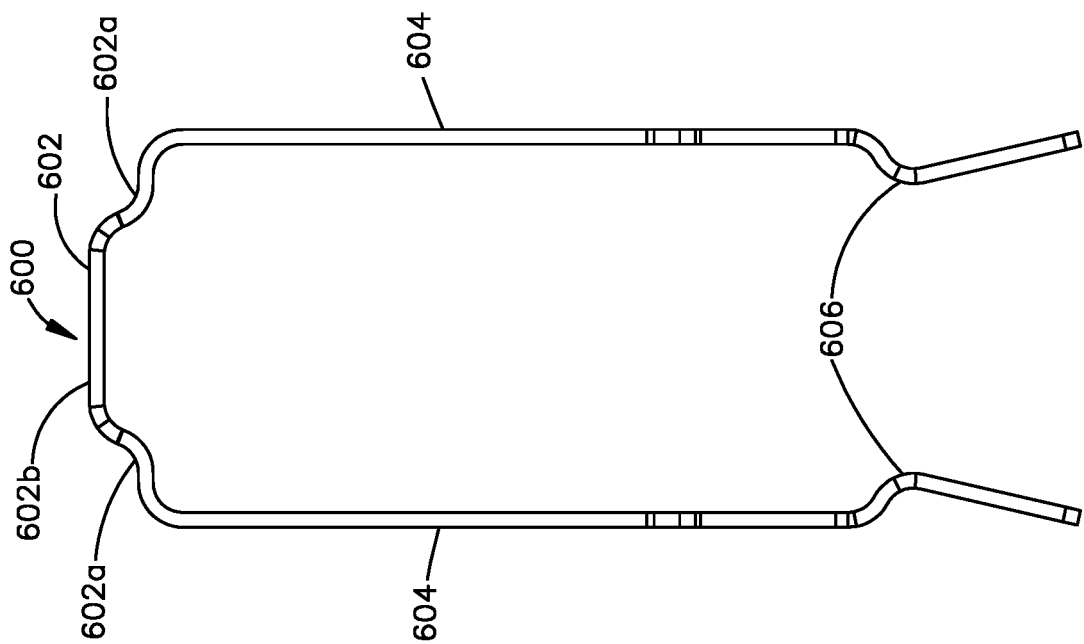
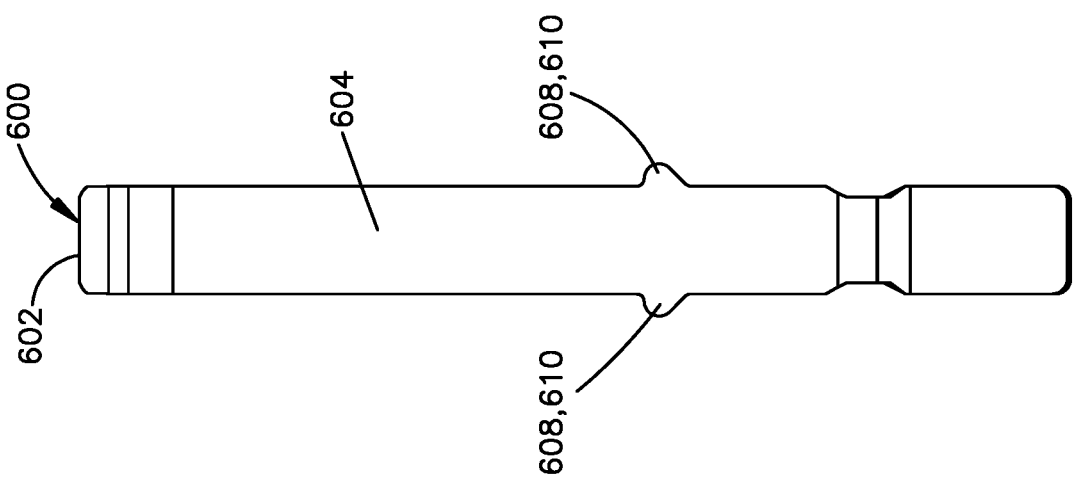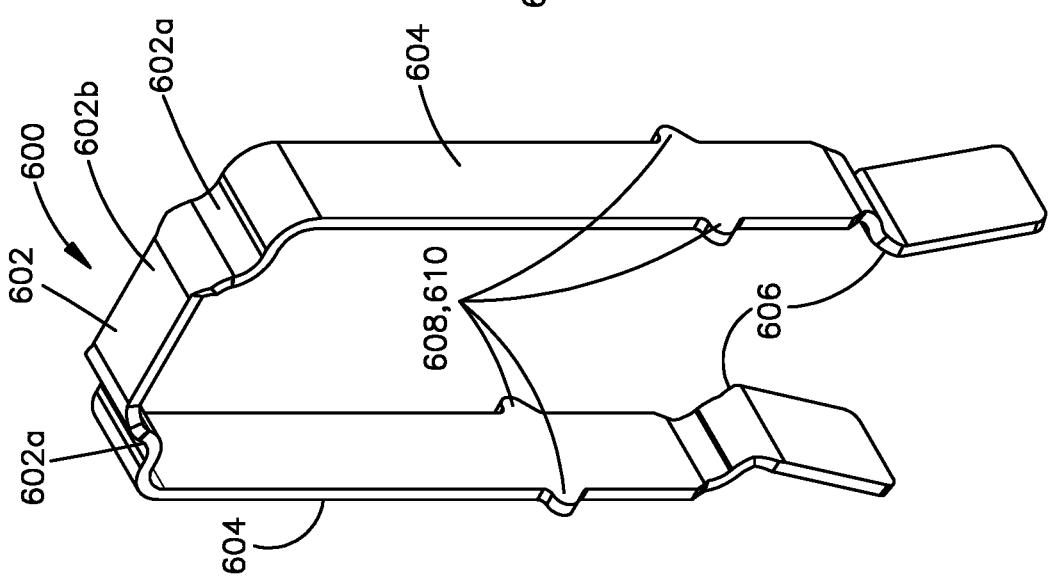

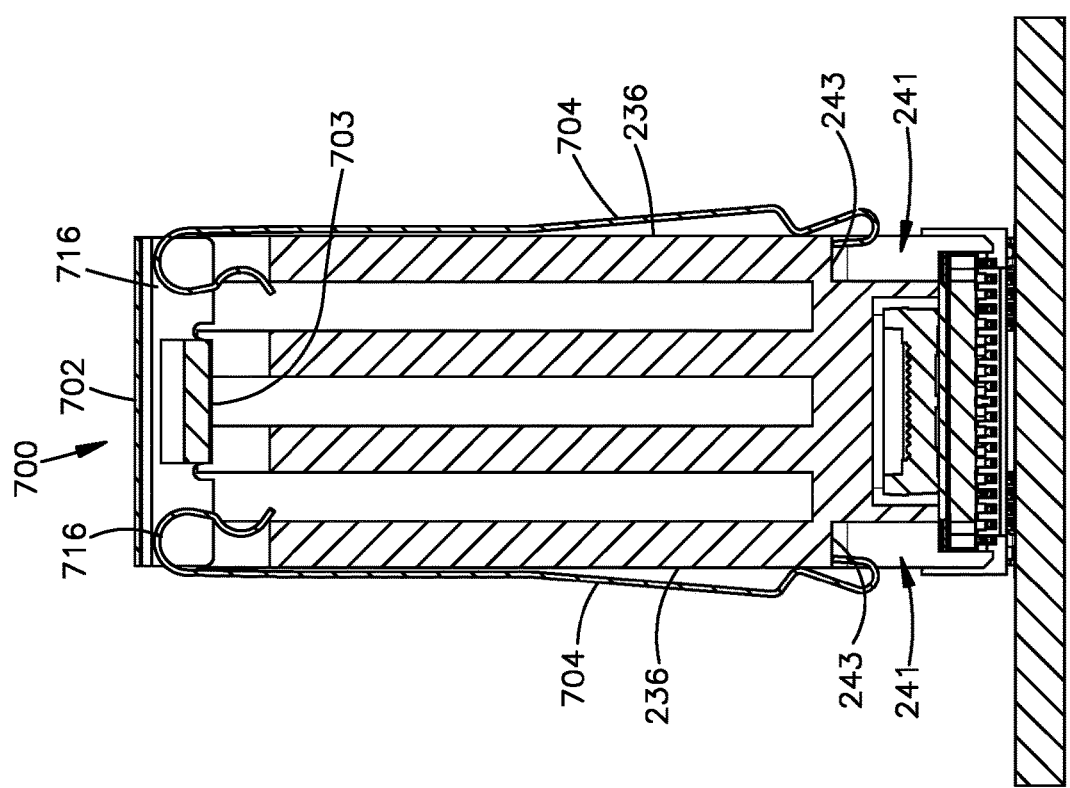
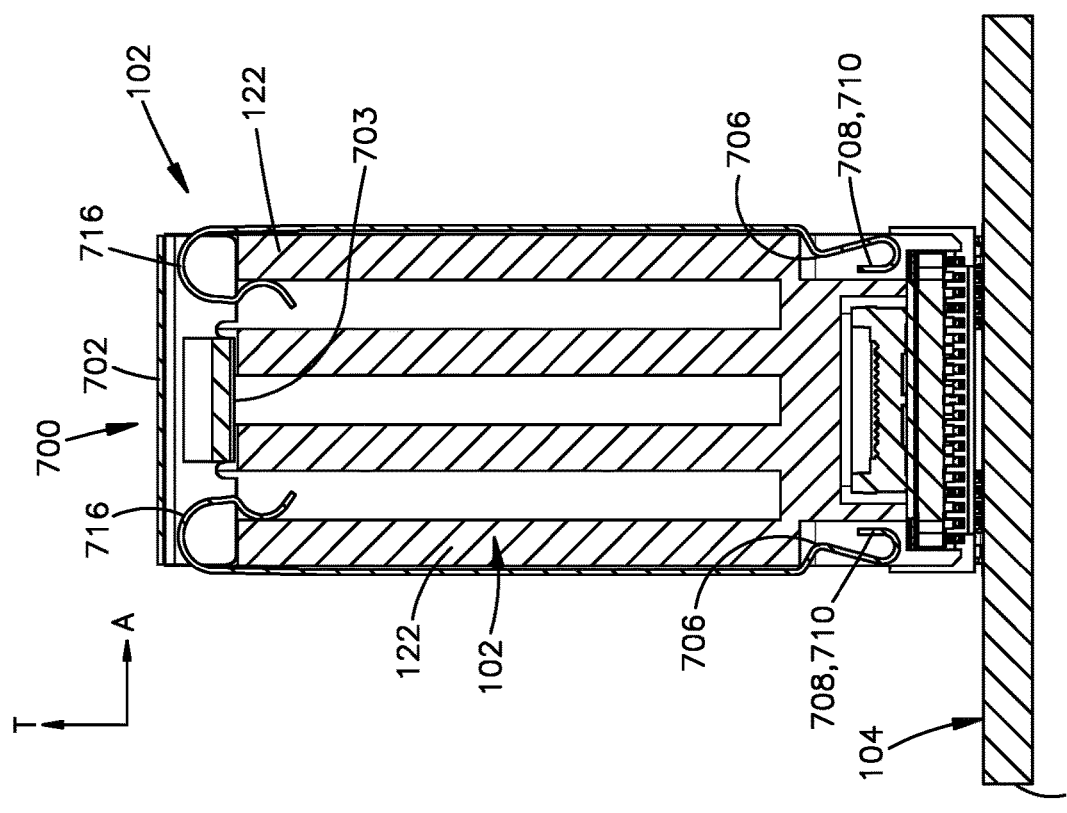

INTERCONNECT SYSTEM HAVING RETENTION FEATURES

CROSS-REFERENCE TO RELATED APPLICATIONS

This application is the National Stage Application of International Patent Application No. PCT/US2018/026860, filed Apr. 10, 2018, claims priority to U.S. Patent Application Ser. No. 62/483,932 filed Apr. 10, 2017, U.S. Patent Application Ser. No. 62/595,579 filed Dec. 6, 2017, and U.S. Patent Application Ser. No. 62/639,492 filed Mar. 6, 2018, the disclosures of each of which are hereby incorporated by reference as if set forth in their entirety herein.

U.S. Pat. No. 9,374,165 describes a plurality of interconnect systems. U.S. Pat. No. 9,374,165 is hereby incorporated by reference as if set forth in its entirety herein. As described in FIGS. 5A-7B of U.S. Pat. No. 9,374,165 as an example of one of several embodiments, a transceiver 115 can include can optical engine 115a, and a cable 116 connected to the optical engine 115a. Examples of the optical engine 115a are disclosed in U.S. Pat. Nos. 7,329,054; 7,648,287; 7,766,559; and 7,824,112, and U.S. Patent Application Publication Nos. 2008/0222351, 2011/0123150, and 2011/0123151, the entirety of each of which is hereby incorporated by reference. Examples of the optical engine 115a are further disclosed in U.S. Patent Application Ser. No. 61/562,371.

Referring to FIG. 9C of the U.S. Pat. No. 9,374,165, the cable 116 can include only one or more fiber optic cables alone or in combination with one or more copper cables. The optical engine 115a can be mounted onto a first substrate, such as a first printed circuit board 115b. The optical engine 115a is configured to receive optical signals from the cable 116, and convert the optical signals to electrical signals. Further, the optical engine 115a is configured to receive electrical signals, convert the electrical signals to optical signals, and transmit the optical signals along the cables. The circuit board 115b can include an IC chip 115f (FIG. 6D) that is configured to route and/or modify the electrical signals transmitted to and from the transceiver, including conditioning the electrical signals for protocol specific data transfers.

As shown in FIG. 10A, the interconnect system further includes a first electrical connector 152 and a second electrical connector 154 that are mounted onto at least one second substrate 118, such as a second printed circuit board. The transceiver of FIG. 9C is configured to mate with both the first electrical connector and the second electrical connector, as shown in FIG. 10C. During operation, optical signals received by the FIG. 9C transceiver from the cable 116 are converted to electrical signals. Ones of the electrical signals are routed to the first electrical connector, while others of the electrical signals are routed to the second electrical connector. For instance, high speed electrical signals can be routed to the first electrical connector, and low speed electrical signals can be routed to the second electrical connector. Electrical power can also be routed to the second electrical connector. Conversely, electrical signals received by the transceiver of FIG. 9C from the first and second electrical connectors are converted into optical signals and output along the optical cables of the cable 116. Of course, in embodiments whereby the cable includes electrically conductive cables, transceiver is configured to receive electrical signals from the electrically conductive cables, and transmit electrical signals to the cable 116. Various ones of the electrical signals are routed to the first electrical connector, and various others of the electrical signals are routed to the second electrical connector. Of course, if the cable 116 includes only electrical cables, the transceiver could be provided without the optical engine.

The first electrical connector 152 can be mounted to the second printed circuit board 118 at a location spaced in a forward direction from a location where the second electrical connector 154 is mounted to the second printed circuit board 118. Similarly, the second electrical connector 154 is spaced from the first electrical connector 152 in a rearward direction opposite the forward direction. Thus, the first electrical connector 152 can be referred to as a front electrical connector, and the second electrical connector 154 can be referred to as a rear electrical connector. In one example illustrated at FIG. 10C of U.S. Pat. No. 9,374,165, the transceiver circuit board 115b is mated to the first electrical connector 152 in the forward direction, thereby establishing an electrical connection between electrical contacts of the first electrical connector and electrically conductive lands of the first circuit board 115b. The first electrical connector 152 can be configured as a right-angle electrical connector. Next, the circuit board 115b can be mated with the second electrical connector 154 by bringing electrically conductive lands on the bottom side of the first circuit board 115b onto vertical compression electrical contacts of the second electrical connector 154, which can be configured as a vertical connector.

SUMMARY

In accordance with one aspect of the present disclosure, an electrical connector can include an electrically insulative connector housing, and a plurality of electrical contacts supported by the connector housing. The electrical contacts are configured to be mated with a first substrate when the first substrate travels in a forward direction with respect to the electrical connector. The electrical connector can further include a securement member that is supported by the connector housing. The securement member can define at least one mounting projection configured to be received in a mounting aperture of a second substrate so as to mount the electrical connector to the second substrate.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 2B is a top perspective view of an electrical connector of the host module;

FIG. 2J is a perspective view of the interconnect module illustrated in FIG. 2F, showing the latch member in a disengaged position;

FIG. 2K is a schematic side elevation view of a biasing member constructed in accordance with one embodiment;

FIG. 2L is a schematic side elevation view of a biasing member constructed in accordance with an alternative embodiment;

FIG. 2N is a top plan view of a host substrate of the host module to which the electrical connector illustrated in FIG. 2M is configured to be mounted;

FIG. 3E is a perspective view of a securement member of the electrical connector illustrated in FIG. 3A;

FIG. 4A is an exploded perspective view of an interconnect system constructed in accordance with another embodiment, including an interconnect module, a host module, and a pivotable anti-backout latch shown in an engaged position;

FIG. 4L is a bottom plan view of the electrical connector illustrated in FIG. 4F;

FIG. 4M is a top plan view of a host substrate of the host module to which the electrical connector illustrated in FIG. 4L is configured to be mounted;

FIG. 5B is a top plan view of a module substrate of the interconnect module similar to the substrate illustrated in FIG. 4H, but constructed in accordance with an alternative embodiment;

FIG. 6F is a bottom plan view of the electrical connector illustrated in FIG. 6A.

FIG. 11B is an enlarged perspective view of a portion of the interconnect system illustrated in FIG. 11A, showing the anti-backout latch in an engaged position;

FIG. 11C is a perspective view of the anti-backout latch illustrated in FIG. 11A;

FIG. 12A is an exploded perspective view of an interconnect system including an interconnect module, a host module, and an anti-backout latch constructed in accordance with another embodiment shown in a disengaged position;

FIG. 12B is an enlarged perspective view of a portion of the interconnect system illustrated in FIG. 12A, showing the anti-backout latch in an engaged position;

FIG. 12C is a perspective view of the anti-backout latch illustrated in FIG. 12A;

FIG. 13C is a cross-sectional end view of a portion of the interconnect system illustrated in FIG. 13A, showing the anti-backout latch in the engaged position;

FIG. 13D is a perspective view of the anti-backout latch of FIG. 13A;

FIG. 13E is a side view of the anti-backout latch of FIG. 13A;

FIG. 13F is a front view of the anti-backout latch of FIG. 13A;

FIG. 14C is a cross-sectional end view of a portion of the interconnect system illustrated in FIG. 14A, showing the anti-backout latch in the engaged position;

FIG. 14D is a cross-sectional end view of a portion of the interconnect system illustrated in FIG. 14A, showing the anti-backout latch in the disengaged position;

DETAILED DESCRIPTION

The present disclosure recognizes that it is desirable to prevent a third electrical connector, such as an interconnect module like a transceiver, from traveling in the rearward direction relative to the first and second connectors, which would cause the interconnect module to unmate from one or both of the first and second electrical connectors. Accordingly, various latches are disclosed that are configured to be moved to an engaged position whereby the latch prevents movement of the interconnect module in the rearward direction a sufficient distance to cause the transceiver to unmate from one or both of the first and second electrical connectors. The present disclosure includes the disclosure in U.S. Patent Application Ser. No. 62/375,050 filed on Aug. 15, 2016, which is included at Appendix J and thus forms part of the present disclosure. The present disclosure further includes the disclosure in U.S. Patent Application Ser. No. 62/451,566 filed on Jan. 27, 2017, which is included at Appendix K and thus forms part of the present disclosure.

Figure 1A:
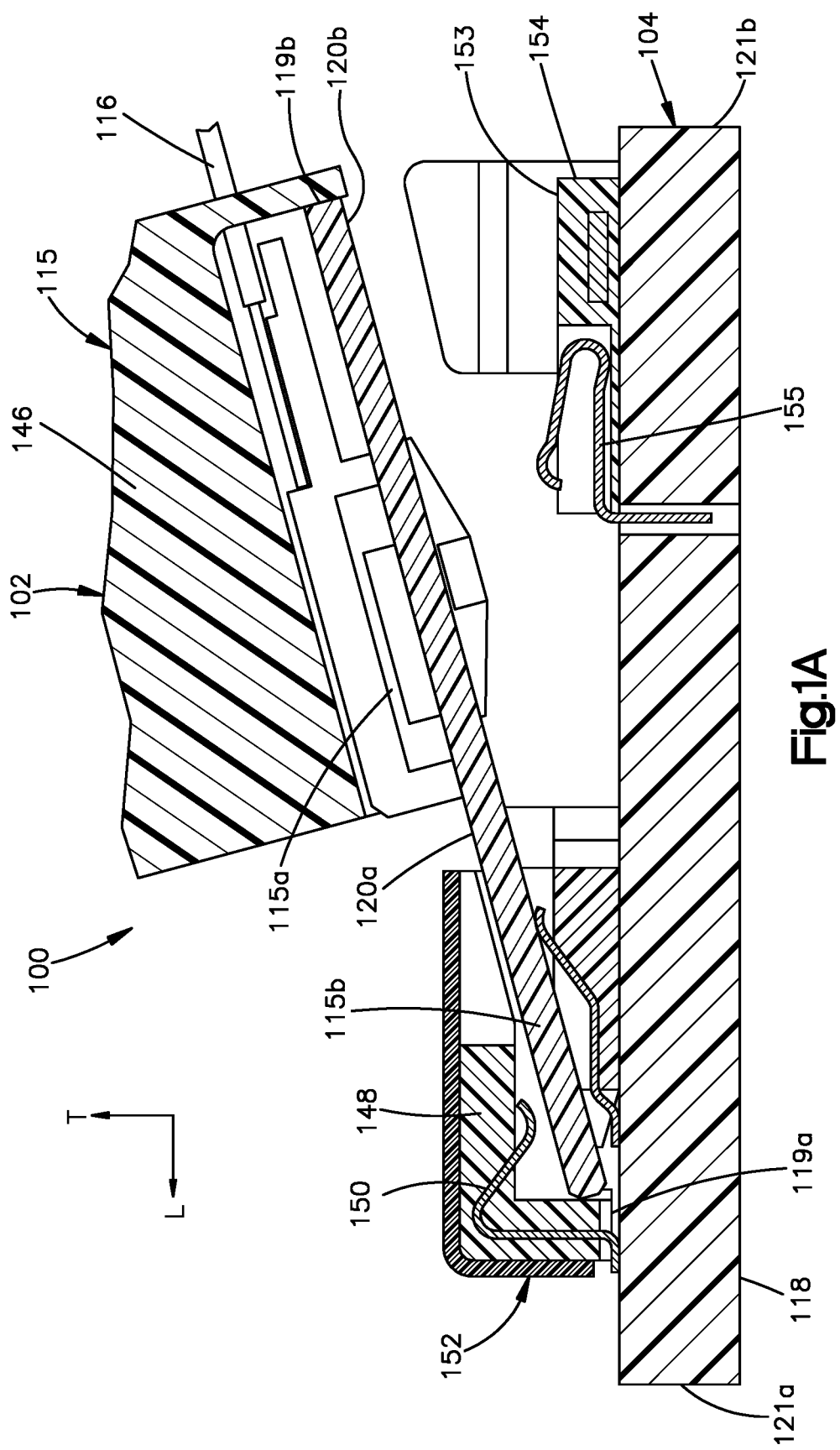
FIG. 1A is a side elevation view of an interconnect system including an interconnect module shown mated to a host module.

Referring initially to FIG. 1A, a first or module substrate 115b, which can be configured as a first printed circuit board, defines a first end 119a and a second end 119b opposite the first end 119a. In particular, the first end 119a can be spaced from the second end 119b in the forward direction. Similarly, the second end 119b can be said to be spaced from the first end 119a in the rearward direction. Thus, the first end 119a can be referred to as a front end, and the second end 119b can be referred to as a rear end.

The forward and rearward directions can be said to extend along a longitudinal direction L. The first printed circuit board 115b further defines a first side 120a and a second side 120b opposite the first side 120a. The first and second sides 120a and 120b are spaced from each other along a transverse direction T. The transverse direction T is oriented substantially perpendicular to the longitudinal direction L. The first side 120a can be said to be spaced from the second side 120b in an upward direction. Similarly, the second side 120b can be said to be spaced from the first side 120a in a downward direction opposite the upward direction. Both the upward and downward direction can be said to extend along the transverse direction T. The terms "upward," "upper," "up," and derivatives thereof are used herein with reference to the upward direction. The terms "downward," "lower," "down," and derivatives thereof are used herein with reference to the downward direction. Of course, it should be appreciated that the actual orientation of the transceiver 115 can vary during use, and that the terms upward and downward and their respective derivatives can be consistently used as described herein regardless of the orientation of the transceiver 115 during use.

The first printed circuit board 115b further defines a first row of electrically conductive lands on the first side 120a, and a second row of electrically conductive lands on the second side 120b. The lands of the first row are spaced from each other along a lateral direction A that is oriented substantially perpendicular to each of the transverse direction T and the longitudinal direction L. Similarly, the lands of the second row are spaced from each other along the lateral direction A.

The second or host substrate 118, which can be configured as a second printed circuit board, defines a first end 121a and a second end 121b opposite the first end. In particular, the first end 121a can be spaced from the second end 121b in the forward direction. Similarly, the second end 121b can be said to be spaced from the first end 121a in the rearward direction. Thus, the first end 121a can be referred to as a front end, and the second end 121b can be referred to as a rear end.

As described above, the transceiver 115 is configured to mate with the first electrical connector 152 and the second electrical connector 154. For instance, the transceiver 115 is configured to be mated to the first electrical connector 152 by inserting the transceiver 115 in the forward direction until the first end 119a of the first printed circuit board 115b is mated with the first electrical connector 152. The first printed circuit board 115b can be oriented at an angle with respect to the second printed circuit board 118. For instance, the first end 119a can be spaced a first distance from the second printed circuit board 118 along the transverse direction T, and the second end 119b can be spaced a second distance from the second printed circuit board 118 that is greater than the first distance. Once the transceiver 115 is mated with the first electrical connector 152, the second end 119b of the first printed circuit board 115b can then be brought down onto the second electrical connector 154 such that electrical lands on the second side 120b of the printed circuit board 115b are placed in contact with electrical contacts of the second electrical connector 154. Alternatively, the first printed circuit board 115b can be oriented parallel to the second printed circuit board 118 while being mated to the first electrical connector 152, in which case the first printed circuit board 115b can be mated to the second electrical connector 154 substantially simultaneously with mating to the first electrical connector 152.

Figure 1B:
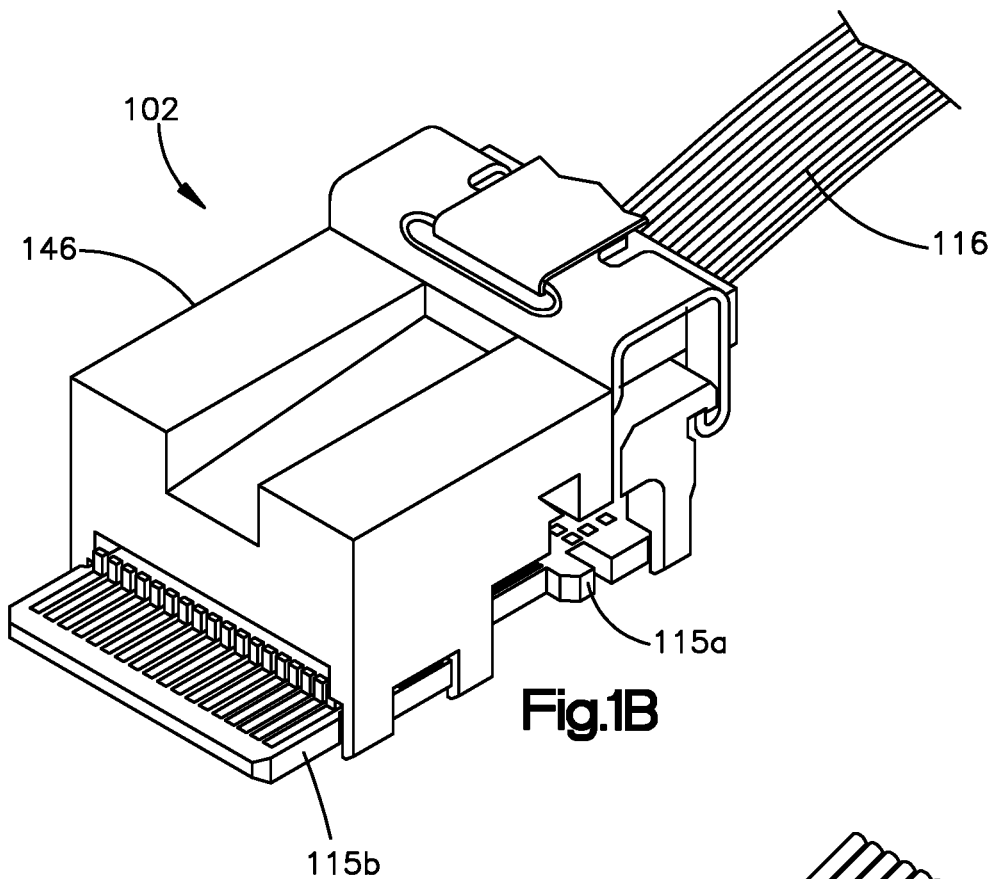
FIG. 1B is a perspective view of the interconnect module of FIG. 1A in accordance with one embodiment.
Figure 1C:
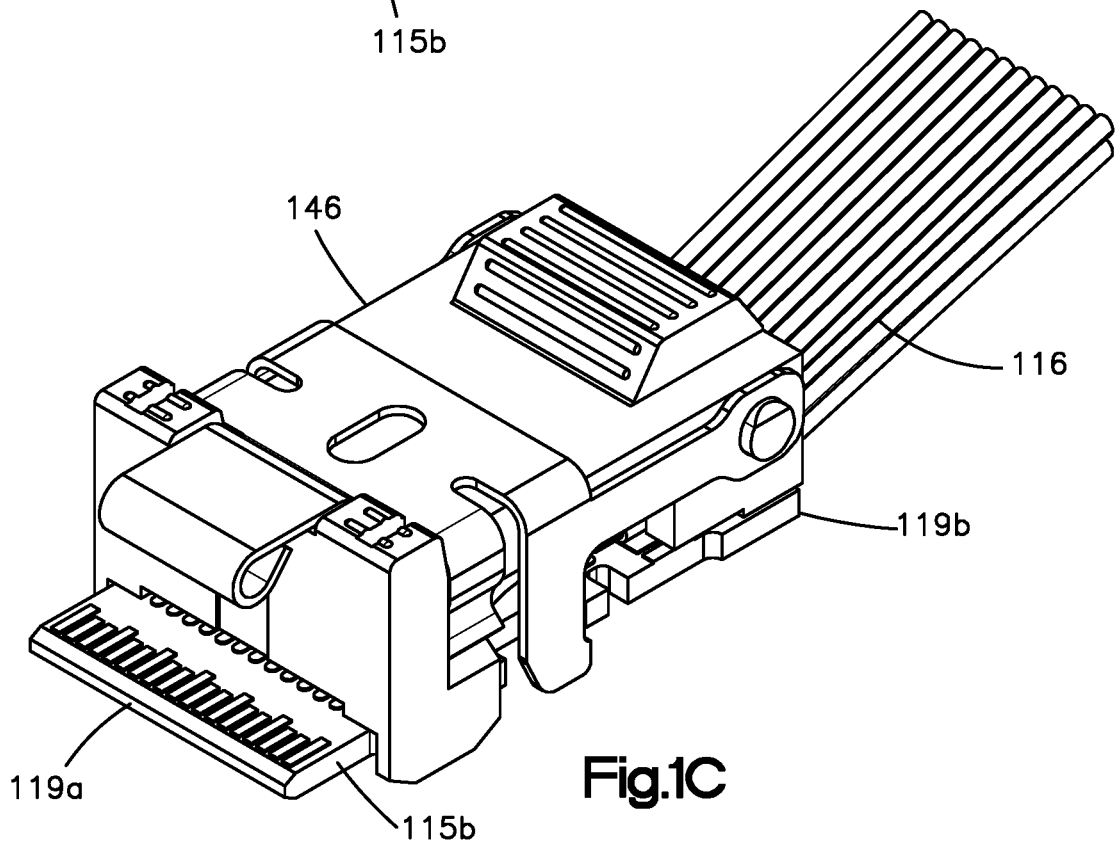
FIG. 1C is a perspective view of the interconnect module of FIG. 1A in accordance with another embodiment.

While the first electrical connector 152 may be configured to receive high speed electrical signals, and the second electrical connector 154 may be configured to receive low speed electrical signals, power signals, or both it should be appreciated that the first and second electrical connectors 152 and 154 can be alternatively configured as desired. Further, while the interconnect module 102 is configured as the transceiver 115 in accordance with one embodiment, the interconnect module 102 can be alternatively configured as desired as an electrical component that is configured to be placed in electrical communication with each of the first and second electrical connectors 152 and 154. The interconnect module 102 can further include a module housing 146 that can at least partially surround one or more components of the interconnect module 102. For instance, as illustrated in FIG. 1B, where the interconnect module 102 is configured as a transceiver that includes the optical engine 115a and optical cables 116A, the module housing 146 can be a metallic heat sink configured to transfer heat away from the optical engine 115a. As illustrated in FIG. 1C, where the cable 116 includes only electrically conductive cables, the module housing 146 can be a plastic housing that at least partially surrounds one or more components of the transceiver. The module housing 146 can be mounted to, or otherwise supported by, the first printed circuit board 115b. In one example, for instance when the interconnect module 102 includes an optical transceiver, the module housing 146 can be configured as a heat sink. Thus, as shown in FIG. 1B, the module housing 146 can be a metal, thermally conductive plastic, or any alternative suitable thermally conductive material. In other embodiments like FIG. 1C, for instance when the cable 116 includes only electrically conductive cables, the module housing 146 can be configured as an electrically insulative material, such as a plastic. Module housing 146 can be electrically conductive or electrically non-conductive, regardless of the type of cable 116, 116A used.

Figure 2A:
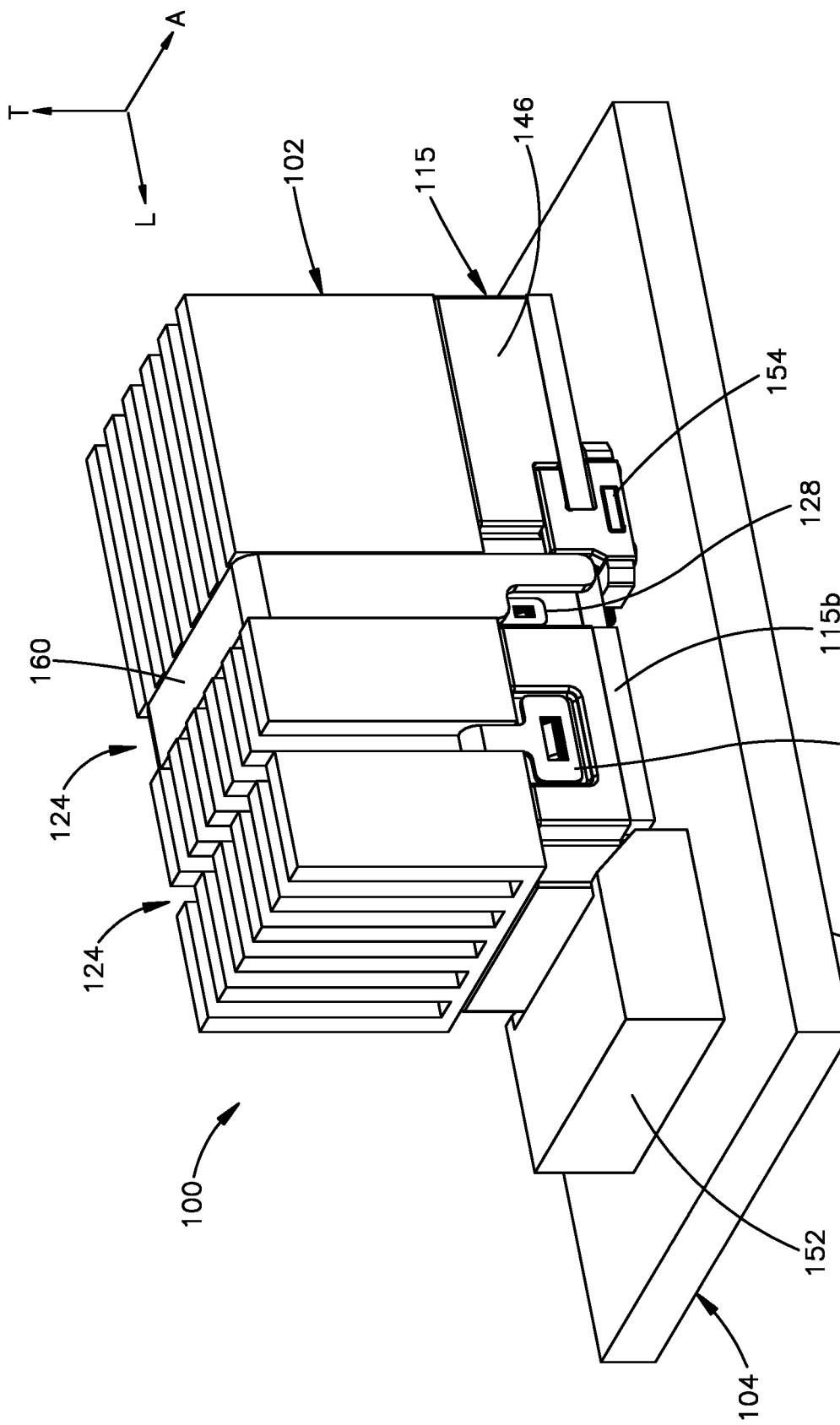
FIG. 2A is a perspective view of an interconnect system including an interconnect module, a host module, and a translatable anti-backout latch shown in an engaged position.

Referring generally now to FIGS. 2A-6G, it is recognized that it is desirable to prevent the interconnect module 102 from inadvertently unmating from one or both of the first and second electrical connectors 152 and 154, respectively. Accordingly, as shown in FIG. 2A, an interconnect system 100 can include the interconnect module 102, such as the transceiver 115 described above, and an anti-backout latch that is configured to prevent backout of the interconnect system 100 in the rearward direction. In this regard, it should be appreciated that the interconnect system 100 can further include one or both of the first and second electrical connectors 152 and 154. The interconnect system 100 can further include the second printed circuit board 118, either alone or in combination with one or both of the first and second electrical connectors 152 and 154. Further, one or both of the first and second electrical connectors 152 and 154 can be mounted onto the second printed circuit board 118 in the manner described above. The second printed circuit board 118 with at least one or both of the first and second electrical connectors 152 and 154 mounted thereto can be referred to as a host module 104. The latch can be configured in accordance with any suitable embodiment as desired, including those described in more detail below with reference to FIGS. 2A-10C. The latch can be made of any suitable material, such as a metal or a plastic.

As will further be described below with reference to FIGS. 2A-6G, it is also desired to ensure that the first and second electrical connectors 152 and 154 are robustly secured to the underlying host substrate 118. Thus, the interconnect system can 100 can include securement members that are configured to further secure one or both of the first and second electrical connectors 152 and 154 to the underlying host substrate 118.

Figure 2C:
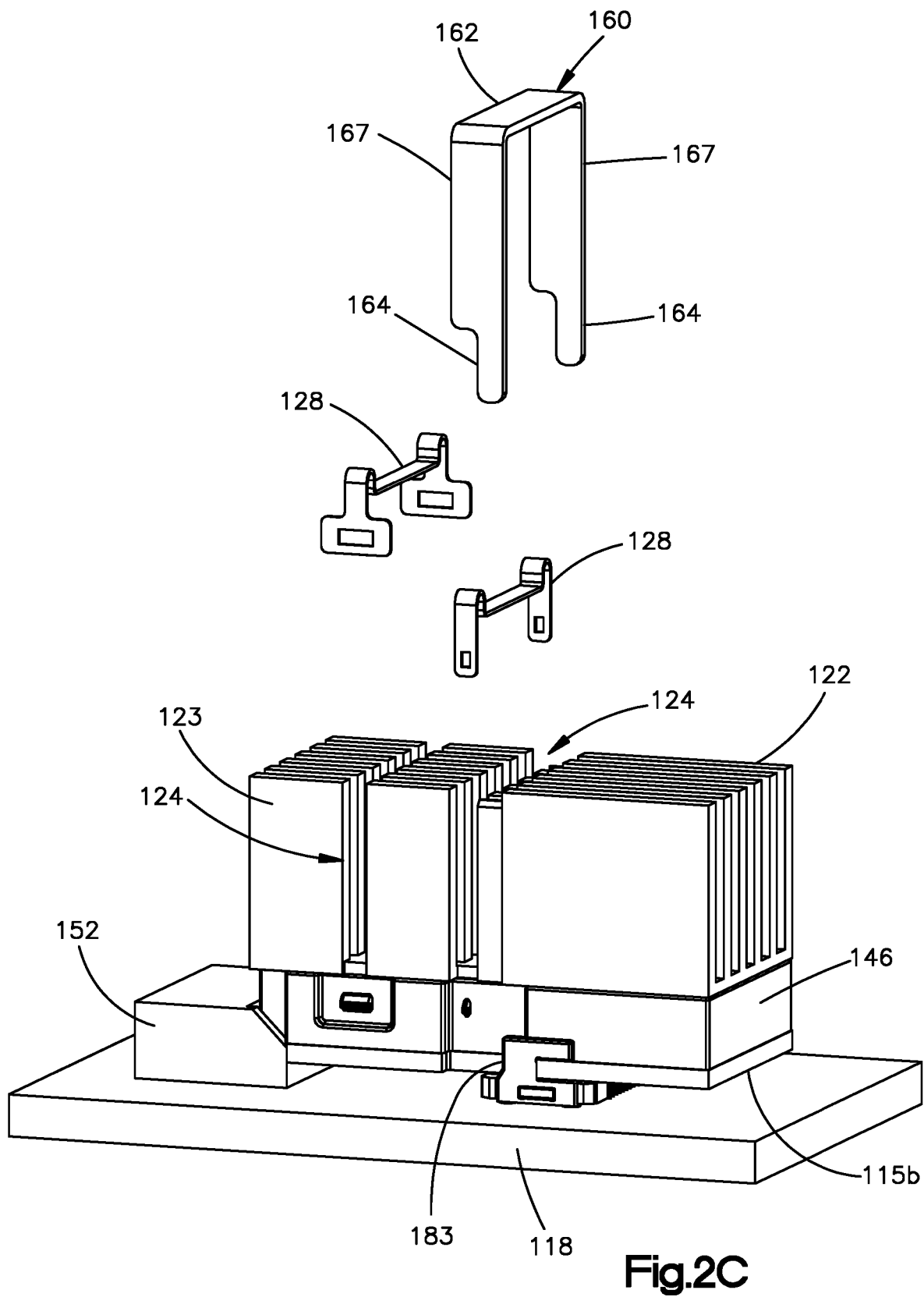
FIG. 2C is an exploded perspective view of the interconnect system illustrated in FIG. 2A, including a heat sink.

Referring to FIGS. 2A-2C, the interconnect system 100 can include the interconnect module 102 and the host module 104. The host module 104 can include the host substrate 118. Alternatively or additionally, the host module 104 can include at least one host electrical connector. The at least one host electrical connector can include one or both of the first electrical connector 152 and the second electrical connector 154. The first and second electrical connectors 152 and 154 can be configured to be mounted to the host substrate 118. Alternatively, the first and second electrical connectors 152 and 154 can be mounted to the host substrate 118.

The first electrical connector 152 includes a first electrically insulative connector housing and a first plurality of electrical contacts that are supported by the connector housing. The first connector housing can be made of plastic. For instance, the first plurality of electrical contacts can be arranged in rows that are oriented along the lateral direction A. The first plurality of electrical contacts can define electrical signal contacts (S) and electrical ground contacts (G). The contacts can be arranged in any suitable pattern along the respective rows. For instance, the electrical contacts can be arranged in a repeating S-S-G pattern along the respective rows. It should be appreciated that the rows can begin with the first signal contact S, the second signal contact S, or the ground contact G. Further, the rows can end with the first signal contact S, the second signal contact S, or the ground contact G. The first connector housing defines a receptacle that is configured to receive the first end of the module substrate 115b so as to mate the interconnect module 102 with the first electrical connector 152. In particular, the first end of the module substrate 115b is configured to be inserted into the receptacle of the first connector housing in the forward direction so as to cause electrically conductive lands of the module substrate 115b to mate with respective ones of the first plurality of electrical contacts of the first electrical connector 152. The forward direction can be oriented along a longitudinal direction L. The longitudinal direction L further defines a rearward direction that is opposite the forward direction.

The second electrical connector 154 includes a second electrically insulative connector housing 153 and a second plurality of electrical contacts 155 that are supported by the connector housing. The second connector housing 153 can be made of a plastic. The second plurality of electrical contacts 155 can extend out of the second connector housing 153 along the transverse direction T away from the host substrate 118. Thus, electrically conductive lands on a lower surface of the second end of the module substrate 115b can be brought into contact with the respective ones of the second plurality of electrical contacts 155, so as to mate the interconnect module 102 with the second electrical connector 154. It is recognized that the electrical contacts 155 can be configured as compression contacts that compress toward the underlying host substrate 118 in response to contact with the module substrate 115b. In particular, the electrical contacts 155 define contact locations 158 that are configured to contact the module substrate 115b so as to place the electrical contacts 155 in electrical communication with the module substrate 115b. For instance, the contact locations 158 can be the uppermost locations of the electrical contacts 155 along the transverse direction T. In one example, the electrical contacts 155 can define curved mating ends whose apices define the contact locations 158. The second plurality of electrical contacts 155 can be arranged in at least one row 156 that is oriented along the lateral direction A. For instance, the electrical contacts 155 can be arranged in first and second rows 156 that are spaced from each other along the longitudinal direction L. The contact locations 158 can be aligned with the rows 156. The second electrical contacts 155 can define electrical signal contacts (S) and electrical ground contacts (G). The contacts can be arranged in any suitable pattern along the respective rows. For instance, the electrical contacts can be arranged in a repeating S-S-G pattern along the respective rows. It should be appreciated that the rows can begin with the first signal contact S, the second signal contact S, or the ground contact G. Further, the rows can end with the first signal contact S, the second signal contact S, or the ground contact G.

The interconnect system 100 can include an anti-backout latch 160 designed to prevent the interconnect module 102 from being inadvertently unmated from the host module 104. The latch 160 can include a support member 162 that is configured to be placed in mechanical communication with the interconnect module 102, and at least one finger 164 that extends out or perpendicularly with respect to the support member 162 and is configured to be placed in mechanical communication with the host module 104. For instance, the at least one finger 164 can extend down from the support member 162 along the transverse direction T. Alternatively, the latch 160 can include an arm 167 that extends down from the support member 162, and the finger 164 can extend down from the arm 167. The finger 164 can define a length along the longitudinal direction L that is less than that of the arm 167.

When the interconnect module 102 is mated with the at least one electrical connector of the host module 104, the latch 160 can be movable between a disengaged position and an engaged position. In particular, the latch 160 can be translatable along the transverse direction T between the disengaged position and the engaged position. For instance, the latch 160 can be translatable in the downward direction to move the latch 160 from the disengaged position to the engaged position, and in the upward direction to move the latch 160 from the engaged position to the disengaged position. When the latch 160 is in the engaged position, a first mechanical interference is defined between the latch 160 and the interconnect module 102 that limits rearward movement of the interconnect module 102 with respect to the latch 160 in the rearward direction. The first mechanical interference can include an abutment between the anti-backout latch 160 and the interconnect module 102. Alternatively, the latch 160 can be monolithic with the interconnect module 102 so as to define the first mechanical interference.

Further, when the latch 160 is in the engaged position, a second mechanical interference is defined between the latch 160 and the host module 104 limits rearward movement of the latch 160 respect to the at least one electrical connector of the host module 104. In particular, the second mechanical interference can be defined between the latch finger 164 and the host module 104. The second mechanical interference can include an abutment between the anti-backout latch 160 and the host module 104. The limited rearward movements can prevent the interconnect module 102 from moving in the rearward direction with respect to the at least one electrical connector of the host module 104 a distance that would be sufficient to unmate the interconnect module 102 from the at least one electrical connector of the host module 104. For instance, the first and second mechanical interferences can substantially prevent rearward movement of the interconnect module 102 with respect to the anti-backout latch 160, and of the latch 160 with respect to the at least one electrical connector of the host module 104, respectively. When the latch 160 is in the disengaged position, at least the second mechanical interference is removed, such that the interconnect module 102 is movable in the rearward direction with respect to the at least one electrical connector of the host module 104 a sufficient distance so as to unmate the interconnect module 102 from the at least one electrical connector of the host module 104.

The latch 160 can include a pair of first and second fingers 164 that may be spaced apart from each other along the lateral direction A. The first and second fingers 164 can be oriented parallel to one another. The support member 162 can be connected between the fingers 164. For instance, the support member 162 can be connected between the fingers 164 along the lateral direction A. The support member 162 and the fingers 164 can be monolithic with each other. Alternatively, the support member 162 and fingers 164 can be attached to each other in any suitable manner as desired. The support member 162 can be configured as an upper cross-bar that is elongate along the lateral direction A. The fingers 164 can extend down with laterally opposed ends of the support member 162. For instance, the fingers 164 can be elongate along the transverse direction T.

The interconnect system 100, and in particular the host module 104, can include at least one securement member 183 that is configured to engage the latch 160 when the latch is in the engaged position. For instance, the second electrical connector 154 can include the at least one securement member 183. The securement member 183 can be further configured to retain the module substrate 115b against the electrical contacts of the second electrical connector 154. The securement member 183 can be configured to secure the module substrate 115b to the second electrical connector 154 with respect to separation along the transverse direction T.

The securement member 183 can be supported by the second connector housing 153. For instance, the securement member 183 can be attached to the second connector housing 153. Alternatively, the securement member 183 can be monolithic with the second connector housing 153. In this regard, it should be appreciated that the securement member 183 can be made from the same material as the second connector housing 153 or of a different material than the second connector housing 153. For instance, the securement member 183 can be made of a plastic. Alternatively or additionally, the securement member 183 can be made of a metal. In one example, the interconnect module 102 can include first and second securement members 183 supported by the connector housing 153 at locations spaced from each other along the lateral direction A. For instance, the first and second securement members 183 can be supported by laterally opposed ends of the connector housing 153. Thus, the first and second securement members 183 can be aligned with each other along the lateral direction A.

The securement member 183 includes a base 500 and a securement wall 502 that extends up from the base 500 along the transverse direction T. The securement wall 502 defines a front surface 504. The front surface 504 can face the forward direction. The securement member 183 can further include a substrate retention member that can be configured as a substrate retention arm 506. The substrate retention arm 506 is spaced from the base 500 along the transverse direction T a distance that is at least equal to the thickness of the module substrate 115b along the transverse direction T. Thus, the securement member 183 can define a substrate receiving gap 508 sized to receive a portion of the module substrate 115b. The substrate receiving gap 508 can be defined between the retention arm 506 and the base 500 along the transverse direction T. The substrate receiving gap 508 is open in the rearward direction, such that the module substrate 115b can be inserted into the gap 508 in the forward direction. The retention arm 506 can extend from the securement wall 502 along the rearward direction. The retention arm 506 can define a beveled lead-in surface 514 (see FIG. 2D) that is configured to guide the module substrate 115b into the gap 508. The beveled lead-in surface 514 is sloped toward the base 500 as it extends in the forward direction toward the securement wall 502. The securement member 183 can limit forward movement of the module substrate 115. For example, when the module substrate 115b is received in the gap 508, the module substrate 115b can abut a rear surface 505 of the securement wall 502 so as to obstruct forward movement of the module substrate 115b.

The securement member 183 can be configured to attach to the second connector housing 153. For instance, the securement member 183 can define a securement opening 510 that is sized to receive a projection 512 of the second connector housing 153 so as to secure the securement member 183 to the second connector housing 153. The securement opening 510 can be defined by the base 500, and can extend into or through the base 500 along the lateral direction A. The projection 512 can extend out in the lateral direction A. The projection 512 can be sized to be press fit in the securement opening 510. The projection 512 and the securement openings 510 can each define non-circular shapes to prevent the securement member 183 from rotating with respect to the second connector housing 153 about an axis that is oriented along the lateral direction A. Alternatively or additionally, the securement member 183 can include one or more projections that extend along the lateral direction A into receiving apertures of the connector housing 153. Thus, the projections can be circular or non-circular in shape as desired.

Referring now to FIG. 2B, a connector centerline CL can be oriented along the lateral direction A and can bisect the second electrical connector 154 into equal halves along the longitudinal direction L. In one example, the front surface 504 and a first one of the rows 156 can be disposed on the same side of the connector centerline CL with respect to a second one of the rows 156. The first one of the rows 156 can be disposed between the connector centerline CL and the front surface 504 with respect to the longitudinal direction L. The retention arm 506 can extend from the securement wall 502 to a free end that is disposed such that the second one of the rows 156 is disposed between the free and the connector centerline CL, the second one of the rows 156 defined by the contact locations 158 when the contact locations 158 are not compressed. The base 500 defines a front end that is disposed such that the first one of the rows 156 is disposed between the front end of the base 500 and the centerline CL.

Figure 2D:
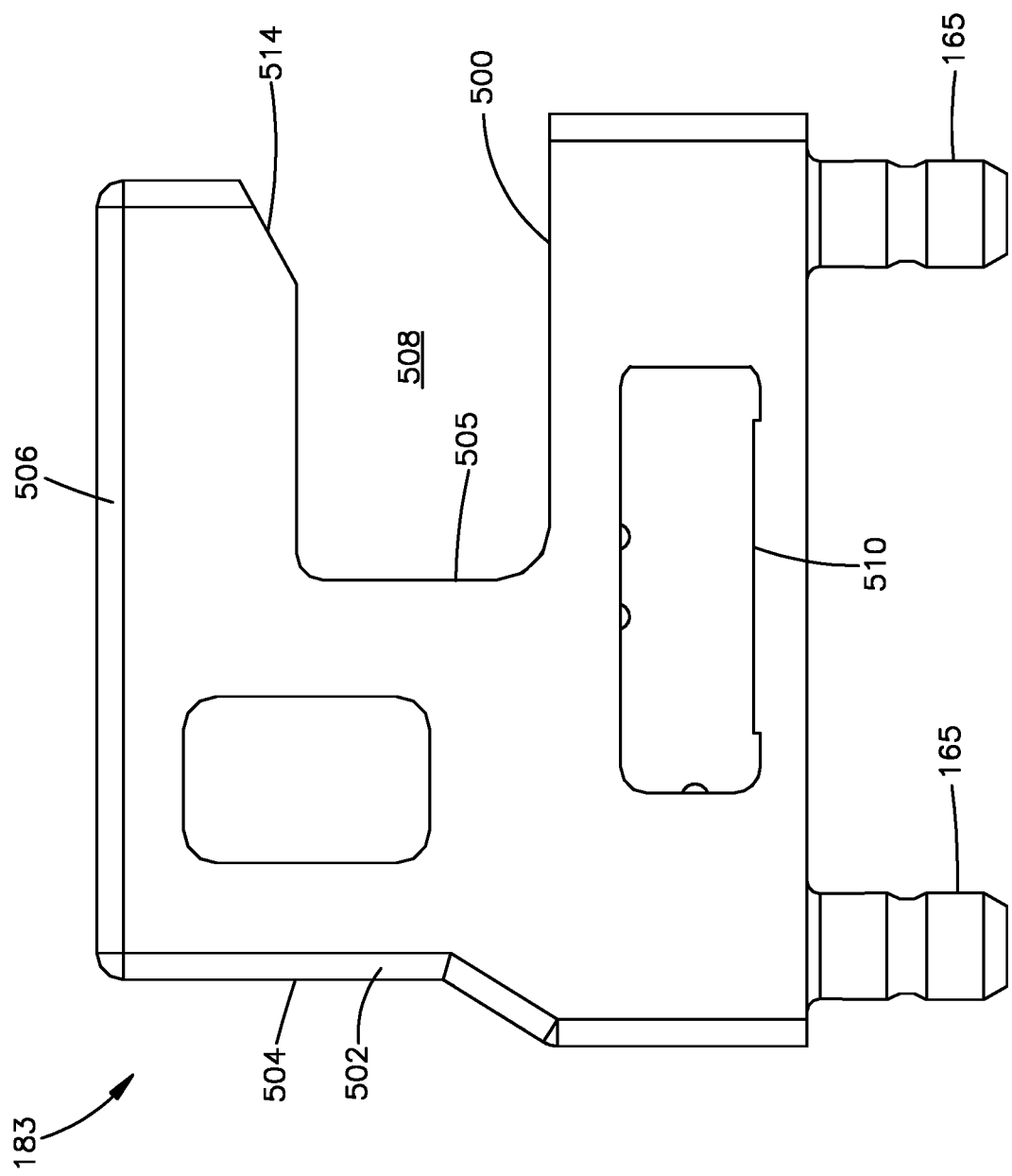
FIG. 2D is a side elevation view of a securement member of the electrical connector illustrated in FIG. 2B.
Figure 2E:
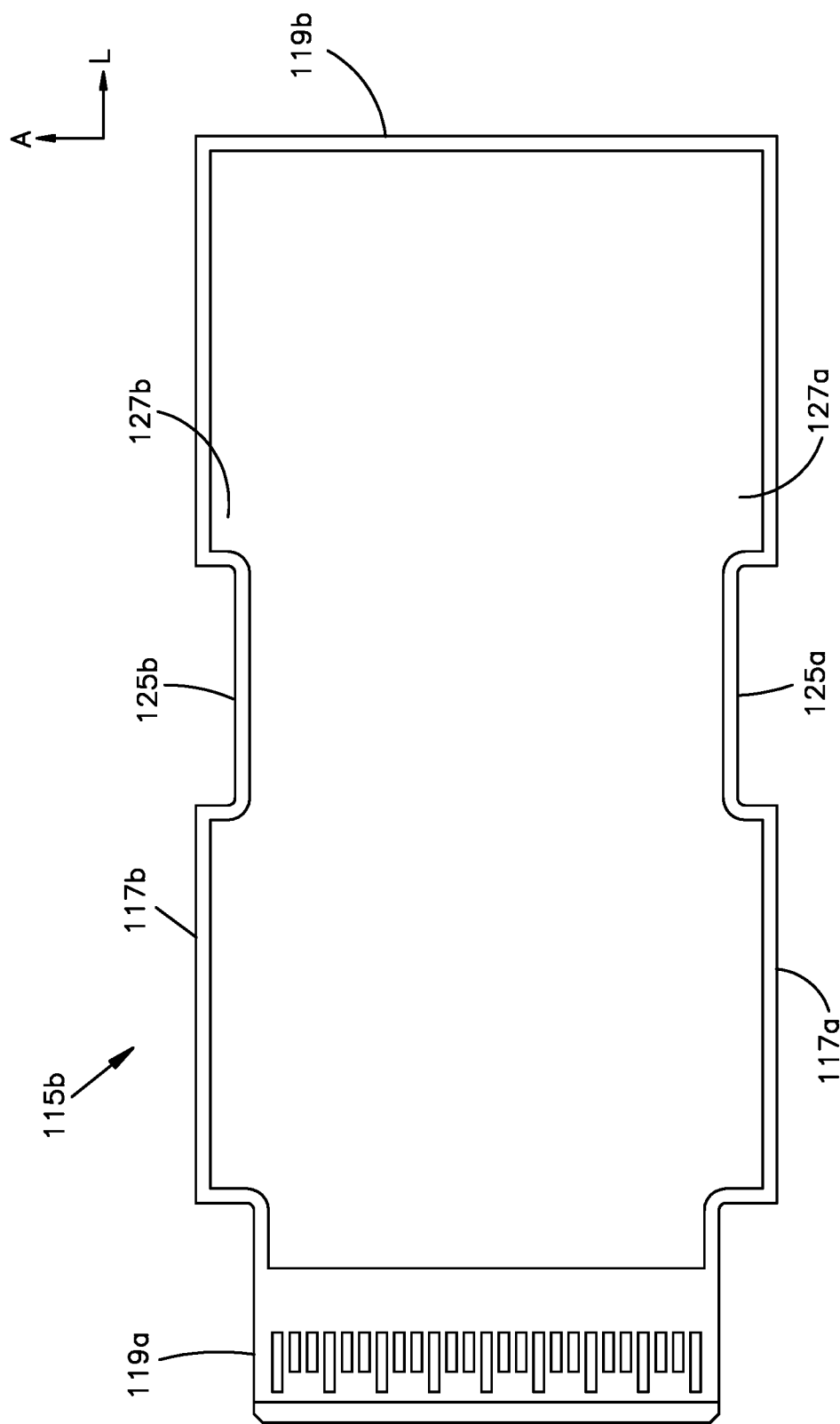
FIG. 2E is a top plan view of a module substrate of the interconnect module illustrated in FIG. 2A.

Referring now to FIG. 2E, the module substrate 115b defines opposed first and second lateral sides 117a and 117b that are spaced from each other along the lateral direction A. The module substrate 115b defines first and second notches 125a and 125b that extend into each of the first and second lateral sides 117a and 117b, respectively. The notches 125a and 125b are positioned and sized to allow the substrate retention arm 506 to pass therethrough along the transverse direction T when the module substrate 115b is aligned to be mated with the first and second electrical connectors 52 and 54, respectively. For instance, the notches 125a and 125b can have a length along the longitudinal direction L that is greater than that of the retention arms 506. The module substrate 115b can further define first and second retention regions 127a and 127b that are configured to be received in the substrate receiving gap 508 of the securement members 183. The first and second retention regions 127a and 127b extend from the first and second notches 125a and 125b, respectively, in the rearward direction. Further, the first and second retention regions 127a and 127b can be aligned with the first and second notches 125a and 125b, respectively, along the longitudinal direction L. Thus, the notches 125a-b are disposed between the retention regions 127a-b and the electrical contact pads at the front end 119a with respect to the longitudinal direction. The electrical contact pads at the front end 119a are configured to mate with the electrical contacts of the first electrical connector 152.

Figure 2F:
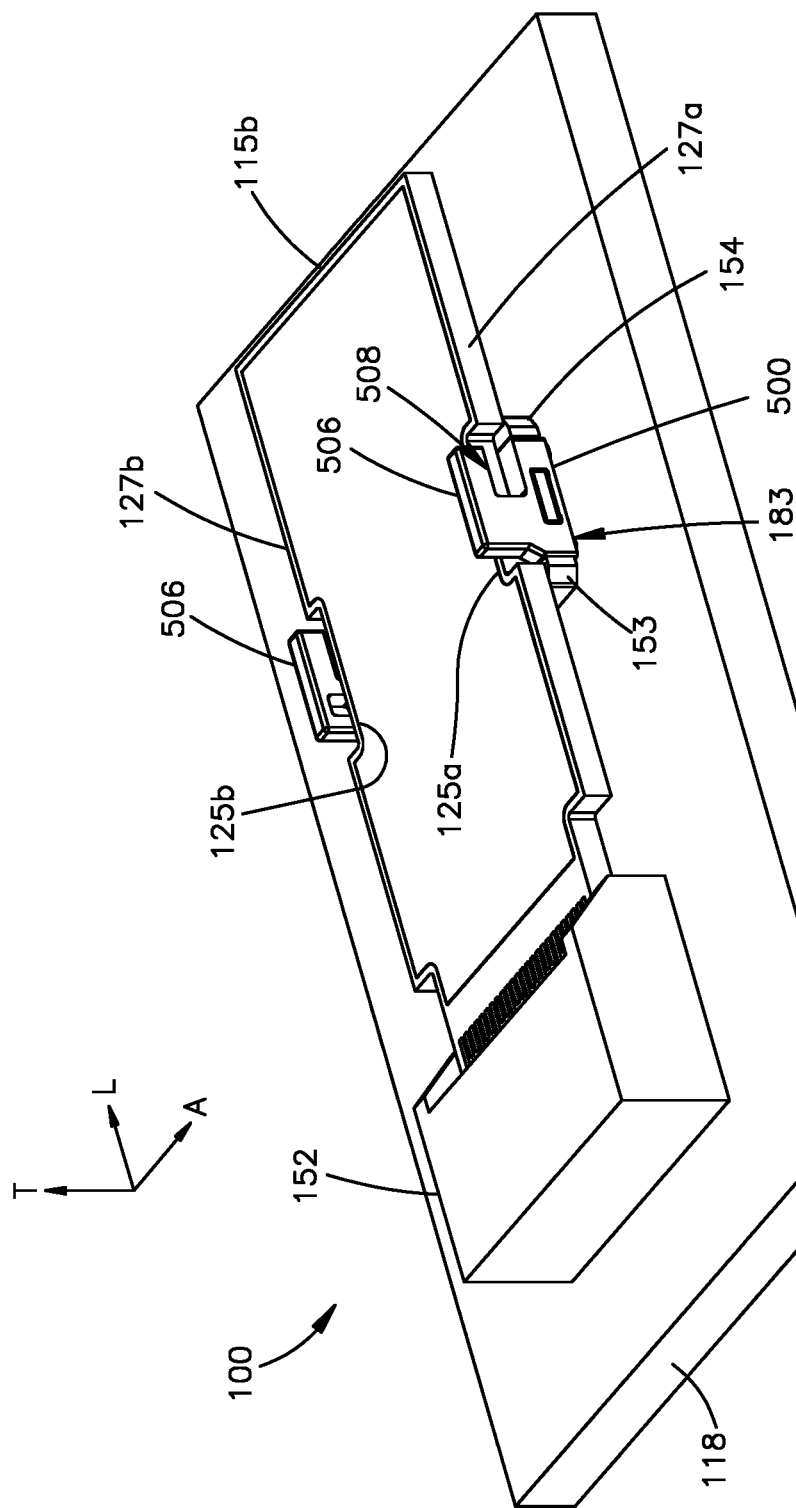
FIG. 2F is a perspective view of a portion of the interconnect module illustrated in FIG. 2A, with the interconnect module aligned to be mated with the host module.

Referring now to FIG. 2F, during operation, the interconnect module 102 is configured to be aligned to be mated with the first and second electrical connectors 152 and 154. In particular, the module substrate 115b is positioned such that the at least one notch is aligned along the transverse direction T with the retention arms 506 of a corresponding securement member 183. Thus, the retention region that is aligned with the at least one notch is offset with respect to the retention arm 506 in the rearward direction. In one example, the first and second notches 125a and 125b are aligned with the retention arms 506 of the first and second securement members 183, respectively, along the transverse direction T. Thus, the retention region that is aligned with the at least one notch is offset with respect to the retention arm 506 in the rearward direction. In FIG. 2F, the interconnect module 102 is shown with the transceiver removed to illustrated the module substrate 115b and the securement members 183. In practice, the transceiver, including the transceiver housing 146 can be mounted to the module substrate 115b during mating of the module substrate 115b to the first and second electrical connectors 152 and 154.

Figure 2G:
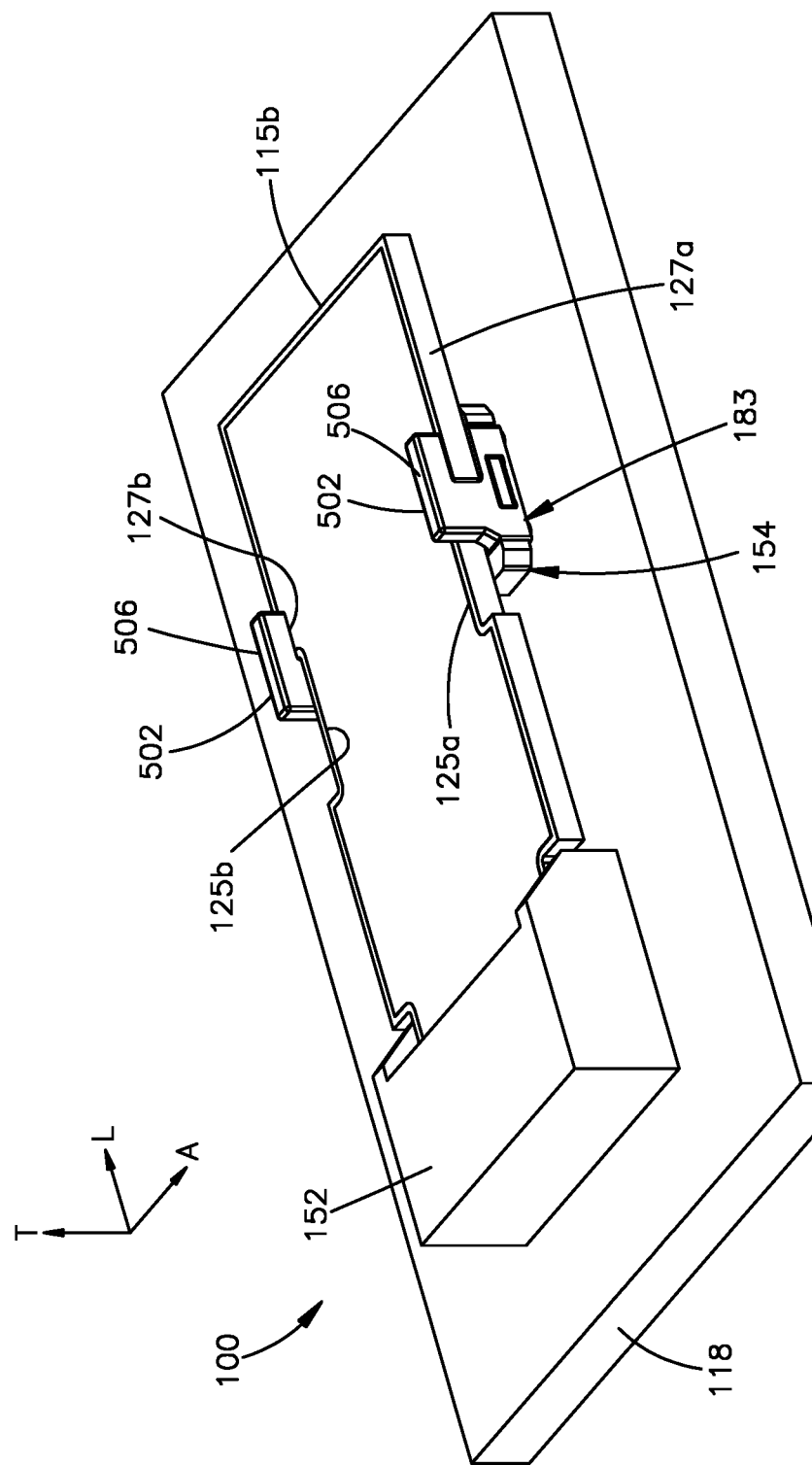
FIG. 2G is a perspective view of the portion of the interconnect module illustrated in FIG. 2F, showing the interconnect module aligned mated with the host module.
Figure 2H:
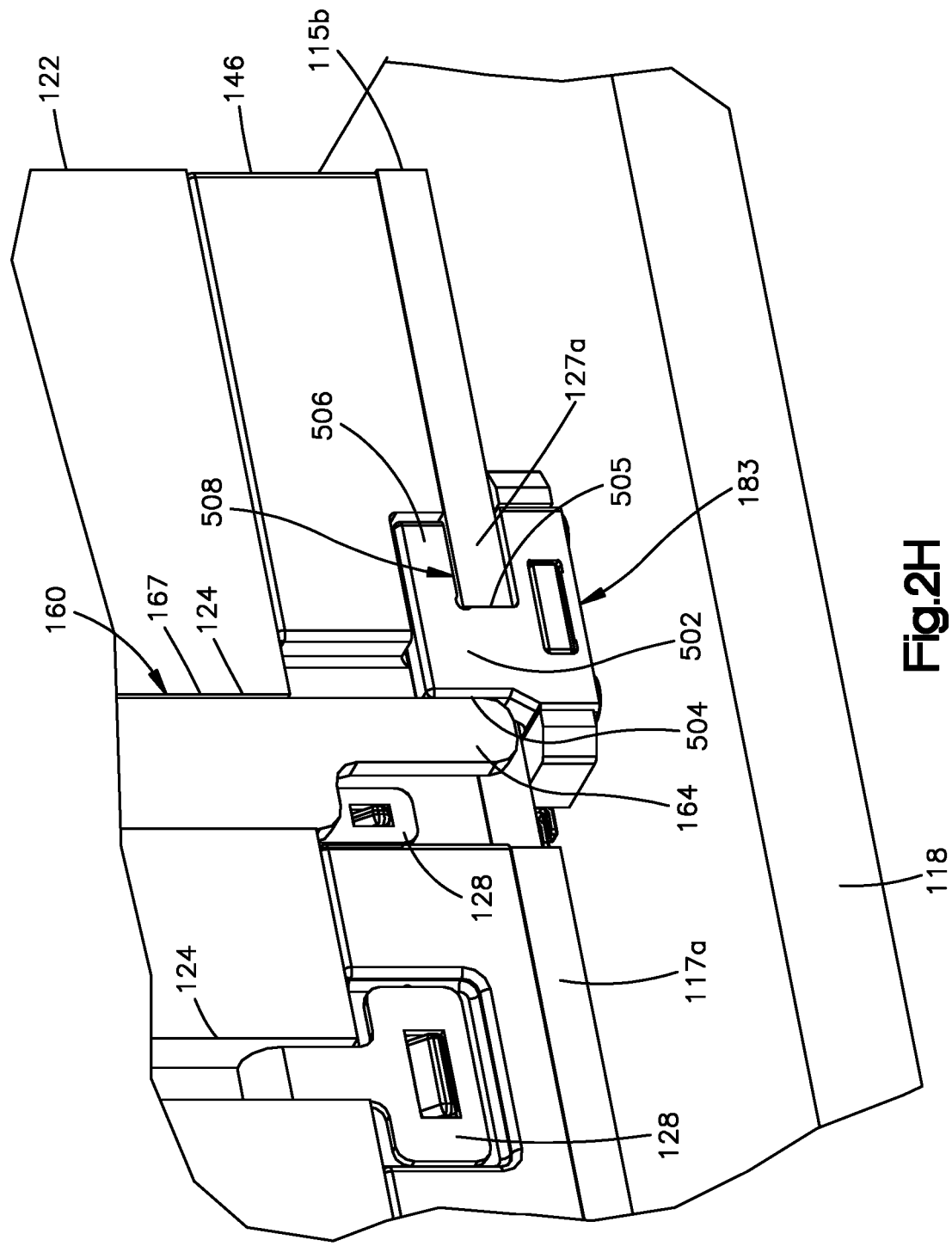
FIG. 2H is an exploded perspective view of the portion of the interconnect module illustrated in FIG. 2G.

The module substrate 115b is then translated down along the transverse direction T toward the second electrical connector 154, and thus toward the host substrate 118 until the module substrate 115b is aligned with the substrate receiving gaps 508 of the securement members 183 along the longitudinal direction L. In particular, the retention regions 127a and 127b are aligned with the substrate receiving gaps 508 of the securement members 183 along the longitudinal direction L. For example, the retention regions 127a and 127b can be aligned with the beveled lead-in surfaces 514 (see FIG. 2D) along the longitudinal direction L. In this position, the front end 119a of the module substrate 115b is aligned with the receptacle of the first electrical connector 152 along the longitudinal direction. As illustrated in FIGS. 2G and 2H, the module substrate 115b is then translated in the forward direction with respect to the host module 104 until the module substrate 115b is mated with the first and second electrical connectors 152 and 154. Further, as the module substrate 115b is mated with the first and second electrical connectors, the retention regions 127a and 127b of the module substrate 115b are received in the substrate receiving gaps 508 of the securement members 183. In FIG. 2G, the interconnect module 102 is shown with the transceiver removed to illustrated the module substrate 115b and the securement members 183. In practice, the transceiver, including the transceiver housing 146 can be mounted to the module substrate 115b during mating of the module substrate 115b to the first and second electrical connectors 152 and 154.

As described above, the electrical contacts 155 are configured to compress toward the underlying host substrate 118 when the module substrate 115b is brought into contact with the electrical contacts 155, in particular at the contact locations 158. Thus, the electrical contacts compress along the transverse direction from a first position to a compressed position. The substrate retention arm 506 can offset from the contact locations 158 a distance along the transverse direction T when the electrical contacts 155 are in the first position. The distance is less than the thickness of the module substrate 115b. Thus, when the module substrate 115b is inserted into the substrate receiving gap 508, the securement member 183 can maintain the module substrate 115b in a position that maintains the electrical contacts 155 in the compressed position. Accordingly, the substrate retention arm 506 can be referred to as a compression member that is configured to apply a compressive force to the module substrate 115b against the electrical contacts 155 in the transverse direction T. In this regard, the securement member 183 can prevent the module substrate 115b from becoming unmated from the electrical contacts 155 along the transverse direction T.

Figure 2I:
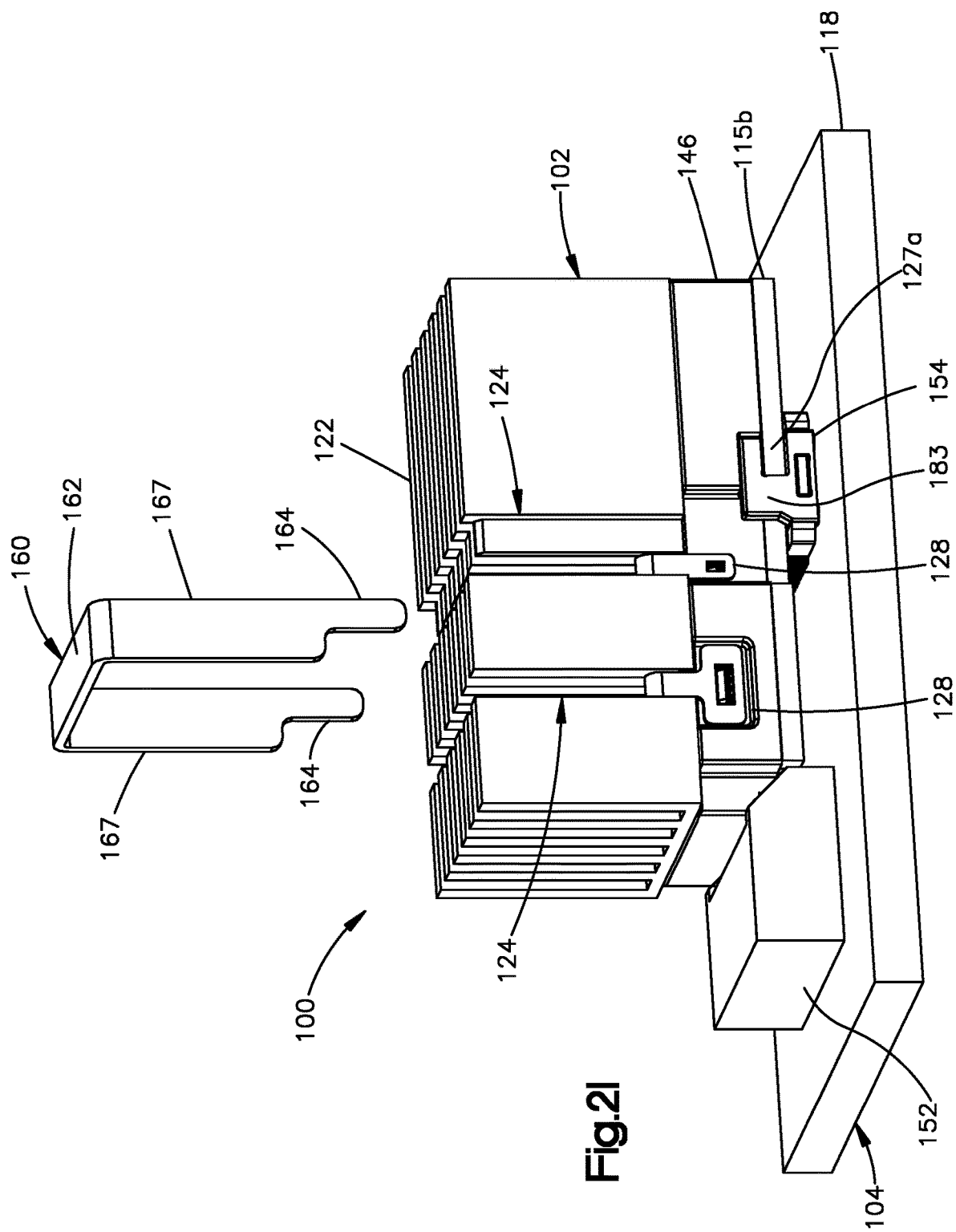
FIG. 2I is a perspective view of the interconnect module illustrated in FIG. 2G, showing the latch member in a disengaged position.

Referring now to FIG. 2I, once the module substrate 115b has been mated with the first and second electrical connectors 152 and 154, the latch 160 can be moved from the disengaged position (FIG. 2I) to the engaged position (FIG. 2A). For instance, the latch 160 is configured to be translated between the disengaged position and the engaged position along a direction angularly offset with respect to the rearward direction. The angularly offset direction can be the transverse direction T. In particular, the latch 160 can be inserted into the interconnect system 100 along the transverse direction T such that the fingers 164 are inserted to a location forward of the securement wall 504 of the respective securement member 183. In one example, the fingers 164 can abut the front surface 504.

Abutment between the latch 160 and the interconnect module 102 can define the first mechanical interference that prevents movement of the latch 160 with respect to the interconnect module 102 in the rearward direction. For instance, abutment between the interconnect module 102 and one or both of the support member 162 and the fingers 164 can define the first mechanical interference that prevents movement of the latch 160 with respect to the interconnect module 102 in the rearward direction. Abutment between the fingers 164 and the securement member 183 can define the second mechanical interference. In particular, abutment between the fingers 164 and the front surface 504 can define the second mechanical interference. Thus, it should thus be appreciated that the fingers 164 and the front surface 504 define respective complementary engagement members that are configured to engage so as to attach the latch 160 to the second electrical connector 154. It can further be said that the engagement member of the latch 160 is configured to mate with the complementary engagement member so as to attach the interconnect module 102 to the host module 104.

In one example, the interconnect module 102 can include a heat sink 122 that is attachable to the module housing 146. The interconnect module 102 can optionally include at least one of a thermally conductive interface material and a thermally conductive adhesive or epoxy between the heat sink 122 and the module housing 146 to promote heat transfer between the heat sink 122 and the module housing 146. An example of the interface material includes (without limitation) a sheet material such as SarconXR-m made by Fujipoly. An example of the adhesive or epoxy includes (without limitation) Thermoset MT-125 made by the Lord Corporation. Alternatively, the heat sink 122 can be monolithic with the module housing 146. Abutment between the latch 160 and the heat sink 122 can define the first mechanical interference. Referring to FIGS. 2A-2C, the heat sink 122 includes a plurality of fins 123 that are configured to dissipate heat. In one example, the fins 123 can be spaced from each other along the lateral direction A. The heat sink 122 can further include at least one recess 124 such as a plurality of recesses 124 that extend into the fins 123. The at least one recess 124 can extend into the fins 123 along the transverse direction T toward the module housing 146. The at least one recess 124 can extend through the fins 123 along the lateral direction A. The interconnect module 102 can include a corresponding at least one more securement bands 128 that are configured to be inserted into a corresponding recesses 124 and attached to the module housing 146, thereby attaching the heat sink 122 to the module housing 146.

One of the recesses 124 can further be configured to receive the latch 160 when the latch 160 is in the engaged position. In particular, the latch-receiving recess 124 can partially be defined by a notch 129 that extends into the fins 123 along the transverse direction T. It should be appreciated, of course, that the latch 160 can be received by a recess in the heat sink 122 that does not also receive a securement band. In accordance with one example, the latch, and in particular the support member 162, is configured to rest against the fins 123 in the notch 129. Thus, the support member 162 can be upwardly spaced from the securement band 128 along the transverse direction T. When the support member 162 is disposed in the latch-receiving recess 124, the fingers 164 extend to a location that is aligned with the corresponding securement members 183 along the longitudinal direction. For instance, the fingers 164 can be in abutment when the front surface 504. While the latch 160 can abut the heat sink 122 so as to define the first engagement, it should be appreciated that the latch 160 can alternatively be seated in a recess 125 defined by the module housing 146 so as to define the first engagement. Whether the latch 160 is in abutment with the heat sink 122 or the module housing 146, it can be said that the abutment between the heat sink 122 and the interconnect module 102 can define the first mechanical interference.

As illustrated in FIGS. 2G-2I, the heat sink 122 can be attached to the module housing 146 after the module substrate 115b has been mated with the first and second electrical connectors 152 and 154. Alternatively, as illustrated in FIG. 2J, the heat sink 122 can be attached to the module housing 146 prior to mating the module substrate 115b with the first and second electrical connectors 152 and 154.

As shown in FIG. 2I, the latch 160 can be removed from the host module 104 in the upward direction along the transverse direction T to the disengaged position, thereby removing the second interference. In particular, the latch fingers 164 can be removed from alignment with the securement member 183, and in particular with the securement wall 502, so as to remove the second interference. Thus, when the latch 160 is in the disengaged position, the latch 160 does not prevent the interconnect module 102 from translating relative to the host module 104 in the rearward direction a sufficient distance so as to unmate the interconnect module 102 from at least one or both of the first electrical connector 152 and the second electrical connector 154. The latch 160 can further translated in the upward direction so as to remove the latch 160 from the latch-receiving recess 124 of the heat sink 122, thereby removing the first mechanical interference.

Referring now also to FIG. 2K, the interconnect system 100 can include a biasing member 437 that is configured to apply a biasing force to the latch 160 in the forward direction. The biasing force can therefore maintain the interconnect module 102 mated with the first electrical connector 152. In particular, the biasing force can maintain the front end of the module substrate 113 in the first electrical connector 152. The biasing member 437 can be configured to contact the latch 160 when the latch is in the engaged position. For instance, the biasing member 437 can be configured to contact the latch 160 only when the latch is in the engaged position. The biasing member 437 can be supported by the host module 104. In one example, the biasing member 437 can be supported by the second electrical connector 154. For instance, the biasing member 437 can extend out from the securement member 183. Alternatively, the biasing member 437 can extend out from the second connector housing. The latch 160 can include a cantilevered leg 439 that has a spring constant with respect to deflection along the longitudinal direction L with respect to a remainder of the latch 160, and in particular with respect to the finger 164 of the latch 160. The cantilevered leg 439 can be spaced from the finger 164 along the longitudinal direction L. Alternatively, the finger 164 can define the cantilevered leg 439. The cantilevered leg 439 can contact the biasing member 437 when the latch 160 moves to the engaged position. In particular, a portion of the cantilevered leg 439 can be aligned with the biasing member 437 along the transverse direction T when the latch 160 is received in the securement recess 124 in the disengaged position. Thus, as the latch 160 is moved to the engaged position, the biasing member 437 can abut the cantilevered leg 439. The biasing force can cause the cantilevered leg 439 to deflect in the forward direction, which thus biases the interconnect module to move in the forward direction with respect to the host module. The latch 160 can include a stop member 441 that is configured to abut the cantilevered leg 439 to prevent further deflection of the cantilevered leg 439 in the forward direction. For instance, the stop member 441 can extend in the rearward direction from the arm 164.

Referring to FIG. 2L, in another example, the channel of the securement recess 124 can have a first section 443a and an angled section 443b that extends from a lowed end of the first section 443a. The first section 443a can extend along the transverse direction T. The angled section 443b can extend in the rearward direction as it extends down from the first section 443a. The latch 160 can define a front surface 445 that is configured to ride along a complementary surface 447 of the heat sink 122 that defines the angled section 443b. In particular, the front surface 445 can be defined by the cantilevered leg 439. Further, the front surface 445 can be in surface contact with the complementary surface 447 of the heat sink 122. Thus, the front surface 445 can extend in the rearward direction as it extends down along the transverse direction T. As the latch 160 moves down to the engaged position, along the securement recess, the front surface complementary surface 447 of the heat sink 122 urges the cantilevered leg 439 to deflect in the rearward direction against the biasing member 437. The biasing member 437 thus applies a forward biasing force to the cantilevered leg 439 that biases the interconnect module 102 in the forward direction with respect to the host module 104.

Figure 2M:
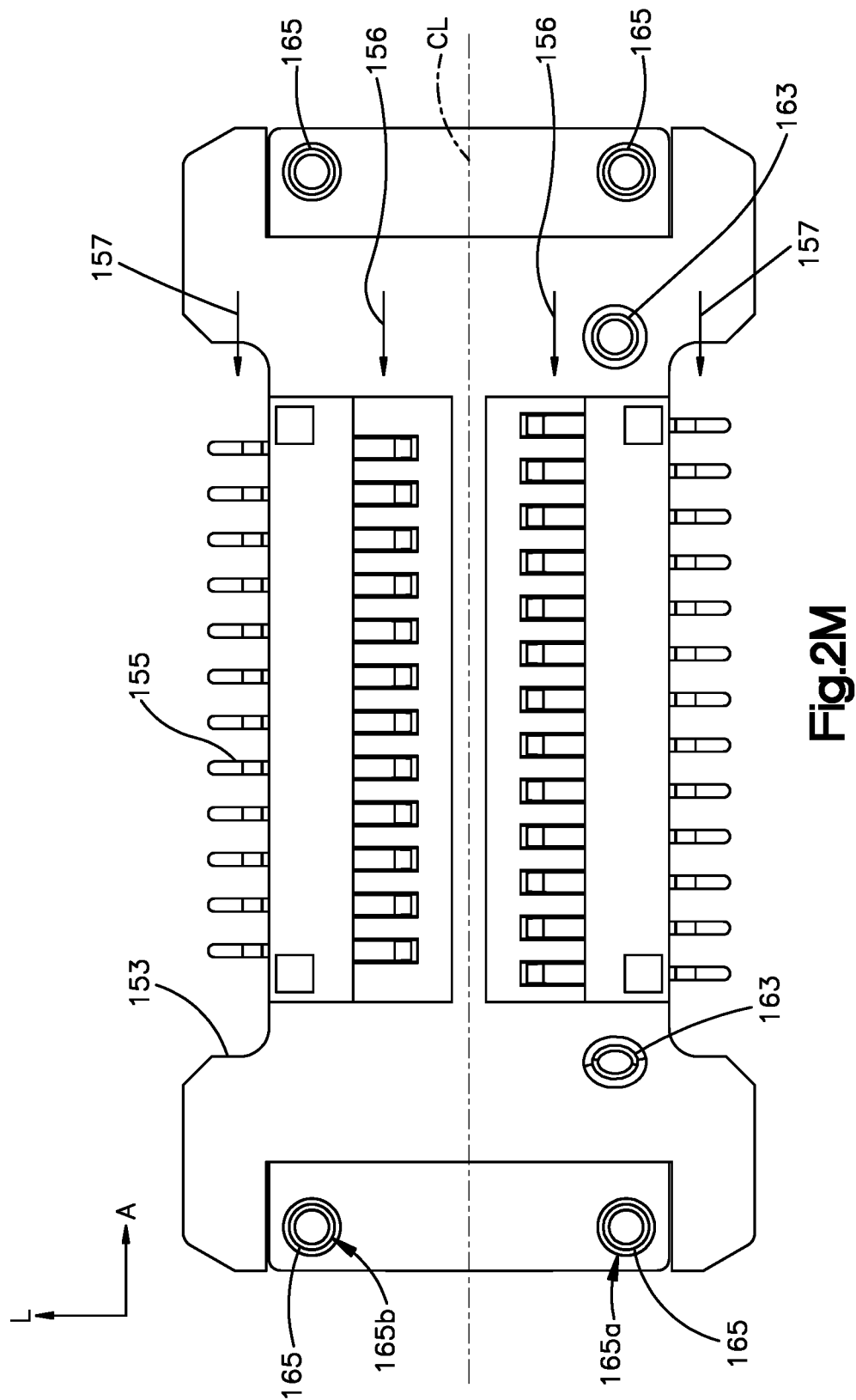
FIG. 2M is a bottom plan view of the electrical connector illustrated in FIG. 2D.

Referring now also to FIG. 2M, the second electrical connector 154, including the second connector housing 153 and the securement members 183, are configured to be mounted to the host substrate 118. For instance, the second connector housing 153 can include at least one mounting projection 163 that extends down along the transverse direction T. In one example, the second connector housing 153 can include a plurality of mounting projections 163 that extend down along the transverse direction. For instance, the second connector housing 153 can include first and second mounting projections 163. The first and second mounting projections 163 can be spaced in the same direction with respect to a connector centerline CL that is oriented along the lateral direction A and bisects the second electrical connector 154 into equal longitudinal halves. Alternatively, the first and second mounting projections 163 can be disposed on opposite sides of the centerline CL. Alternatively still, the first and second mounting projections 163 can be disposed on the centerline CL. The mounting projections 163 can be circular, non-circular, or any suitable alternative shape as desired. Further, the mounting projections 163 can define the same size and shape as each other, or can have a different size or shape from each other. The first and second mounting projections 163 can be aligned with each other along the lateral direction A. The mounting ends of the electrical contacts 155 can define be aligned in mounting end rows 157 that can be disposed between the mounting projections 163 and the centerline CL with respect to the longitudinal direction L. Alternatively, the mounting projections 163 can be disposed between the mounting end rows 157 and the centerline CL with respect to the longitudinal direction L.

Referring now also to FIG. 2M, the second electrical connector 154, including the second connector housing 153 and the securement members 183, are configured to be mounted to the host substrate 118. For instance, the second connector housing 153 can include at least one mounting projection 163 that extends down along the transverse direction T. In one example, the second connector housing 153 can include a plurality of mounting projections 163 that extend down along the transverse direction. For instance, the second connector housing 153 can include first and second mounting projections 163. The first and second mounting projections 163 can be spaced in the same direction with respect to a connector centerline CL that is oriented along the lateral direction A and bisects the second electrical connector 154 into equal longitudinal halves. Alternatively, the first and second mounting projections 163 can be disposed on opposite sides of the centerline CL. Alternatively still, the first and second mounting projections 163 can be disposed on the centerline CL. The mounting projections 163 can be circular, non-circular, or any suitable alternative shape as desired. Further, the mounting projections 163 can define the same size and shape as each other, or can have a different size or shape from each other. The first and second mounting projections 163 can be aligned with each other along the lateral direction A. The mounting ends of the electrical contacts 155 can define be aligned in mounting end rows 157 that can be disposed between the mounting projections 163 and the centerline CL with respect to the longitudinal direction L. Alternatively, the mounting projections 163 can be disposed between the mounting end rows 157 and the centerline CL with respect to the longitudinal direction L.

The securement member 183 can also include at least one mounting projection 165 that extends down along the transverse direction T. In one example, the securement member 183 can include a plurality of mounting projections 165 that extend down along the transverse direction T. The mounting projections 165 can extend down from the base 500 along the transverse direction T. The securement members 183 can combine to include first and second pairs 165a and 165b of mounting projections 165. The first and second pairs 165a and 165b can be disposed on opposite sides of the centerline CL. For instance, the first and second pairs 165a and 165b can be equidistantly spaced from the centerline CL. Alternatively, the first and second pairs 165a and 165b can be spaced at different distances from the centerline CL. The mounting projections 165 of the first pair 165a can be aligned with each other along the lateral direction A. Similarly, the mounting projections 165 of the second pair 165b can be aligned with each other along the lateral direction A. Alternatively, the first and second pairs 165a and 165b of mounting projections 165 can be disposed on the same side of the centerline CL. Alternatively still, one or both of the first and second pairs 165a and 165b can be located on the centerline CL. The mounting projections 165 can be circular, non-circular, or any suitable alternative shape as desired. The mounting end rows 157 that can be disposed between the mounting projections 165 and the centerline CL with respect to the longitudinal direction L. Alternatively, the mounting projections 163 can be disposed between the mounting end rows 157 and the centerline CL with respect to the longitudinal direction L.

The mounting projections 163 and 165 can define the same size and shape as each other, or can have a different size or shape from each other. Further, the mounting projections 165 of the securement members 183 can define cross-sectional dimensions that are different than cross-sectional dimensions of the mounting projections 163 of the connector housing 153. The cross-sectional dimensions are measured along a plane that is defined by the lateral direction A and the longitudinal direction L. In one example, the cross-sectional dimensions of the mounting projections 165 can be greater than the cross-sectional dimensions of the mounting projections 163. Alternatively, the cross-sectional dimensions of the mounting projections 163 can be greater than the cross-sectional dimensions of the mounting projections 165. Alternatively still, the cross-sectional dimensions of the mounting projections 165 can be equal to the cross-sectional dimensions of the mounting projections 163.

In one example, the mounting projections 163 are on the same side of the centerline CL as the first pair 165a of mounting projections 165, and on the opposite side of the centerline CL from the second pair 165b of mounting projections. The mounting projections 163 and 165 can define geometrical transverse centerlines that are oriented along the transverse direction T. The transverse centerlines of the mounting projections 163 can be offset toward the centerline CL with respect to the centerlines of the mounting projections 165 of the first pair 165a. Alternatively, the transverse centerlines of the mounting projections 165 of the first pair 165a can be offset toward the centerline CL with respect to the centerlines of the mounting projections 163. Alternatively still, the transverse centerlines of the mounting projections 165 of the first pair 165a can be equidistantly spaced from the centerline CL as the centerlines of the mounting projections 163. The mounting projections 163 and 165 can be said to define a footprint of the second electrical connector 154.

In this regard, it should be appreciated that the centers of the mounting projections 163 can be spaced closer to the centers of the first pair 165a of mounting projections 165 than they are to the centerline along the longitudinal direction L. For instance, the centers of the mounting projections 163 can be spaced from the centers of the first pair 165a of mounting projections 165 a first distance along the longitudinal direction L, and spaced from the centerline a second distance along the longitudinal direction. The second distance can be greater than five times the first distance. For example, the second distance is greater than 10 times the first distance. The mounting projections 163 can be disposed between the first pair 165a of mounting projections 165 with respect to the lateral direction A. The mounting projections of the first pair 165a of mounting projections can be aligned with respective different ones of the mounting projections of the second pair 165b of mounting projections 165 along the longitudinal direction. One of the mounting end rows 157 can be disposed such that at least one or both of the mounting projections 163 and the first pair 165a of mounting projections 165 are disposed between the one of the mounting end rows 157 and the centerline CL with respect to the longitudinal direction L. The second pair 165b of mounting projections 165 can be disposed between the other of the mounting end rows 157 and the centerline CL with respect to the longitudinal direction L. The first electrical connector 152 can similarly include a plurality of mounting projections that are configured to be received by corresponding mounting apertures of the host substrate 118.

The pair of mounting projections 163 of the connector housing 153 can be referred to as a first pair of mounting projections of the second electrical connector. The first pair of mounting projections 165 of the securement members 183 can be referred to as a second pair of mounting projections of the second electrical connector 154. The second pair of mounting projections 165 of the securement members 183 can be referred to as a third pair of mounting projections of the second electrical connector 154. In one example, the second electrical connector 154 has no mounting projections configured to secure the electrical connector to the host substrate 118 other than the first, second, and third pairs of mounting projections.

Similarly, referring now to FIG. 2M, the host substrate 118 can define a footprint that corresponds to the footprint of the second electrical connector 154. In particular, the host substrate 118 can define a plurality of mounting apertures that are dimensioned and positioned to receive the mounting projections 163 and 165 of the second electrical connector 154. In one example, the mounting apertures can be sized such that the mounting projections 163 and 165 are inserted into the mounting apertures so that the mounting ends of the electrical contacts 155 are aligned with respective ones of electrical contact locations 177 of the host substrate. Alternatively or additionally, the mounting projections 163 and 165 can be press-fit in, or otherwise received by, the mounting apertures. The host substrate 118 can further define a plurality of mounting apertures that are sized and shaped to receive the mounting projections of the first electrical connector 152. The mounting apertures that are sized and shaped to receive the mounting projections of the first electrical connector 152 can be disposed outside the footprint that is defined by the mounting apertures that are dimensioned and positioned to receive the mounting projections 163 and 165 of the second electrical connector 154.

For instance, the host substrate 118 can include at least one first mounting aperture 169 that extends at least therein or therethrough along the transverse direction T. In one example, the host substrate 118 can include a plurality of first mounting apertures 169. For instance, the host substrate 118 can include a pair of first mounting apertures 169. The first mounting apertures are sized and configured to receive the mounting projections 163 of the second electrical connector 154. For instance, the mounting projections 163 of the second electrical connector 154 can be sized to be press-fit in, or otherwise received by, the first mounting apertures 169. The host substrate 118 can include electrical contact locations 177 that are configured to be placed in physical and electrical contact with the mounting ends of the electrical contacts 155 of the second electrical connector 154. For instance, the electrical contact locations 177 can be configured as contact pads at an upper surface of the host substrate 118 that faces the second electrical connector 154.

The contact locations 177 can be aligned oriented along respective first and second rows 179 that are oriented along the lateral direction A and spaced from each other along the longitudinal direction L. The mounting apertures 169 can be spaced in the same direction with respect to a substrate centerline CL1 that is oriented along the lateral direction A and is equidistantly spaced from the first and second rows 179. Alternatively, the first and second mounting apertures 169 can be disposed on opposite sides of the centerline CL1. Alternatively still, the first and second mounting apertures 169 can be disposed on the centerline CL1. The mounting apertures 169 can be circular, non-circular, or any suitable alternative shape as desired. Further, the mounting apertures 169 can define the same size and shape as each other, or can have a different size or shape from each other. The first and second mounting apertures 169 can be aligned with each other along the lateral direction A. The mounting apertures 169 can be disposed between the rows 179 and the centerline CL with respect to the longitudinal direction L. Alternatively, the rows 179 can be can be disposed between the mounting apertures 169 and the centerline CL with respect to the longitudinal direction L.

The host substrate 118 can also include at least one second mounting aperture 171 that extends at least therein or therethrough along the transverse direction T. In one example, the host substrate 118 can include a plurality of second mounting apertures 171. The second mounting apertures 171 are sized and configured to receive the mounting projections 165 of the securement members 183. For instance, the mounting projections 165 of the securement members 183 can be sized to be press-fit in, or otherwise received by, the second mounting apertures 171. For instance, the host substrate 118 can include first and second pairs 171a and 171b of second mounting apertures 171. The first and second pairs 171a and 171b can be disposed on opposite sides of the centerline CL1. For instance, the first and second pairs 171a and 171b can be equidistantly spaced from the centerline CL1. Alternatively, the first and second pairs 171a and 171b can be spaced at different distances from the centerline CL. The mounting apertures 171 of the first pair 171a can be aligned with each other along the lateral direction A. Similarly, the mounting apertures 171 of the second pair 171b can be aligned with each other along the lateral direction A. Alternatively, the first and second pairs 171a and 171b of mounting apertures 171 can be disposed on the same side of the centerline CL. Alternatively still, one or both of the first and second pairs 171a and 171b can be located on the centerline CL. The mounting apertures 171 can be circular, non-circular, or any suitable alternative shape as desired. The mounting apertures 171 can be disposed between the rows 179 and the centerline CL1 with respect to the longitudinal direction L. Alternatively, the rows 179 can be disposed between the mounting apertures 171 and the centerline CL1 with respect to the longitudinal direction L.

The mounting apertures 169 and 171 can define the same size and shape as each other, or can have a different size or shape from each other. Further, the mounting apertures 169 can define cross-sectional dimensions that are different than cross-sectional dimensions of the mounting apertures 171. The cross-sectional dimensions are measured along a plane that is defined by the lateral direction A and the longitudinal direction L. In one example, the cross-sectional dimensions of the mounting apertures 169 can be greater than the cross-sectional dimensions of the mounting apertures 171. Alternatively, the cross-sectional dimensions of the mounting apertures 171 can be greater than the cross-sectional dimensions of the mounting apertures 169. Alternatively still, the cross-sectional dimensions of the mounting apertures 169 can be equal to the cross-sectional dimensions of the mounting apertures 171.

In one example, the mounting apertures 169 are on the same side of the centerline CL1 as the first pair 171a of mounting apertures 171, and on the opposite side of the centerline CL1 from the second pair 171b of mounting apertures 171. The mounting apertures 169 and 171 can define geometrical transverse centerlines that are oriented along the transverse direction T. The transverse centerlines of the mounting apertures 169 can be offset toward the substrate centerline CL1 with respect to the centerlines of the mounting apertures 171 of the first pair 171a. Alternatively, the transverse centerlines of the mounting apertures 171 of the first pair 171a can be offset toward the centerline CL with respect to the centerlines of the mounting apertures 169. Alternatively still, the transverse centerlines of the mounting apertures 171 of the first pair 171a can be equidistantly spaced from the centerline CL as the centerlines of the mounting apertures 169. The mounting apertures 169 and 171 can be said to define a footprint of the host substrate 118.

It is appreciated that the host substrate 118 defines a first surface and a second surface opposite the first surface so as to define a thickness along the transverse direction T. The host substrate 118 further defines first and second lateral sides opposite each other so as to define a width along a lateral direction A, wherein the width is greater than the thickness. The host substrate further defines first and second longitudinal ends spaced from each other so as to define a length along a longitudinal direction L, wherein the length is greater than the width. The first and second pairs 171a and 171b of mounting apertures 171 can be disposed on opposite sides of the centerline CL1. The centerline CL1 can be equidistantly spaced from the first and second pairs 171a and 171b of mounting apertures 171. The mounting apertures 171 of the second pair 171b can be aligned with each other along the lateral direction A. The mounting apertures 171 of the first pair 171a can also be aligned with each other along the lateral direction A. The mounting apertures 169 can also be aligned with each other along the lateral direction.

Respective centers of the mounting apertures 169 can be disposed between respective centers of the mounting apertures 171 of the first pair 171a and the centerline CL1 with respect to the longitudinal direction L. The centers of the mounting apertures 169 can be spaced closer to the centers of the mounting apertures 171 of the first pair 171a than they are to the centerline CL1 along the longitudinal direction L. For instance, the centers of the mounting apertures 169 can be spaced from the centers of the mounting apertures 171 of the first pair 171a a first distance along the longitudinal direction L, and spaced from the centerline CL1 a second distance along the longitudinal direction L. The second distance can be greater than five times the first distance. For instance, the second distance can be greater than 10 times the first distance. The mounting apertures 169 can be disposed between the mounting apertures 171 of the first pair 171a with respect to the lateral direction A. The mounting apertures 171 of the first pair 171a can be aligned with respective different ones of the mounting apertures 171 of the second pair 171b along the longitudinal direction L.

The host substrate 118 can defines contact locations 177 that are configured to establish electrical contact with electrical contacts 155 of the second electrical connector 154. The contact locations 177 can be configured as contact pads, plated through holes, or any suitable alternatively constructed contact locations as desired. The contact locations 177 can be arranged in first and second rows that are oriented along the lateral direction A and spaced from each other along the longitudinal direction L. The centerline CL1 can be equidistantly spaced from the first and second rows along the longitudinal direction L. One or both of the mounting apertures 169 and the first pair of mounting apertures 171a can be disposed between one of the rows and the centerline CL1 with respect to the longitudinal direction L. The second pair 171b of mounting apertures 171 can be disposed between the other of the rows and the centerline CL1 with respect to the longitudinal direction L. The mounting apertures 169 can have a smaller cross-sectional dimension than the mounting apertures of each of the mounting apertures 171 of the first and second pairs 171a and 171b, respectively. For instance, the mounting apertures 171 of each of the first and second pairs 171a and 171b can the same cross-sectional dimension.

The mounting apertures 169 can be referred to as a first pair of mounting apertures of the host substrate 118 that are configured to receive mounting projections of the second electrical connector 154. The first pair 171a of mounting apertures 171 can be referred to as a second pair of mounting apertures of the host substrate 118 that are configured to receive mounting projections of the second electrical connector 154. The second pair 171b of mounting apertures 171 can be referred to as a third pair of mounting apertures of the host substrate 118 that are configured to receive mounting projections of the second electrical connector 154. It will be understood that the electrical connector 154 can be configured to mount to the host substrate 118. Thus, the first, second, and third pairs 169, 171a, and 171b, of mounting apertures that extend at least into or through the substrate 118 can be configured to receive the first, second, and third pairs of mounting projections of the electrical connector 154, respectively, thereby securing the electrical connector 154 to the substrate 118. In one example, the host substrate 118 has no mounting apertures configured to receive mounting projections of the second electrical connector 154 so as to secure the second electrical connector 154 to the host substrate 118 other than the first, second, and third pairs of mounting apertures.

It is recognized that the interconnect system 100 can define various dimensions that are contemplated in accordance with the present disclosure. It should be appreciated, of course, that the interconnect system 100 can be alternatively dimensioned unless otherwise indicated. For instance, referring to FIG. 2B, the second connector housing 153 can have a width at a location aligned with the electrical contacts 155 along the longitudinal direction L The width can be between approximately 5 mm and approximately 9 mm. For instance, the width can be approximately 7 mm. The word "approximately" with respect to dimensions recognizes that the dimensions can differ slightly from those disclosed. For instance, manufacturing tolerances can cause a variation in the dimensions. Further, numerical rounding can also cause a variation in the dimensions. The second connector housing 153 can define a maximum length along the lateral direction A between approximately 16 mm and approximately 24 mm. For instance, the maximum length can be approximately 20 mm. The second connector housing 153 can define an inner length along the lateral direction A between respective recesses that receive the securement members 183. The inner length can be between approximately 14 mm and approximately 21 mm. For instance, the inner length can be approximately 17.5 mm.

Referring now to FIG. 2D, the base 500 of the securement member 183 can define a length along the longitudinal direction L between approximately 8 mm and approximately 12 mm. For instance, the length of the base 500 can be approximately 10 mm. The retention arm 506 can have a length along the longitudinal direction L between approximately 6 mm and approximately 10 mm. For instance, the length of the retention arm 506 can be approximately 8 mm. The retention arm 506 can be centered with respect to the base 500 with respect to the longitudinal direction L. The lower surface of the retention arm 506 can be spaced from the upper surface of the base 500 a distance along the transverse direction T between approximately 1.5 mm and approximately 2 mm. For instance, the lower surface of the retention arm 506 can be spaced from the upper surface of the base 500 along the transverse direction T a distance of approximately 1.75 mm. Thus, the substrate receiving gap along the transverse direction can be between approximately 1.5 mm and approximately 2 mm. For instance, the substrate receiving gap along the transverse direction T can be approximately 1.75 mm. The securement member 183 can define a maximum height from the lower surface of the base 500 to the upper surface of the retention arm 506 along the transverse direction T. The maximum height can be between approximately 4 mm and approximately 6 mm. For instance, the maximum height can be approximately 5.3 mm. The securement member 183 can define an inner height from the lower surface of the base 500 to the lower surface of the retention arm 506 along the transverse direction T. The inner height can be between approximately 3 mm and approximately 4 mm. For instance, the inner height can be approximately 3.8 mm.

Referring now to FIG. 2E, the first and second notches 125a and 125b of the module substrate 115b can define a length along the longitudinal direction L between approximately 6 mm and approximately 10 mm. For instance, the length of the first and second notches 125a and 125b along the longitudinal direction L can be approximately 8.25 mm. The notches 125a and 125b can be spaced from the rear end 119b of the module substrate 115b along the longitudinal direction L a distance between approximately 10 mm and approximately 20 mm. For instance, the notches 125a and 125b can be spaced from the rear end 119b of the module substrate 115b along the longitudinal direction L a distance of approximately 15 mm. The module substrate 115b can define a maximum width along the lateral direction A between approximately 15 mm and approximately 25 mm. For instance, the maximum width can be approximately 20 mm. The maximum width can be defined by the retention regions 127a and 127b. The module substrate 115b can define an inner width along the lateral direction A between approximately 14 mm and approximately 20 mm. For instance, the inner width can be approximately 17.3 mm. The inner width can be defined at the notches 125a and 125b.

Referring now to FIGS. 3A-3E generally, and as described above with respect to FIGS. 2A-2M, the host module 104, and thus the interconnect system 100, can include a retention member that is configured to prevent the module substrate 115b from unmating from the second electrical connector 154 along the transverse direction T. As described above in FIGS. 2A-2M, the retention member can be defined by second electrical connector 154. In particular, the second electrical connector 154 can include the securement member 183 that, in turn, defines the retention member configured as the retention arm 506.

Figure 3A:
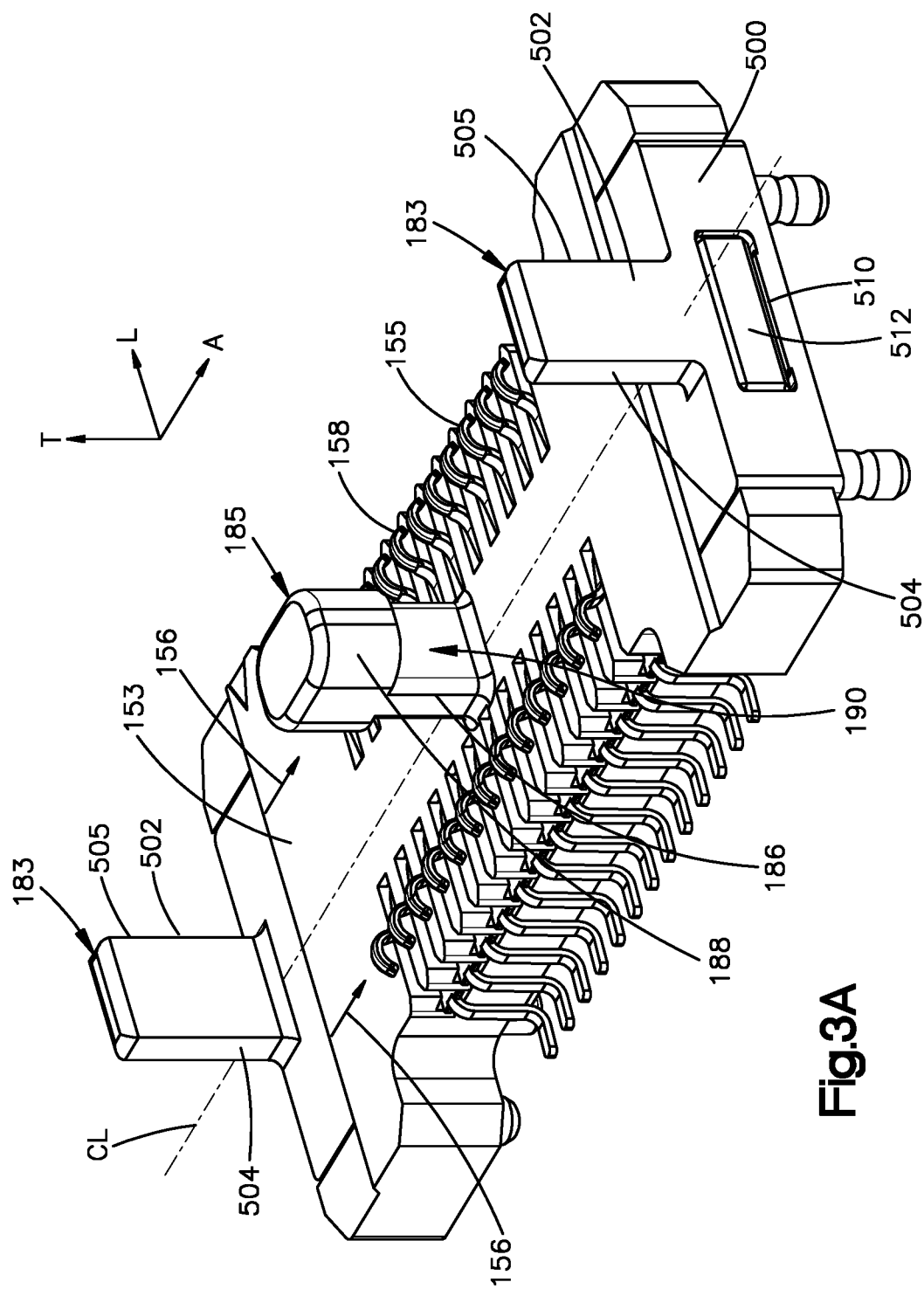
FIG. 3A is a perspective view of an electrical connector of the interconnect system illustrated in FIG. 2A, the electrical connector constructed similar to the electrical connector illustrated in FIG. 2B, but constructed in accordance with an alternative embodiment.

Referring now to FIG. 3A, when the interconnect system 100 includes the translatable latch 160, the retention member can alternatively or additionally be configured as a retention peg 185 that extends out from the connector housing 153 along the transverse direction T. In particular, the retention peg 185 extends upward from the connector housing 153 along the transverse direction T away, in a direction away from the mounting ends of the electrical contacts 155. The retention peg 185 can be monolithic with the connector housing 153. Alternatively, the retention peg 185 can be separate from the connector housing 153 and attached to the connector housing 153. The retention peg 185 can be centrally disposed on the connector centerline CL. Alternatively, the retention peg 185 can be offset with respect to the connector centerline CL along the longitudinal direction L The retention peg 185 is configured to retain the module substrate 115b against the electrical contacts 155, and in particular against the contact locations 158 with respect to the transverse direction T. The retention peg 185 can define a neck 186 and a head 188. The neck 186 can extend out from the connector housing 153, and the head 188 can extend from the neck 186 at a location such that the head 188 is spaced from the connector housing 153. The neck 186 can define a cross-sectional dimension that is less than the cross-sectional dimension of the head 188. The cross-sectional dimension can be defined by the lateral direction A. Otherwise stated, the head 188 can be wider than the neck 186 along the lateral direction A. Thus, the head 188 can be said to be elongate along the lateral direction A with respect to each of the longitudinal direction L and the transverse direction T.

Thus, the second electrical connector 154 can define a substrate receiving gap 190 sized to receive a portion of the module substrate 115b. The substrate receiving gap 190 can be defined between the head 188 and the upper surface of the connector housing 153. The substrate receiving gap 190 is configured to receive the module substrate 115b as the module substrate 115b is inserted into the gap 190 in the forward direction. The head 188 can define a beveled lead-in surface as desired so as to guide the module substrate 115b into the gap 190. The beveled lead-in surface can be sloped toward the connector housing 153 as it extends in the forward direction. The retention peg 185 can be located on the centerline CL. The retention pegs 185 can further be centrally disposed on the connector housing 153 with respect to the lateral direction A. It should be appreciated that the second electrical connector 154 can include any number of retention pegs 185 as desired.

Figure 3B:
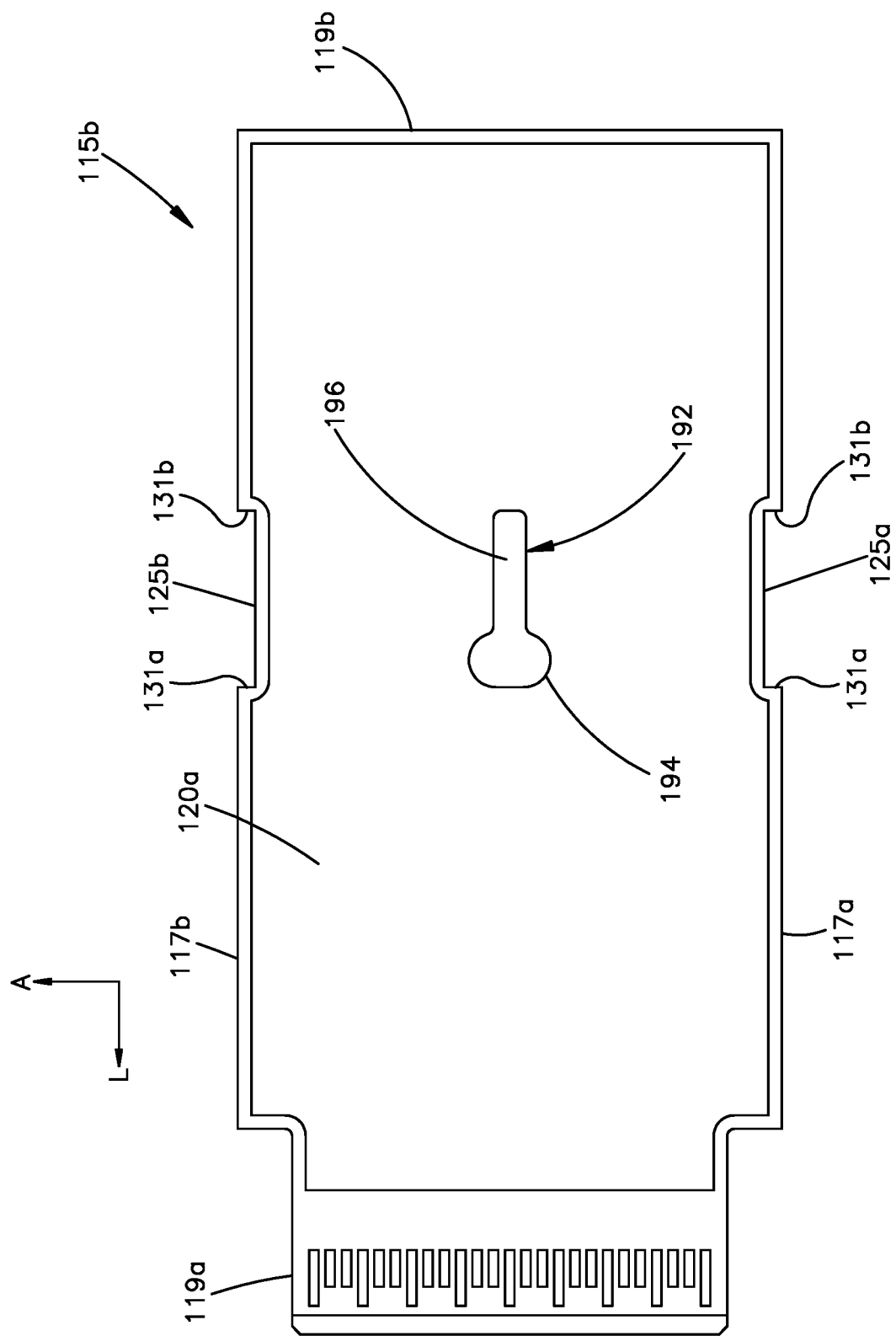
FIG. 3B is a top plan view of a module substrate of the interconnect module similar to the substrate illustrated in FIG. 2E, but constructed in accordance with an alternative embodiment.

Referring now to FIG. 3B, the module substrate 115b defines a slot 192 that extends therethrough along the transverse direction from the first side 120a to the second side 120b. The slot 192 can define a closed continuous circumference that is defined by the module substrate 115b. The slot 192 defines a first insertion region 194 and a second guide region 196 that extends from the insertion region 194 in the rearward direction. The second guide region 196 is elongated along the longitudinal direction L. The first insertion region 194 is sized to receive the head 188 of the retention peg 185. The guide region 196 is sized narrower than the head 188 along the lateral direction A. Thus, the head 188 is not sized to be received in the guide region 196. The guide region 196 is sized substantially equal to or greater than the neck 186 along the lateral direction A. Thus, the guide region 196 is sized to receive the neck 186. Accordingly, during operation, the module substrate 115b is placed over the second electrical connector 154 such that the head 188 is aligned with the insertion region 194 of the slot 192 along the transverse direction.

Figure 3C:
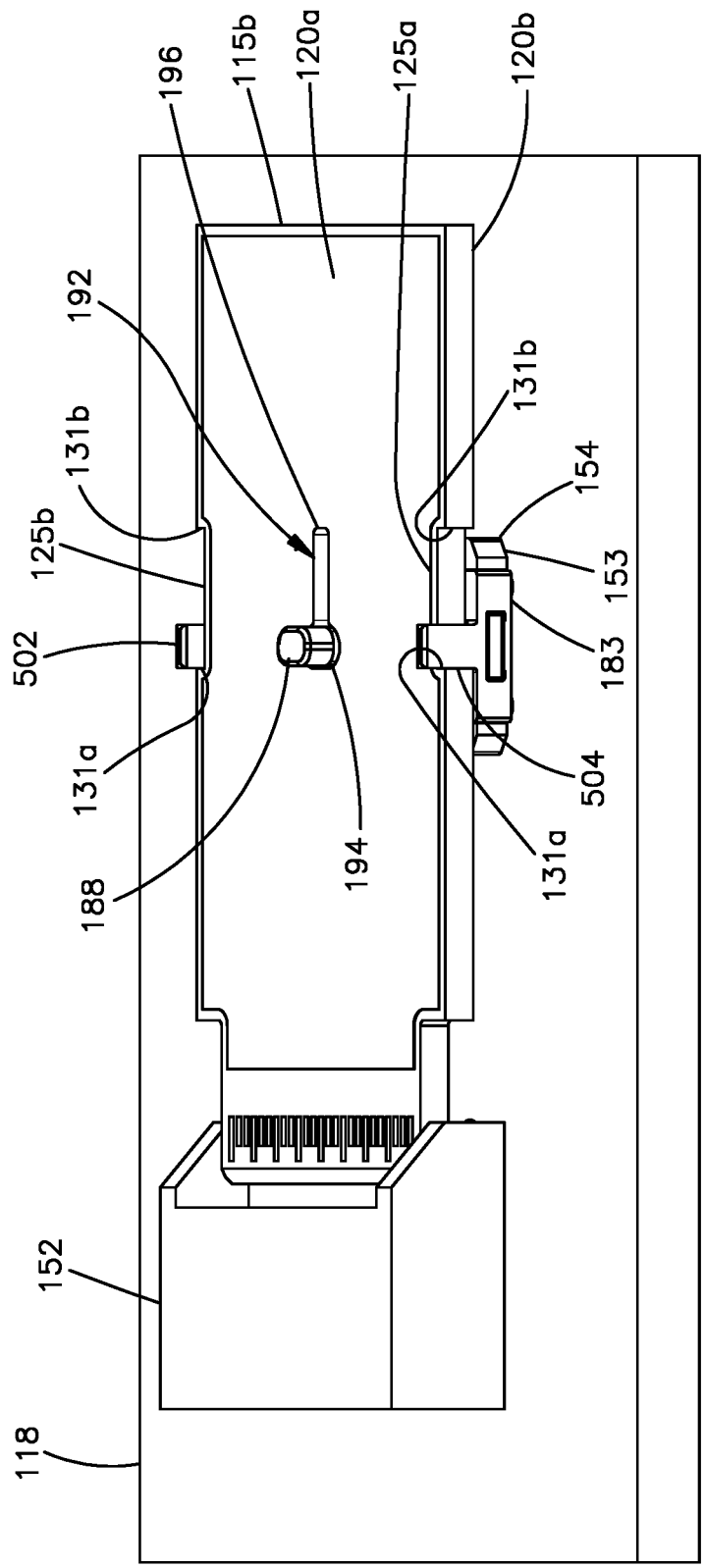
FIG. 3C is a perspective view of the interconnect system showing the module substrate of FIG. 3B aligned to be mated with the host module including the electrical connector of FIG. 3A.

Referring to FIG. 3C, the substrate 115b is then brought down onto the second electrical connector 154, thereby inserting the head 188 through the insertion region 194 of the slot 192 until the neck 186 is aligned with the guide region 196 of the slot 192. Next, as illustrated in FIG. 3D, the module substrate 115b is translated in the forward direction with respect to the second electrical connector 154, which causes the neck 186 to slide in the guide region 196.

In this regard, the guide region 196 guides the forward movement of the module substrate 115b with respect to the second electrical connector 154. The guide region 196 can have a length such that when the neck 186 abuts the module substrate 115b at the rear end of the guide region 196, the module substrate 115b is mated with both the first electrical connector 152 and the second electrical connector 154. The head 188 can be offset from the contact locations 158 a distance along the transverse direction T when the electrical contacts 155 are in the first position. The distance is less than the thickness of the module substrate 115b. Thus, when the module substrate 115b is inserted into the substrate receiving gap 190, the retention peg 185 can maintain the module substrate 115b in a position that maintains the electrical contacts 155 in the compressed position. In this regard, the retention peg can define a compression member that compresses the module substrate 115b against the electrical contacts 155.

Figure 3D:
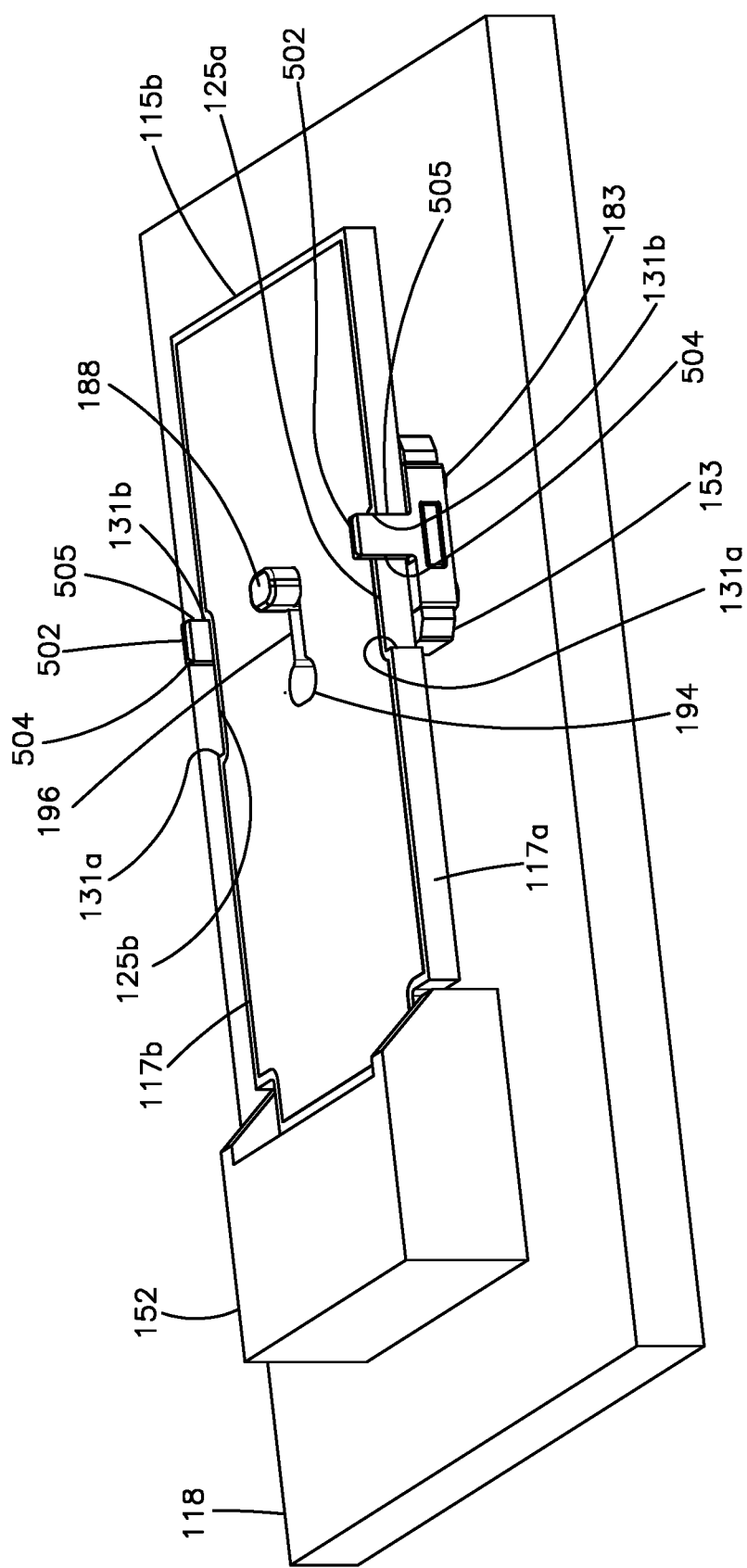
FIG. 3D is a perspective view of the interconnect system of FIG. 3C, but showing the module substrate of FIG. 3B mated with the host module including the electrical connector of FIG. 3A.

Referring now to FIGS. 3C-3E, and as described above, the securement member 183 is configured to engage the latch 160 when the latch is in the engaged position. For instance, the second electrical connector 154 can include the at least one securement member 183. The securement member 183 can be configured to secure the second electrical connector 154 to the module substrate 115b. In this embodiment, because the retention peg 185 is configured to retain the module substrate 115b against the electrical contacts 155 of the second electrical connector 154 along the transverse direction T, the securement member 183 can be configured so as to not apply a compressive force to the module substrate 115b along the transverse direction T.

As described above, the securement member 183 can include the base 500 and the securement wall 502 that extends up from the base 500 along the transverse direction T. The securement wall 502 defines a front surface 504. The front surface 504 can face the forward direction. The securement wall 502 can define a rear surface 505 opposite the front surface 504. The base 500 can include a laterally inner surface and a laterally outer surface. The securement wall 502 can be laterally outwardly offset with respect to the laterally inner surface of the base 500. Further, the securement wall 502 can be substantially flush with the laterally outer surface of the base 500. Because the retention peg 185 is configured to retain the module substrate 115b against the electrical contacts 155 along the transverse direction T as described above (see FIG. 3A), the securement member 183 can be configured without the substrate retention arm 506 shown in FIG. 2D. Alternatively, the securement member 183 can include the substrate retention arm 506 and the second electrical connector 154 can include the retention peg 185 in one example.

As illustrated in FIG. 3B, and as described above, the module substrate 115b can define the first and second notches 125a and 125b in the first and second lateral sides 117a and 117b, respectively. Each of the first and second notches 125a and 125b defines a front end 131a and a rear end 131b. The rear end 131b is spaced from the front end 131a in the rearward direction. Conversely, the front end 131a is spaced from the rear end 131b in the forward direction. The securement walls 502 can be aligned with each other and the retention peg 185 along the lateral direction A. The notches 125a and 125b and the securement wall 502 can be positioned such that the front surface 504 abuts the front end 131a of the notches 125a and 125b when the head 188 is inserted in the insertion region 194 of the slot 192. Thus, during operation, when the first and second notches 125a-b are disposed between the respective securement walls 502 with respect to the lateral direction A, the head 188 will be aligned with the insertion region 194 with respect to the lateral direction A. Further, when the front ends 131a of the notches 125a-b are aligned with the front surfaces 504, the head 188 will be aligned with the insertion region 194 with respect to the longitudinal direction L as illustrated in FIG. 3C. Thus, the module substrate 115b can be reliably aligned with the second electrical connector 154 such that the head 188 is aligned with the insertion region 194 even though the head 188 and the insertion region 194 are hidden from view. As illustrated in FIG. 3D, the module substrate 115b can be translated in the forward direction until the rear end 131b of the notches 125a-b abut the rear surfaces 505 of the securement walls 502, at which point the module substrate 115b is mated with each of the first and second electrical connectors 152 and 154. Thus, the rear end 131b of the notches 125a-b can abut the rear surfaces 505 of the securement walls 502 when the retention peg 185 reaches the rear end of the slot 192.

It is recognized that the interconnect system 100 illustrated in FIGS. 3A-3E can define various dimensions that are contemplated in accordance with the present disclosure. It should be appreciated, of course, that the interconnect system 100 can be alternatively dimensioned unless otherwise indicated. For instance, referring to FIG. 3A, the second connector housing 153 can define a maximum length along the lateral direction A between approximately 16 mm and approximately 24 mm. For instance, the maximum length can be approximately 20 mm. The retention peg 185 can define a length along the longitudinal direction L between approximately 1 mm and approximately 3 mm. For instance, the length of the retention peg can be approximately 1.8 mm. The head 188 of the retention peg 185 can define a width along the lateral direction A that is between approximately 1.5 mm and 5 mm. For instance, the width can be approximately 2.5 mm. The head 188 can be spaced from the upper end of the connector housing 153 a distance along the transverse direction T between approximately 1 mm and approximately 3 mm. For instance, the distance can be approximately 1.8 mm. The securement member 183 can define a height along the transverse direction T from the bottom surface of the base 500 to the top surface of the securement wall 502. The height can be between approximately 3.5 mm and approximately 7 mm. For instance, the height can be approximately 4.9 mm. The second electrical connector 154 can define a height along the transverse direction T from the bottom surface of the base 500 to the top surface of the head 188 of the retention peg 185. The height can be between approximately 3.5 mm and approximately 7 mm. For instance, the height can be approximately 5.4 mm. The securement wall 502 can define a length along the longitudinal direction L between approximately 1 mm and approximately 4 mm. For instance, the length can be approximately 2 mm.

Referring now to FIG. 3B, the slot 192 can define a length along the longitudinal direction L that is between approximately 4 mm and approximately 9 mm. For instance, the length can be approximately 6.5 mm. The insertion region 194 can have a width along the lateral direction A. The width can be between approximately 1.5 mm and approximately 4.5 mm. For instance, the width can be approximately 3 mm. The module substrate 115b can define a maximum width along the lateral direction A between approximately 16 mm and approximately 24 mm. For instance, the maximum width can be approximately 20 mm. The module substrate 115b can define an inner width along the lateral direction A between the notches 125a and 125b that receive the securement members 183. The inner width can be between approximately 14 mm and approximately 22 mm. For instance, the inner width can be approximately 18.7 mm. It is recognized that the inner width of the substrate 115b of FIG. 3B can be greater than the inner width of the substrate 115b of FIG. 2E. Each of the notches 125a and 125b can have a length along the longitudinal direction L that is between approximately 4 mm and approximately 9 mm. For instance, the length can be approximately 6.5 mm.

Referring now to FIGS. 4A-E, the interconnect system 100 can include a pivotable anti-backout latch 200 constructed in accordance with an alternative embodiment. As described above with respect to the latch 160, the latch 200 is designed to prevent the interconnect module 102 from being inadvertently unmated from the host module 104. However, while the latch 160 is translatable along the transverse direction T between the engaged and disengaged positions, the latch 200 is pivotable between the engaged and disengaged positions The latch 200 can include a support member 202 that is configured to be placed in mechanical communication with the interconnect module 102, and a finger 204 that extends out from the support member 202 and is configured to be placed in mechanical communication with the host module 104. The finger 204 can be continuous with the support member 202, or can define a jog with respect to the support member 202. The finger 204 can be configured to be secured to the host module 104 when the latch 200 is in the engaged position, so as to define the second mechanical interference. For instance, the finger 204 can be configured to be secured to the second electrical connector 154 when the latch 200 is in the engaged position, so as to define the second mechanical interference. In one example, the latch 200 is pivotally supported by the module housing 146 so as to define the first mechanical interference. For instance, the latch 200 can be pivotally attached to the module housing 146. In particular, the support member 202 can be pivotally supported by, for instance attached to, the module housing 146. Alternatively, the latch 200 can be monolithic with the module housing 146 so as to define the first mechanical interference.

Figure 4B:
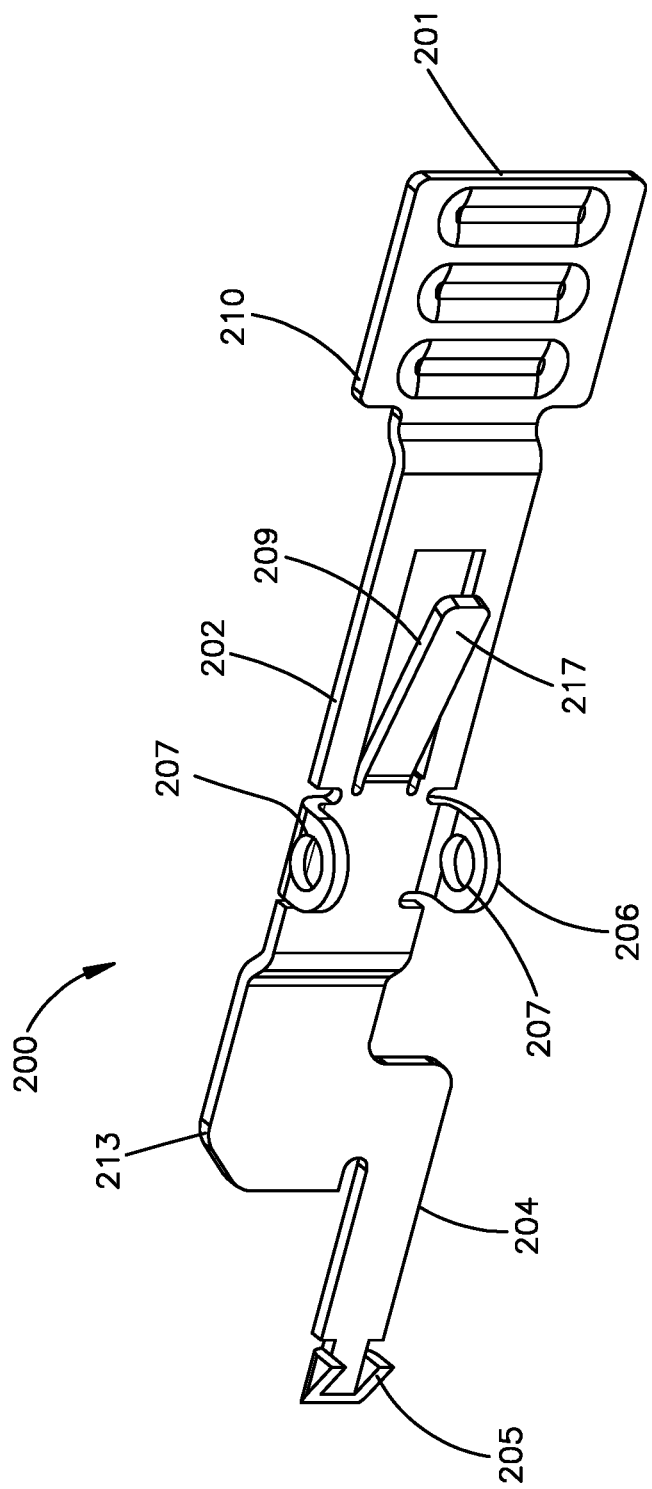
FIG. 4B is a perspective view of the latch illustrated in FIG. 4A.
Figure 4C:
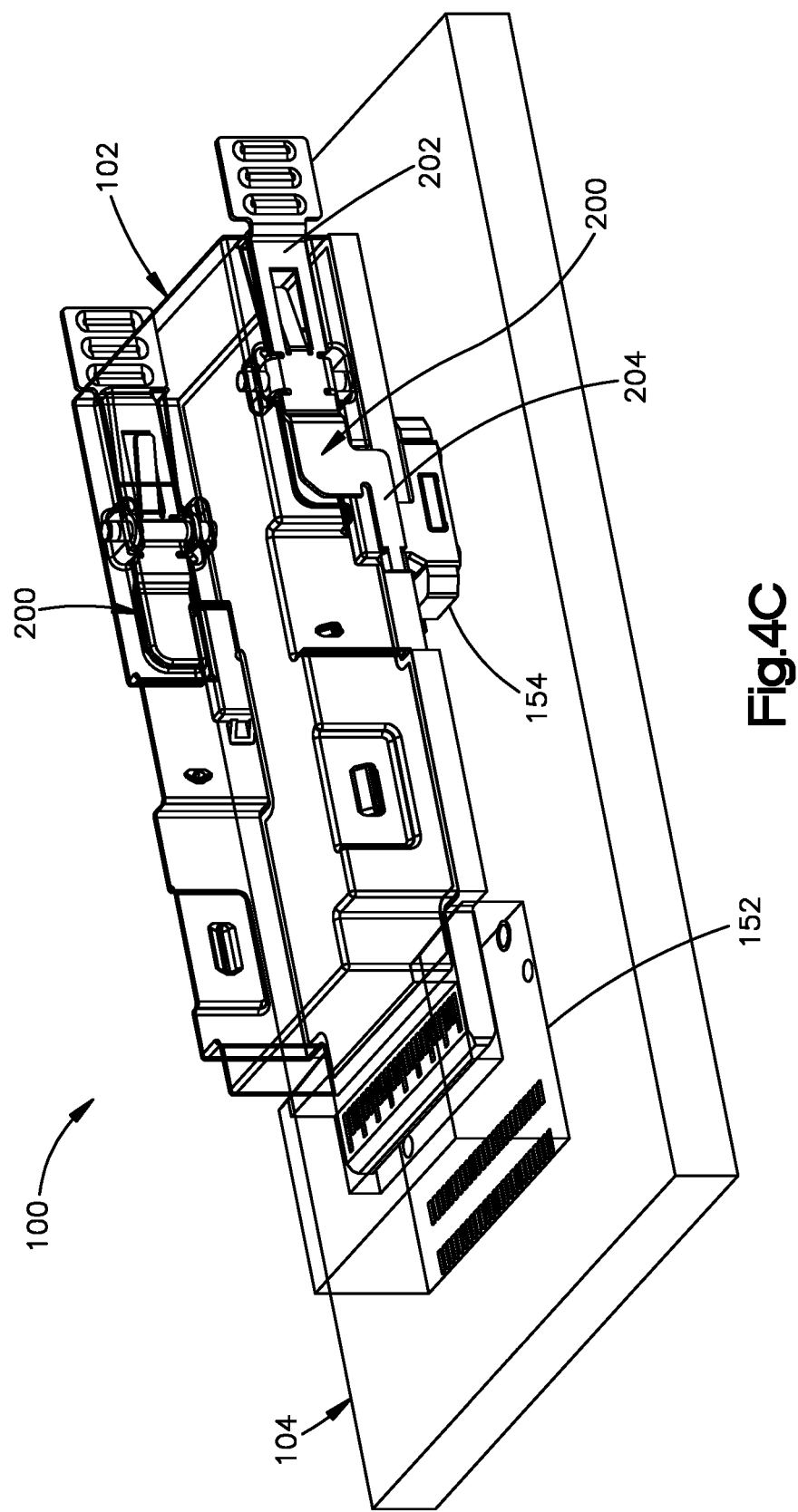
FIG. 4C is a perspective view of the interconnect system illustrated in FIG. 4A, showing the interconnect module mated with the host module, and the latch in an engaged position.
Figure 4D:
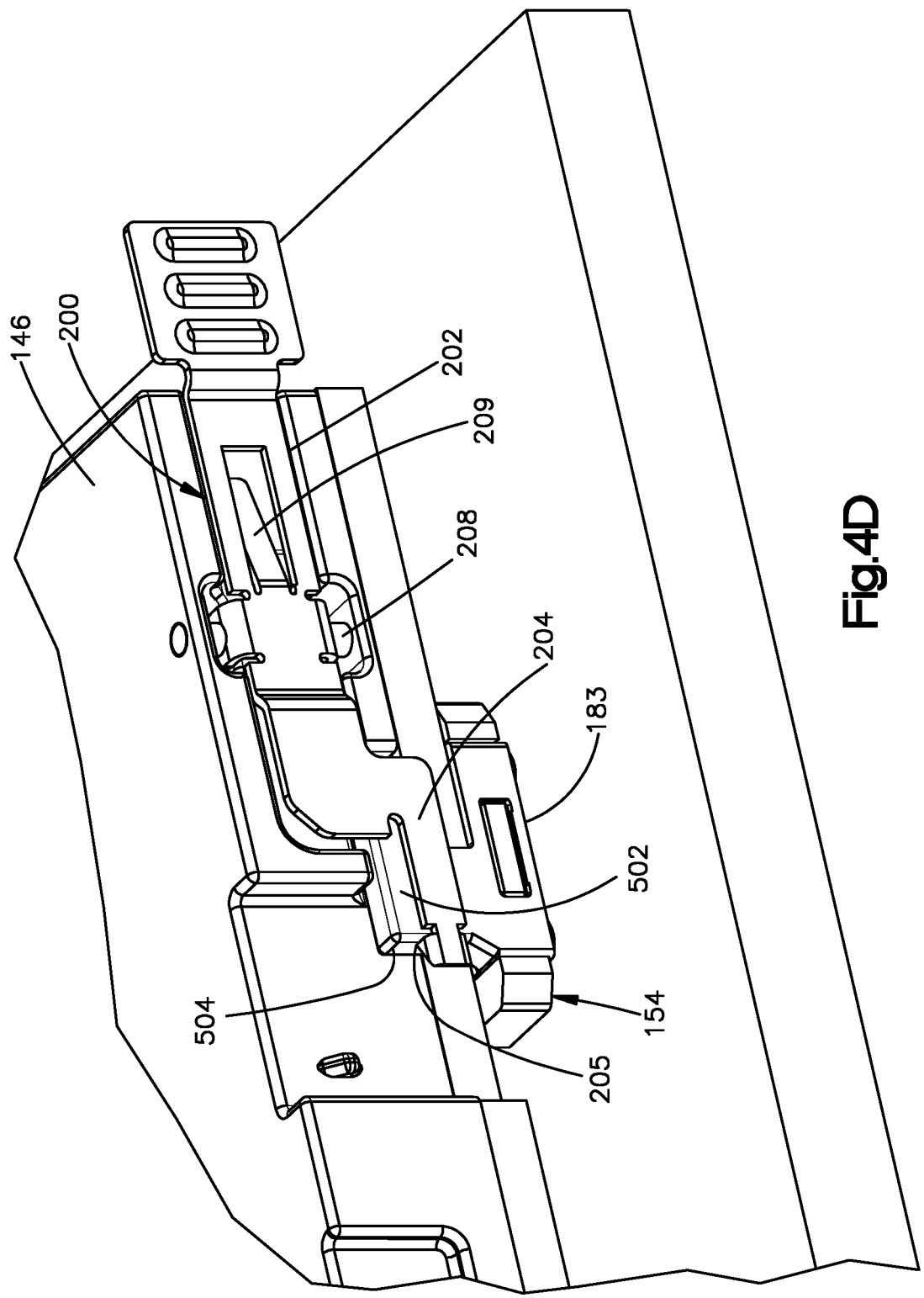
FIG. 4D is an enlarged perspective view of a portion of the interconnect system illustrated in FIG. 4C.
Figure 4E:
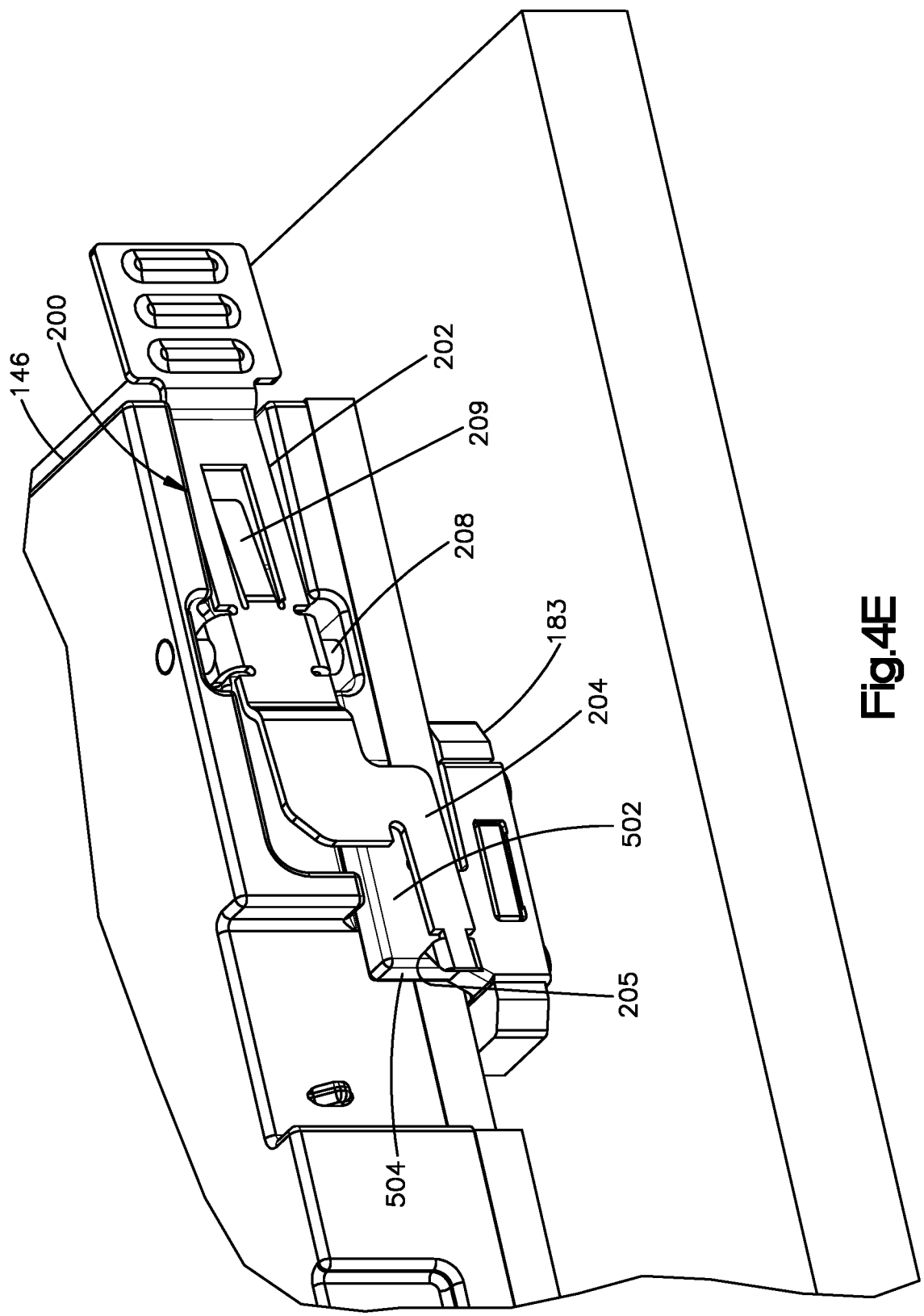
FIG. 4E is an enlarged perspective view of a portion of the interconnect system similar to FIG. 4D, but showing the latch in a disengaged position.
Figure 11A:
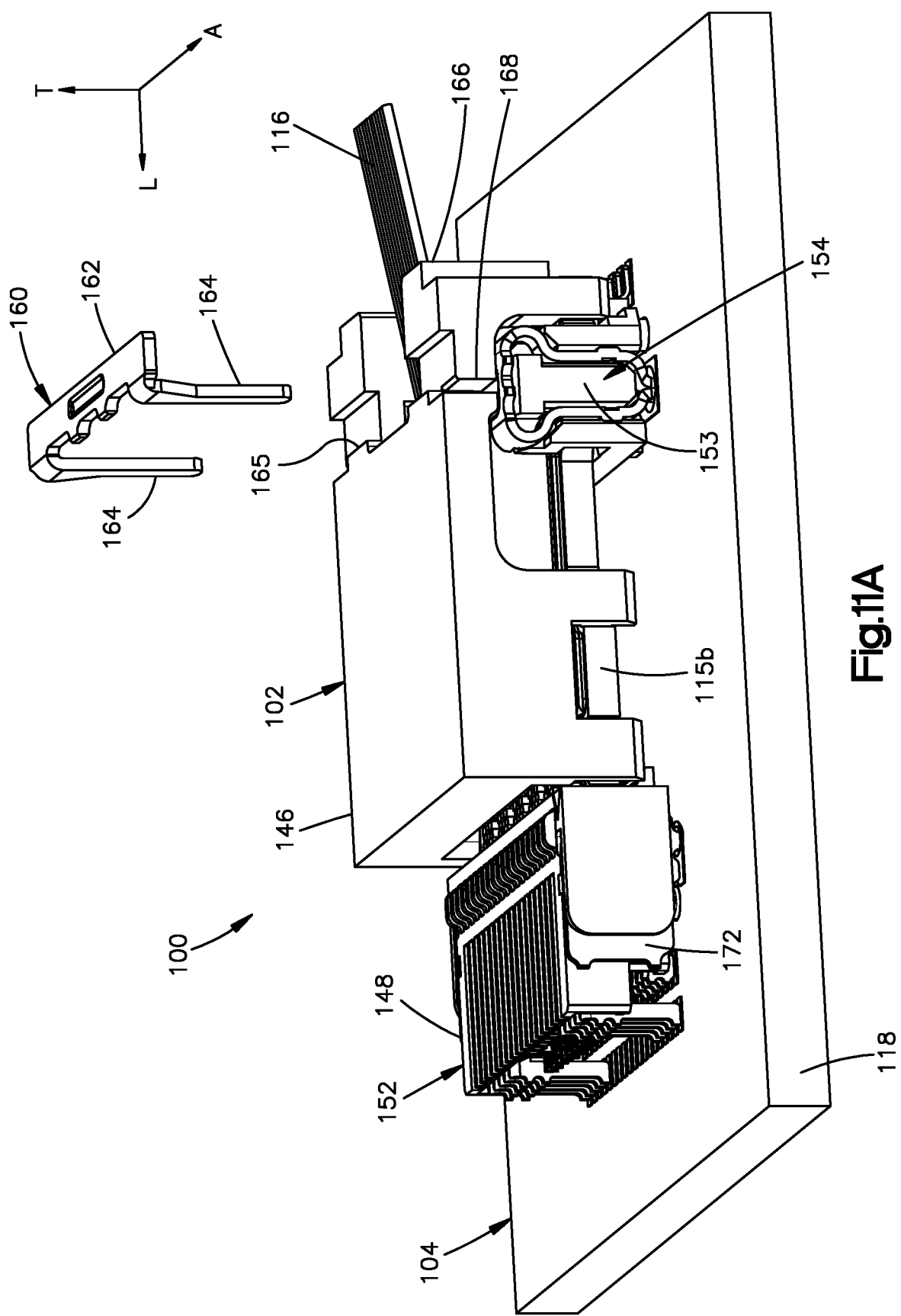
FIG. 11A is an exploded perspective view of an interconnect system including an interconnect module, a host module, and an anti-backout latch shown in a disengaged position.

When the interconnect module 102 is mated with the at least one electrical connector of the host module 104, the latch 200 can be movable between an engaged position (FIGS. 4C-4D) and a disengaged position (FIG. 4E). In particular, the latch 200 can be pivotable about a pivot axis between the disengaged position and the engaged position. The pivot axis can be oriented along the transverse direction T. Thus, the pivot axis can be oriented normal to both the host substrate 118 and the module substrate 115b, which are each oriented along a respective plane defined by the longitudinal direction L and the lateral direction A. For instance, the latch 200 can be pivotable in a first direction about the pivot axis to move the latch 200 from the disengaged position to the engaged position, and in a second direction opposite the first direction about the pivot axis to move the latch 200 from the engaged position to the disengaged position. As shown in FIG. 11A, the pivot axis can be spaced from the first electrical connector 152 in the rearward direction. The pivot axis can further be spaced from the second electrical connector 154 in the rearward direction. The at least one finger 204 can extend inward from the support member 202 along the lateral direction A when the latch 200 is in the engaged position. For instance, the at least one finger 204 can include a barb 205 that extends inward toward the second electrical connector 154 along the lateral direction A. Thus, the finger 204 can extend from the support member 202 along a direction that lies in a plane that includes the longitudinal direction L and the lateral direction A.

When the latch 200 is in the engaged position, a first mechanical interference is defined between the latch 200 and the interconnect module 102 that limits rearward movement of the interconnect module 102 with respect to the latch 200 in the rearward direction. The first mechanical interference can be defined by a pivotal attachment of the latch 200 to the interconnect module 102. For instance, the first mechanical interference can be defined by a pivotal attachment of the latch 200 to the module housing 146.

Further, when the latch 200 is in the engaged position, a second mechanical interference is defined between the finger 204 and the host module 104 limits rearward movement of the latch 200 with respect to the at least one electrical connector of the host module 104. The second mechanical interference can include an abutment between the anti-backout latch 200 and the host module 104. For instance, the second mechanical interference can include an abutment between the finger 204 and the host module 104. In one example, the second mechanical interference can include an abutment between the finger 204 and the second electrical connector 154. In particular, the second mechanical interference can be defined by an abutment between the barb 205 and the second electrical connector 154.

The limited rearward movements can prevent the interconnect module 102 from moving in the rearward direction with respect to the at least one electrical connector of the host module 104 a distance that would be sufficient to unmate the interconnect module 102 from the at least one electrical connector of the host module 104. For instance, the first and second mechanical interferences can substantially prevent rearward movement of the interconnect module 102 with respect to the anti-backout latch 200, and of the latch 200 with respect to the at least one electrical connector of the host module 104, respectively. When the latch 200 is in the disengaged position, the second mechanical interference is removed such that the interconnect module 102 is movable in the rearward direction with respect to the at least one electrical connector of the host module 104 a sufficient distance so as to unmate the interconnect module 102 from the at least one electrical connector of the host module 104.

The support member 202 can include a pivot member 206 that is pivotally attached to the interconnect module 102. In particular, the pivot member 206 can be pivotally attached to the module housing 146. The latch 200 can include pivot apertures 207 that extend through the pivot member 206 along the transverse direction T and are sized to receive respective pivot pins 208. The pivot pins 208 can define the pivot axis of the latches 200. For instance, the pivot member 206 can be friction fit to the pivot pin 208. In one example, the pivot pin 208 can be rotatably fixed to the interconnect module 102. For instance, the pivot pins 208 can be rotatably fixed to the module housing 146. The latch 200 can thus be pivotable about the pivot pin 208. In particular, the support wall 210 can be pivotable about the pivot pin 208. Alternatively, the latch 200 can be rotatably fixed to the pivot pin 208. Thus, the pivot pin 208 can be rotatable about its long axis with respect to the interconnect module 102. For instance, the pivot pin 208 can be rotatable about its long axis with respect to the module housing 146. In one example, the latch 200 can be monolithic with the pivot pin 208. Alternatively, the latch 200 can be secured to the pivot pin 208 in any manner desired.

The support wall 210 can include a handle portion 201 and an attachment portion 213. The finger 204 can extend inward the attachment portion 213 along the lateral direction A. The attachment portion 213 can be spaced from the handle portion 201 in the forward direction when the latch 200 is pivotally attached to the module housing 146. The pivot apertures 207 can be disposed between the handle portion 201 and the attachment portion 213 with respect to the longitudinal direction L. The handle portion 201 can be disposed at the rear end of the support member 202. The pivot aperture 207 can be sized to receive a respective one of the pivot pins 208 that is supported by the module housing 146, so as to pivotally attach the support member 202 to the module housing 146. Thus, the pivot pin 208 can define the pivot axis along its long axis. The pivot axis can be oriented along the transverse direction T. It should be appreciated that the pivot member 206 can include the pivot pin 208 as desired. Further, it should be appreciated that the pivot pin 208, and the other pivot pins described herein can be disposed in an aperture of the module housing 146 or can be monolithic with the module housing 146 as desired.

The latch 200 can be mounted to the module housing 146 such that the support member 202 extends both in the forward direction and in the rearward direction from the pivot axis when the anti-backout latch 200 is in the engaged position. In particular, the handle portion 201 can extend in the rearward direction from the pivot axis, and the attachment portion 213 can extend in the forward direction from the pivot axis. Thus, the pivot axis can be spaced from the attachment portion 213 in the rearward direction. The handle portion 201 can be configured to receive a disengagement force that urges the latch 200 to move from the engaged position to the disengaged position.

The latch 200 can further include at least one biasing member 217 that is configured to apply a biasing force that biases the latch 200 toward the engaged position. In one example, the biasing member 217 can extend from the handle portion 201, and can be configured to abut the interconnect module 102 so as to provide the biasing force. In particular, the biasing member 217 can extend from the handle portion 201 inwardly along the lateral direction A toward the module housing 146. The basing member 217 can be configured to abut a lateral side of the module housing 146 so as to provide the biasing force. The biasing member 217 can be defined by a resilient spring arm 209 that extends from the support member 202. In particular, the spring arm 209 extends in the rearward direction as it extends away from the support member 202 along the lateral direction A. Thus, it can be said that the spring arm 209 can extend from the support member 202 along the longitudinal direction L toward the handle portion 201. The spring arm 219 can be planar. Alternatively, the spring arm 219 curved along the lateral direction A as it extends from the support member 202. The spring arm 219 is configured to abut the module housing 146 when the latch 200 is in the engaged position. The pivot axis can be spaced from the biasing members 217 in the forward direction. The finger 204 can also be spaced from the biasing members 217 and the pivot axis in the forward direction. Accordingly, the pivot axis can be disposed between the finger 204 and biasing member 217 with respect to the longitudinal direction L.

As will be appreciated from the description below, the disengagement force is configured to cause the finger 204 to move away from the host module 104 against the biasing force so as to actuate the latch 200 from the engaged position to the disengaged position. For instance, an inward disengagement force in the lateral direction can be applied to the handle portion 201 of the latch 200 at a location spaced rearward from the pivot axis, thereby urging the latch 200 to move from the engaged position to the disengaged position against the biasing force. The disengagement force can be applied to the handle portion 201 toward the module housing 146. Alternatively still, the latch 200 can be configured such that an outward force along the lateral direction A away from the module housing 146 can be applied to the latch 200 at a location spaced from the pivot axis in the forward direction, thereby urging the latch 200 to move from the engaged position to the disengaged position.

The interconnect system 100 can include a pair of the latches 200 that are each attached to laterally opposed sides of the interconnect module 102. For instance, each of the pair of latches 200 can be attached to laterally opposed sides of the interconnect housing 146. Thus, the latches 200 can be squeezed toward each other to actuate the latches 200 from their engaged positions to their disengaged positions. In particular, the handle portions 201 can be squeezed toward each other to actuate the latches 200 from their engaged positions to their disengaged positions. The latches 200 can be aligned with each other along the lateral direction.

Figure 4F:
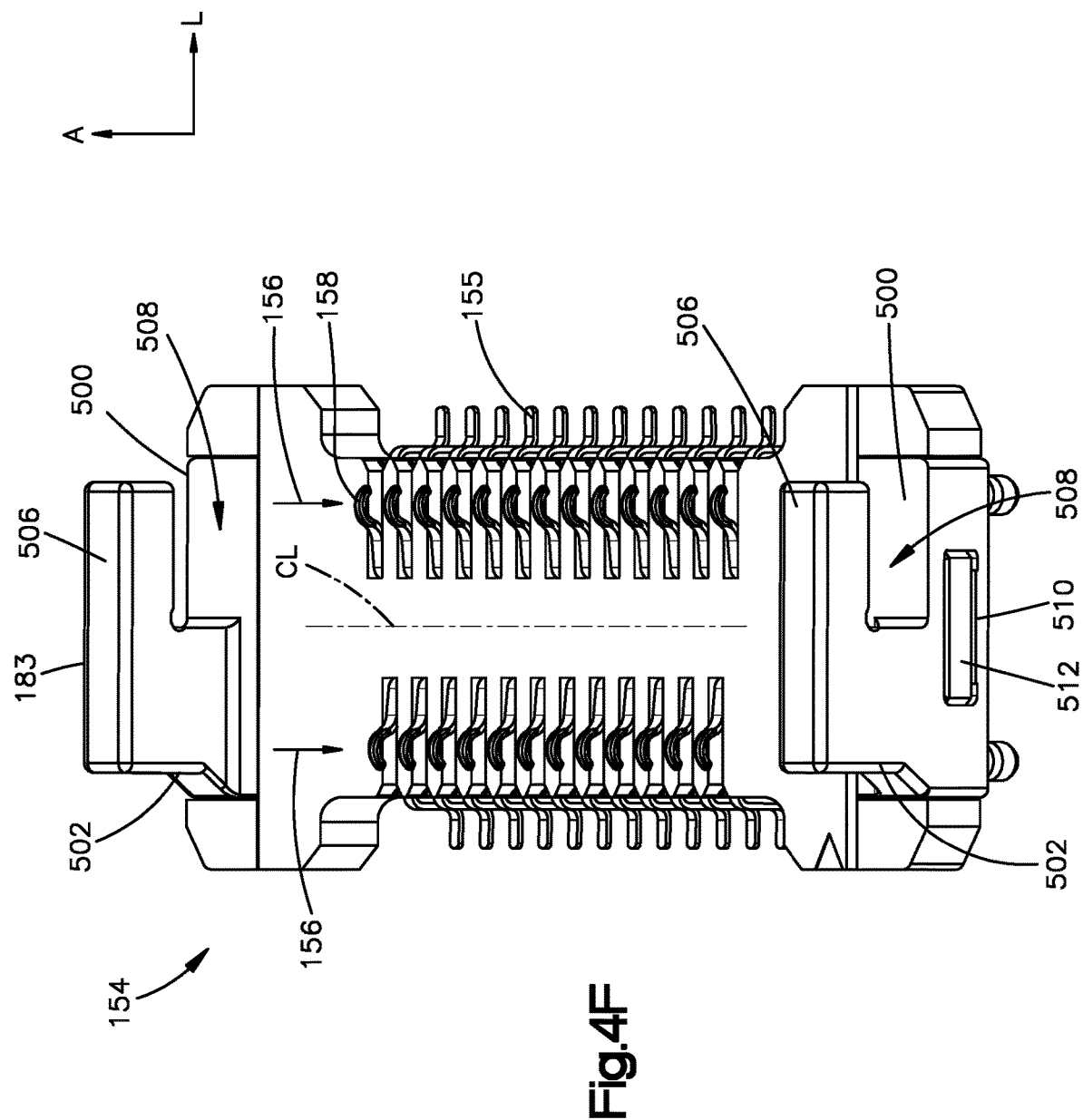
FIG. 4F is a perspective view of an electrical connector of the host module illustrated in FIG. 4A.
Figure 4G:
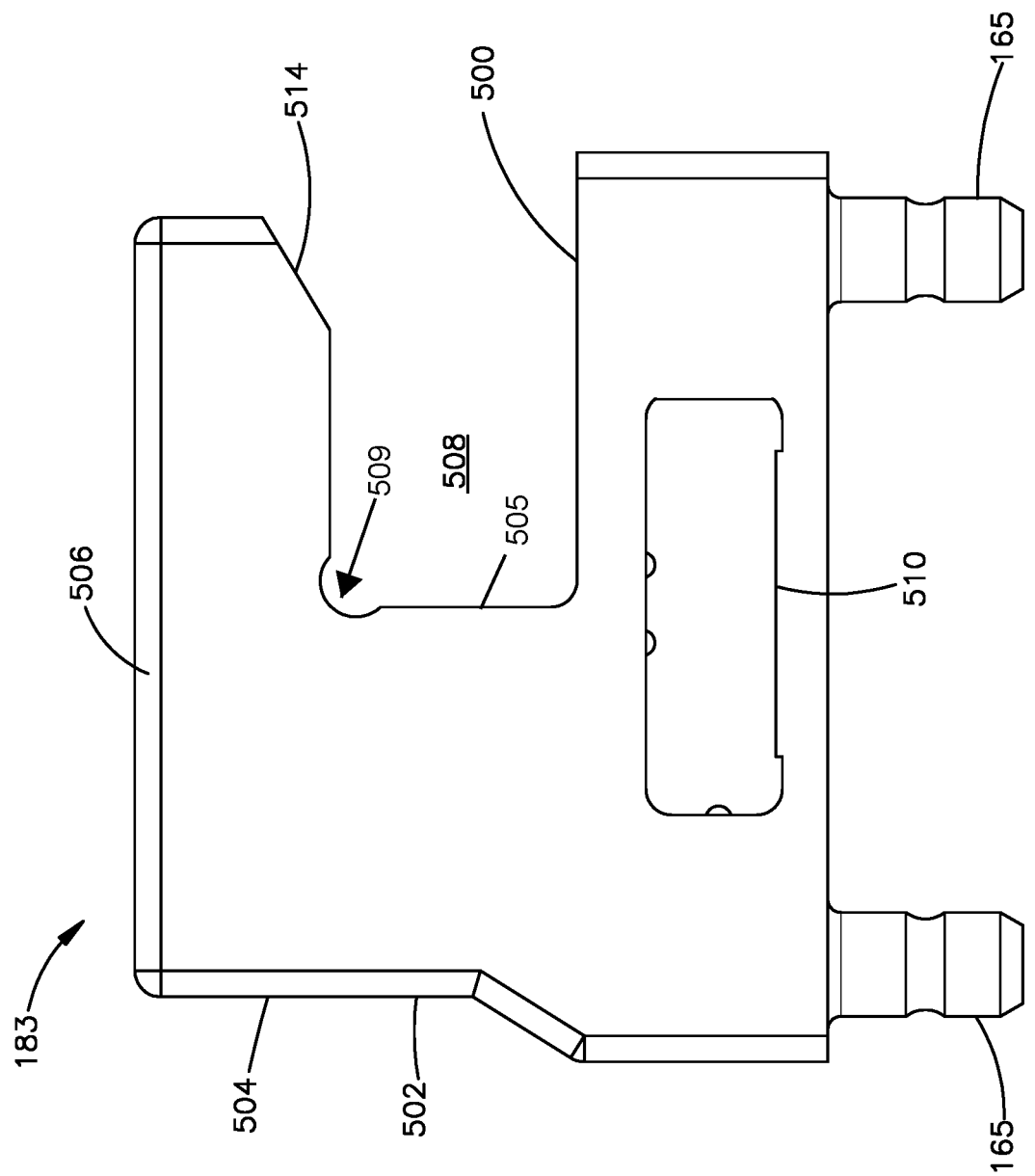
FIG. 4G is a side elevation view of a securement member of the electrical connector illustrated in FIG. 4F.

As described above with respect to FIGS. 2A-2M, and referring now also to FIGS. 4F-4G, the interconnect system 100, and in particular the host module 104, can include the at least one securement member 183. The at least one securement member 183 is configured to engage the latch 200 when the latch is in the engaged position. For instance, the second electrical connector 154 can include the at least one securement member 183. The securement member 183 can be further configured to retain the module substrate 115b against the electrical contacts of the second electrical connector 154. The securement member 183 can be configured to secure the module substrate 115b to the second electrical connector 154 with respect to separation along the transverse direction T.

The securement member 183 can be supported by the second connector housing 153. For instance, the securement member 183 can be attached to the second connector housing 153. Alternatively, the securement member 183 can be monolithic with the second connector housing 153. In this regard, it should be appreciated that the securement member 183 can be made from the same material as the second connector housing 153 or of a different material than the second connector housing 153. For instance, the securement member 183 can be made of a plastic. Alternatively or additionally, the securement member 183 can be made of a metal. In one example, the interconnect module 102 can include first and second securement members 183 supported by the connector housing 153 at locations spaced from each other along the lateral direction A. For instance, the first and second securement members 183 can be supported by laterally opposed ends of the connector housing 153. Thus, the first and second securement members 183 can be aligned with each other along the lateral direction A.

As described above, the securement member 183 includes the base 500 and the securement wall 502 that extends up from the base 500 along the transverse direction T. The securement wall 502 defines the front surface 504. The front surface 504 can face the forward direction. The securement member 183 can further include the substrate retention member that can be configured as the substrate retention arm 506. The substrate retention arm 506 is spaced from the base 500 along the transverse direction T a distance that is at least equal to the thickness of the module substrate 115b along the transverse direction T. Thus, the securement member 183 can define the substrate receiving gap 508 sized to receive a portion of the module substrate 115b. The substrate receiving gap 508 can be defined between the retention arm 506 and the base 500 along the transverse direction T. The substrate receiving gap 508 is open in the rearward direction, such that the module substrate 115b can be inserted into the gap 508 in the forward direction. The retention arm 506 can extend from the securement wall 502 along the rearward direction. The retention arm 506 can define a beveled lead-in surface 514 (see FIG. 4G) that is configured to guide the module substrate 115b into the gap 508. The beveled lead-in surface 514 is sloped toward the base 500 as it extends in the forward direction toward the securement wall 502. The securement member 183 can limit forward movement of the module substrate 115. For example, when the module substrate 115b is received in the gap 508, the module substrate 115b can abut a rear surface 505 of the securement wall 502 so as to obstruct forward movement of the module substrate 115b.

The retention arm 506 can extend from the securement wall 502 so as to define an inner corner. In some examples, the inner corner between the securement wall 502 and the retention arm 506 can define a notch 509. The notch 509 can be open to the gap 508 along the rearward direction. The notch 159 can be configured to receive an upper corner of the module substrate 115b when the module substrate 115b is received in the gap 508. The notch 509 can be sized to receive the upper corner of the module substrate 115b so as to prevent interference between the upper corner of the module substrate 115b and the inner corner of the securement member 183, thereby allowing an edge of the substrate to abut the rear surface 505 of the securement wall 502. The securement wall 502 can extend from the base 500 so as to define an inner corner. In some examples, the inner corner between the base 500 and the securement wall 502 can define a notch (not shown). The notch can be similar to the notch 509 and can be sized to receive a lower corner of the module substrate 115b so as to prevent interference between the lower corner of the module substrate 115b and the inner corner of the securement member 183, thereby allowing the front end 119a of the module substrate 115b to abut the rear surface 505 of the securement wall 502.

The securement member 183 can be configured to attach to the second connector housing 153. For instance, the securement member 183 can define the securement opening 510 that is sized to receive a projection 512 of the second connector housing 153 so as to secure the securement member 183 to the second connector housing 153. The securement opening 510 can be defined by the base 500, and can extend into or through the base 500 along the lateral direction A. The projection 512 can extend out in the lateral direction A. The projection 512 can be sized to be press fit in the securement opening 510. The projection 512 and the securement openings 510 can each define non-circular shapes to prevent the securement member 183 from rotating with respect to the second connector housing 153 about an axis that is oriented along the lateral direction A. Alternatively or additionally, the securement member 183 can include one or more projections that extend along the lateral direction A into receiving apertures of the connector housing 153. Thus, the projections can be circular or non-circular in shape as desired. In some examples, as shown in FIG. 4F, when the securement member 183 is attached to the second connector housing 153, the upper surface of the base 500 can be downwardly offset from the upper surface of the second connector housing 153 with respect to the transverse direction T. Thus, when the module substrate 115b is received in the gap 508 of the securement member 183 and the lower surface of the module substrate 115b abuts the upper surface of the second connector housing 153, the lower surface of the module substrate 115b will be spaced from the upper surface of the base 500. Accordingly, the gap 508 can define a height along the transverse direction that is greater than a height of the module substrate 115b so as to define a space between the lower surface of the module substrate 115b and the upper surface of the base 500.

A connector centerline CL can be oriented along the lateral direction A and can bisect the second electrical connector 154 into equal halves along the longitudinal direction L. In one example, the front surface 504 and a first one of the rows 156 can be disposed on the same side of the connector centerline CL with respect to a second one of the rows 156. The first one of the rows 156 can be disposed between the connector centerline CL and the front surface 504 with respect to the longitudinal direction L. The retention arm 506 can extend from the securement wall 502 to a free end that is disposed such that the second one of the rows 156 is disposed between the free and the connector centerline CL, the second one of the rows 156 defined by the contact locations 158 when the contact locations 158 are not compressed. The base 500 defines a front end that is disposed such that the first one of the rows 156 is disposed between the front end of the base 500 and the centerline CL.

Figure 4H:
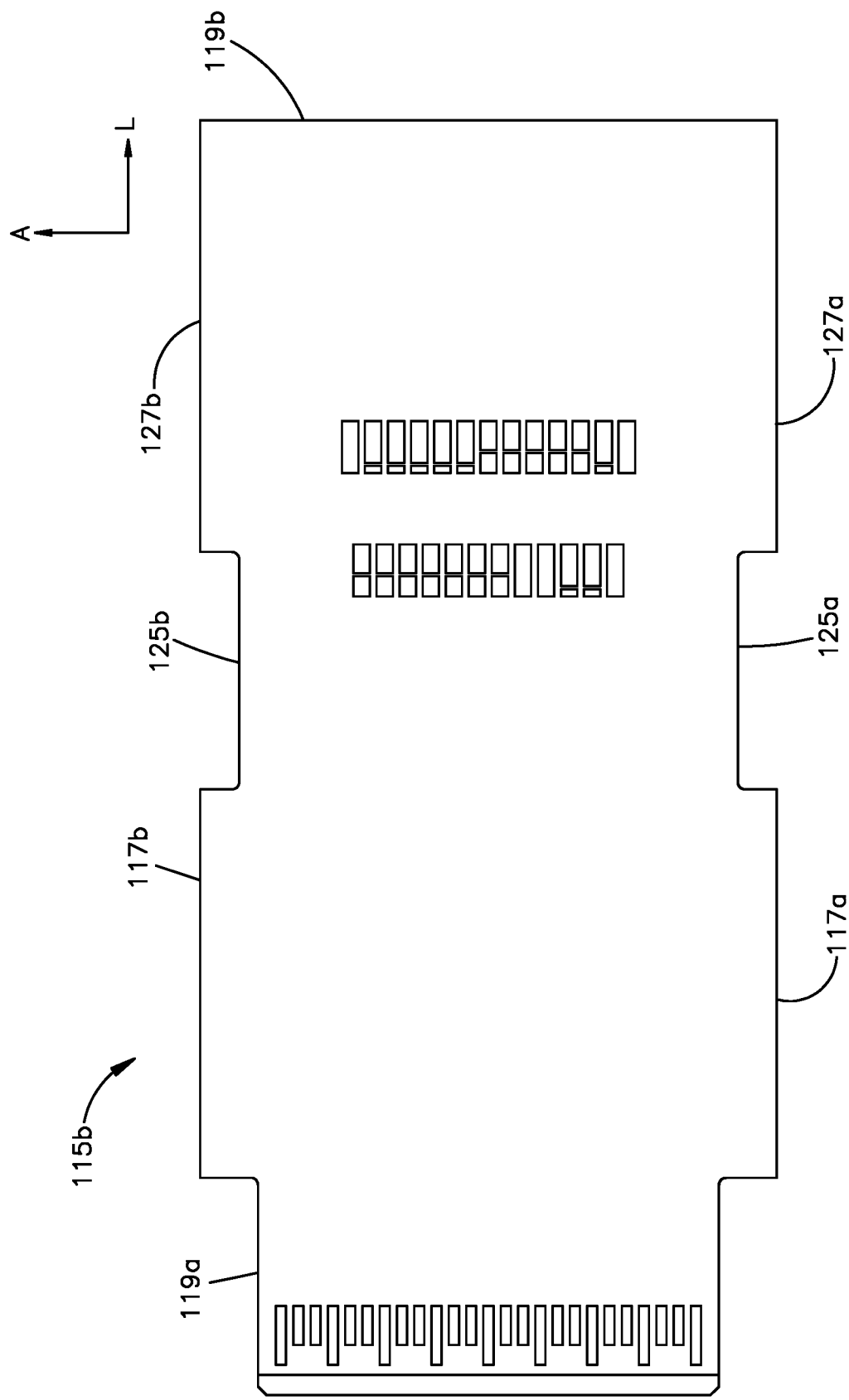
FIG. 4H is a top plan view of a host substrate of the host module illustrated in FIG. 4A to which the electrical connector illustrated in FIG. 2G is configured to be mounted.

Referring now to FIG. 4H, the module substrate 115b defines opposed first and second lateral sides 117a and 117b that are spaced from each other along the lateral direction A. The module substrate 115b defines first and second notches 125a and 125b that extend into each of the first and second lateral sides 117a and 117b, respectively. The notches 125a and 125b are positioned and sized to allow the substrate retention arm 506 to pass therethrough along the transverse direction T when the module substrate 115b is aligned to be mated with the first and second electrical connectors 52 and 54, respectively. For instance, the notches 125a and 125b can have a length along the longitudinal direction L that is greater than that of the retention arms 506. The module substrate 115b can further define first and second retention regions 127a and 127b that are configured to be received in the substrate receiving gap 508 of the securement members 183. The first and second retention regions 127a and 127b extend from the first and second notches 125a and 125b, respectively, in the rearward direction. Further, the first and second retention regions 127a and 127b can be aligned with the first and second notches 125a and 125b, respectively, along the longitudinal direction L. Thus, the notches 125a-b are disposed between the retention regions 127a-b and the electrical contact pads at the front end 119a with respect to the longitudinal direction. The electrical contact pads at the front end 119a are configured to mate with the electrical contacts of the first electrical connector 152.

Figure 4I:
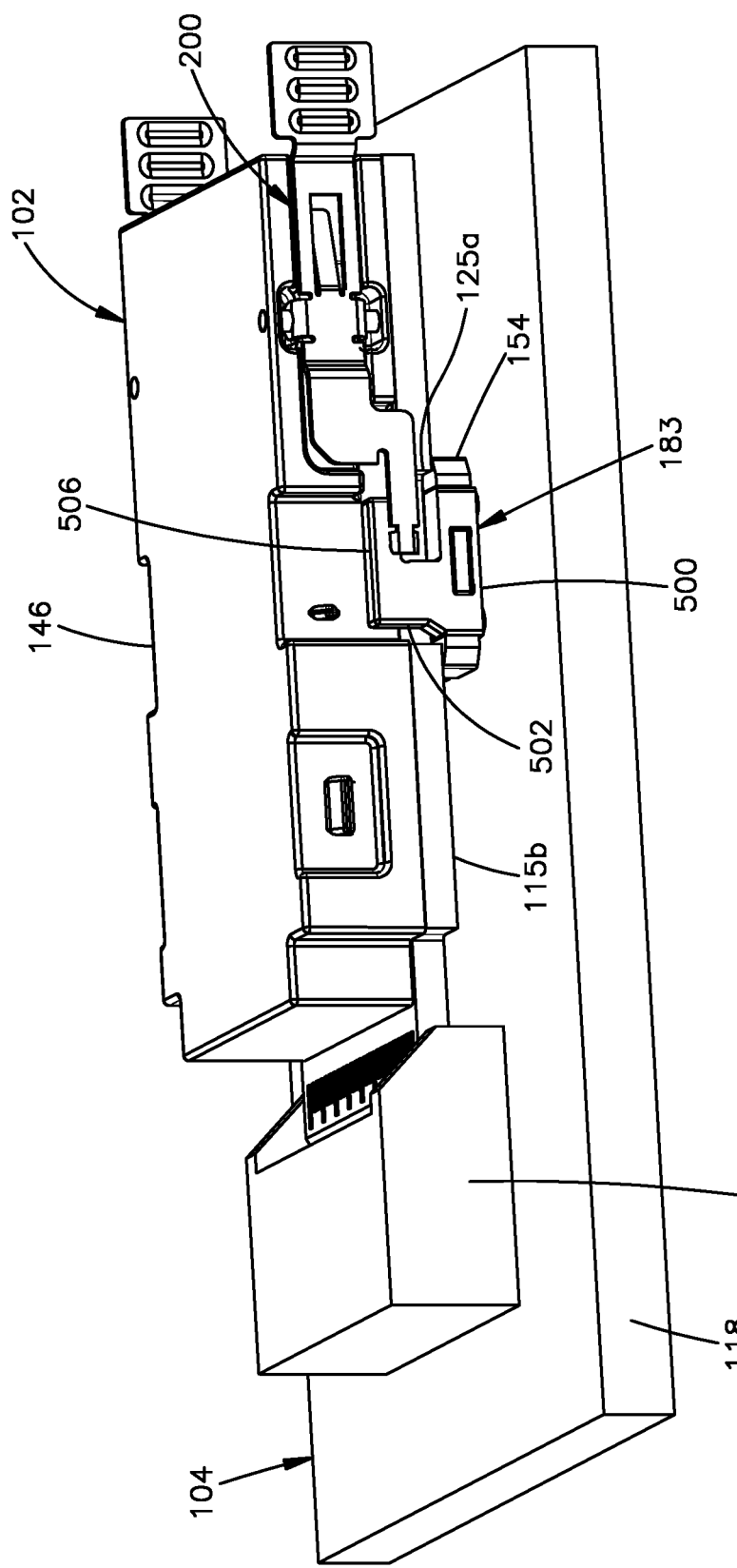
FIG. 4I is a perspective view of a portion of the interconnect module illustrated in FIG. 4A, with the interconnect module aligned to be mated with the host module.

Referring now to FIG. 4I, during operation, the interconnect module 102 is configured to be aligned to be mated with the first and second electrical connectors 152 and 154. In particular, the module substrate 115b is positioned such that the at least one notch is aligned along the transverse direction T with the retention arms 506 of a corresponding securement member 183. Thus, the retention region that is aligned with the at least one notch is offset with respect to the retention arm 506 in the rearward direction. In one example, the first and second notches 125a and 125b are aligned with the retention arms 506 of the first and second securement members 183, respectively, along the transverse direction T. Thus, the retention regions 127a and 127b that are aligned with the corresponding notches 125 and 125b, respectively, along the longitudinal direction L are offset with respect to the retention arm 506 in the rearward direction.

The module substrate 115b is then translated down along the transverse direction T toward the second electrical connector 154, and thus toward the host substrate 118 until the module substrate 115b is aligned with the substrate receiving gaps 508 of the securement members 183 along the longitudinal direction L, as shown in FIG. 4I. In particular, the retention regions 127a and 127b are aligned with the substrate receiving gaps 508 of the securement members 183 along the longitudinal direction L. For example, the retention regions 127a and 127b can be aligned with the beveled lead-in surfaces 514 (see FIG. 4G) along the longitudinal direction L. In this position, the front end 119a of the module substrate 115b is aligned with the receptacle of the first electrical connector 152 along the longitudinal direction. As illustrated in FIGS. 4C-4D, the module substrate 115b is then translated in the forward direction with respect to the host module 104 until the module substrate 115b is mated with the first and second electrical connectors 152 and 154. Further, as the module substrate 115b is mated with the first and second electrical connectors 152 and 154, the retention regions 127a and 127b of the module substrate 115b are received in the substrate receiving gaps 508 of the securement members 183.

As described above, the electrical contacts 155 are configured to compress toward the underlying host substrate 118 when the module substrate 115b is brought into contact with the electrical contacts 155, in particular at the contact locations 158. Thus, the electrical contacts compress along the transverse direction from a first position to a compressed position. The substrate retention arm 506 can offset from the contact locations 158 a distance along the transverse direction T when the electrical contacts 155 are in the first position. The distance is less than the thickness of the module substrate 115b. Thus, when the module substrate 115b is inserted into the substrate receiving gap 508, the securement member 183 can maintain the module substrate 115b in a position that maintains the electrical contacts 155 in the compressed position. Accordingly, the substrate retention arm 506 can be referred to as a compression member that is configured to apply a compressive force to the module substrate 115b against the electrical contacts 155 in the transverse direction T. In this regard, the securement member 183 can prevent the module substrate 115b from becoming unmated from the electrical contacts 155 along the transverse direction T.

With continuing reference to FIG. 4I, when the module substrate 115b is aligned to be mated with the first and second electrical connectors 152 and 154 in the forward direction, the barb 205 (see FIG. 2B) of the latch 200 can be aligned with the securement member 183 along the longitudinal direction L. For instance, the barb 205 can be aligned with the substrate retention arm 206 along the longitudinal direction. Accordingly, referring now also to FIGS. 4C-4D, as the module housing 115b is translated in the forward direction, the barb 205 can ride over the securement member 183, and in particular the retention arm 206, thereby causing the latch 200 to pivot about the pivot axis in the second direction against the biasing force of the spring arm 209 that compresses against the module housing 146. When the module substrate 115b is mated with the first and second electrical connectors 152 and 154, the barb 205 can translate past the front surface 504, thereby causing the biasing force of the spring arm 209 to pivot the latch 200 in the first direction. As the latch 200 pivots in the first direction, the barb 205 is urged laterally inward toward the module housing into an interfering position with the front surface 205. In particular, the barb 205 can be aligned with the front surface along the longitudinal direction L. For instance, the barb 205, and thus the finger 204, and thus the latch 200, can abut the front surface 205. When the barb 205 is in longitudinal alignment or abutment with the front surface 504, the interconnect module 102 is prevented from translating in the rearward direction with respect to the host module 104 a sufficient distance to unmate the interconnect module 102 from the host module 104. It should thus be appreciated that the barb 205 (and thus the finger 204) and the front surface 504 define respective complementary engagement members that are configured to engage so as to attach the latch 200 to the second electrical connector 154. It can further be said that the engagement member of the latch 200 is configured to mate with the complementary engagement member so as to attach the interconnect module 102 to the host module 104.

In an alternative embodiment, the securement member 183 can define a projection, and the latch 200 can define a front surface that engages the projection of the securement member when the latch 200 is in the engaged position. Thus, the complementary engagement members can be defined by the projection of the securement member 183 and the front surface of the latch 200. It can therefore be said that one of the latch 200 and the securement member 183 defines a projection, and the other of the latch 200 and the securement member 183 defines a front surface that is sized and positioned to abut the projection so as to removably secure the latch 200 to the second electrical connector 154 in the engaged position.

As shown in FIG. 4E, the latch 160 can be moved from the engaged position to the disengaged position. Disengagement of the latch 200 from the complementary engagement member allows the interconnect module 102 to be removed from the host module 104. In particular, the latch 160 is configured to be pivoted about the pivot axis in the second direction so as to remove the second interference between the latch 200 and the securement member 183, and in particular the securement wall 502. Thus, when the latch 160 is in the disengaged position, interference between the latch 200 and the securement member 183 does not prevent the interconnect module 102 from translating relative to the host module 104 in the rearward direction a sufficient distance so as to unmate the interconnect module 102 from at least one or both of the first electrical connector 152 and the second electrical connector 154.

Figure 4J:
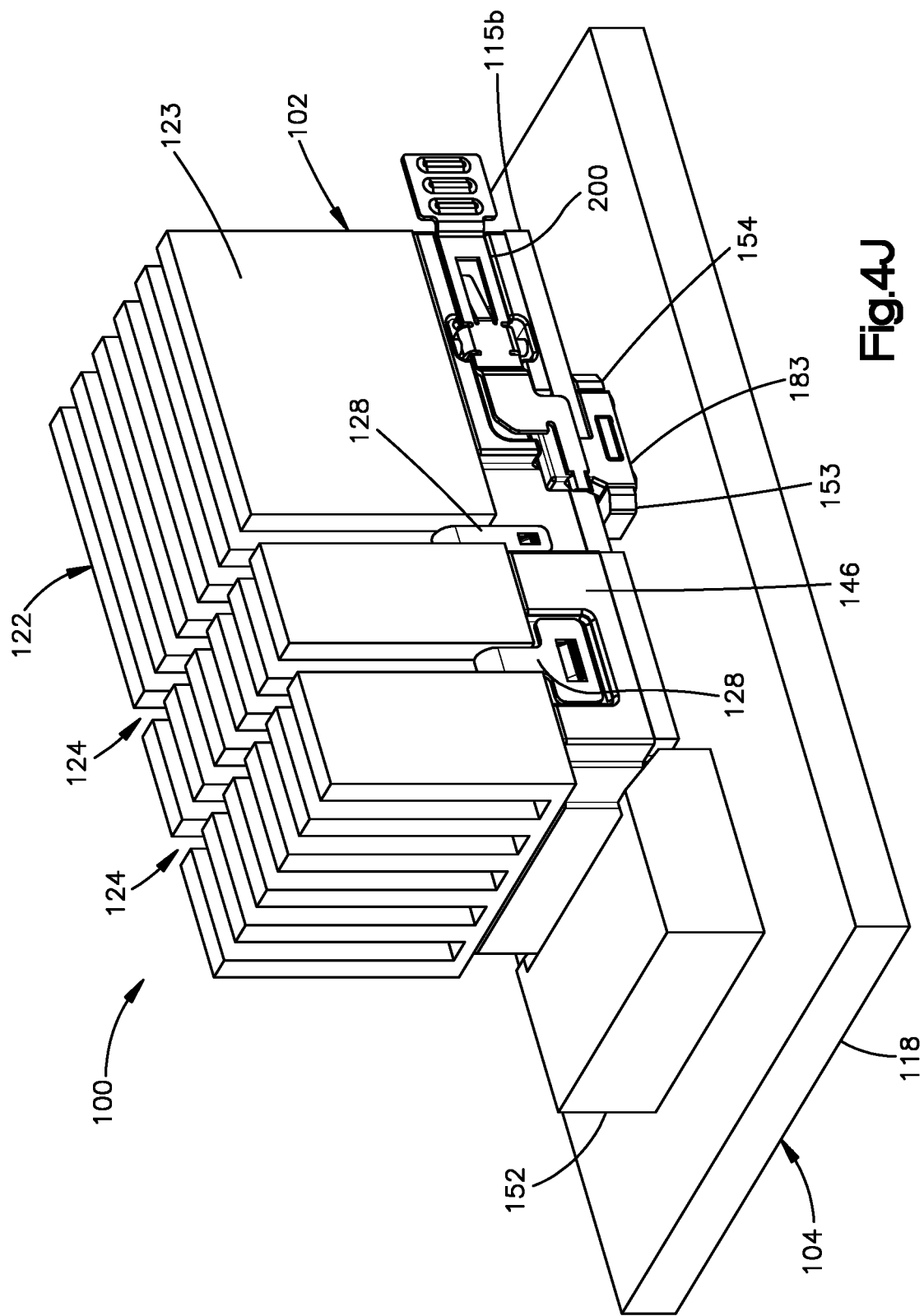
FIG. 4J is a perspective view of the interconnect module illustrated in FIG. 4A, including a heat sink attached to a module housing of the interconnect module.
Figure 4K:
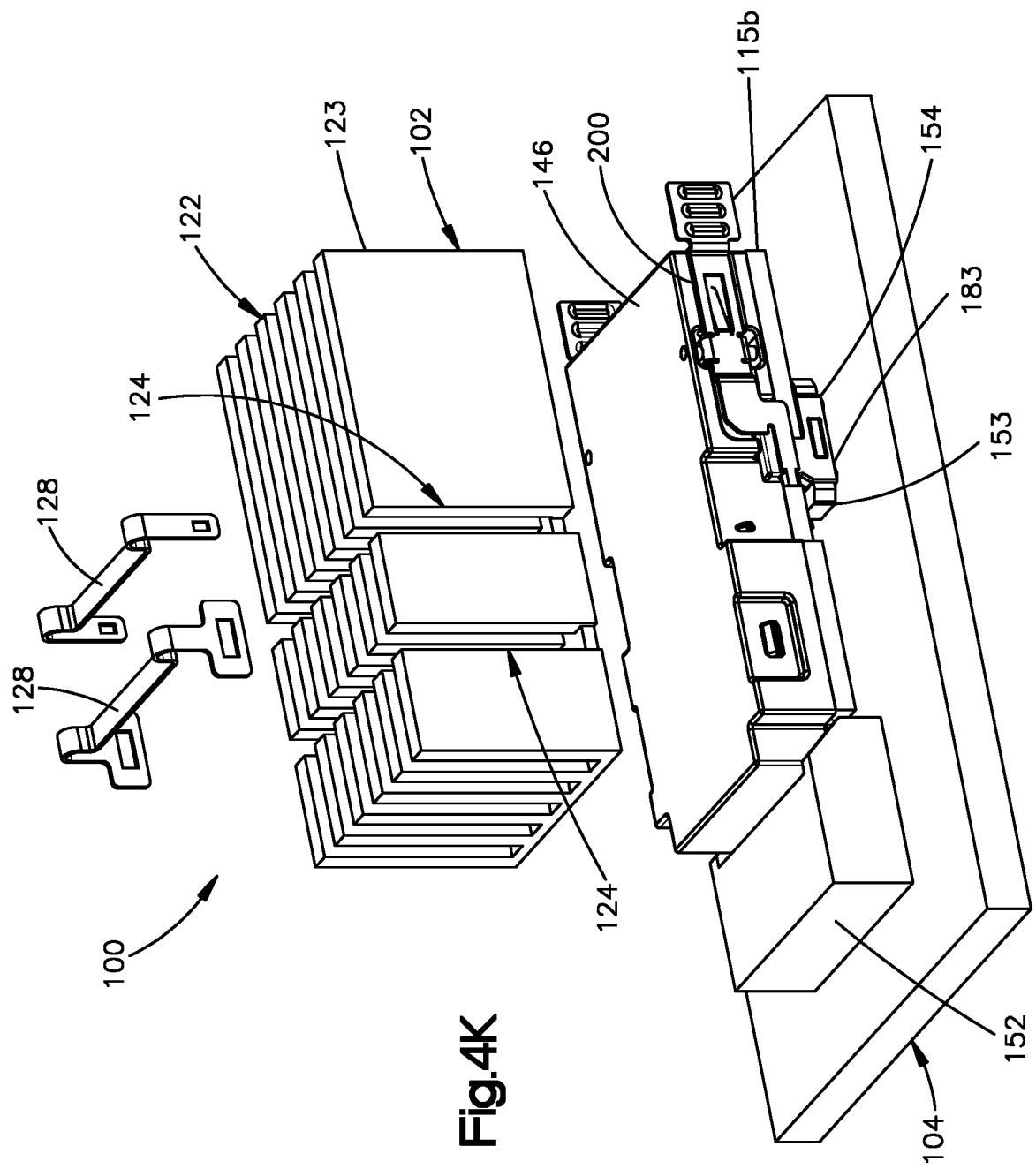
FIG. 4K is a perspective view of the interconnect module illustrated in FIG. 4J, showing attachment of the heat sink to the module housing.

Referring now to FIGS. 4J-4K, and as described above with respect to FIGS. 2A-2M, the interconnect module 102 can include a heat sink 122 that is attachable to the module housing 146. The interconnect module 102 can optionally include at least one of a thermally conductive interface material and a thermally conductive adhesive or epoxy between the heat sink 122 and the module housing 146 to promote heat transfer between the heat sink 122 and the module housing 146. An example of the interface material includes (without limitation) a sheet material such as SarconXR-m made by Fujipoly. An example of the adhesive or epoxy includes (without limitation) Thermoset MT-125 made by the Lord Corporation. Alternatively, the heat sink 222 can be monolithic with the module housing 146. It should be appreciated that the latch 200 can alternatively be pivotally attached to the heat sink 220, such that the latch 160 and the heat sink 122 define the first mechanical interference. The heat sink 122 includes a plurality of fins 123 that are configured to dissipate heat. In one example, the fins 123 can be spaced from each other along the lateral direction A. The heat sink 122 can further include at least one recess 124 such as a plurality of recesses 124 that extend into the fins 123. The at least one recess 124 can extend into the fins 123 along the transverse direction T toward the module housing 146. The at least one recess 124 can extend through the fins 123 along the lateral direction A. The interconnect module 102 can include a corresponding at least one more securement bands 128 that are configured to be inserted into a corresponding recesses 124 and attached to the module housing 146, thereby attaching the heat sink 122 to the module housing 146.

Because the latch 200 is pivotally attached to the module housing 146, the heat sink 122 can be configured such that neither of the recesses 124 is configured to receive a latch in the manner described above with respect to FIGS. 2A-2M. Thus, the recesses 124 can each be configured to receive only the bands 128 that secure the heat sink 122 to the module housing 146. It should be appreciated that the heat sink 122 can be attached to the module housing 146 after the module substrate 115b has been mated with the first and second electrical connectors 152 and 154. Alternatively, the heat sink 122 can be attached to the module housing 146 prior to mating the module substrate 115b with the first and second electrical connectors 152 and 154.

It should be appreciated that the interconnect system 100 can include any number of latches 200 as desired, such as first and second ones of the latch 200. The latches 200 can be spaced from each other along the lateral direction A. In particular, the latches 200 can be positioned such that the respective pivot axes are aligned with each other along the lateral direction A. Further, the fingers 204 can be spaced from each other and aligned with each other along the lateral direction A. Accordingly, the fingers 204 can move toward each other as the latches 200 move from the disengaged position to the engaged position. Similarly, the fingers 204 can move away each other and away from the respective projections 193 as the latches 200 move from the engaged position to the disengaged position. Further still, the biasing members 217 can be aligned with each other along the lateral direction A. It should be appreciated that the interconnect system 100 can be said to include a latch system that includes first and second ones of the latch 200, and first and second ones of the securement member 183. Thus, both in the embodiment illustrated in FIGS. 2A-2M, and in the embodiment illustrated in FIGS. 4A-4M, at least one latch can define a pair of fingers that are each configured to engage with the securement member 183 so as to define the second mechanical interference when the latch is in the engaged position. The fingers can be aligned with each other along the lateral direction A.

Referring now also to FIG. 4L, and as described above with respect to FIGS. 2A-2M, the second electrical connector 154, including the second connector housing 153 and the securement members 183, are configured to be mounted to the host substrate 118. For instance, the second connector housing 153 can include at least one mounting projection 163 that extends down along the transverse direction T. In one example, the second connector housing 153 can include a plurality of mounting projections 163 that extend down along the transverse direction. For instance, the second connector housing 153 can include first and second mounting projections 163. The first and second mounting projections 163 can be spaced in the same direction with respect to a connector centerline CL that is oriented along the lateral direction A and bisects the second electrical connector 154 into equal longitudinal halves. Alternatively, the first and second mounting projections 163 can be disposed on opposite sides of the centerline CL. Alternatively still, the first and second mounting projections 163 can be disposed on the centerline CL. The mounting projections 163 can be circular, non-circular, or any suitable alternative shape as desired. Further, the mounting projections 163 can define the same size and shape as each other, or can have a different size or shape from each other. The first and second mounting projections 163 can be aligned with each other along the lateral direction A. The mounting ends of the electrical contacts 155 can define be aligned in mounting end rows 157 that can be disposed between the mounting projections 163 and the centerline CL with respect to the longitudinal direction L. Alternatively, the mounting projections 163 can be disposed between the mounting end rows 157 and the centerline CL with respect to the longitudinal direction L.

The securement member 183 can also include at least one mounting projection 165 that extends down along the transverse direction T. In one example, the securement member 183 can include a plurality of mounting projections 165 that extend down along the transverse direction T. The mounting projections 165 can extend down from the base 500 along the transverse direction T. The securement members 183 can combine to include first and second pairs 165a and 165b of mounting projections 165. The first and second pairs 165a and 165b can be disposed on opposite sides of the centerline CL. For instance, the first and second pairs 165a and 165b can be equidistantly spaced from the centerline CL. Alternatively, the first and second pairs 165a and 165b can be spaced at different distances from the centerline CL. The mounting projections 165 of the first pair 165a can be aligned with each other along the lateral direction A. Similarly, the mounting projections 165 of the second pair 165b can be aligned with each other along the lateral direction A. Alternatively, the first and second pairs 165a and 165b of mounting projections 165 can be disposed on the same side of the centerline CL. Alternatively still, one or both of the first and second pairs 165a and 165b can be located on the centerline CL. The mounting projections 165 can be circular, non-circular, or any suitable alternative shape as desired. The mounting end rows 157 that can be disposed between the mounting projections 165 and the centerline CL with respect to the longitudinal direction L. Alternatively, the mounting projections 163 can be disposed between the mounting end rows 157 and the centerline CL with respect to the longitudinal direction L.

The mounting projections 163 and 165 can define the same size and shape as each other, or can have a different size or shape from each other. Further, the mounting projections 165 of the securement members 183 can define cross-sectional dimensions that are different than cross-sectional dimensions of the mounting projections 163 of the connector housing 153. The cross-sectional dimensions are measured along a plane that is defined by the lateral direction A and the longitudinal direction L. In one example, the cross-sectional dimensions of the mounting projections 165 can be greater than the cross-sectional dimensions of the mounting projections 163. Alternatively, the cross-sectional dimensions of the mounting projections 163 can be greater than the cross-sectional dimensions of the mounting projections 165. Alternatively still, the cross-sectional dimensions of the mounting projections 165 can be equal to the cross-sectional dimensions of the mounting projections 163.

In one example, the mounting projections 163 are on the same side of the centerline CL as the first pair 165a of mounting projections 165, and on the opposite side of the centerline CL from the second pair 165b of mounting projections. The mounting projections 163 and 165 can define geometrical transverse centerlines that are oriented along the transverse direction T. The transverse centerlines of the mounting projections 163 can be offset toward the centerline CL with respect to the centerlines of the mounting projections 165 of the first pair 165a. Alternatively, the transverse centerlines of the mounting projections 165 of the first pair 165a can be offset toward the centerline CL with respect to the centerlines of the mounting projections 163. Alternatively still, the transverse centerlines of the mounting projections 165 of the first pair 165a can be equidistantly spaced from the centerline CL as the centerlines of the mounting projections 163. The mounting projections 163 and 165 can be said to define a footprint of the second electrical connector 154.

In this regard, it should be appreciated that the centers of the mounting projections 163 can be spaced closer to the centers of the first pair 165a of mounting projections 165 than they are to the centerline along the longitudinal direction L. For instance, the centers of the mounting projections 163 can be spaced from the centers of the first pair 165a of mounting projections 165 a first distance along the longitudinal direction L, and spaced from the centerline a second distance along the longitudinal direction. The second distance can be greater than five times the first distance. For example, the second distance is greater than 10 times the first distance. The mounting projections 163 can be disposed between the first pair 165a of mounting projections 165 with respect to the lateral direction A. The mounting projections of the first pair 165a of mounting projections can be aligned with respective different ones of the mounting projections of the second pair 165b of mounting projections 165 along the longitudinal direction. One of the mounting end rows 157 can be disposed such that at least one or both of the mounting projections 163 and the first pair 165a of mounting projections 165 are disposed between the one of the mounting end rows 157 and the centerline CL with respect to the longitudinal direction L. The second pair 165b of mounting projections 165 can be disposed between the other of the mounting end rows 157 and the centerline CL with respect to the longitudinal direction L. The first electrical connector 152 can similarly include a plurality of mounting projections that are configured to be received by corresponding mounting apertures of the host substrate 118.

The pair of mounting projections 163 of the connector housing 153 can be referred to as a first pair of mounting projections of the second electrical connector. The first pair of mounting projections 165 of the securement members 183 can be referred to as a second pair of mounting projections of the second electrical connector 154. The second pair of mounting projections 165 of the securement members 183 can be referred to as a third pair of mounting projections of the second electrical connector 154. In one example, the second electrical connector 154 has no mounting projections configured to secure the electrical connector to the host substrate 118 other than the first, second, and third pairs of mounting projections.

Similarly, referring now to FIG. 4M, and as described above with respect to FIGS. 2A-2M, the host substrate 118 can define a footprint that corresponds to the footprint of the second electrical connector 154. In particular, the host substrate 118 can define a plurality of mounting apertures that are dimensioned and positioned to receive the mounting projections 163 and 165 of the second electrical connector 154. In one example, the mounting apertures can be sized such that the mounting projections 163 and 165 are inserted into the mounting apertures so that the mounting ends of the electrical contacts 155 are aligned with respective ones of electrical contact locations 177 of the host substrate. Alternatively or additionally, the mounting projections 163 and 165 can be press-fit in, or otherwise received by, the mounting apertures. The host substrate 118 can further define a plurality of mounting apertures that are sized and shaped to receive the mounting projections of the first electrical connector 152. The mounting apertures that are sized and shaped to receive the mounting projections of the first electrical connector 152 can be disposed outside the footprint that is defined by the mounting apertures that are dimensioned and positioned to receive the mounting projections 163 and 165 of the second electrical connector 154.

For instance, the host substrate 118 can include at least one first mounting aperture 169 that extends at least therein or therethrough along the transverse direction T. In one example, the host substrate 118 can include a plurality of first mounting apertures 169. For instance, the host substrate 118 can include a pair of first mounting apertures 169. The first mounting apertures are sized and configured to receive the mounting projections 163 of the second electrical connector 154. For instance, the mounting projections 163 of the second electrical connector 154 can be sized to be press-fit in, or otherwise received by, the first mounting apertures 169. The host substrate 118 can include electrical contact locations 177 that are configured to be placed in physical and electrical contact with the mounting ends of the electrical contacts 155 of the second electrical connector 154. For instance, the electrical contact locations 177 can be configured as contact pads at an upper surface of the host substrate 118 that faces the second electrical connector 154.

The contact locations 177 can be aligned oriented along respective first and second rows 179 that are oriented along the lateral direction A and spaced from each other along the longitudinal direction L. The mounting apertures 169 can be spaced in the same direction with respect to a substrate centerline CL1 that is oriented along the lateral direction A and is equidistantly spaced from the first and second rows 179. Alternatively, the first and second mounting apertures 169 can be disposed on opposite sides of the centerline CL1. Alternatively still, the first and second mounting apertures 169 can be disposed on the centerline CL1. The mounting apertures 169 can be circular, non-circular, or any suitable alternative shape as desired. Further, the mounting apertures 169 can define the same size and shape as each other, or can have a different size or shape from each other. The first and second mounting apertures 169 can be aligned with each other along the lateral direction A. The mounting apertures 169 can be disposed between the rows 179 and the centerline CL with respect to the longitudinal direction L. Alternatively, the rows 179 can be can be disposed between the mounting apertures 169 and the centerline CL with respect to the longitudinal direction L.

The host substrate 118 can also include at least one second mounting aperture 171 that extends at least therein or therethrough along the transverse direction T. In one example, the host substrate 118 can include a plurality of second mounting apertures 171. The second mounting apertures 171 are sized and configured to receive the mounting projections 165 of the securement members 183. For instance, the mounting projections 165 of the securement members 183 can be sized to be press-fit in, or otherwise received by, the second mounting apertures 171. For instance, the host substrate 118 can include first and second pairs 171a and 171b of second mounting apertures 171. The first and second pairs 171a and 171b can be disposed on opposite sides of the centerline CL1. For instance, the first and second pairs 171a and 171b can be equidistantly spaced from the centerline CL1. Alternatively, the first and second pairs 171a and 171b can be spaced at different distances from the centerline CL. The mounting apertures 171 of the first pair 171a can be aligned with each other along the lateral direction A. Similarly, the mounting apertures 171 of the second pair 171b can be aligned with each other along the lateral direction A. Alternatively, the first and second pairs 171a and 171b of mounting apertures 171 can be disposed on the same side of the centerline CL. Alternatively still, one or both of the first and second pairs 171a and 171b can be located on the centerline CL. The mounting apertures 171 can be circular, non-circular, or any suitable alternative shape as desired. The mounting apertures 171 can be disposed between the rows 179 and the centerline CL1 with respect to the longitudinal direction L. Alternatively, the rows 179 can be disposed between the mounting apertures 171 and the centerline CL1 with respect to the longitudinal direction L.

The mounting apertures 169 and 171 can define the same size and shape as each other, or can have a different size or shape from each other. Further, the mounting apertures 169 can define cross-sectional dimensions that are different than cross-sectional dimensions of the mounting apertures 171. The cross-sectional dimensions are measured along a plane that is defined by the lateral direction A and the longitudinal direction L. In one example, the cross-sectional dimensions of the mounting apertures 169 can be greater than the cross-sectional dimensions of the mounting apertures 171. Alternatively, the cross-sectional dimensions of the mounting apertures 171 can be greater than the cross-sectional dimensions of the mounting apertures 169. Alternatively still, the cross-sectional dimensions of the mounting apertures 169 can be equal to the cross-sectional dimensions of the mounting apertures 171.

In one example, the mounting apertures 169 are on the same side of the centerline CL1 as the first pair 171a of mounting apertures 171, and on the opposite side of the centerline CL1 from the second pair 171b of mounting apertures 171. The mounting apertures 169 and 171 can define geometrical transverse centerlines that are oriented along the transverse direction T. The transverse centerlines of the mounting apertures 169 can be offset toward the substrate centerline CL1 with respect to the centerlines of the mounting apertures 171 of the first pair 171a. Alternatively, the transverse centerlines of the mounting apertures 171 of the first pair 171a can be offset toward the centerline CL with respect to the centerlines of the mounting apertures 169. Alternatively still, the transverse centerlines of the mounting apertures 171 of the first pair 171a can be equidistantly spaced from the centerline CL as the centerlines of the mounting apertures 169. The mounting apertures 169 and 171 can be said to define a footprint of the host substrate 118.

It is appreciated that the host substrate 118 defines a first surface and a second surface opposite the first surface so as to define a thickness along the transverse direction T. The host substrate 118 further defines first and second lateral sides opposite each other so as to define a width along a lateral direction A, wherein the width is greater than the thickness. The host substrate further defines first and second longitudinal ends spaced from each other so as to define a length along a longitudinal direction L, wherein the length is greater than the width. The first and second pairs 171a and 171b of mounting apertures 171 can be disposed on opposite sides of the centerline CL1. The centerline CL1 can be equidistantly spaced from the first and second pairs 171a and 171b of mounting apertures 171. The mounting apertures 171 of the second pair 171b can be aligned with each other along the lateral direction A. The mounting apertures 171 of the first pair 171a can also be aligned with each other along the lateral direction A. The mounting apertures 169 can also be aligned with each other along the lateral direction.

Respective centers of the mounting apertures 169 can be disposed between respective centers of the mounting apertures 171 of the first pair 171a and the centerline CL1 with respect to the longitudinal direction L. The centers of the mounting apertures 169 can be spaced closer to the centers of the mounting apertures 171 of the first pair 171a than they are to the centerline CL1 along the longitudinal direction L. For instance, the centers of the mounting apertures 169 can be spaced from the centers of the mounting apertures 171 of the first pair 171a a first distance along the longitudinal direction L, and spaced from the centerline CL1 a second distance along the longitudinal direction L. The second distance can be greater than five times the first distance. For instance, the second distance can be greater than 10 times the first distance. The mounting apertures 169 can be disposed between the mounting apertures 171 of the first pair 171a with respect to the lateral direction A. The mounting apertures 171 of the first pair 171a can be aligned with respective different ones of the mounting apertures 171 of the second pair 171b along the longitudinal direction L.

The host substrate 118 can defines contact locations 177 that are configured to establish electrical contact with electrical contacts 155 of the second electrical connector 154. The contact locations 177 can be configured as contact pads, plated through holes, or any suitable alternatively constructed contact locations as desired. The contact locations 177 can be arranged in first and second rows that are oriented along the lateral direction A and spaced from each other along the longitudinal direction L. The centerline CL1 can be equidistantly spaced from the first and second rows along the longitudinal direction L. One or both of the mounting apertures 169 and the first pair of mounting apertures 171a can be disposed between one of the rows and the centerline CL1 with respect to the longitudinal direction L. The second pair 171b of mounting apertures 171 can be disposed between the other of the rows and the centerline CL1 with respect to the longitudinal direction L. The mounting apertures 169 can have a smaller cross-sectional dimension than the mounting apertures of each of the mounting apertures 171 of the first and second pairs 171a and 171b, respectively. For instance, the mounting apertures 171 of each of the first and second pairs 171a and 171b can the same cross-sectional dimension.

The mounting apertures 169 can be referred to as a first pair of mounting apertures of the host substrate 118 that are configured to receive mounting projections of the second electrical connector 154. The first pair 171a of mounting apertures 171 can be referred to as a second pair of mounting apertures of the host substrate 118 that are configured to receive mounting projections of the second electrical connector 154. The second pair 171b of mounting apertures 171 can be referred to as a third pair of mounting apertures of the host substrate 118 that are configured to receive mounting projections of the second electrical connector 154. It will be understood that the electrical connector 154 can be configured to mount to the host substrate 118. Thus, the first, second, and third pairs 169, 171a, and 171b, of mounting apertures that extend at least into or through the substrate 118 can be configured to receive the first, second, and third pairs of mounting projections of the electrical connector 154, respectively, thereby securing the electrical connector 154 to the substrate 118. In one example, the host substrate 118 has no mounting apertures configured to receive mounting projections of the second electrical connector 154 so as to secure the second electrical connector 154 to the host substrate 118 other than the first, second, and third pairs of mounting apertures.

It is recognized that the interconnect system 100 can define various dimensions that are contemplated in accordance with the present disclosure. It should be appreciated, of course, that the interconnect system 100 can be alternatively dimensioned unless otherwise indicated. For instance, referring to FIG. 4F, the second connector housing 153 can have a width at a location aligned with the electrical contacts 155 along the longitudinal direction L The width can be between approximately 5 mm and approximately 9 mm. For instance, the width can be approximately 7 mm. The word "approximately" with respect to dimensions recognizes that the dimensions can differ slightly from those disclosed. For instance, manufacturing tolerances can cause a variation in the dimensions. Further, numerical rounding can also cause a variation in the dimensions. The second connector housing 153 can define a maximum length along the lateral direction A between approximately 16 mm and approximately 24 mm. For instance, the maximum length can be approximately 20 mm. The second connector housing 153 can define an inner length along the lateral direction A between respective recesses that receive the securement members 183. The inner length can be between approximately 14 mm and approximately 21 mm. For instance, the inner length can be approximately 17.5 mm.

Referring now to FIG. 4G, the base 500 of the securement member 183 can define a length along the longitudinal direction L between approximately 8 mm and approximately 12 mm. For instance, the length of the base 500 can be approximately 10 mm. The retention arm 506 can have a length along the longitudinal direction L between approximately 6 mm and approximately 10 mm. For instance, the length of the retention arm 506 can be approximately 8 mm. The retention arm 506 can be centered with respect to the base 500 with respect to the longitudinal direction L. The lower surface of the retention arm 506 can be spaced from the upper surface of the base 500 a distance along the transverse direction T between approximately 1.5 mm and approximately 2 mm. For instance, the lower surface of the retention arm 506 can be spaced from the upper surface of the base 500 along the transverse direction T a distance of approximately 1.75 mm. Thus, the substrate receiving gap along the transverse direction can be between approximately 1.5 mm and approximately 2 mm. For instance, the substrate receiving gap along the transverse direction T can be approximately 1.75 mm. The securement member 183 can define a maximum height from the lower surface of the base 500 to the upper surface of the retention arm 506 along the transverse direction T. The maximum height can be between approximately 4 mm and approximately 6 mm. For instance, the maximum height can be approximately 5.3 mm. The securement member 183 can define an inner height from the lower surface of the base 500 to the lower surface of the retention arm 506 along the transverse direction T. The inner height can be between approximately 3 mm and approximately 4 mm. For instance, the inner height can be approximately 3.8 mm.

Referring now to FIG. 4H, the first and second notches 125a and 125b of the module substrate 115b can define a length along the longitudinal direction L between approximately 6 mm and approximately 10 mm. For instance, the length of the first and second notches 125a and 125b along the longitudinal direction L can be approximately 8.25 mm. The notches 125a and 125b can be spaced from the rear end 119b of the module substrate 115b along the longitudinal direction L a distance between approximately 10 mm and approximately 20 mm. For instance, the notches 125a and 125b can be spaced from the rear end 119b of the module substrate 115b along the longitudinal direction L a distance of approximately 15 mm. The module substrate 115b can define a maximum width along the lateral direction A between approximately 15 mm and approximately 25 mm. For instance, the maximum width can be approximately 20 mm. The maximum width can be defined by the retention regions 127a and 127b. The module substrate 115b can define an inner width along the lateral direction A between approximately 14 mm and approximately 20 mm. For instance, the inner width can be approximately 17.3 mm. The inner width can be defined at the notches 125a and 125b.

Referring now to FIGS. 5A-5E generally, and as described above with respect to FIGS. 4A-4M, the host module 104, and thus the interconnect system 100, can include a retention member that is configured to prevent the module substrate 115b from unmating from the second electrical connector 154 along the transverse direction T. As described above in FIGS. 4A-4M, the retention member can be defined by second electrical connector 154. In particular, the second electrical connector 154 can include the securement member 183 that, in turn, defines the retention member configured as the retention arm 506.

Figure 5A:
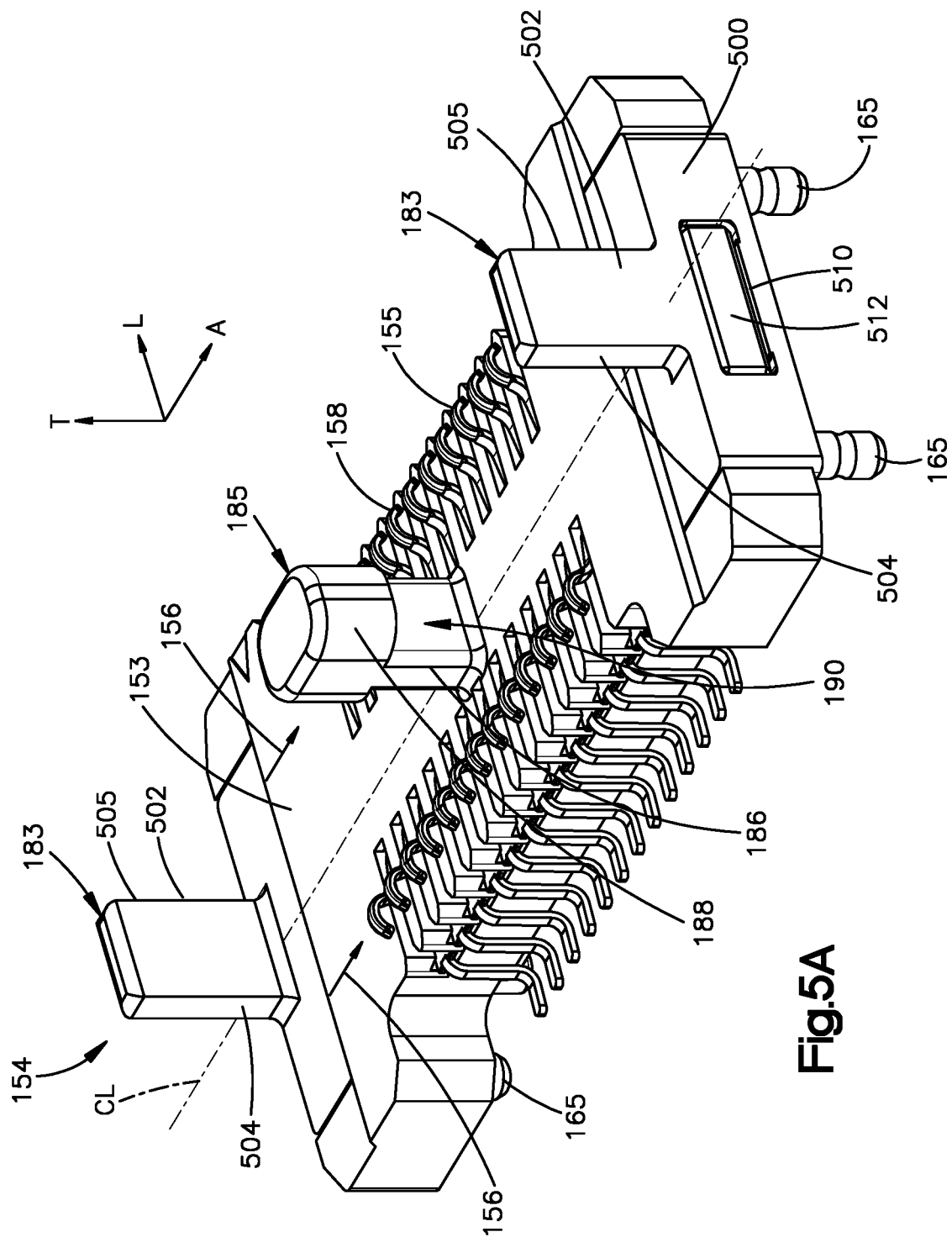
FIG. 5A is a perspective view of an electrical connector of the interconnect system illustrated in FIG. 4A, the electrical connector similar to the electrical connector illustrated in FIG. 4F, but having a securement member constructed in accordance with an alternative embodiment.

Referring now to FIG. 5A, when the interconnect system 100 includes the pivotable latch 160, the retention member can alternatively or additionally be configured as a retention peg 185 that extends out from the connector housing 153 along the transverse direction T. In particular, the retention peg 185 extends upward from the connector housing 153 along the transverse direction T away, in a direction away from the mounting ends of the electrical contacts 155. The retention peg 185 can be monolithic with the connector housing 153. Alternatively, the retention peg 185 can be separate from the connector housing 153 and attached to the connector housing 153. The retention peg 185 can be centrally disposed on the connector centerline CL. Alternatively, the retention peg 185 can be offset with respect to the connector centerline CL along the longitudinal direction L.

The retention peg 185 is configured to retain the module substrate 115b against the electrical contacts 155, and in particular against the contact locations 158 with respect to the transverse direction T. The retention peg 185 can define a neck 186 and a head 188. The neck 186 can extend out from the connector housing 153, and the head 188 can extend from the neck 186 at a location such that the head 188 is spaced from the connector housing 153. The neck 186 can define a cross-sectional dimension that is less than the cross-sectional dimension of the head 188. The cross-sectional dimension can be defined by the lateral direction A. Otherwise stated, the head 188 can be wider than the neck 186 along the lateral direction A. Thus, the head 188 can be said to be elongate along the lateral direction A with respect to each of the longitudinal direction L and the transverse direction T.

Thus, the second electrical connector 154 can define a substrate receiving gap 190 sized to receive a portion of the module substrate 115b. The substrate receiving gap 190 can be defined between the head 188 and the upper surface of the connector housing 153. The substrate receiving gap 190 is configured to receive the module substrate 115b as the module substrate 115b is inserted into the gap 190 in the forward direction. The head 188 can define a beveled lead-in surface as desired so as to guide the module substrate 115b into the gap 190. The beveled lead-in surface can be sloped toward the connector housing 153 as it extends in the forward direction. The retention peg 185 can be located on the centerline CL. The retention pegs 185 can further be centrally disposed on the connector housing 153 with respect to the lateral direction A. It should be appreciated that the second electrical connector 154 can include any number of retention pegs 185 as desired.

Referring now to FIG. 5B, the module substrate 115b defines a slot 192 that extends therethrough along the transverse direction from the first side 120a to the second side 120b. The slot 192 can define a closed continuous circumference that is defined by the module substrate 115b. The slot 192 defines a first insertion region 194 and a second guide region 196 that extends from the insertion region 194 in the rearward direction. The second guide region 196 is elongated along the longitudinal direction L. The first insertion region 194 is sized to receive the head 188 of the retention peg 185. The guide region 196 is sized narrower than the head 188 along the lateral direction A. Thus, the head 188 is not sized to be received in the guide region 196. The guide region 196 is sized substantially equal to or greater than the neck 186 along the lateral direction A. Thus, the guide region 196 is sized to receive the neck 186. Accordingly, during operation, the module substrate 115b is placed over the second electrical connector 154 such that the head 188 is aligned with the insertion region 194 of the slot 192 along the transverse direction.

Figure 5C:
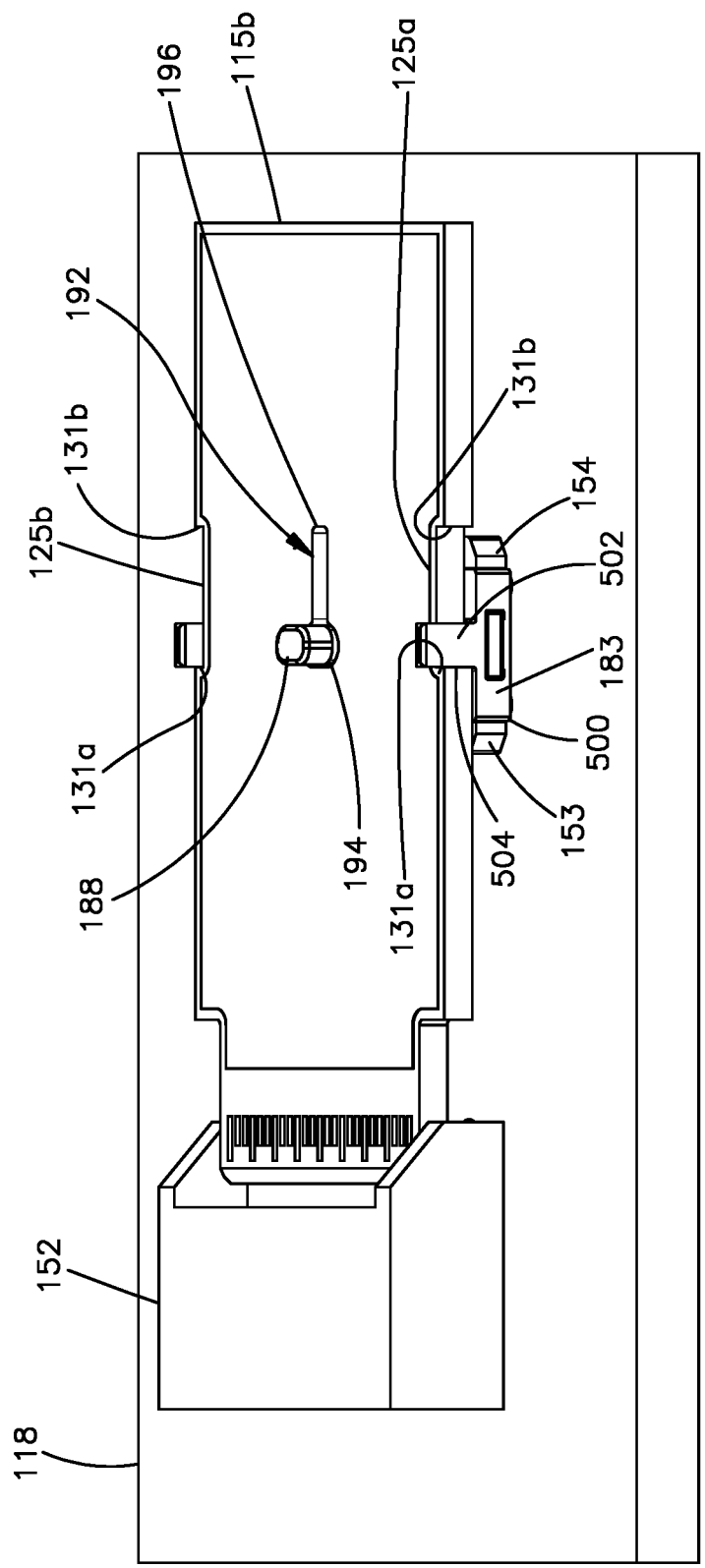
FIG. 5C is a perspective view of the interconnect system showing the module substrate of FIG. 5B aligned to be mated with the host module including the electrical connector of FIG. 5A.
Figure 5D:
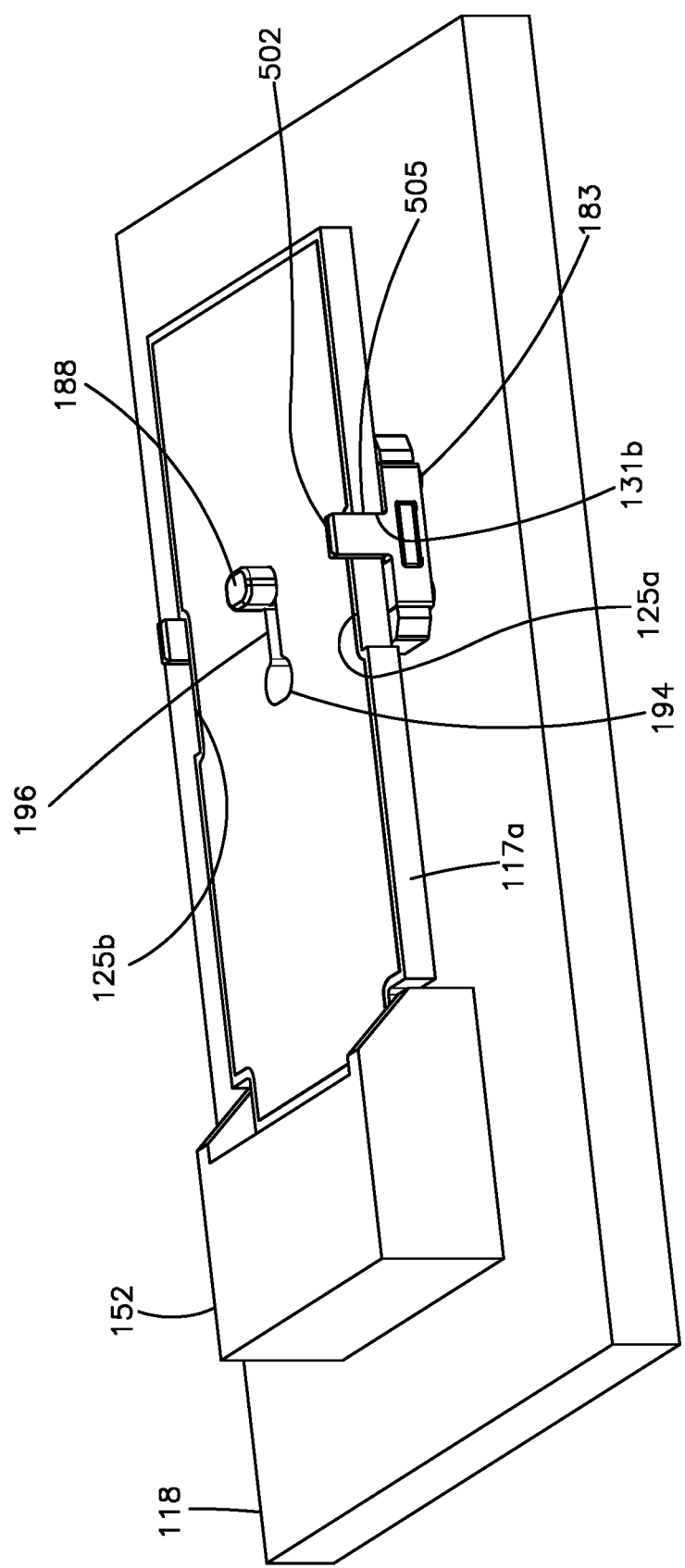
FIG. 5D is a perspective view of the interconnect system of FIG. 5C, but showing the module substrate of FIG. 5B mated with the host module including the electrical connector of FIG. 5A.

Referring to FIG. 5C, the substrate 115b is then brought down onto the second electrical connector 154, thereby inserting the head 188 through the insertion region 194 of the slot 192 until the neck 186 is aligned with the guide region 196 of the slot 192. Next, as illustrated in FIG. 5D, the module substrate 115b is translated in the forward direction with respect to the second electrical connector 154, which causes the neck 186 to slide in the guide region 196. In this regard, the guide region 196 guides the forward movement of the module substrate 115b with respect to the second electrical connector 154. The guide region 196 can have a length such that when the neck 186 abuts the module substrate 115b at the rear end of the guide region 196, the module substrate 115b is mated with both the first electrical connector 152 and the second electrical connector 154. The head 188 can be offset from the contact locations 158 a distance along the transverse direction T when the electrical contacts 155 are in the first position. The distance is less than the thickness of the module substrate 115b. Thus, when the module substrate 115b is inserted into the substrate receiving gap 190, the retention peg 185 can maintain the module substrate 115b in a position that maintains the electrical contacts 155 in the compressed position. In this regard, the retention peg can define a compression member that compresses the module substrate 115b against the electrical contacts 155.

Figure 5E:
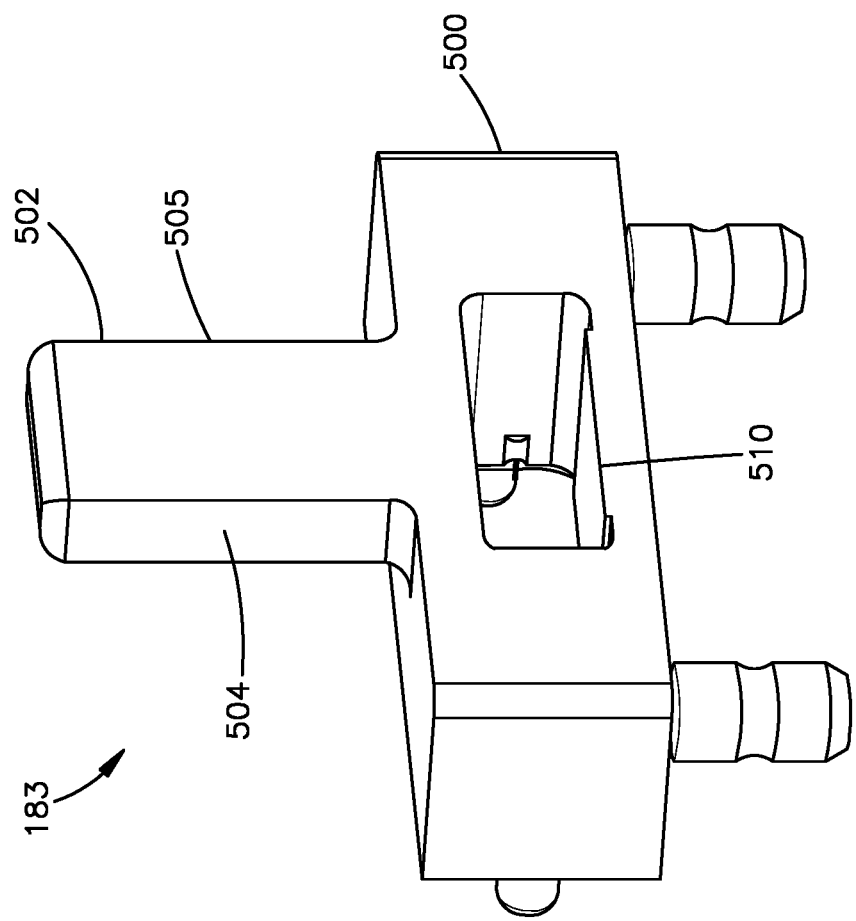
FIG. 5E is a perspective view of a securement member of the electrical connector illustrated in FIG. 5A.

Referring now to FIGS. 5C-5E, and as described above, the securement member 183 is configured to engage the latch 160 when the latch is in the engaged position. For instance, the second electrical connector 154 can include the at least one securement member 183. The securement member 183 can be configured to secure the second electrical connector 154 to the module substrate 115b. In this embodiment, because the retention peg 185 is configured to retain the module substrate 115b against the electrical contacts 155 of the second electrical connector 154 along the transverse direction T, the securement member 183 can be configured so as to not apply a compressive force to the module substrate 115b along the transverse direction T.

As described above, the securement member 183 can include the base 500 and the securement wall 502 that extends up from the base 500 along the transverse direction T. The securement wall 502 defines a front surface 504. The front surface 504 can face the forward direction. The securement wall 502 can define a rear surface 505 opposite the front surface 504. The base 500 can include a laterally inner surface and a laterally outer surface. The securement wall 502 can be laterally outwardly offset with respect to the laterally inner surface of the base 500. Further, the securement wall 502 can be substantially flush with the laterally outer surface of the base 500. Because the retention peg 185 is configured to retain the module substrate 115b against the electrical contacts 155 along the transverse direction T as described above (see FIG. 5A), the securement member 183 can be configured without the substrate retention arm 506 shown in FIG. 4G. Alternatively, the securement member 183 can include the substrate retention arm 506 and the second electrical connector 154 can include the retention peg 185 in one example.

As illustrated in FIG. 5B, and as described above, the module substrate 115b can define the first and second notches 125a and 125b in the first and second lateral sides 117a and 117b, respectively. Each of the first and second notches 125a and 125b defines a front end 131a and a rear end 131b. The rear end 131b is spaced from the front end 131a in the rearward direction. Conversely, the front end 131a is spaced from the rear end 131b in the forward direction. The securement walls 502 can be aligned with each other and the retention peg 185 along the lateral direction A. The notches 125a and 125b and the securement wall 502 can be positioned such that the front surface 504 abuts the front end 131a of the notches 125a and 125b when the head 188 is inserted in the insertion region 194 of the slot 192. Thus, during operation, when the first and second notches 125a-b are disposed between the respective securement walls 502 with respect to the lateral direction A, the head 188 will be aligned with the insertion region 194 with respect to the lateral direction A. Further, when the front ends 131a of the notches 125a-b are aligned with the front surfaces 504, the head 188 will be aligned with the insertion region 194 with respect to the longitudinal direction L as illustrated in FIG. 5C. Thus, the module substrate 115b can be reliably aligned with the second electrical connector 154 such that the head 188 is aligned with the insertion region 194 even though the head 188 and the insertion region 194 are hidden from view. As illustrated in FIG. 5D, the module substrate 115b can be translated in the forward direction until the rear end 131b of the notches 125a-b abut the rear surfaces 505 of the securement walls 502, at which point the module substrate 115b is mated with each of the first and second electrical connectors 152 and 154. Thus, the rear end 131b of the notches 125a-b can abut the rear surfaces 505 of the securement walls 502 when the retention peg 185 reaches the rear end of the slot 192.

It is recognized that the interconnect system 100 illustrated in FIGS. 5A-5E can define various dimensions that are contemplated in accordance with the present disclosure. It should be appreciated, of course, that the interconnect system 100 can be alternatively dimensioned unless otherwise indicated. For instance, referring to FIG. 5A, the second connector housing 153 can define a maximum length along the lateral direction A between approximately 16 mm and approximately 24 mm. For instance, the maximum length can be approximately 20 mm. The retention peg 185 can define a length along the longitudinal direction L between approximately 1 mm and approximately 3 mm. For instance, the length of the retention peg can be approximately 1.8 mm. The head 188 of the retention peg 185 can define a width along the lateral direction A that is between approximately 1.5 mm and 5 mm. For instance, the width can be approximately 2.5 mm. The head 188 can be spaced from the upper end of the connector housing 153 a distance along the transverse direction T between approximately 1 mm and approximately 3 mm. For instance, the distance can be approximately 1.8 mm. The securement member 183 can define a height along the transverse direction T from the bottom surface of the base 500 to the top surface of the securement wall 502. The height can be between approximately 3.5 mm and approximately 7 mm. For instance, the height can be approximately 4.9 mm. The second electrical connector 154 can define a height along the transverse direction T from the bottom surface of the base 500 to the top surface of the head 188 of the retention peg 185. The height can be between approximately 3.5 mm and approximately 7 mm. For instance, the height can be approximately 5.4 mm. The securement wall 502 can define a length along the longitudinal direction L between approximately 1 mm and approximately 4 mm. For instance, the length can be approximately 2 mm.

Referring now to FIG. 5B, the slot 192 can define a length along the longitudinal direction L that is between approximately 4 mm and approximately 9 mm. For instance, the length can be approximately 6.5 mm. The insertion region 194 can have a width along the lateral direction A. The width can be between approximately 1.5 mm and approximately 4.5 mm. For instance, the width can be approximately 3 mm. The module substrate 115b can define a maximum width along the lateral direction A between approximately 16 mm and approximately 24 mm. For instance, the maximum width can be approximately 20 mm. The module substrate 115b can define an inner width along the lateral direction A between the notches 125a and 125b that receive the securement members 183. The inner width can be between approximately 14 mm and approximately 22 mm. For instance, the inner width can be approximately 18.7 mm. It is recognized that the inner width of the substrate 115b of FIG. 5B can be greater than the inner width of the substrate 115b of FIG. 4H. Each of the notches 125a and 125b can have a length along the longitudinal direction L that is between approximately 4 mm and approximately 9 mm. For instance, the length can be approximately 6.5 mm.

Referring now to FIGS. 6A-6F, it is recognized that the interconnect system can be constructed with the retention peg 185 of the type described above, but without an anti-backout latch of the type described above with respect to the slidable latch 160 and the pivotable latch 200. The retention peg 185 can be configured to apply a compressive force to the module substrate 115b against the electrical contacts 155 of the second electrical connector 154 as described above. The compressive force can create a frictional resistance to inadvertent movement of the interconnect module 102 with respect to the host module 104 in the rearward direction an amount sufficient to unmate the module substrate 115b from the first and second electrical connectors 152 and 154.

Further, the module substrate 115b can be devoid of the notches 125a and 125b described above. Thus, the module substrate 115b can ride over the upper surface of the securement member 183 as the module substrate 115b translates along the forward and rearward directions (see FIGS. 6C-6D). Accordingly, the first and second lateral sides 117a and 117b can be devoid of a respective notch sized to receive the securement member 183 along the transverse direction T. For instance, the first and second lateral sides 117a and 117b can extend linearly and continuously from the first or front end 119a of the module substrate 115b to the second or rear end 119b of the module substrate 115b.

During operation, and as described above, the module substrate 115b can be placed over the second electrical connector 154 such that the head 188 is aligned with the insertion region 194 of the slot 192 along the transverse direction T. Next, the substrate 115b is brought down onto the second electrical connector 154, thereby inserting the head 188 through the insertion region 194 of the slot 192 until the neck 186 is aligned with the guide region 196 of the slot 192. Next, the module substrate 115b is translated in the forward direction with respect to the second electrical connector 154, which causes the neck 186 to slide in the guide region 196. In this regard, the guide region 196 guides the forward movement of the module substrate 115b with respect to the second electrical connector 154. The guide region 196 can have a length such that when the neck 186 abuts the module substrate 115b at the rear end of the guide region 196, the module substrate 115b is mated with both the first electrical connector 152 and the second electrical connector 154. The head 188 can be offset from the contact locations 158 a distance along the transverse direction T when the electrical contacts 155 are in the first position. The distance is less than the thickness of the module substrate 115b. Thus, when the module substrate 115b is inserted into the substrate receiving gap 190, the retention peg 185 can maintain the module substrate 115b in a position that maintains the electrical contacts 155 in the compressed position. In this regard, the retention peg can define a compression member that compresses the module substrate 115b against the electrical contacts 155.

Figure 6A:
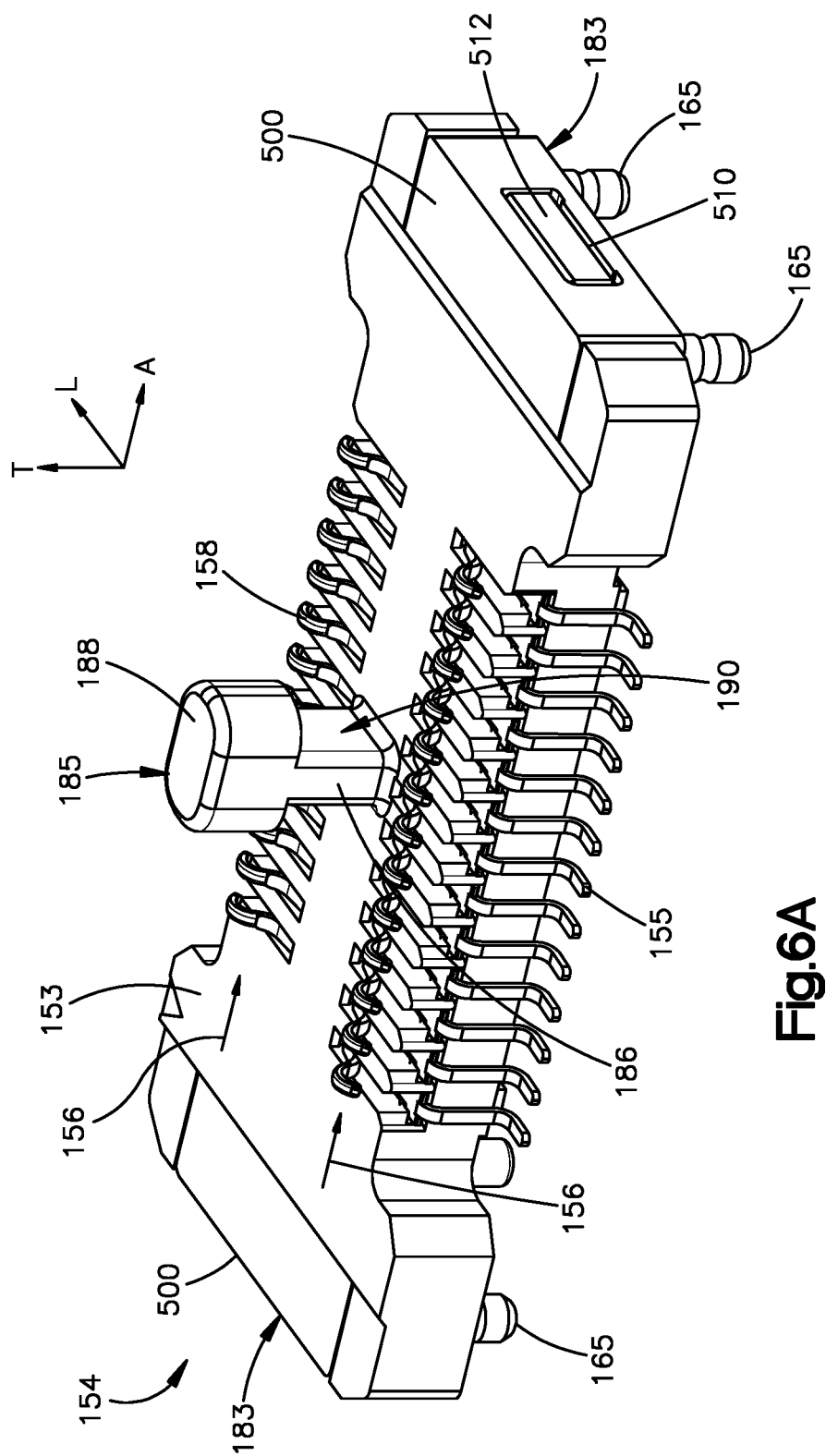
FIG. 6A is a perspective view of an electrical connector of an interconnect system illustrated in FIG. 4A, the electrical connector similar to the electrical connector illustrated in FIG. 5A, but including a securement member constructed in accordance with another alternative embodiment.
Figure 6B:
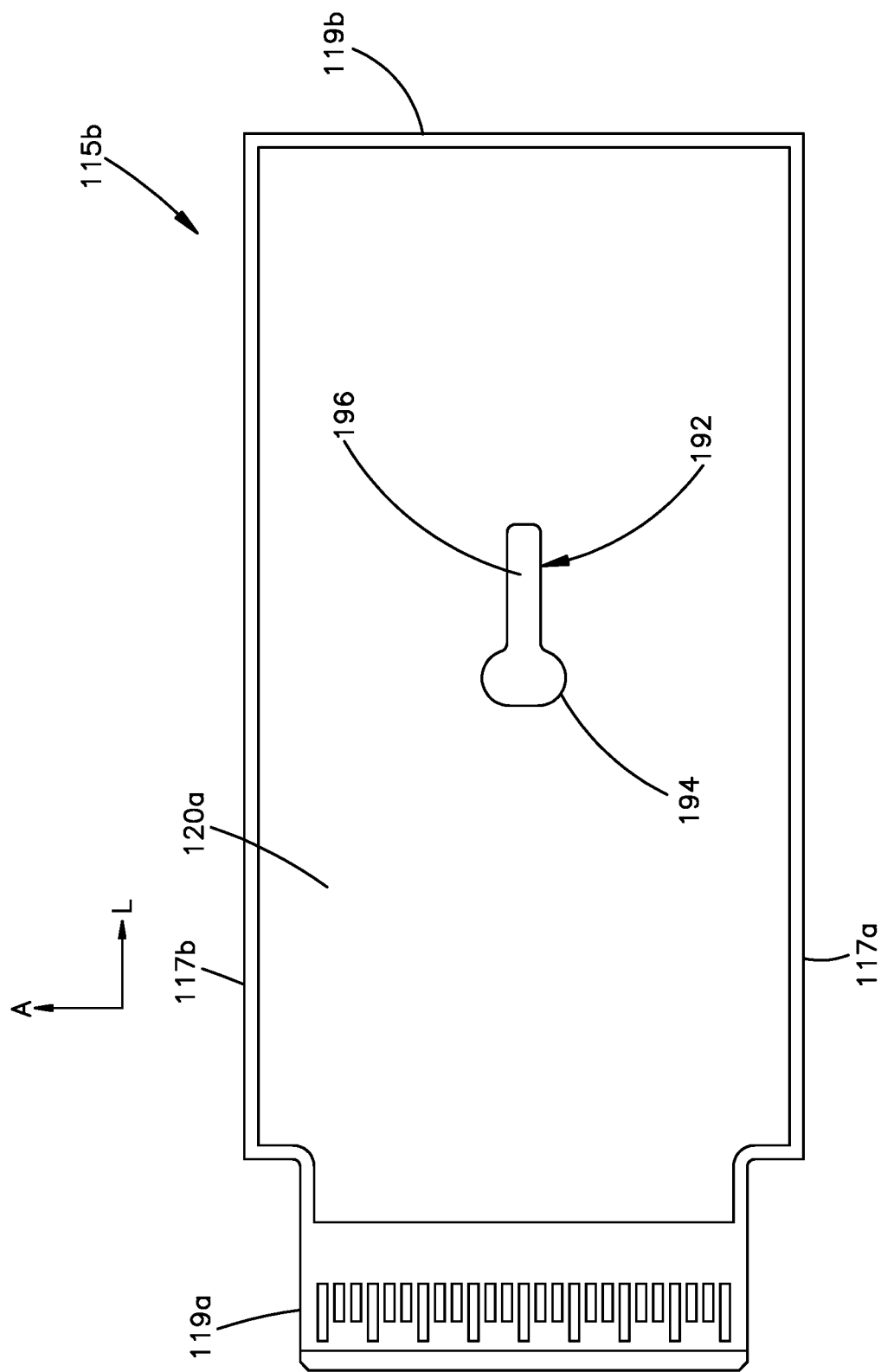
FIG. 6B is a top plan view of a module substrate of an interconnect module configured to mate with the electrical connector illustrated in FIG. 6A.
Figure 6C:
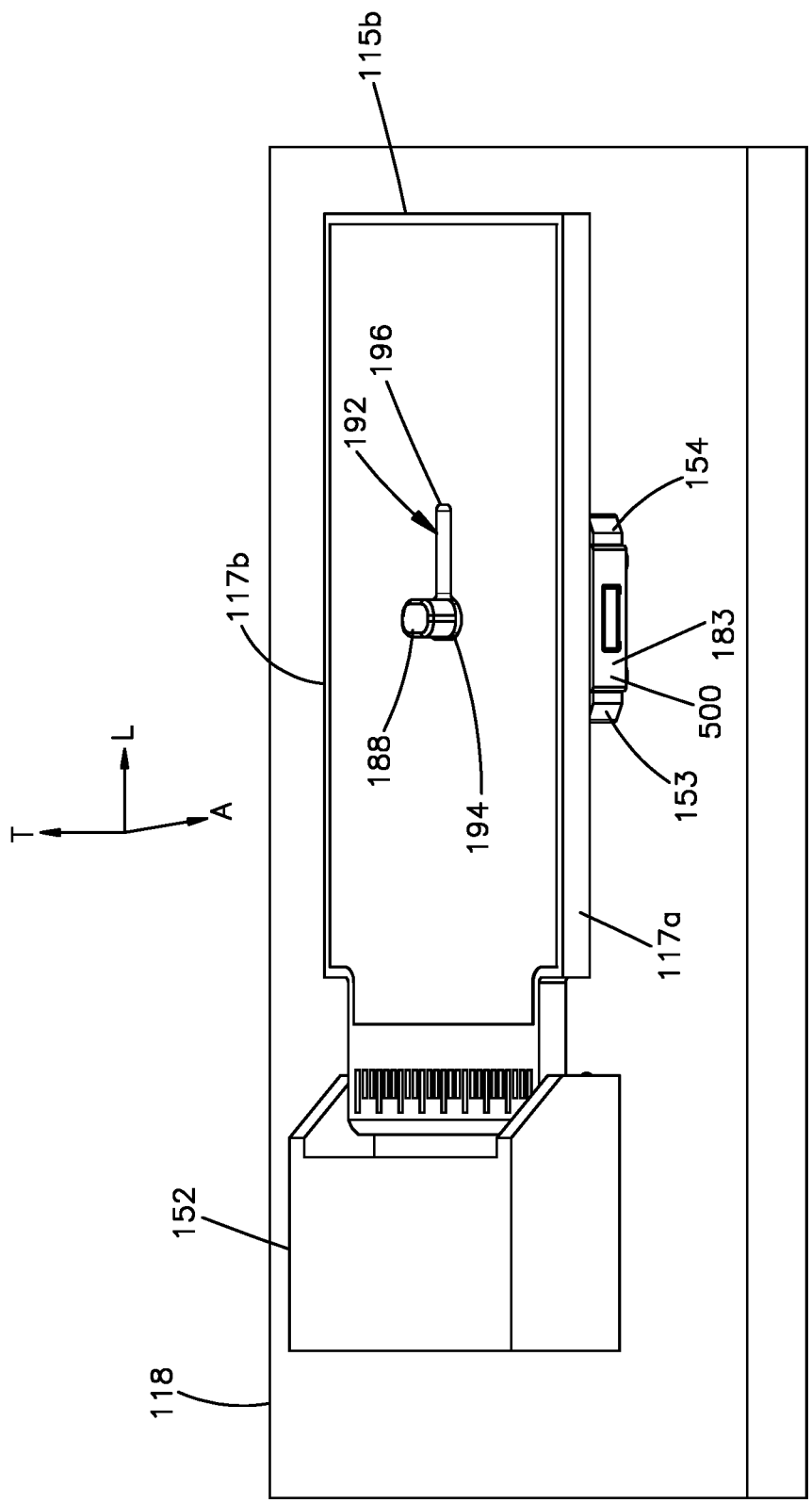
FIG. 6C is a perspective view of the interconnect system showing the module substrate of FIG. 6B aligned to be mated with a host module of the interconnect system.
Figure 6D:
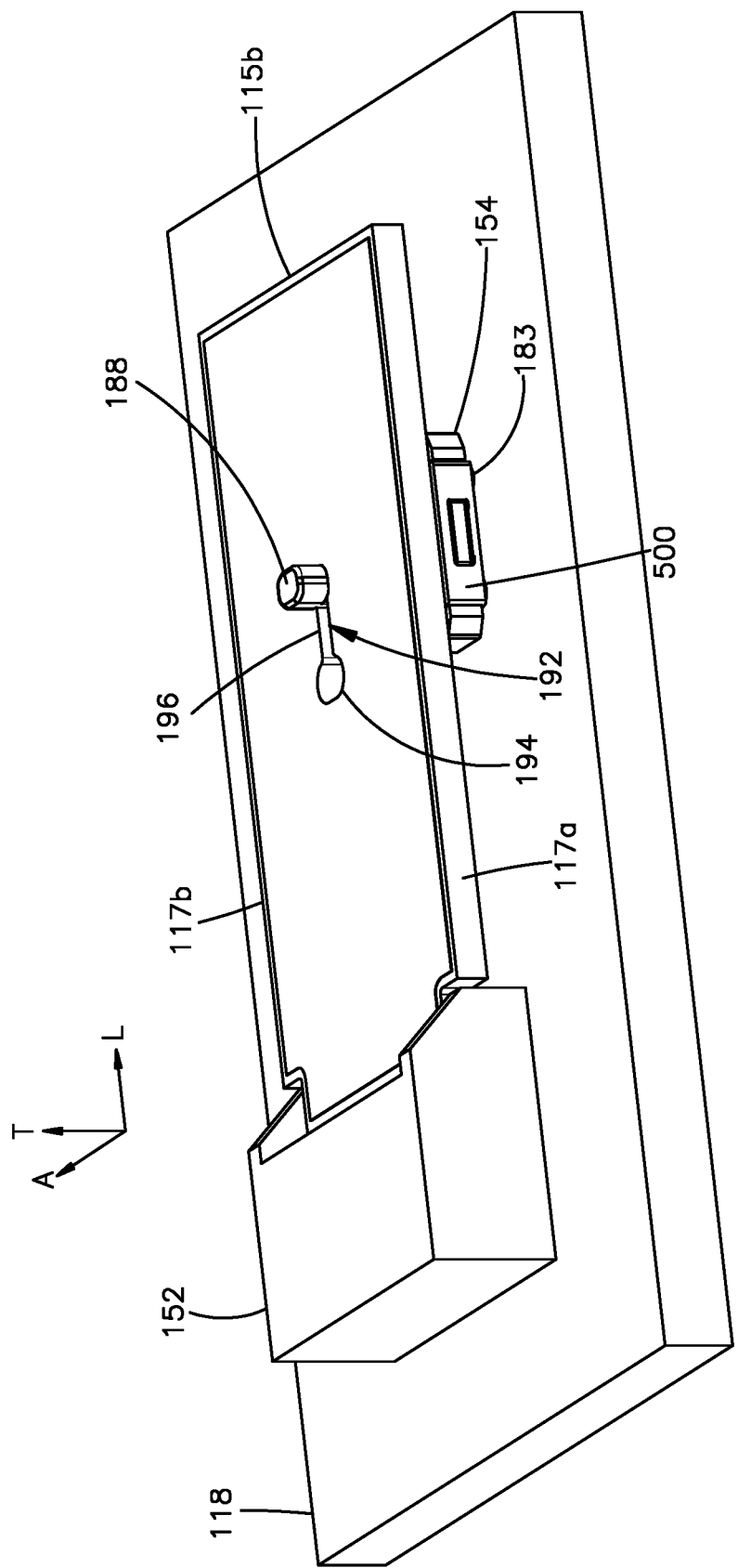
FIG. 6D is a perspective view of the interconnect system of FIG. 6C, but showing the module substrate of FIG. 6B mated with the host module including the electrical connector of FIG. 6A.
Figure 6E:
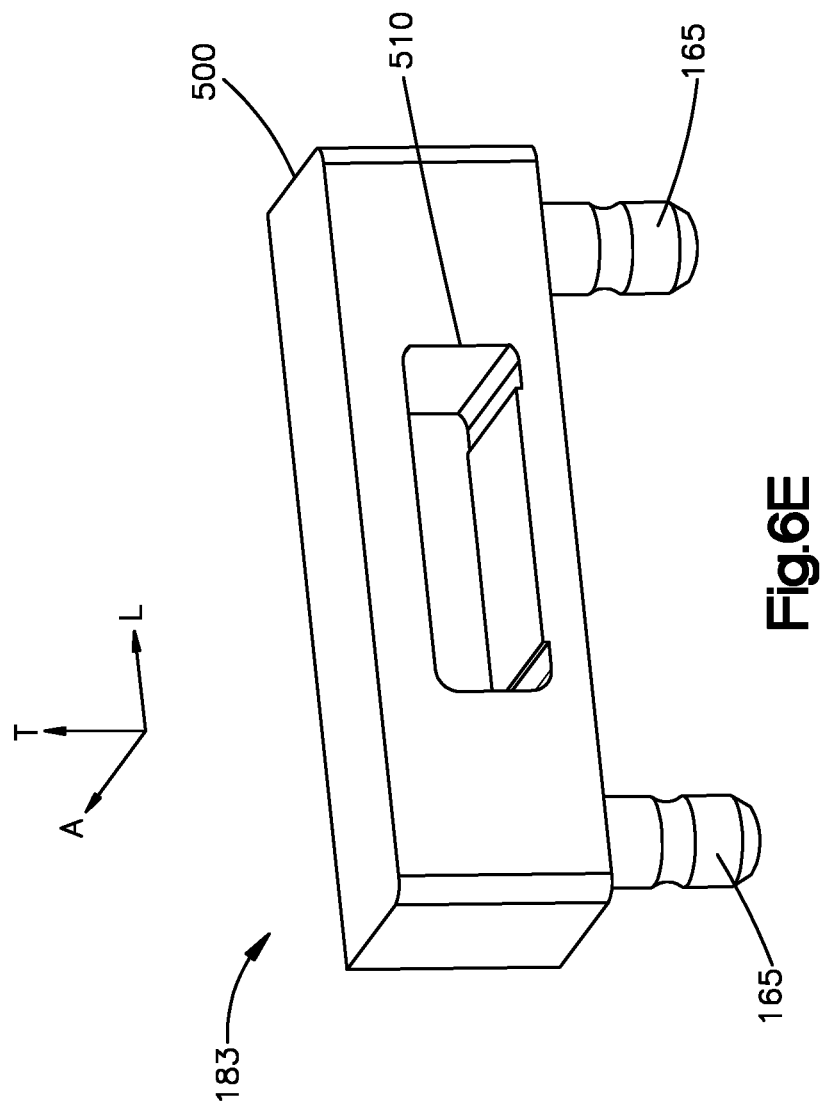
FIG. 6E is a perspective view of the securement member of the electrical connector illustrated in FIG. 6A.

As described above, the securement member 183 can be configured to secure the second electrical connector 154 to the host substrate 118. However, the securement member 183 can be devoid of both the securement wall and the retention arm described above. Thus, the securement member 183 can be configured so as to not apply a compressive force to the module substrate 115b along the transverse direction T toward the second electrical connector 154. Further, the securement member 183 can be configured so as to not engage a latch that extends from the interconnect module 104 so as to prevent the interconnect module 104 from moving in the rearward direction with respect to In this regard, as illustrated in FIGS. 6C-6E, the securement member 183 can include the base 500 that is configured to attach to the second connector housing 153. For instance, the securement member 183 can define the securement opening 510 that is sized to receive a projection 512 of the second connector housing 153 so as to secure the securement member 183 to the second connector housing 153. The securement opening 510 can be defined by the base 500, and can extend into or through the base 500 along the lateral direction A. The projection 512 can extend out in the lateral direction A. The projection 512 can be sized to be press fit in the securement opening 510. The projection 512 and the securement openings 510 can each define non-circular shapes to prevent the securement member 183 from rotating with respect to the second connector housing 153 about an axis that is oriented along the lateral direction A. Alternatively or additionally, the base 500 can include one or more projections that extend along the lateral direction A into receiving apertures of the connector housing 153. Thus, the projections can be circular or non-circular in shape as desired.

Referring now also to FIG. 6F, and as described above, the second electrical connector 154, including the second connector housing 153 and the securement members 183, are configured to be mounted to the host substrate 118. For instance, the second connector housing 153 can include at least one mounting projection 163 that extends down along the transverse direction T. In one example, the second connector housing 153 can include a plurality of mounting projections 163 that extend down along the transverse direction. For instance, the second connector housing 153 can include first and second mounting projections 163. The first and second mounting projections 163 can be spaced in the same direction with respect to a connector centerline CL that is oriented along the lateral direction A and bisects the second electrical connector 154 into equal longitudinal halves. Alternatively, the first and second mounting projections 163 can be disposed on opposite sides of the centerline CL. Alternatively still, the first and second mounting projections 163 can be disposed on the centerline CL. The mounting projections 163 can be circular, non-circular, or any suitable alternative shape as desired. Further, the mounting projections 163 can define the same size and shape as each other, or can have a different size or shape from each other. The first and second mounting projections 163 can be aligned with each other along the lateral direction A. The mounting ends of the electrical contacts 155 can define be aligned in mounting end rows 157 that can be disposed between the mounting projections 163 and the centerline CL with respect to the longitudinal direction L. Alternatively, the mounting projections 163 can be disposed between the mounting end rows 157 and the centerline CL with respect to the longitudinal direction L.

The securement member 183 can also include at least one mounting projection 165 that extends down along the transverse direction T. In one example, the securement member 183 can include a plurality of mounting projections 165 that extend down along the transverse direction T. The mounting projections 165 can extend down from the base 500 along the transverse direction T. The securement members 183 can combine to include first and second pairs 165a and 165b of mounting projections 165. The first and second pairs 165a and 165b can be disposed on opposite sides of the centerline CL. For instance, the first and second pairs 165a and 165b can be equidistantly spaced from the centerline CL. Alternatively, the first and second pairs 165a and 165b can be spaced at different distances from the centerline CL. The mounting projections 165 of the first pair 165a can be aligned with each other along the lateral direction A. Similarly, the mounting projections 165 of the second pair 165b can be aligned with each other along the lateral direction A. Alternatively, the first and second pairs 165a and 165b of mounting projections 165 can be disposed on the same side of the centerline CL. Alternatively still, one or both of the first and second pairs 165a and 165b can be located on the centerline CL. The mounting projections 165 can be circular, non-circular, or any suitable alternative shape as desired. The mounting end rows 157 that can be disposed between the mounting projections 165 and the centerline CL with respect to the longitudinal direction L. Alternatively, the mounting projections 163 can be disposed between the mounting end rows 157 and the centerline CL with respect to the longitudinal direction L.

The mounting projections 163 and 165 can define the same size and shape as each other, or can have a different size or shape from each other. Further, the mounting projections 165 of the securement members 183 can define cross-sectional dimensions that are different than cross-sectional dimensions of the mounting projections 163 of the connector housing 153. The cross-sectional dimensions are measured along a plane that is defined by the lateral direction A and the longitudinal direction L. In one example, the cross-sectional dimensions of the mounting projections 165 can be greater than the cross-sectional dimensions of the mounting projections 163. Alternatively, the cross-sectional dimensions of the mounting projections 163 can be greater than the cross-sectional dimensions of the mounting projections 165. Alternatively still, the cross-sectional dimensions of the mounting projections 165 can be equal to the cross-sectional dimensions of the mounting projections 163.

In one example, the mounting projections 163 are on the same side of the centerline CL as the first pair 165a of mounting projections 165, and on the opposite side of the centerline CL from the second pair 165b of mounting projections. The mounting projections 163 and 165 can define geometrical transverse centerlines that are oriented along the transverse direction T. The transverse centerlines of the mounting projections 163 can be offset toward the centerline CL with respect to the centerlines of the mounting projections 165 of the first pair 165a. Alternatively, the transverse centerlines of the mounting projections 165 of the first pair 165a can be offset toward the centerline CL with respect to the centerlines of the mounting projections 163. Alternatively still, the transverse centerlines of the mounting projections 165 of the first pair 165a can be equidistantly spaced from the centerline CL as the centerlines of the mounting projections 163. The mounting projections 163 and 165 can be said to define a footprint of the second electrical connector 154.

In this regard, it should be appreciated that the centers of the mounting projections 163 can be spaced closer to the centers of the first pair 165a of mounting projections 165 than they are to the centerline along the longitudinal direction L. For instance, the centers of the mounting projections 163 can be spaced from the centers of the first pair 165a of mounting projections 165 a first distance along the longitudinal direction L, and spaced from the centerline a second distance along the longitudinal direction. The second distance can be greater than five times the first distance. For example, the second distance is greater than 10 times the first distance. The mounting projections 163 can be disposed between the first pair 165a of mounting projections 165 with respect to the lateral direction A. The mounting projections of the first pair 165a of mounting projections can be aligned with respective different ones of the mounting projections of the second pair 165b of mounting projections 165 along the longitudinal direction. One of the mounting end rows 157 can be disposed such that at least one or both of the mounting projections 163 and the first pair 165a of mounting projections 165 are disposed between the one of the mounting end rows 157 and the centerline CL with respect to the longitudinal direction L. The second pair 165b of mounting projections 165 can be disposed between the other of the mounting end rows 157 and the centerline CL with respect to the longitudinal direction L. The first electrical connector 152 can similarly include a plurality of mounting projections that are configured to be received by corresponding mounting apertures of the host substrate 118.

The pair of mounting projections 163 of the connector housing 153 can be referred to as a first pair of mounting projections of the second electrical connector. The first pair of mounting projections 165 of the securement members 183 can be referred to as a second pair of mounting projections of the second electrical connector 154. The second pair of mounting projections 165 of the securement members 183 can be referred to as a third pair of mounting projections of the second electrical connector 154. In one example, the second electrical connector 154 has no mounting projections configured to secure the electrical connector to the host substrate 118 other than the first, second, and third pairs of mounting projections.

Figure 6G:
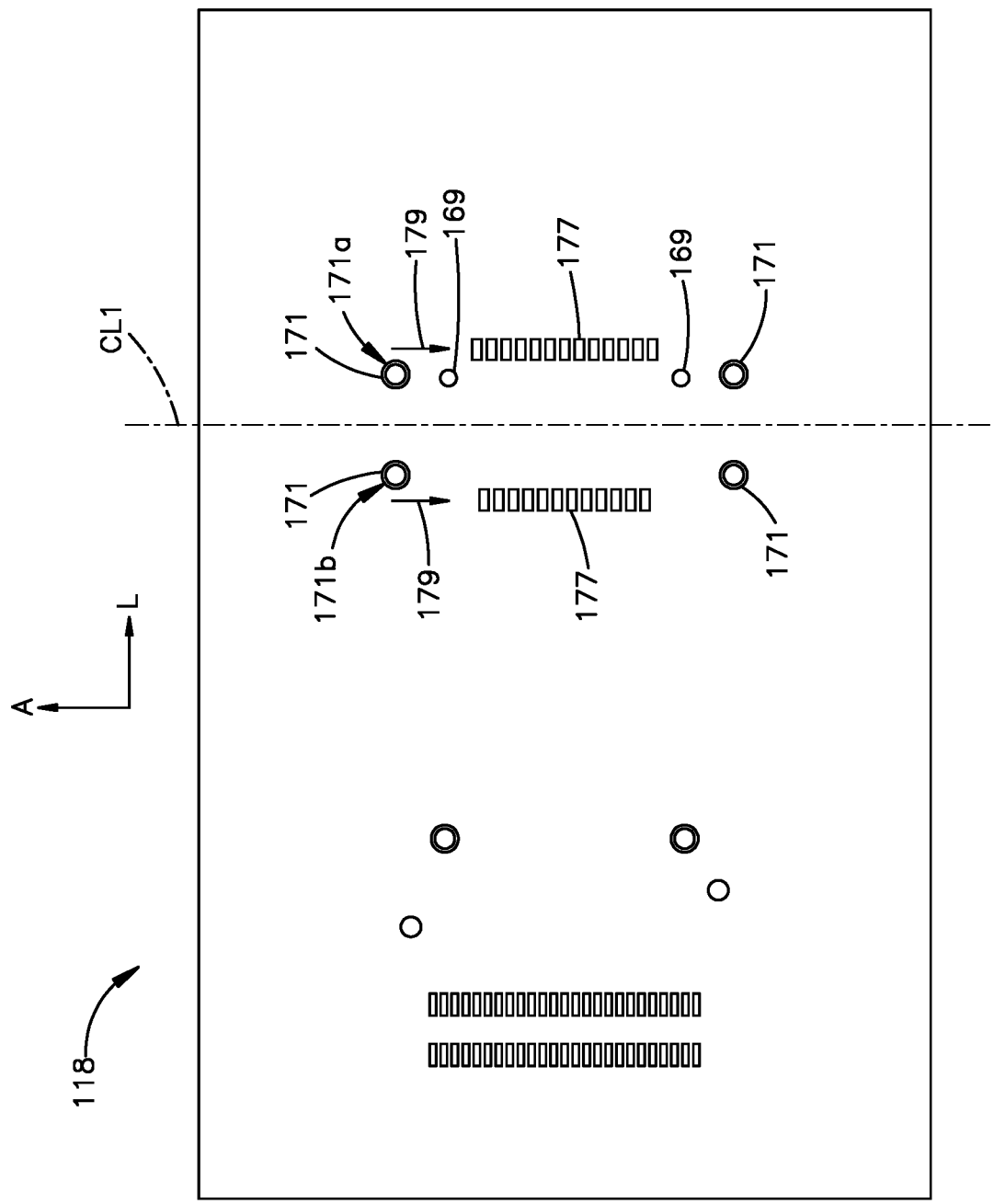
FIG. 6G is a top plan view of the module substrate illustrated in FIG. 6B.

Similarly, referring now to FIG. 6G, and as described above, the host substrate 118 can define a footprint that corresponds to the footprint of the second electrical connector 154. In particular, the host substrate 118 can define a plurality of mounting apertures that are dimensioned and positioned to receive the mounting projections 163 and 165 of the second electrical connector 154. In one example, the mounting apertures can be sized such that the mounting projections 163 and 165 are inserted into the mounting apertures so that the mounting ends of the electrical contacts 155 are aligned with respective ones of electrical contact locations 177 of the host substrate. Alternatively or additionally, the mounting projections 163 and 165 can be press-fit in, or otherwise received by, the mounting apertures. The host substrate 118 can further define a plurality of mounting apertures that are sized and shaped to receive the mounting projections of the first electrical connector 152. The mounting apertures that are sized and shaped to receive the mounting projections of the first electrical connector 152 can be disposed outside the footprint that is defined by the mounting apertures that are dimensioned and positioned to receive the mounting projections 163 and 165 of the second electrical connector 154.

For instance, the host substrate 118 can include at least one first mounting aperture 169 that extends at least therein or therethrough along the transverse direction T. In one example, the host substrate 118 can include a plurality of first mounting apertures 169. For instance, the host substrate 118 can include a pair of first mounting apertures 169. The first mounting apertures are sized and configured to receive the mounting projections 163 of the second electrical connector 154. For instance, the mounting projections 163 of the second electrical connector 154 can be sized to be press-fit in, or otherwise received by, the first mounting apertures 169. The host substrate 118 can include electrical contact locations 177 that are configured to be placed in physical and electrical contact with the mounting ends of the electrical contacts 155 of the second electrical connector 154. For instance, the electrical contact locations 177 can be configured as contact pads at an upper surface of the host substrate 118 that faces the second electrical connector 154.

The contact locations 177 can be aligned oriented along respective first and second rows 179 that are oriented along the lateral direction A and spaced from each other along the longitudinal direction L. The mounting apertures 169 can be spaced in the same direction with respect to a substrate centerline CL1 that is oriented along the lateral direction A and is equidistantly spaced from the first and second rows 179. Alternatively, the first and second mounting apertures 169 can be disposed on opposite sides of the centerline CL1. Alternatively still, the first and second mounting apertures 169 can be disposed on the centerline CL1. The mounting apertures 169 can be circular, non-circular, or any suitable alternative shape as desired. Further, the mounting apertures 169 can define the same size and shape as each other, or can have a different size or shape from each other. The first and second mounting apertures 169 can be aligned with each other along the lateral direction A. The mounting apertures 169 can be disposed between the rows 179 and the centerline CL with respect to the longitudinal direction L. Alternatively, the rows 179 can be can be disposed between the mounting apertures 169 and the centerline CL with respect to the longitudinal direction L.

The host substrate 118 can also include at least one second mounting aperture 171 that extends at least therein or therethrough along the transverse direction T. In one example, the host substrate 118 can include a plurality of second mounting apertures 171. The second mounting apertures 171 are sized and configured to receive the mounting projections 165 of the securement members 183. For instance, the mounting projections 165 of the securement members 183 can be sized to be press-fit in, or otherwise received by, the second mounting apertures 171. For instance, the host substrate 118 can include first and second pairs 171a and 171b of second mounting apertures 171. The first and second pairs 171a and 171b can be disposed on opposite sides of the centerline CL1. For instance, the first and second pairs 171a and 171b can be equidistantly spaced from the centerline CL1. Alternatively, the first and second pairs 171a and 171b can be spaced at different distances from the centerline CL. The mounting apertures 171 of the first pair 171a can be aligned with each other along the lateral direction A. Similarly, the mounting apertures 171 of the second pair 171b can be aligned with each other along the lateral direction A. Alternatively, the first and second pairs 171a and 171b of mounting apertures 171 can be disposed on the same side of the centerline CL. Alternatively still, one or both of the first and second pairs 171a and 171b can be located on the centerline CL. The mounting apertures 171 can be circular, non-circular, or any suitable alternative shape as desired. The mounting apertures 171 can be disposed between the rows 179 and the centerline CL1 with respect to the longitudinal direction L. Alternatively, the rows 179 can be disposed between the mounting apertures 171 and the centerline CL1 with respect to the longitudinal direction L.

The mounting apertures 169 and 171 can define the same size and shape as each other, or can have a different size or shape from each other. Further, the mounting apertures 169 can define cross-sectional dimensions that are different than cross-sectional dimensions of the mounting apertures 171. The cross-sectional dimensions are measured along a plane that is defined by the lateral direction A and the longitudinal direction L. In one example, the cross-sectional dimensions of the mounting apertures 169 can be greater than the cross-sectional dimensions of the mounting apertures 171. Alternatively, the cross-sectional dimensions of the mounting apertures 171 can be greater than the cross-sectional dimensions of the mounting apertures 169. Alternatively still, the cross-sectional dimensions of the mounting apertures 169 can be equal to the cross-sectional dimensions of the mounting apertures 171.

In one example, the mounting apertures 169 are on the same side of the centerline CL1 as the first pair 171a of mounting apertures 171, and on the opposite side of the centerline CL1 from the second pair 171b of mounting apertures 171. The mounting apertures 169 and 171 can define geometrical transverse centerlines that are oriented along the transverse direction T. The transverse centerlines of the mounting apertures 169 can be offset toward the substrate centerline CL1 with respect to the centerlines of the mounting apertures 171 of the first pair 171a. Alternatively, the transverse centerlines of the mounting apertures 171 of the first pair 171a can be offset toward the centerline CL with respect to the centerlines of the mounting apertures 169. Alternatively still, the transverse centerlines of the mounting apertures 171 of the first pair 171a can be equidistantly spaced from the centerline CL as the centerlines of the mounting apertures 169. The mounting apertures 169 and 171 can be said to define a footprint of the host substrate 118.

It is appreciated that the host substrate 118 defines a first surface and a second surface opposite the first surface so as to define a thickness along the transverse direction T. The host substrate 118 further defines first and second lateral sides opposite each other so as to define a width along a lateral direction A, wherein the width is greater than the thickness. The host substrate further defines first and second longitudinal ends spaced from each other so as to define a length along a longitudinal direction L, wherein the length is greater than the width. The first and second pairs 171a and 171b of mounting apertures 171 can be disposed on opposite sides of the centerline CL1. The centerline CL1 can be equidistantly spaced from the first and second pairs 171a and 171b of mounting apertures 171. The mounting apertures 171 of the second pair 171b can be aligned with each other along the lateral direction A. The mounting apertures 171 of the first pair 171a can also be aligned with each other along the lateral direction A. The mounting apertures 169 can also be aligned with each other along the lateral direction.

Respective centers of the mounting apertures 169 can be disposed between respective centers of the mounting apertures 171 of the first pair 171a and the centerline CL1 with respect to the longitudinal direction L. The centers of the mounting apertures 169 can be spaced closer to the centers of the mounting apertures 171 of the first pair 171a than they are to the centerline CL1 along the longitudinal direction L. For instance, the centers of the mounting apertures 169 can be spaced from the centers of the mounting apertures 171 of the first pair 171a a first distance along the longitudinal direction L, and spaced from the centerline CL1 a second distance along the longitudinal direction L. The second distance can be greater than five times the first distance. For instance, the second distance can be greater than 10 times the first distance. The mounting apertures 169 can be disposed between the mounting apertures 171 of the first pair 171a with respect to the lateral direction A. The mounting apertures 171 of the first pair 171a can be aligned with respective different ones of the mounting apertures 171 of the second pair 171b along the longitudinal direction L.

The host substrate 118 can defines contact locations 177 that are configured to establish electrical contact with electrical contacts 155 of the second electrical connector 154. The contact locations 177 can be configured as contact pads, plated through holes, or any suitable alternatively constructed contact locations as desired. The contact locations 177 can be arranged in first and second rows that are oriented along the lateral direction A and spaced from each other along the longitudinal direction L. The centerline CL1 can be equidistantly spaced from the first and second rows along the longitudinal direction L. One or both of the mounting apertures 169 and the first pair of mounting apertures 171a can be disposed between one of the rows and the centerline CL1 with respect to the longitudinal direction L. The second pair 171b of mounting apertures 171 can be disposed between the other of the rows and the centerline CL1 with respect to the longitudinal direction L. The mounting apertures 169 can have a smaller cross-sectional dimension than the mounting apertures of each of the mounting apertures 171 of the first and second pairs 171a and 171b, respectively. For instance, the mounting apertures 171 of each of the first and second pairs 171a and 171b can the same cross-sectional dimension.

The mounting apertures 169 can be referred to as a first pair of mounting apertures of the host substrate 118 that are configured to receive mounting projections of the second electrical connector 154. The first pair 171a of mounting apertures 171 can be referred to as a second pair of mounting apertures of the host substrate 118 that are configured to receive mounting projections of the second electrical connector 154. The second pair 171b of mounting apertures 171 can be referred to as a third pair of mounting apertures of the host substrate 118 that are configured to receive mounting projections of the second electrical connector 154. It will be understood that the electrical connector 154 can be configured to mount to the host substrate 118. Thus, the first, second, and third pairs 169, 171a, and 171b, of mounting apertures that extend at least into or through the substrate 118 can be configured to receive the first, second, and third pairs of mounting projections of the electrical connector 154, respectively, thereby securing the electrical connector 154 to the substrate 118. In one example, the host substrate 118 has no mounting apertures configured to receive mounting projections of the second electrical connector 154 so as to secure the second electrical connector 154 to the host substrate 118 other than the first, second, and third pairs of mounting apertures.

It is recognized that the interconnect system 100 illustrated in FIGS. 6A-6G can define various dimensions that are contemplated in accordance with the present disclosure. It should be appreciated, of course, that the interconnect system 100 can be alternatively dimensioned unless otherwise indicated. For instance, referring to FIG. 5A, the second connector housing 153 can define a maximum length along the lateral direction A between approximately 16 mm and approximately 24 mm. For instance, the maximum length can be approximately 20 mm. The retention peg 185 can define a length along the longitudinal direction L between approximately 1 mm and approximately 3 mm. For instance, the length of the retention peg can be approximately 1.8 mm. The head 188 of the retention peg 185 can define a width along the lateral direction A that is between approximately 1.5 mm and 5 mm. For instance, the width can be approximately 2.5 mm. The head 188 can be spaced from the upper end of the connector housing 153 a distance along the transverse direction T between approximately 1 mm and approximately 3 mm. For instance, the distance can be approximately 1.8 mm. The securement member 183 can define a height along the transverse direction T from the bottom surface of the base 500 to the top surface of the securement wall 502. The height can be between approximately 3.5 mm and approximately 7 mm. For instance, the height can be approximately 4.9 mm. The second electrical connector 154 can define a height along the transverse direction T from the bottom surface of the base 500 to the top surface of the head 188 of the retention peg 185. The height can be between approximately 3.5 mm and approximately 7 mm. For instance, the height can be approximately 5.4 mm. The securement wall 502 can define a length along the longitudinal direction L between approximately 1 mm and approximately 4 mm. For instance, the length can be approximately 2 mm.

Referring now to FIG. 5B, the slot 192 can define a length along the longitudinal direction L that is between approximately 4 mm and approximately 9 mm. For instance, the length can be approximately 6.5 mm. The insertion region 194 can have a width along the lateral direction A. The width can be between approximately 1.5 mm and approximately 4.5 mm. For instance, the width can be approximately 3 mm. The module substrate 115b can define a maximum width along the lateral direction A between approximately 16 mm and approximately 24 mm. For instance, the maximum width can be approximately 20 mm.

Referring now to FIGS. 7A-10C generally, it should be appreciated that the second electrical connector 154 can be configured in accordance with any suitable embodiment as desired. Thus, the host substrate 118 can be similarly constructed in accordance with any suitable embodiment as desired, such that at least the second electrical connector 154 can be mounted to the host substrate 118. The first electrical connector can further be mounted to the host substrate 118 in the manner described above.

Figure 7A:
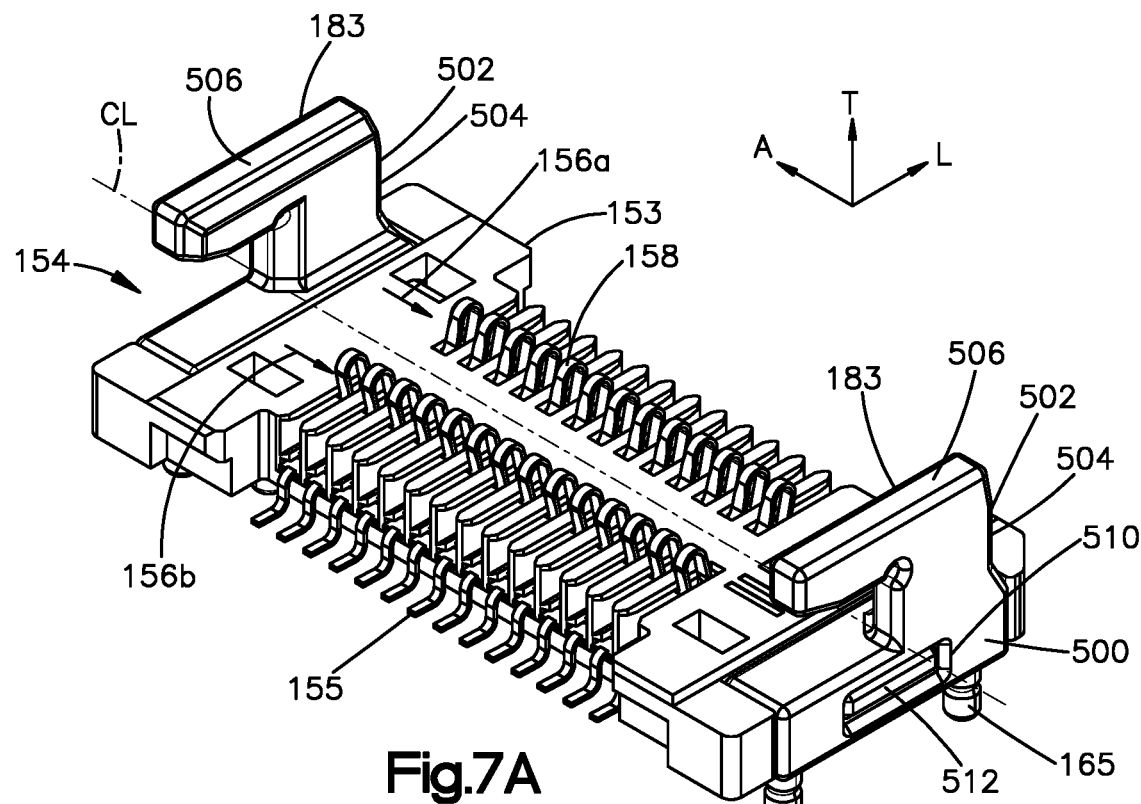
FIG. 7A is a perspective view of an electrical connector of the host module, wherein the electrical connector is constructed in accordance with an alternative embodiment.
Figure 8A:
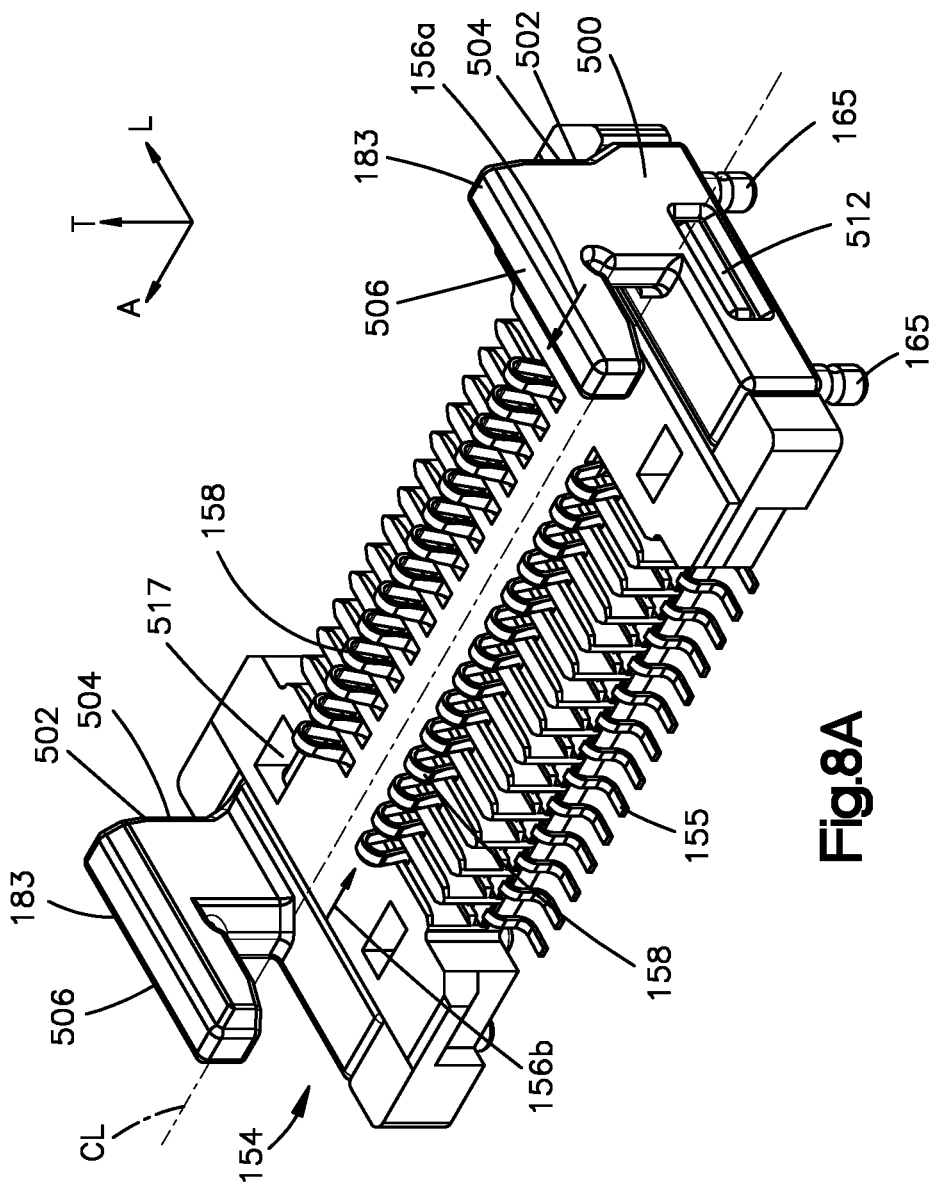
FIG. 8A is a perspective view of an electrical connector of the host module, wherein the electrical connector is constructed in accordance with an alternative embodiment.

Referring now to FIGS. 7A and 8A, and as described above, the second electrical connector 154 includes a second electrically insulative connector housing 153 and a second plurality of electrical contacts 155 that are supported by the connector housing. The electrical contacts 155 can be spaced from each other along the lateral direction at any suitable row pitch as desired. For instance, the row pitch can be substantially (i.e., within manufacturing tolerance) 0.6 mm. It should be appreciated that the row pitch can be in a range from substantially 0.4 mm to substantially 1.5 mm at substantially 0.1 mm increments therebetween. Thus, the row pitch can be 0.4 mm, 0.5 mm, 0.6 mm, 0.7 mm, 0.8 mm, 0.9 mm, 1.0 mm, 1.1 mm, 1.2 mm, 1.3 mm, 1.4 mm, and 1.5 mm. It should be appreciated that these stated row pitches are presented by way of example only, and the row pitch can be any suitable alternatively row pitch as desired.

The second connector housing 153 can be made of a plastic. The second plurality of electrical contacts 155 can include mating portions that extend out of the second connector housing 153 along the transverse direction T away from the host substrate 118. Thus, electrically conductive lands on a lower surface of the second end of the module substrate 115b can be brought into contact with the respective ones of the mating portions of the second plurality of electrical contacts 155, so as to mate the interconnect module 102 with the second electrical connector 154. It is recognized that the mating portions, and thus the electrical contacts 155, can be configured as compression contacts that compress toward the underlying host substrate 118 in response to contact with the module substrate 115b. In particular, the mating portions, and thus the electrical contacts 155, define contact locations 158 that are configured to contact the module substrate 115b so as to place the electrical contacts 155 in electrical communication with the module substrate 115b. For instance, the contact locations 158 can be the uppermost locations of the electrical contacts 155 along the transverse direction T. In one example, the electrical contacts 155 can define curved mating ends whose apices define the contact locations 158. The second plurality of electrical contacts 155 can be arranged in at least one row that is oriented along the lateral direction A. For instance, the electrical contacts 155 can be arranged in a first row 156a and a second row 156b that are spaced from each other along the longitudinal direction L. The contact locations 158 of the first row 156a can be aligned with each other along the lateral direction A. Similarly, the contact locations 158 of the second row 156b can be aligned with each other along the lateral direction A.

A connector centerline CL can be oriented along the lateral direction A and can divide the second electrical connector into first and second portions along the longitudinal direction L. For instance, the connector centerline CL can bisect the second electrical connector 154 into equal halves along the longitudinal direction L. In one example, the securement surface 504 and the first row 156a can be disposed on the same side of the connector centerline CL with respect to the second row 156 b. The first row 156 can be disposed between the connector centerline CL and the securement surface 504 with respect to the longitudinal direction L. The retention arm 506 can extend from the securement wall 502 to a free end that is disposed such that the second row 156b is disposed between the free and the connector centerline CL, the second row 156b defined by the contact locations 158 when the contact locations 158 are not compressed. The base 500 defines a front end that is disposed such that the first rows 156a is disposed between the front end of the base 500 and the centerline CL. As illustrated in FIG. 7D, the securement member 138 can include one or more securement pins 517 that are received in respective openings of the connector housing 153 along the lateral direction A when the securement member 138 is attached to the connector housing 153. The securement pins 517 can be differently sized or shaped from each other to ensure that the securement member 118 is attached to the connector housing 153 in its proper orientation.

As illustrated in FIG. 7A, the second electrical connector 154 can have a first number of electrical contacts along the first row 156a, and a second number of electrical contacts along the second row 156b that is different than the first number. For instance, the electrical connector 154 can have fewer contacts along the first row 156a than along the second row. Thus, at least one or both of the outermost ends along the lateral direction A of the first row 156a can be inwardly recessed with respect to the outermost ends of the second row 156b with respect to the lateral direction A. In one example, the first row 156a can include thirteen electrical contacts, and the second row 156b can include fourteen electrical contacts. Alternatively, the electrical connector 154 can have fewer contacts along the second row 156b than along the first row 156a. It should be appreciated, of course, that the number of electrical contacts can vary as desired. In one example, as illustrated in FIG. 8A, the first number of electrical contacts 156 along the first row 156a can be equal to the second number of electrical contacts 156 along the second row 156b. Thus, the outermost ends of the first row 156a can be aligned with respective ones of the outermost ends of the second row 156b along the longitudinal direction L. In one example, the first and second number of electrical contacts 156 can be fourteen in one example.

Figure 7B:
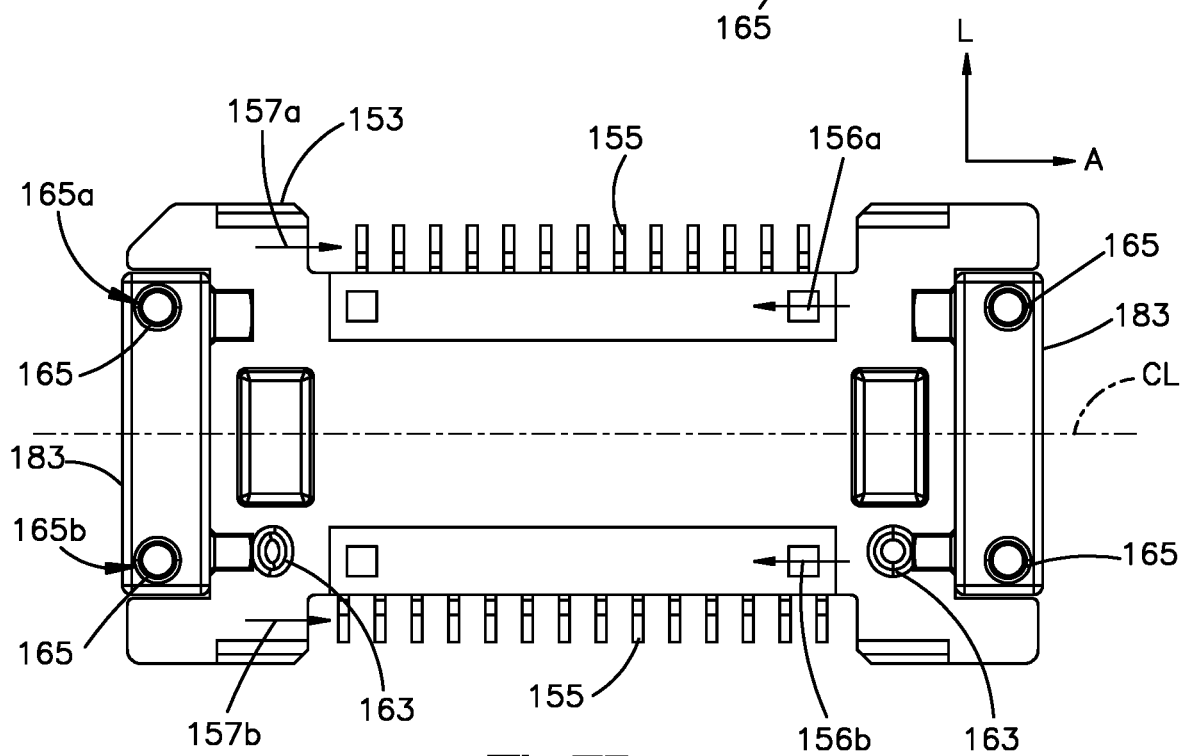
FIG. 7B is a bottom plan view of the electrical connector illustrated in FIG. 7A.
Figure 8B:
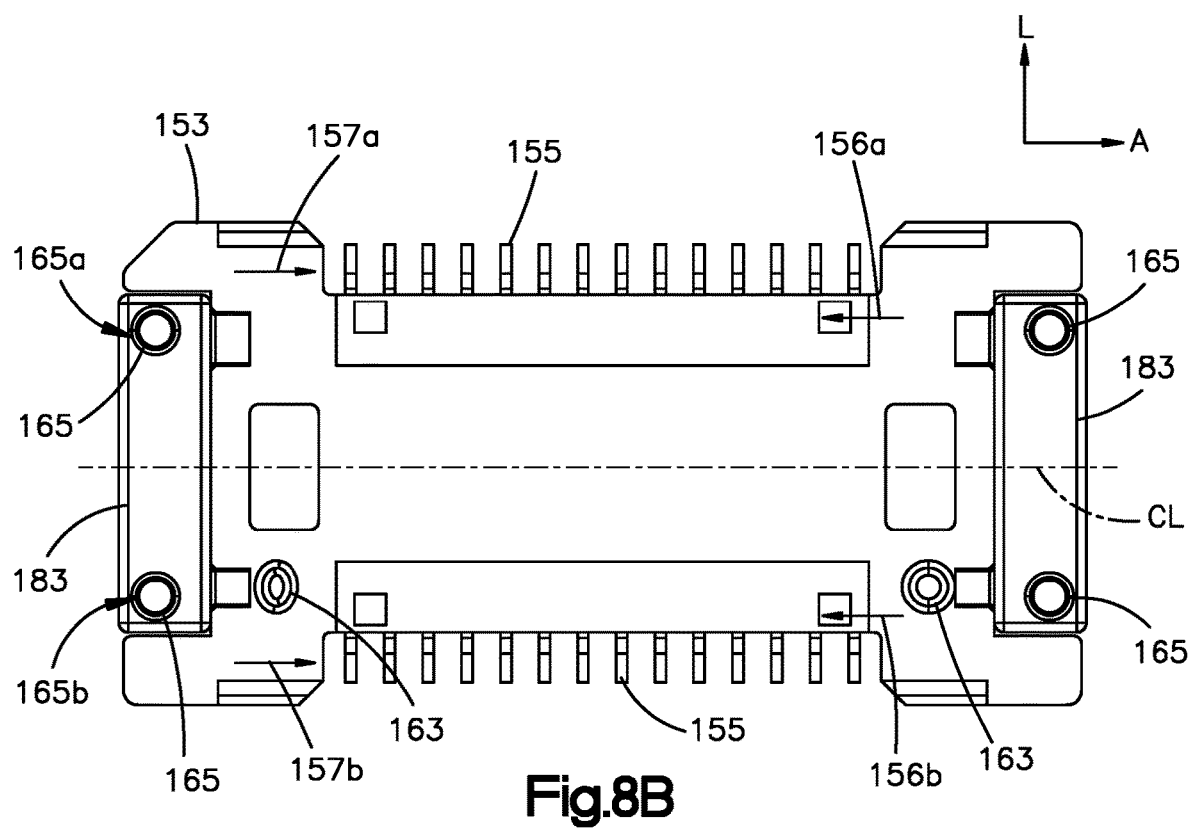
FIG. 8B is a bottom plan view of the electrical connector illustrated in FIG. 8A.

Referring now also to FIGS. 7B and 8B, the second electrical connector 154, including the second connector housing 153 and the securement members 183, are configured to be mounted to the host substrate 118. For instance, the second connector housing 153 can include at least one mounting projection 163 that extends down along the transverse direction T. In one example, the second connector housing 153 can include a plurality of mounting projections 163 that extend down along the transverse direction. For instance, the second connector housing 153 can include first and second mounting projections 163. The first and second mounting projections 163 can be spaced in the same direction with respect to a connector centerline CL that is oriented along the lateral direction A and bisects the second electrical connector 154 into equal longitudinal halves. Alternatively, the first and second mounting projections 163 can be disposed on opposite sides of the centerline CL. Alternatively still, the first and second mounting projections 163 can be disposed on the centerline CL. The mounting projections 163 can be circular, non-circular, or any suitable alternative shape as desired. Further, the mounting projections 163 can define the same size and shape as each other, or can have a different size or shape from each other. The first and second mounting projections 163 can be aligned with each other along the lateral direction A. The mounting ends of the electrical contacts 155 can define be aligned in mounting end rows 157. For instance, the mounting ends of the electrical contacts 155 that are aligned along the first row 156*a* can be aligned along a first mounting end row 157*a*. Similarly, the mounting ends of the electrical contacts 155 that are aligned along the first row 156*a* can be aligned along a second mounting end row 157*b*. The mounting projections 163 can be disposed between the mounting end rows 157 and the centerline CL with respect to the longitudinal direction L. Alternatively, the mounting end rows 167 can be disposed between the mounting projections 163 and the centerline CL with respect to the longitudinal direction L.

The securement member 183 can also include at least one mounting projection 165 that extends down along the transverse direction T. In one example, the securement member 183 can include a plurality of mounting projections 165 that extend down along the transverse direction T. The mounting projections 165 can extend down from the base 500 along the transverse direction T. The securement members 183 can combine to include first and second pairs 165*a* and 165*b* of mounting projections 165. The first and second pairs 165*a* and 165*b* can be disposed on opposite sides of the centerline CL. For instance, the first and second pairs 165*a* and 165*b* can be equidistantly spaced from the centerline CL. Alternatively, the first and second pairs 165*a* and 165*b* can be spaced at different distances from the centerline CL. The mounting projections 165 of the first pair 165*a* can be aligned with each other along the lateral direction A. Similarly, the mounting projections 165 of the second pair 165*b* can be aligned with each other along the lateral direction A. Alternatively, the first and second pairs 165*a* and 165*b* of mounting projections 165 can be disposed on the same side of the centerline CL. Alternatively still, one or both of the first and second pairs 165*a* and 165*b* can be located on the centerline CL. The mounting projections 165 can be circular, non-circular, or any suitable alternative shape as desired. In one example, one of the mounting projections 165 can have a different size or shape than another one of the mounting projections 165 to ensure that the connector 154 is mounted to the host substrate in its proper orientation. The mounting end rows 157 can be disposed between the mounting projections 165 and the centerline CL with respect to the longitudinal direction L. Alternatively, the mounting projections 163 can be disposed between the mounting end rows 157 and the centerline CL with respect to the longitudinal direction L.

The mounting projections 163 and 165 can define the same size and shape as each other, or can have a different size or shape from each other. Further, the mounting projections 165 of the securement members 183 can define cross-sectional dimensions that are different than cross-sectional dimensions of the mounting projections 163 of the connector housing 153. The cross-sectional dimensions are measured along a plane that is defined by the lateral direction A and the longitudinal direction L. In one example, the cross-sectional dimensions of the mounting projections 165 can be greater than the cross-sectional dimensions of the mounting projections 163. Alternatively, the cross-sectional dimensions of the mounting projections 163 can be greater than the cross-sectional dimensions of the mounting projections 165. Alternatively still, the cross-sectional dimensions of the mounting projections 165 can be equal to the cross-sectional dimensions of the mounting projections 163.

In one example, the mounting projections 163 are on the same side of the centerline CL as a select pair of the first and second pairs 165*a-b* of mounting projections 165, and on opposite sides of the centerline CL with respect to the other pair of the first and second pairs 165*a-b* of the mounting projections 165. In one example, the select pair of mounting projections 165 can be defined by the second pair 165*b*, and the other pair can be defined by the first pair 165*a*. Alternatively, the select pair of mounting projections 165 can be defined by the first pair 165*a*, and the other pair can be defined by the second pair 165*b*. Accordingly, in one example, the mounting projections 163 can be on the same side of the centerline CL as the second pair 165*b* of mounting projections 165, and on the opposite side of the centerline CL from the first pair 165*a* of mounting projections. Thus, the mounting projections 165 can be on the same side of the centerline CL as the second row 156*b* and the second mounting end row 157*b*. Alternatively, the mounting projections 163 can be on the same side of the centerline CL as the first pair 165*b* of mounting projections 165, and on the opposite side of the centerline CL from the second pair 165*b* of mounting projections. Thus, the mounting projections 165 can be on the same side of the centerline CL as the first row 156*a* and the first mounting end row 157*a*.

The mounting projections 163 and 165 can define geometrical transverse centerlines that are oriented along the transverse direction T. The transverse centerlines of the mounting projections 163 can be offset toward the centerline CL with respect to the centerlines of the mounting projections 165 of the second pair 165*b*. Alternatively, the transverse centerlines of the mounting projections 165 of the second pair 165*b* can be offset toward the centerline CL with respect to the centerlines of the mounting projections 163. Alternatively still, the transverse centerlines of the mounting projections 165 of the second pair 165*b* can be equidistantly spaced from the centerline CL as the centerlines of the mounting projections 163. The mounting projections 163 and 165 can be said to define a footprint of the second electrical connector 154, either alone or in combination with the mounting ends of the electrical contacts 155.

The centers of the mounting projections 163 can be spaced closer to the centers of the select pair of the mounting projections 165 than they are to the centerline along the longitudinal direction L. For instance, the centers of the mounting projections 163 can be spaced from the centers of the mounting projections 165 of the select pair a first distance along the longitudinal direction L, and spaced from the centerline CL a second distance along the longitudinal direction. The second distance can be greater than five times the first distance. For example, the second distance is greater than 10 times the first distance. The mounting projections 163 can be disposed between the mounting projections 165 of the select pair with respect to the lateral direction A. The mounting projections of the select pair can be aligned with respective different ones of the mounting projections 165 of the other pair of mounting projections 165 along the longitudinal direction L. One of the mounting end rows 157 can be disposed such that at least one or both of the mounting projections 163 and the select pair of mounting projections 165 are disposed between the one of the mounting end rows 157 and the centerline CL with respect to the longitudinal direction L. The other pair of mounting projections 165 can be disposed between the other of the mounting end rows 157 and the centerline CL with respect to the longitudinal direction L. The first electrical connector 152 can similarly include a plurality of mounting projections that are configured to be received by corresponding mounting apertures of the host substrate 118.

The pair of mounting projections 163 of the connector housing 153 can be referred to as a first pair of mounting projections of the second electrical connector. The select pair of mounting projections 165 of the securement members 183 can be referred to as a second pair of mounting projections of the second electrical connector 154. The other pair of mounting projections 165 of the securement members 183 can be referred to as a third pair of mounting projections of the second electrical connector 154. In one example, the second electrical connector 154 has no mounting projections configured to secure the electrical connector to the host substrate 118 other than the first, second, and third pairs of mounting projections.

Figure 7C:
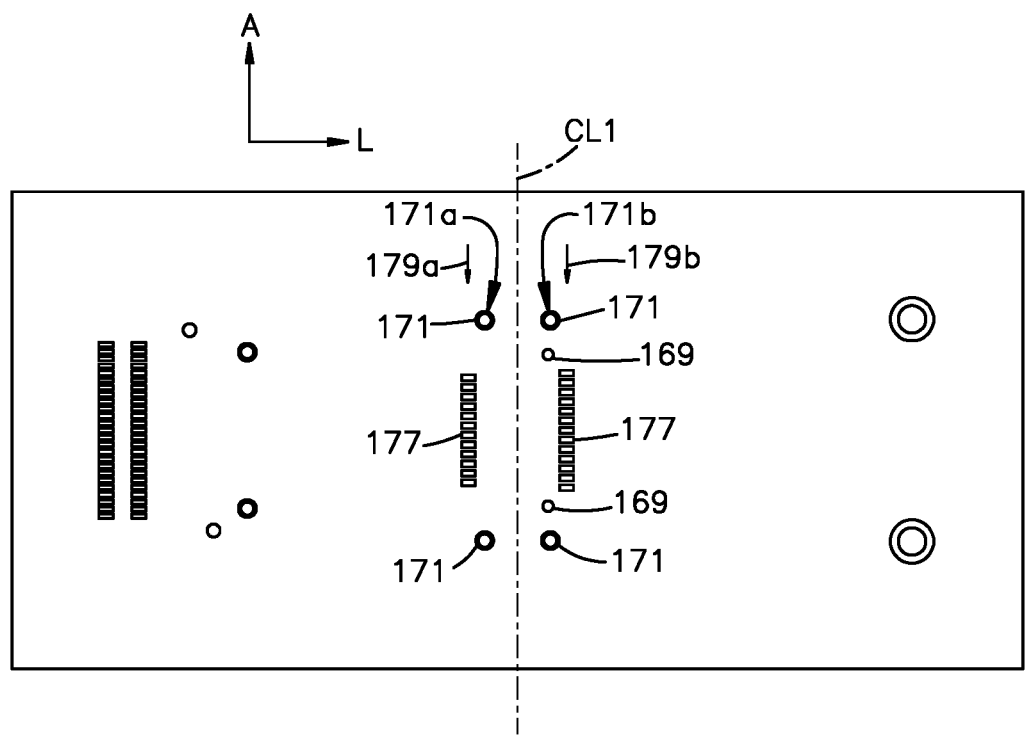
FIG. 7C is a top plan view of a portion of the host substrate of the host module, the host substrate constructed in accordance with an alternative embodiment such that the electrical connector illustrated in FIG. 7A is configured to be mounted to the host substrate.
Figure 7D:
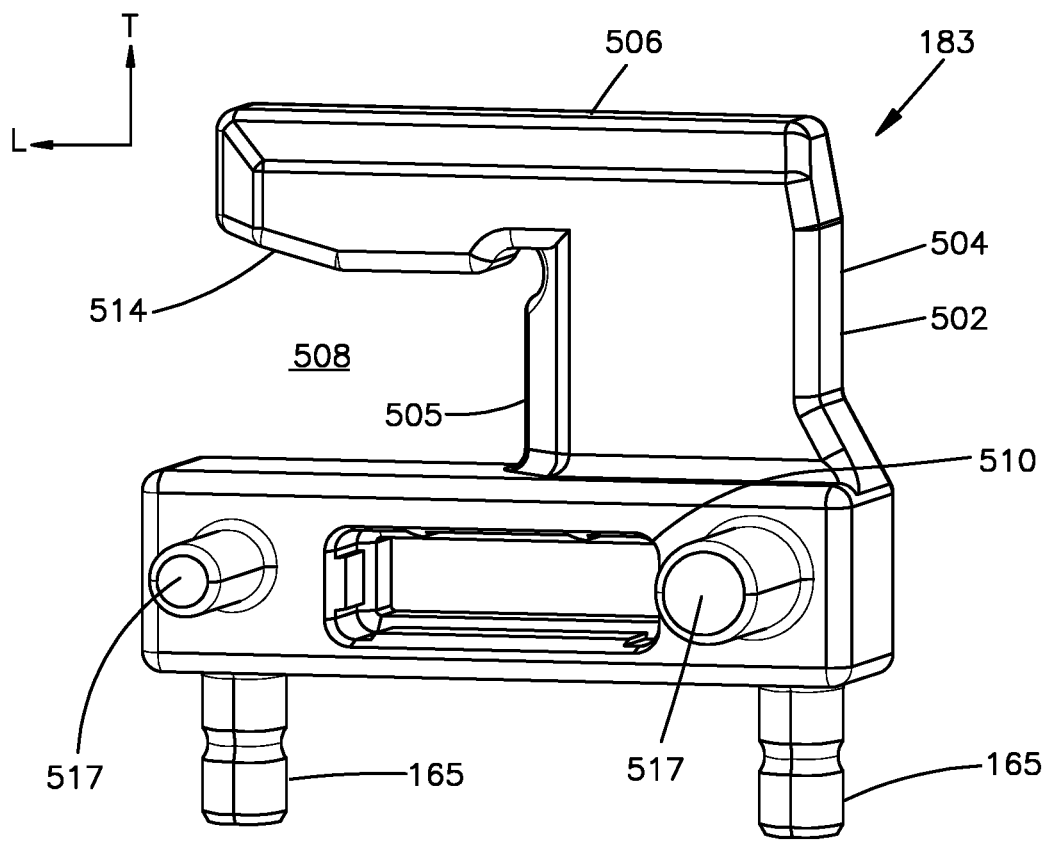
FIG. 7D is a perspective view of a securement member constructed in accordance with an alternative embodiment.
Figure 8C:
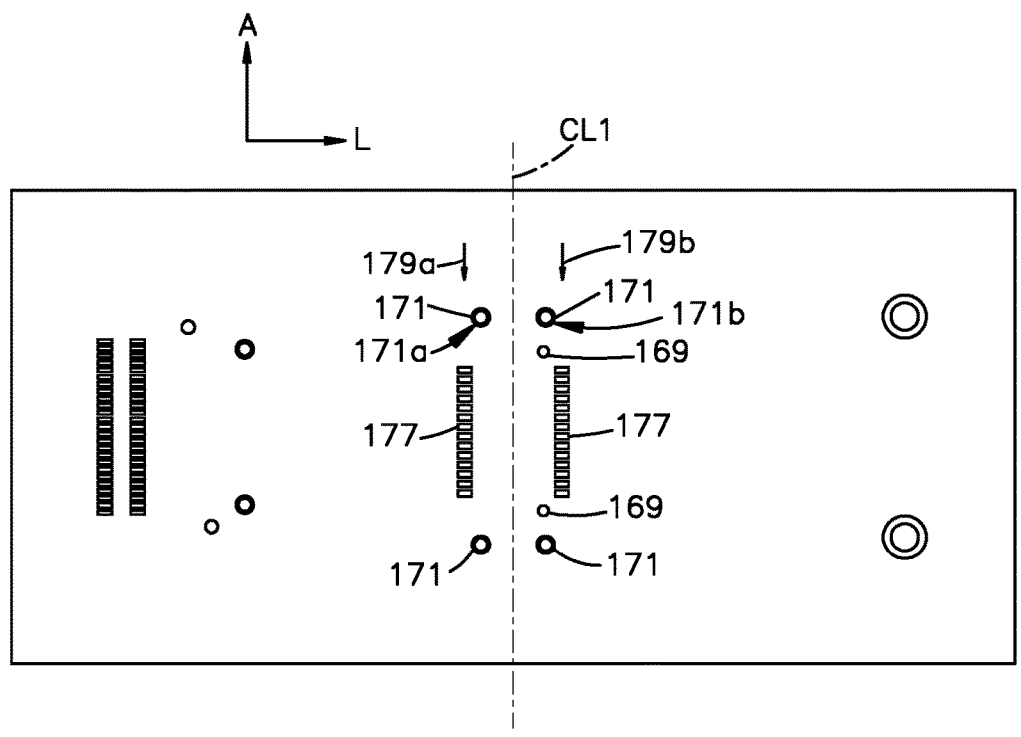
FIG. 8C is a top plan view of a portion of the host substrate of the host module, the host substrate constructed in accordance with an alternative embodiment such that the electrical connector illustrated in FIG. 8A is configured to be mounted to the host substrate.

Referring now to FIGS. 7C and 8C, the host substrate 118 can define a footprint that corresponds to the footprint of the second electrical connector 154. In particular, the host substrate 118 can define a plurality of mounting apertures that are dimensioned and positioned to receive respective ones of the mounting projections 163 and 165 of the second electrical connector 154. In one example, the mounting apertures can be sized such that the mounting projections 163 and 165 are inserted into the mounting apertures so that the mounting ends of the electrical contacts 155 are aligned with respective ones of electrical contact locations 177 of the host substrate. Alternatively or additionally, the mounting projections 163 and 165 can be press-fit in, or otherwise received by, the mounting apertures. In particular, the mounting projections 163 of the second electrical connector 154 can be received in the mounting apertures so as to align the mounting ends of the electrical contacts 155 with respective ones of the electrical contact locations 177 along the transverse direction T. The host substrate 118 can further define a plurality of mounting apertures that are sized and shaped to receive the mounting projections of the first electrical connector 152. The mounting apertures that are sized and shaped to receive the mounting projections of the first electrical connector 152 can be disposed outside the footprint that is defined by the mounting apertures that are dimensioned and positioned to receive the mounting projections 163 and 165 of the second electrical connector 154.

For instance, the host substrate 118 can include at least one first mounting aperture 169 that extends at least therein or therethrough along the transverse direction T. In one example, the host substrate 118 can include a plurality of first mounting apertures 169. For instance, the host substrate 118 can include a pair of first mounting apertures 169. The first mounting apertures are sized and configured to receive respective ones of the mounting projections 163 of the second electrical connector 154. For instance, the mounting projections 163 of the second electrical connector 154 can be sized to be press-fit in, or otherwise received by, the first mounting apertures 169. In particular, the mounting projections 163 of the second electrical connector 154 can be received in the first mounting apertures 169 so as to align the mounting ends of the electrical contacts 155 with respective ones of the electrical contact locations 177 along the transverse direction T. The host substrate 118 can include electrical contact locations 177 that are configured to establish electrical contact with electrical contacts 155 of the second electrical connector 154. In particular, the contact locations 177 are configured to contact respective ones of the mounting ends of the electrical contacts 155. The contact locations 177 can be configured as contact pads, plated through holes, or any suitable alternatively constructed contact locations as desired.

The contact locations 177 can be arranged along a first row 179a and a second row 179b. A select row of the first and second rows 179a and 179b of contact locations 177 can be on the same side of a centerline CL1 as the first mounting apertures 169 and a select pair of second mounting apertures 171. An other row of the first and second pairs 171a and 171b can be on the opposite side of the centerline CL1 than the mounting apertures 169 and the select pair of mounting apertures 171. In one example, the select row of contact locations can be defined by the first row 179a, and the other row of contact locations can be defined by the second row 179b. Alternatively, the select row of contact locations can be defined by the second row 179b, and the other row of contact locations 177 can be defined by the first row 179a.

As illustrated in FIG. 7C, the host substrate 118 can have a first number of electrical contact locations along the select row of contact locations 177, and a second number of electrical contacts along the other row 177 that is different than the first number. For instance, the host substrate 118 can have fewer contacts along the select row of contact locations 177 than along the other row. Thus, at least one or both of the outermost ends of the select row of contact locations 177 can be inwardly recessed with respect to the outermost ends of the other row of contact locations 177 with respect to the lateral direction A. In one example, the select row of contact locations 177 can include thirteen electrical contacts, and the other row 177 can include fourteen electrical contacts. Alternatively, the host substrate 118 can have fewer contacts along the other row of contact locations 177 than along the select row. It should be appreciated, of course, that the number of electrical contact locations can vary as desired. In one example, as illustrated in FIG. 8C, the first number of electrical contact locations 177 along the first row 179a can be equal to the second number of electrical contact locations 177 along the second row 179b. Thus, the outermost ends of the select row of contact locations 177 can be aligned with respective ones of the outermost ends of the other row of contact locations along the longitudinal direction L. For example, the first and second number of contact locations can be fourteen in one example.

Referring again to FIGS. 7C and 8C, the first and second rows 179a-b can be oriented along the lateral direction A and spaced from each other along the longitudinal direction L. Each of the mounting apertures 169 can be spaced in the same direction as the other with respect to a substrate centerline CL1. The substrate centerline CL1 is oriented along the lateral direction A and is equidistantly spaced from the first and second rows 179a and 179b. Alternatively, the first and second mounting apertures 169 can be disposed on opposite sides of the centerline CL1. Alternatively still, the first and second mounting apertures 169 can be disposed on the centerline CL1. One or more of the mounting apertures 169 can be circular, non-circular, or any suitable alternative shape as desired. Further, the mounting apertures 169 can define the same size and shape as each other, or can have a different size or shape from each other. The first and second mounting apertures 169 can be aligned with each other along the lateral direction A. The mounting apertures 169 can be disposed between the rows 179 and the centerline CL with respect to the longitudinal direction L. Alternatively, the rows 179 can be can be disposed between the mounting apertures 169 and the centerline CL with respect to the longitudinal direction L.

The host substrate 118 can also include at least one second mounting aperture 171 that extends at least therein or therethrough along the transverse direction T. In one example, the host substrate 118 can include a plurality of second mounting apertures 171. The second mounting apertures 171 are sized and configured to receive the mounting projections 165 of the securement members 183. For instance, the mounting projections 165 of the securement members 183 can be sized to be press-fit in, or otherwise received by, the second mounting apertures 171. In particular, the mounting projections 165 can be received in the second mounting apertures 171 so as to align the mounting ends of the electrical contacts 155 with respective ones of the electrical contact locations 177 along the transverse direction T. For instance, the host substrate 118 can include first and second pairs 171a and 171b of second mounting apertures 171. The first and second pairs 171a and 171b can be disposed on opposite sides of the centerline CL1. For instance, the first and second pairs 171a and 171b can be equidistantly spaced from the centerline CL1. Alternatively, the first and second pairs 171a and 171b can be spaced at different distances from the centerline CL. The mounting apertures 171 of the first pair 171a can be aligned with each other along the lateral direction A. Similarly, the mounting apertures 171 of the second pair 171b can be aligned with each other along the lateral direction A. Alternatively, the first and second pairs 171a and 171b of mounting apertures 171 can be disposed on the same side of the centerline CL. Alternatively still, one or both of the first and second pairs 171a and 171b can be located on the centerline CL. The mounting apertures 171 can be circular, non-circular, or any suitable alternative shape as desired. The mounting apertures 171 can be disposed between the rows 179 and the centerline CL1 with respect to the longitudinal direction L. Alternatively, the rows 179 can be disposed between the mounting apertures 171 and the centerline CL1 with respect to the longitudinal direction L. The mounting apertures 171 can define a select pair of mounting apertures 171, and an other pair of mounting apertures. The select pair of second mounting apertures 171 can be defined by the second pair 171b, and the other pair of second mounting apertures 171 can be defined by the first pair 171a. Alternatively, the select pair of second mounting apertures 171 can be defined by the first pair 171a, and the other pair of second mounting apertures 171 can be defined by the second pair 171b.

The mounting apertures 169 and 171 can define the same size and shape as each other, or can have a different size or shape from each other. Further, the mounting apertures 169 can define cross-sectional dimensions that are different than cross-sectional dimensions of the mounting apertures 171. The cross-sectional dimensions are measured along a plane that is defined by the lateral direction A and the longitudinal direction L. In one example, the cross-sectional dimensions of the mounting apertures 169 can be greater than the cross-sectional dimensions of the mounting apertures 171. Alternatively, the cross-sectional dimensions of the mounting apertures 171 can be greater than the cross-sectional dimensions of the mounting apertures 169. Alternatively still, the cross-sectional dimensions of the mounting apertures 169 can be equal to the cross-sectional dimensions of the mounting apertures 171.

In one example, the mounting apertures 169 are on the same side of the centerline CL1 as a select pair of the first and second pairs 171a-b of mounting apertures 171, and on the opposite side of the centerline CL1 from other pair of the first and second pairs 171a-b of mounting apertures 171. In one example, the select pair of the first and second pairs 171a-b of mounting apertures 171 cam ne defined by the second pair 171b, and the other pair can be defined by the first pair 171a. Alternatively, the select pair of the first and second pairs 171a-b of mounting apertures 171 cam ne defined by the first pair 171a, and the other pair can be defined by the second pair 171b. The mounting apertures 169 and 171 can define geometrical transverse centerlines that are oriented along the transverse direction T. The transverse centerlines of the mounting apertures 169 can be offset toward the substrate centerline CL1 with respect to the centerlines of the mounting apertures 171 of the select pair. Alternatively, the transverse centerlines of the mounting apertures 171 of the select pair can be offset toward the centerline CL with respect to the centerlines of the mounting apertures 169. Alternatively still, the transverse centerlines of the mounting apertures 171 of the select pair can be equidistantly spaced from the centerline CL as the centerlines of the mounting apertures 169. The mounting apertures 169 and 171 can be said to define a footprint of the host substrate 118, alone or in combination with the contact locations 177.

It is appreciated that the host substrate 118 defines a first surface and a second surface opposite the first surface so as to define a thickness along the transverse direction T. The host substrate 118 further defines first and second lateral sides opposite each other so as to define a width along a lateral direction A, wherein the width is greater than the thickness. The host substrate 118 further defines first and second longitudinal ends spaced from each other so as to define a length along a longitudinal direction L, wherein the length is greater than the width. The first and second pairs 171a and 171b of mounting apertures 171 can be disposed on opposite sides of the centerline CL1. The centerline CL1 can be equidistantly spaced from the first and second pairs 171a and 171b of mounting apertures 171. The mounting apertures 171 of the second pair 171b can be aligned with each other along the lateral direction A. The mounting apertures 171 of the first pair 171a can also be aligned with each other along the lateral direction A. The mounting apertures 169 can also be aligned with each other along the lateral direction.

Respective centers of the mounting apertures 169 can be disposed between respective centers of the mounting apertures 171 of the select pair and the centerline CL1 with respect to the longitudinal direction L. The centers of the mounting apertures 169 can be spaced closer to the centers of the mounting apertures 171 of the select pair of mounting apertures 171 than they are to the centerline CL1 along the longitudinal direction L. For instance, the centers of the mounting apertures 169 can be spaced from the centers of the mounting apertures 171 of the select pair a first distance along the longitudinal direction L, and spaced from the centerline CL1 a second distance along the longitudinal direction L. The second distance can be greater than five times the first distance. For instance, the second distance can be greater than 10 times the first distance. The mounting apertures 169 can be disposed between the mounting apertures 171 of the select pair of mounting apertures 171 with respect to the lateral direction A. The mounting apertures 171 of the select pair can be aligned with respective different ones of the mounting apertures 171 of the other pair along the longitudinal direction L.

The centerline CL1 can be equidistantly spaced from the first and second rows of contact locations 177 along the longitudinal direction L. One or both of the mounting apertures 169 and the select pair of mounting apertures 171 can be disposed between the select row of contact locations 177 and the centerline CL1 with respect to the longitudinal direction L. The other pair of mounting apertures 171 can be disposed between the other row of contact locations 177 and the centerline CL1 with respect to the longitudinal direction L. The mounting apertures 169 can have a smaller cross-sectional dimension than the mounting apertures of each of the mounting apertures 171 of the first and second pairs 171a and 171b, respectively. The mounting apertures 171 of each of the first and second pairs 171a and 171b can the same cross-sectional dimension.

The mounting apertures 169 can be referred to as a first pair of mounting apertures of the host substrate 118 that are configured to receive mounting projections of the second electrical connector 154. The select pair of mounting apertures 171 can be referred to as a second pair of mounting apertures of the host substrate 118 that are configured to receive mounting projections of the second electrical connector 154. The other pair of mounting apertures 171 can be referred to as a third pair of mounting apertures of the host substrate 118 that are configured to receive mounting projections of the second electrical connector 154. In one example, the host substrate 118 has no mounting apertures configured to receive mounting projections of the second electrical connector 154 so as to secure the second electrical connector 154 to the host substrate 118 other than the first, second, and third pairs of mounting apertures. In one example, the first pair of mounting apertures of the host substrate 118 can be configured to receive respective ones of the first pair of mounting projections of the second electrical connector 154. The second pair of mounting apertures of the host substrate 118 can be configured to receive respective ones of the second pair of mounting projections of the second electrical connector 154. The third pair of mounting apertures of the host substrate 118 can be configured to receive respective ones of the third pair of mounting projections of the second electrical connector 154.

Once the mounting projections of the second electrical connector 154 have been received in the mounting apertures of the host substrate 118, the mounting ends of the electrical contacts 155 can be soldered to respective ones of the contact locations 177, which can be configured as contact pads. Alternatively, the mounting ends of the electrical contacts can be configured as J-shaped leads that are compressed against contact pads that are defined by the contact locations 177. Alternatively still, the mounting ends of the electrical contacts can be configured as press-fit tails that are press fit into vias of the host substrate 118 that are defined by the contact locations 177.

It is recognized that the interconnect system 100 can define various dimensions that are contemplated in accordance with the present disclosure. It should be appreciated, of course, that the interconnect system 100 can be alternatively dimensioned unless otherwise indicated. For instance, the second connector housing 153 can have a width at a location aligned with the electrical contacts 155 along the longitudinal direction L. The width can be between approximately 5 mm and approximately 9 mm. For instance, the width can be approximately 7 mm. The word "approximately" with respect to dimensions recognizes that the dimensions can differ slightly from those disclosed. For instance, manufacturing tolerances can cause a variation in the dimensions. Further, numerical rounding can also cause a variation in the dimensions. The second connector housing 153 can define a maximum length along the lateral direction A between approximately 16 mm and approximately 24 mm. For instance, the maximum length can be approximately 20 mm. The second connector housing 153 can define an inner length along the lateral direction A between respective recesses that receive the securement members 183. The inner length can be between approximately 14 mm and approximately 21 mm. For instance, the inner length can be approximately 17.5 mm.

Figure 9A:
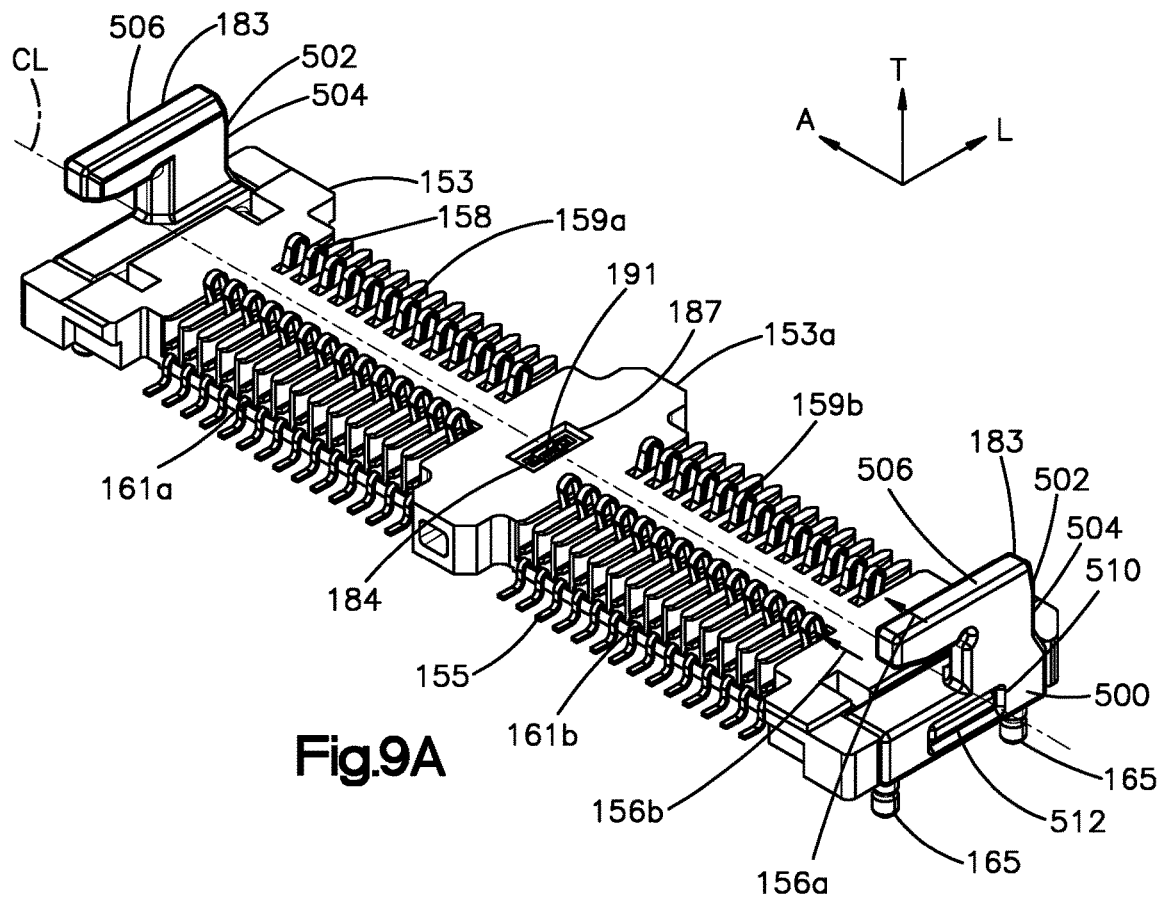
FIG. 9A is a perspective view of an electrical connector of the host module, wherein the electrical connector is constructed in accordance with an alternative embodiment.

Referring now to FIGS. 9A-10C, it should be appreciated that the second electrical connector 154 and the host substrate 118 can be configured in accordance with an alternative embodiment. As illustrated in FIGS. 9A and 10A, and as described above, the second electrical connector 154 includes a second electrically insulative connector housing 153 and a second plurality of electrical contacts 155 that are supported by the connector housing. The electrical contacts 155 can be spaced from each other along the lateral direction at any suitable row pitch as desired. For instance, the row pitch can be substantially (i.e., within manufacturing tolerance) 0.6 mm. It should be appreciated that the row pitch can be in a range from substantially 0.4 mm to substantially 1.5 mm at substantially 0.1 mm increments therebetween. Thus, the row pitch can be 0.4 mm, 0.5 mm, 0.6 mm, 0.7 mm, 0.8 mm, 0.9 mm, 1.0 mm, 1.1 mm, 1.2 mm, 1.3 mm, 1.4 mm, and 1.5 mm. It should be appreciated that these stated row pitches are presented by way of example only, and the row pitch can be any suitable alternatively row pitch as desired.

The second connector housing 153 can be made of a plastic. The second plurality of electrical contacts 155 can include mating portions that extend out of the second connector housing 153 along the transverse direction T away from the host substrate 118. In particular, the mating portions can extend out from an upper surface of the connector housing 153. Thus, electrically conductive lands on a lower surface of the second end of the module substrate 115b can be brought into contact with the respective ones of the mating portions of the second plurality of electrical contacts 155, so as to mate the interconnect module 102 with the second electrical connector 154. It is recognized that the mating portions, and thus the electrical contacts 155, can be configured as compression contacts that compress toward the underlying host substrate 118 in response to contact with the module substrate 115b. In particular, the mating portions, and thus the electrical contacts 155, define contact locations 158 that are configured to contact the module substrate 115b so as to place the electrical contacts 155 in electrical communication with the module substrate 115b. For instance, the contact locations 158 can be the uppermost locations of the electrical contacts 155 along the transverse direction T. In one example, the electrical contacts 155 can define curved mating ends whose apices define the contact locations 158.

The second plurality of electrical contacts 155 can be arranged in at least one row that is oriented along the lateral direction A. For instance, the electrical contacts 155 can be arranged in a first row 156a and a second row 156b that are spaced from each other along the longitudinal direction L. The contact locations 158 of the first row 156a can be aligned with each other along the lateral direction A. Similarly, the contact locations 158 of the second row 156b can be aligned with each other along the lateral direction A. Further, the second electrical connector can define first and second portions of each of the first and second rows 156a and 156b. Thus, the first row 156a can define a first portion 159a and a second portion 159b. Similarly, the second row 156b can define a first portion 161a and a second portion 161b. The first portion 159a can define the same number of electrical contacts 155 as the second portion 159b. Alternatively, the first portion 159a can define a different number of electrical contacts 155 than the second portion 159b. Similarly, the first portion 161a can define the same number of electrical contacts 155 as the second portion 161b. Alternatively, the first portion 161a can define a different number of electrical contacts 155 than the second portion 161b.

The connector housing 153 can define an intermediate portion 153a that separates the first portion 159a from the second portion 159b, and further separates the first portion 161a from the second portion 161b. The intermediate portion 153a can be devoid of electrical contacts. Further, the intermediate portion 153a can extend along the lateral direction A a distance at least two times the row pitch. For instance, the intermediate portion 153a can extend along the lateral direction A a distance between two times the row pitch and 10 times the row pitch. For example, the intermediate portion 153a can extend along the lateral direction A a distance between four times the row pitch and 7 times the row pitch. The intermediate portion 153a can define a central portion that bisects the first and second rows 156a and 156b of electrical contacts 155 along the lateral direction A. Further, the intermediate portion 153a can define a central portion of the electrical connector 154 that bisects the electrical connector into equal halves along the lateral direction A. The interconnect system, and in particular the host module, can include an alignment member 184 that is inserted into an opening 187 in the upper surface of the connector housing 153 at the intermediate portion 153a. The opening 187 can be defined by a recess 158 of the intermediate portion 153c. The alignment member 184 can include first and second alignment legs 189a and 189b, respectively (see FIGS. 9B and 10B), and an arm 191 that extends between the attachment legs 189a-b. The alignment legs 189a-b can be spaced from each other along the longitudinal direction L. Further, the alignment legs 189a-b can be aligned with each other along the longitudinal direction L. The alignment legs 189a-b can bifurcate the rows 156a and 156b into equal halves along the lateral direction. Thus, the first portions 159a and 161a can be disposed on opposite sides of the alignment legs 189a-b with respect to the second portions 159b and 161b with respect to the lateral direction A. It should be appreciated, however, that the alignment legs 189a and 189b can alternatively be aligned with each other along any suitable alternative direction that is perpendicular to the transverse direction T. For instance, the alignment legs 189a and 189b can alternatively be aligned with each other along the lateral direction A.

A connector centerline CL can be oriented along the lateral direction A and can divide the second electrical connector 154 into first and second portions along the longitudinal direction L. For instance, the connector centerline CL can bisect the second electrical connector 154 into equal halves along the longitudinal direction L. In one example, the securement surface 504 and the first row 156a can be disposed on the same side of the connector centerline CL with respect to the second row 156b. The first row 156a can be disposed between the connector centerline CL and the securement surface 504 with respect to the longitudinal direction L. The retention arm 506 can extend from the securement wall 502 to a free end that is disposed such that the second row 156b is disposed between the free and the connector centerline CL, the second row 156b defined by the contact locations 158 when the contact locations 158 are not compressed. The base 500 defines a front end that is disposed such that the first rows 156a is disposed between the front end of the base 500 and the centerline CL. The securement member 183 can include one or more securement pins 517 as described above with respect to FIG. 7D.

As illustrated in FIG. 9A, the second electrical connector 154 can have a first number of electrical contacts along the first row 156a, and a second number of electrical contacts along the second row 156b that is different than the first number. Similarly, one or both of the first and second portions 159a and 159b can have a different number of electrical contacts than one or both of the first and second portions 161a and 161b. For instance, the electrical connector 154 can have fewer contacts along the first row 156a than along the second row. Thus, at least one or both of the outermost ends along the lateral direction A of the first row can be inwardly recessed with respect to the outermost ends of the second row 156b with respect to the lateral direction A. Further, each of the first and second portions 159a and 159b can have fewer electrical contacts than the first and second portions 161a and 161b. Thus, at least one or both outermost ends along the lateral direction A of the first portion 159a can be inwardly recessed with respect to the outermost ends of the first portion 161a along the lateral direction. Similarly, at least one or both outermost ends along the lateral direction A of the second portion 159b can be inwardly recessed with respect to the outermost ends of the first portion 161b along the lateral direction A. In one example, the first row 156a can include twenty-six electrical contacts, and the second row 156b can include twenty-eight electrical contacts. Thus, the first and second portions 159a and 159b can each include thirteen electrical contacts. The first and second portions 161a and 161b can each include fourteen electrical contacts. Alternatively, the electrical connector 154 can have fewer contacts along the second row 156b than along the first row 156a. It should be appreciated, of course, that the number of electrical contacts can vary as desired.

Figure 10A:
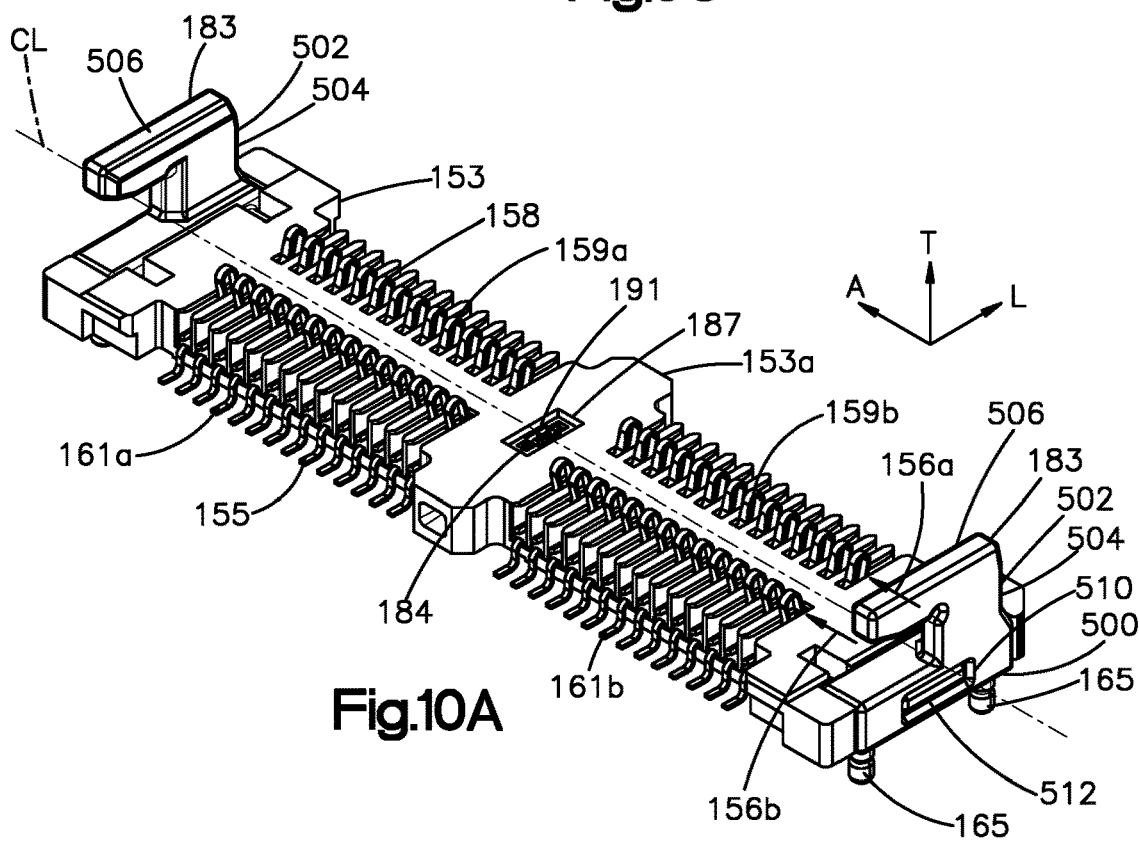
FIG. 10A is a perspective view of an electrical connector of the host module, wherein the electrical connector is constructed in accordance with an alternative embodiment.

In one example, as illustrated in FIG. 10A, the first number of electrical contacts 156 along the first row 156a can be equal to the second number of electrical contacts 156 along the second row 156b. In one example, the number of electrical contacts in each of the first and second rows 156a and 156b can be twenty-eight. Further, the number of electrical contacts 155 in each of the first portion 159a, the second portion 159b, the first portion 161a, and the second portion 161b, can all be equal to each other. Thus, the number of electrical contacts 155 in each of the first portion 159a, the second portion 159b, the first portion 161a, and the second portion 161b can be fourteen. It should therefore be appreciated that the outermost ends of the first row 156a can be aligned with respective ones of the outermost ends of the second row 156b along the longitudinal direction L. Further, the outermost ends of the first portion 159a can be aligned with respective ones of the outermost ends of the first portion 161a along the longitudinal direction L. Further still, the outermost ends of the second portion 159b can be aligned with respective ones of the outermost ends of the second portion 161b along the longitudinal direction L.

Figure 9B:
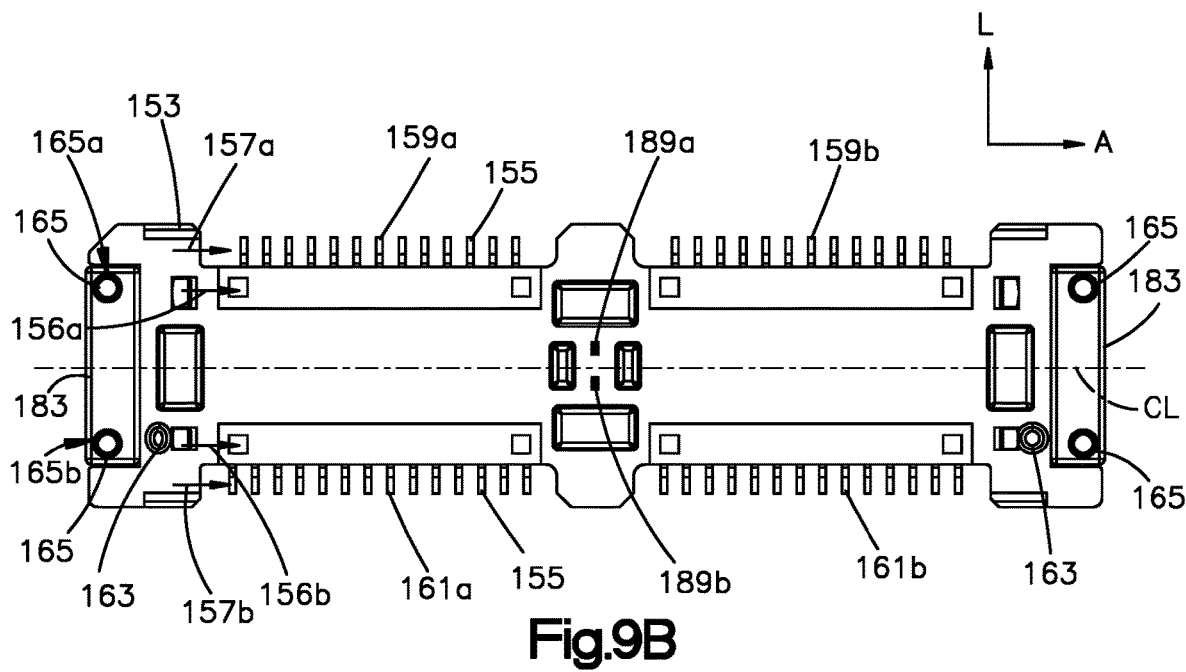
FIG. 9B is a bottom plan view of the electrical connector illustrated in FIG. 9A.
Figure 10B:
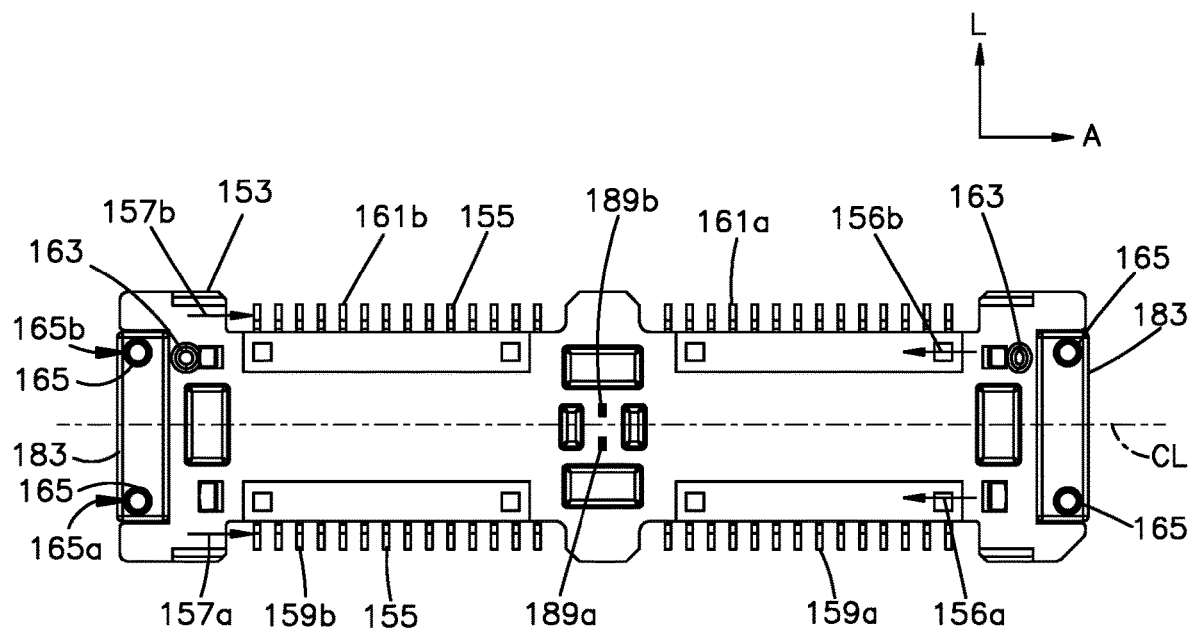
FIG. 10B is a bottom plan view of the electrical connector illustrated in FIG. 10A.

Referring now also to FIGS. 9B and 10B, the second electrical connector 154, including the second connector housing 153, the securement members 183, and the alignment member 184, are configured to be mounted to the host substrate 118. For instance, the alignment legs 189a and 189b can extend down along the transverse direction T. The alignment legs 189a and 189b can be disposed on opposite sides of a connector centerline CL that is oriented along the lateral direction A and bisects the second electrical connector 154 into equal halves along the longitudinal direction L. In particular, the alignment legs 189a and 189b can be spaced equidistantly from the centerline CL along the longitudinal direction L. Alternatively, the alignment legs 189a and 189b can be spaced at different distances along the longitudinal direction L. As will be appreciated from the description below, the alignment legs 189a and 189b are configured to be inserted into the underlying host substrate 118. In this regard, the first and second alignment legs 189a and 189b can be referred to as mounting projections that are configured to be received in the host substrate 118 when the second electrical connector 154 is mounted to the host substrate 118.

Further, the second connector housing 153 can include at least one mounting projection 163 that extends down along the transverse direction T. In one example, the second connector housing 153 can include a plurality of mounting projections 163 that extend down along the transverse direction. For instance, the second connector housing 153 can include first and second mounting projections 163. The first and second mounting projections 163 can be spaced in the same direction with respect to the connector centerline CL. Alternatively, the first and second mounting projections 163 can be disposed on opposite sides of the centerline CL. Alternatively still, the first and second mounting projections 163 can be disposed on the centerline CL. The mounting projections 163 can be circular, non-circular, or any suitable alternative shape as desired. Further, the mounting projections 163 can define the same size and shape as each other, or can have a different size or shape from each other. The first and second mounting projections 163 can be aligned with each other along the lateral direction A. The mounting ends of the electrical contacts 155 can define be aligned in mounting end rows 157. For instance, the mounting ends of the electrical contacts 155 that are aligned along the first row 156a can be aligned along a first mounting end row 157a. Similarly, the mounting ends of the electrical contacts 155 that are aligned along the first row 156a can be aligned along a second mounting end row 157b. The mounting projections 163 can be disposed between the mounting end rows 157 and the centerline CL with respect to the longitudinal direction L. Alternatively, the mounting end rows 167 can be disposed between the mounting projections 163 and the centerline CL with respect to the longitudinal direction L.

The securement member 183 can also include at least one mounting projection 165 that extends down along the transverse direction T. In one example, the securement member 183 can include a plurality of mounting projections 165 that extend down along the transverse direction T. The mounting projections 165 can extend down from the base 500 along the transverse direction T. The securement members 183 can combine to include first and second pairs 165a and 165b of mounting projections 165. The first and second pairs 165a and 165b can be disposed on opposite sides of the centerline CL. For instance, the first and second pairs 165a and 165b can be equidistantly spaced from the centerline CL. Alternatively, the first and second pairs 165a and 165b can be spaced at different distances from the centerline CL. The mounting projections 165 of the first pair 165a can be aligned with each other along the lateral direction A. Similarly, the mounting projections 165 of the second pair 165b can be aligned with each other along the lateral direction A. Alternatively, the first and second pairs 165a and 165b of mounting projections 165 can be disposed on the same side of the centerline CL. Alternatively still, one or both of the first and second pairs 165a and 165b can be located on the centerline CL. The mounting projections 165 can be circular, non-circular, or any suitable alternative shape as desired. In one example, one of the mounting projections 165 can have a different size or shape than another one of the mounting projections 165 to ensure that the connector 154 is mounted to the host substrate in its proper orientation. The mounting end rows 157 can be disposed between the mounting projections 165 and the centerline CL with respect to the longitudinal direction L. Alternatively, the mounting projections 163 can be disposed between the mounting end rows 157 and the centerline CL with respect to the longitudinal direction L.

The mounting projections 163 and 165 can define the same size and shape as each other, or can have a different size or shape from each other. Further, the mounting projections 165 of the securement members 183 can define cross-sectional dimensions that are different than cross-sectional dimensions of the mounting projections 163 of the connector housing 153. The cross-sectional dimensions are measured along a plane that is defined by the lateral direction A and the longitudinal direction L. In one example, the cross-sectional dimensions of the mounting projections 165 can be greater than the cross-sectional dimensions of the mounting projections 163. Alternatively, the cross-sectional dimensions of the mounting projections 163 can be greater than the cross-sectional dimensions of the mounting projections 165. Alternatively still, the cross-sectional dimensions of the mounting projections 165 can be equal to the cross-sectional dimensions of the mounting projections 163.

In one example, the mounting projections 163 are on the same side of the centerline CL as a select pair of the first and second pairs 165a-b of mounting projections 165, and on opposite sides of the centerline CL with respect to the other pair of the first and second pairs 165a-b of the mounting projections 165. In one example, the select pair of mounting projections 165 can be defined by the second pair 165b, and the other pair can be defined by the first pair 165a. Alternatively, the select pair of mounting projections 165 can be defined by the first pair 165a, and the other pair can be defined by the second pair 165b. Accordingly, in one example, the mounting projections 163 can be on the same side of the centerline CL as the second pair 165b of mounting projections 165, and on the opposite side of the centerline CL from the first pair 165a of mounting projections. Thus, the mounting projections 165 can be on the same side of the centerline CL as the second row 156b and the second mounting end row 157b. Alternatively, the mounting projections 163 can be on the same side of the centerline CL as the first pair 165b of mounting projections 165, and on the opposite side of the centerline CL from the second pair 165b of mounting projections. Thus, the mounting projections 165 can be on the same side of the centerline CL as the first row 156a and the first mounting end row 157a.

Further, the mounting projections 163 are on the same side of the centerline CL as a select alignment leg of the first and second alignment legs 189a and 189b, and on opposite sides of the centerline CL with respect to the other of the first and second alignment legs 189a and 189b. Thus, the select one of the alignment legs 189a and 189b can be on the same side of the centerline CL as the select pair of the mounting projections 165. In one example, the select alignment leg can be defined by the second alignment leg 189b, and the other alignment leg can be defined by the first alignment leg 189a. Alternatively, the select alignment leg can be defined by the first alignment leg 189a, and the other alignment leg can be defined by the second alignment leg 189a.

The mounting projections 163 and 165, and the mounting projections defined by the first and second alignment legs 189a-b, can define geometrical transverse centerlines that are oriented along the transverse direction T. The transverse centerlines of the mounting projections 163 can be offset toward the centerline CL with respect to the centerlines of the mounting projections 165 of the second pair 165b. Alternatively, the transverse centerlines of the mounting projections 165 of the second pair 165b can be offset toward the centerline CL with respect to the centerlines of the mounting projections 163. Alternatively still, the transverse centerlines of the mounting projections 165 of the second pair 165b can be equidistantly spaced from the centerline CL as the centerlines of the mounting projections 163. The transverse centerlines of the select alignment leg is disposed between the centerline CL and the centerlines of the mounting projection 163 with respect to the longitudinal direction L. Further, the transverse centerlines of the select alignment leg can be disposed between the centerlines CL and the select pair of mounting projections 165 with respect to the longitudinal direction L. Similarly, the transverse centerline of the other alignment leg can be disposed between the centerline CL and the transverse centerline of the other pair of mounting projections 165 with respect to the longitudinal direction L. The mounting projections 163 and 165 and the alignment legs 189a-b can be said to define a footprint of the second electrical connector 154, either alone or in combination with the mounting ends of the electrical contacts 155.

The transverse centers of the mounting projections 163 can be spaced closer to the centers of the select pair of the mounting projections 165 than they are to the centerline along the longitudinal direction L. For instance, the centers of the mounting projections 163 can be spaced from the centers of the mounting projections 165 of the select pair a first distance along the longitudinal direction L, and spaced from the centerline CL a second distance along the longitudinal direction. The second distance can be greater than five times the first distance. For example, the second distance is greater than 10 times the first distance. The mounting projections 163 can be disposed between the mounting projections 165 of the select pair with respect to the lateral direction A. The mounting projections of the select pair can be aligned with respect different ones of the mounting projections 165 of the other pair of mounting projections 165 along the longitudinal direction L. One of the mounting end rows 157 can be disposed such that at least one or both of the mounting projections 163 and the select pair of mounting projections 165 are disposed between the one of the mounting end rows 157 and the centerline CL with respect to the longitudinal direction L. The other pair of mounting projections 165 can be disposed between the other of the mounting end rows 157 and the centerline CL with respect to the longitudinal direction L. The first electrical connector 152 can similarly include a plurality of mounting projections that are configured to be received by corresponding mounting apertures of the host substrate 118.

The pair of mounting projections 163 of the connector housing 153 can be referred to as a first pair of mounting projections of the second electrical connector. The select pair of mounting projections 165 of the securement members 183 can be referred to as a second pair of mounting projections of the second electrical connector 154. The other pair of mounting projections 165 of the securement members 183 can be referred to as a third pair of mounting projections of the second electrical connector 154. The pair of alignment legs 189a and 189b can be referred to as a fourth pair of mounting projections of the second electrical connector 154. In one example, the second electrical connector 154 has no mounting projections configured to secure the electrical connector to the host substrate 118 other than the first, second, third, and fourth pairs of mounting projections.

Figure 9C:
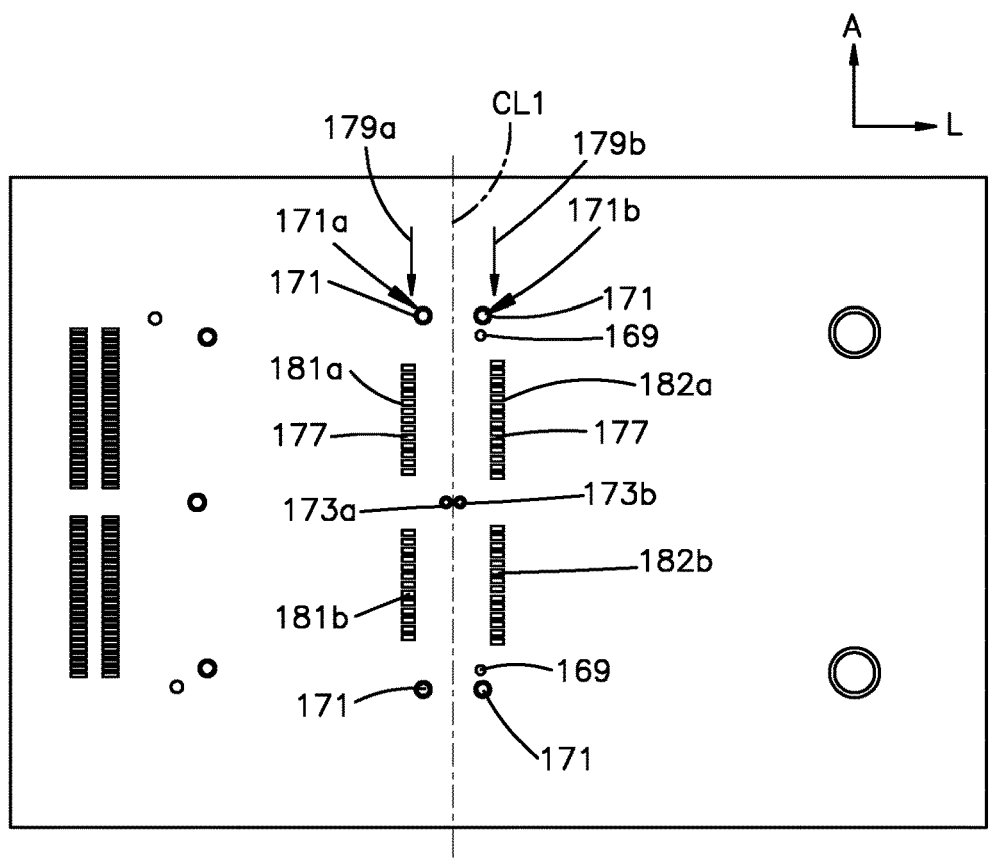
FIG. 9C is a top plan view of a portion of the host substrate of the host module, the host substrate constructed in accordance with an alternative embodiment such that the electrical connector illustrated in FIG. 9A is configured to be mounted to the host substrate.
Figure 10C:
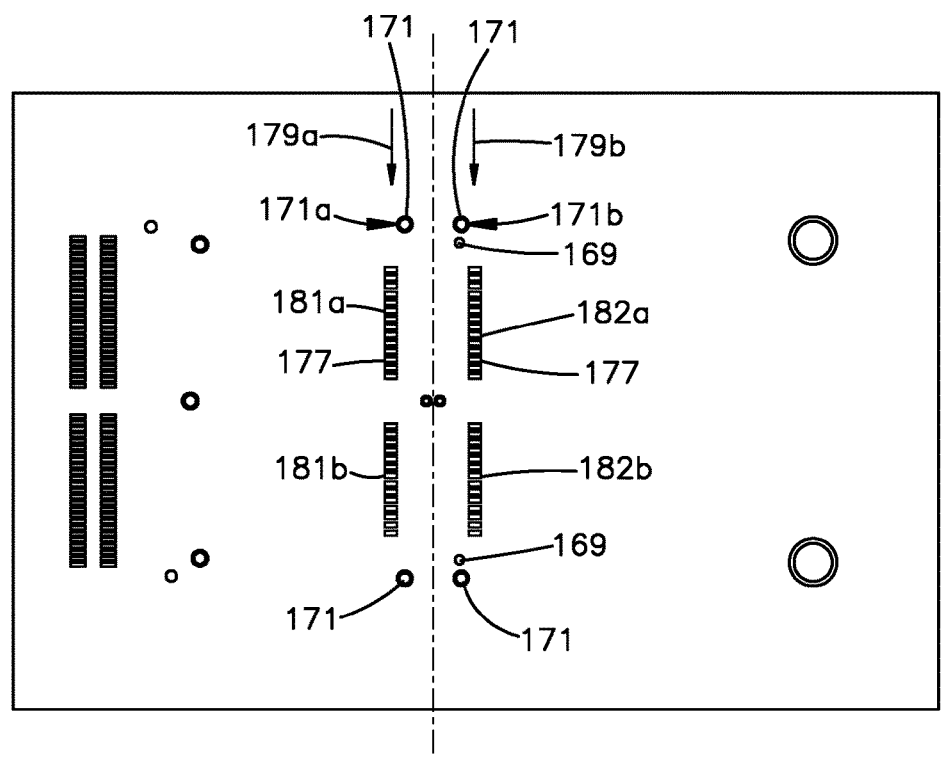
FIG. 10C is a top plan view of a portion of the host substrate of the host module, the host substrate constructed in accordance with an alternative embodiment such that the electrical connector illustrated in FIG. 10A is configured to be mounted to the host substrate.

Referring now to FIGS. 9C and 10C, the host substrate 118 can define a footprint that corresponds to the footprint of the second electrical connector 154. In particular, the host substrate 118 can define a plurality of mounting apertures that are dimensioned and positioned to receive respective ones of the mounting projections 163 and 165 and the first and second alignment legs 189a-b of the second electrical connector 154. In one example, the mounting apertures can be sized such that the mounting projections 163 and 165 and the alignment legs 189a-b are inserted into the mounting apertures to align the mounting ends of the electrical contacts 155 with respective ones of electrical contact locations 177 of the host substrate 118. Alternatively or additionally, the mounting apertures can be sized such that the mounting projections 163 and 165 and the alignment legs 189a-b are press-fit into the mounting apertures. In particular, the mounting projections 163 and 165 and the alignment legs 189a-b can be received in the mounting apertures so as to align the mounting ends of the electrical contacts 155 with respective ones of the electrical contact locations 177 along the transverse direction T. The host substrate 118 can further define a plurality of mounting apertures that are sized and shaped to receive the mounting projections of the first electrical connector 152. The mounting apertures that are sized and shaped to receive the mounting projections of the first electrical connector 152 can be disposed outside the footprint that is defined by the mounting apertures that are dimensioned and positioned to receive the mounting projections 163 and 165 of the second electrical connector 154.

For instance, the host substrate 118 can include at least one first mounting aperture 169 that extends at least therein or therethrough along the transverse direction T. In one example, the host substrate 118 can include a plurality of first mounting apertures 169. For instance, the host substrate 118 can include a pair of first mounting apertures 169. The first mounting apertures are sized and configured to receive respective ones of the mounting projections 163 of the second electrical connector 154. For instance, the mounting projections 163 of the second electrical connector 154 can be sized to be press-fit in, or otherwise received by, the first mounting apertures 169. In particular, the mounting projections 163 of the second electrical connector 154 can be received in the first mounting apertures 169 so as to align the mounting ends of the electrical contacts 155 with respective ones of the electrical contact locations 177 along the transverse direction T. The electrical contact locations 177 of the host substrate 118 are configured to establish electrical contact with electrical contacts 155 of the second electrical connector 154. In particular, the contact locations 177 are configured to contact respective ones of the mounting ends of the electrical contacts 155. The contact locations 177 can be configured as contact pads, plated through holes, or any suitable alternatively constructed contact locations as desired.

The contact locations 177 can be arranged along a first row 179a and a second row 179b. The contact locations 177 can define a select row of the first and second rows 179a and 179b, and an other row of the first and second rows 179a and 179b. In one example, the select row of contact locations can be defined by the first row 179a, and the other row of contact locations can be defined by the second row 179b. Alternatively, the select row of contact locations can be defined by the second row 179b, and the other row of contact locations 177 can be defined by the first row 179a.

Further, the host substrate can define first and second portions of each of the first and second rows 179a and 179b. Thus, the first row 179a can define a first portion 181a and a second portion 181b. Similarly, the second row 179b can define a first portion 182a and a second portion 182b. The first portion 181a can define the same number of electrical contact locations 177 as the second portion 181b. Alternatively, the first portion 181a can define a different number of electrical contact locations 177 than the second portion 181b. Similarly, the first portion 182a can define the same number of electrical contact locations 177 as the second portion 182b. Alternatively, the first portion 182a can define a different number of electrical contact locations 177 than the second portion 182b. The electrical contact locations 177 of the first portion 181a of the first row 179a can contact the mounting ends of the first portion 159a of the first row 156a of electrical contacts 155. Further, the electrical contact locations 177 of the second portion 181b of the first row 179a can contact the mounting ends of the second portion 159b of the first row 156a of electrical contacts 155. Similarly, the electrical contact locations 177 of the first portion 182a of the second row 179b can contact the mounting ends of the first portion 161a of the second row 156v of electrical contacts 155. Further, the electrical contact locations 177 of the second portion 182b of the second row 179b can contact the mounting ends of the second portion 161b of the second row 156b of electrical contacts 155.

Thus, as illustrated in FIG. 7C, the host substrate 118 can have a first number of electrical contact locations along the select row of contact locations 177, and a second number of electrical contacts along the other row 177 that is different than the first number. For instance, the host substrate 118 can have fewer contacts along the select row of contact locations 177 than along the other row. Accordingly, at least one or both of the outermost ends of the select row of contact locations 177 can be inwardly recessed with respect to the outermost ends of the other row of contact locations 177 with respect to the lateral direction A. In one example, the select row of contact locations 177 can include twenty-six electrical contacts, and the other row 177 can include twenty-eight electrical contacts. It should therefore be appreciated that each of the first and second portions 181a and 181b of the select row of contact locations 177 can include thirteen electrical contacts. Each of the first and second portions 182a and 182b of the other row of electrical contact locations 177 can include 14 electrical contacts. Alternatively, the host substrate 118 can have fewer contacts along the other row of contact locations 177 than along the select row. It should be appreciated, of course, that the number of electrical contacts can vary as desired.

In one example, as illustrated in FIG. 8C, the number of electrical contact location 156 along the select row of electrical contact locations 177 can be equal to the number of electrical contact locations 177 along the other row of electrical contact locations 177. Otherwise stated, the first and second rows 179a and 179b of electrical contact locations 177 can have the same number of electrical contact locations. Thus, the outermost ends of the select row of contact locations 177 can be aligned with respective ones of the outermost ends of the other row of contact locations along the longitudinal direction L. For example, the first and second number of contact locations can be twenty-eight. It should therefore be appreciated that the number of electrical contact locations 177 in each of the first portion 181a, the second portion 181b, the first portion 182a, and the second portion 182b, can all be equal to each other. Thus, the number of electrical contact locations 177 in each of the first portion 181a, the second portion 181b, the first portion 182a, and the second portion 182b can be fourteen. Further, the outermost ends of the first portion 181 a can be aligned with respective ones of the outermost ends of the first portion 182a along the longitudinal direction L. Further still, the outermost ends of the second portion 181b can be aligned with respective ones of the outermost ends of the second portion 182b along the longitudinal direction L.

The first and second rows 179a-b can be oriented along the lateral direction A and spaced from each other along the longitudinal direction L. Each of the mounting apertures 169 can be spaced in the same direction as the other with respect to a substrate centerline CL1. The substrate centerline CL1 is oriented along the lateral direction A and can be equidistantly spaced from the first and second rows 179a and 179b. Alternatively, the first and second mounting apertures 169 can be disposed on opposite sides of the centerline CL1. Alternatively still, the first and second mounting apertures 169 can be disposed on the centerline CL1. One or more of the mounting apertures 169 can be circular, non-circular, or any suitable alternative shape as desired. Further, the mounting apertures 169 can define the same size and shape as each other, or can have a different size or shape from each other. The first and second mounting apertures 169 can be aligned with each other along the lateral direction A. The mounting apertures 169 can be disposed between the rows 179 and the centerline CL with respect to the longitudinal direction L. Alternatively, the rows 179 can be can be disposed between the mounting apertures 169 and the centerline CL with respect to the longitudinal direction L.

The host substrate 118 can also include at least one second mounting aperture 171 that extends at least therein or therethrough along the transverse direction T. In one example, the host substrate 118 can include a plurality of second mounting apertures 171. The second mounting apertures 171 are sized and configured to receive the mounting projections 165 of the securement members 183. The second plurality of mounting apertures 171 can include a first pair 171a of second mounting apertures 171 and a second pair 171b of mounting apertures 171. Further, the second mounting apertures 171 can include a select pair of second mounting apertures 171 and an other pair of second mounting apertures 171. The select pair of second mounting apertures 171 can be defined by the second pair 171b, and the other pair of second mounting apertures 171 can be defined by the first pair 171a. Alternatively, the select pair of second mounting apertures 171 can be defined by the first pair 171a, and the other pair of second mounting apertures 171 can be defined by the second pair 171b. The select row of contact locations 177 can be on the same side of the centerline CL1 as the mounting apertures 169 and the select pair of second mounting apertures 171. The other pair of the second mounting apertures 171 can be on the opposite side of the centerline CL1 than both the mounting apertures 169 and the select pair of mounting apertures 171.

The mounting projections 165 of the securement members 183 can be sized to be press-fit in, or otherwise received by, the second mounting apertures 171. In particular, the mounting projections 165 can be received in the second mounting apertures 171 so as to align the mounting ends of the electrical contacts 155 with respective ones of the electrical contact locations 177 along the transverse direction T. The host substrate 118 can include first and second pairs 171a and 171b of second mounting apertures 171. The first and second pairs 171a and 171b can be disposed on opposite sides of the centerline CL1. For instance, the first and second pairs 171a and 171b can be equidistantly spaced from the centerline CL1. Alternatively, the first and second pairs 171a and 171b can be spaced at different distances from the centerline CL. The mounting apertures 171 of the first pair 171*a* can be aligned with each other along the lateral direction A. Similarly, the mounting apertures 171 of the second pair 171*b* can be aligned with each other along the lateral direction A. Alternatively, the first and second pairs 171*a* and 171*b* of mounting apertures 171 can be disposed on the same side of the centerline CL. Alternatively still, one or both of the first and second pairs 171*a* and 171*b* can be located on the centerline CL. The mounting apertures 171 can be circular, non-circular, or any suitable alternative shape as desired. The mounting apertures 171 can be disposed between the respective rows 179 and the centerline CL1 with respect to the longitudinal direction L. Alternatively, the rows 179 can be disposed between mounting apertures 171 and the centerline CL1 with respect to the longitudinal direction L.

The host substrate 118 can also include a third pair of mounting apertures 173, including a first mounting aperture 173*a* and a second mounting aperture 173*b* that extends at least therein or therethrough along the transverse direction T. The first mounting aperture 173*a* is sized and configured to receive the first alignment leg 189*a*, and the second mounting aperture 173*b* is configured to receive the second alignment leg 189*b*. The first and second mounting apertures 173*a* and 173*b* of the third mounting apertures can be on opposite sides of the centerline CL1. Further, the first and second mounting apertures 173*a* and 173*b* of the third mounting apertures can bisect each of the first and second rows 179*a* and 179*b* into equal halves along the lateral direction A. Thus, the first portions 181*a* and 182*a* can be disposed on opposite sides of the mounting apertures 173*a-b* with respect to the second portions 181*b* and 182*b* with respect to the lateral direction A. The third pair of mounting apertures 173 can include a select third mounting aperture and another third mounting aperture. The select third mounting aperture can be defined by the second mounting aperture 173*b*, and the other third mounting aperture can be defined by the first mounting aperture 173*a*. Thus, the select third mounting aperture can be configured to receive the select alignment leg, and the other third mounting aperture can be configured to receive the other alignment leg.

The first and second alignment legs 189*a* and 189*b* can be sized to be press-fit in, or otherwise received by, the third mounting apertures 173. In particular, the alignment legs 189*a-b* can be received in the third mounting apertures 173 so as to align the mounting ends of the electrical contacts 155 with respective ones of the electrical contact locations 177 along the transverse direction T. The first and second mounting aperture 173*a* and 173*b* of the third mounting apertures 173 can be disposed on opposite sides of the centerline CL1. For instance, the first and second mounting aperture 173*a* and 173*b* of the third mounting apertures 173 can be equidistantly spaced from the centerline CL1. Alternatively, the first and second mounting aperture 173*a* and 173*b* of the third mounting apertures 173 can be spaced at different distances from the centerline CL. The first and second mounting aperture 173*a* and 173*b* of the third mounting apertures 173 can be aligned with each other along the lateral direction A. Alternatively, the first and second mounting aperture 173*a* and 173*b* of the third mounting apertures 173 can be aligned with each other along any alternative direction that is perpendicular to the transverse direction T. For instance, the first and second mounting aperture 173*a* and 173*b* of the third mounting apertures 173 can be aligned with each other along the lateral direction A. Alternatively still, the first and second mounting aperture 173*a* and 173*b* of the third mounting apertures 173 can be located on the centerline CL. The third apertures 173 can be circular, non-circular, or any suitable alternative shape as desired.

The third mounting apertures 173 can be disposed between the respective rows 179 and the centerline CL1 with respect to the longitudinal direction L. Alternatively, the rows 179 can be disposed between the third mounting apertures 173 and the centerline CL1 with respect to the longitudinal direction L. Further, the third mounting apertures 173 can be disposed between the centerline CL1 and the second mounting apertures 171 with respect to the longitudinal direction L. Thus, the select third mounting aperture can be disposed between the centerline CL1 and the select pair of second mounting apertures 171 with respect to the longitudinal direction L. Similarly, the other third mounting aperture can be disposed between the centerline CL1 and the other pair of second mounting apertures 171 with respect to the longitudinal direction L. Further still, the select third mounting aperture can be disposed between the centerline CL1 and the first mounting apertures 169 with respect to the longitudinal direction L.

The mounting apertures 169, 171, and 173 can define the same size and shape as each other, or can have a different size or shape from each other. Further, one or more of the mounting apertures 169, 171, and 173 can define cross-sectional dimensions that are different than cross-sectional dimensions of one or more others of the mounting apertures 169, 171, and 173. The cross-sectional dimensions are measured along a plane that is defined by the lateral direction A and the longitudinal direction L. In one example, the cross-sectional dimensions of the mounting apertures 169 can be greater than the cross-sectional dimensions of the mounting apertures 171 and 173. Alternatively, the cross-sectional dimensions of the mounting apertures 171 and 173 can be greater than the cross-sectional dimensions of the mounting apertures 169. Alternatively still, the cross-sectional dimensions of the mounting apertures 169 can be equal to the cross-sectional dimensions of the mounting apertures 171 and 173. Alternatively or additionally, the cross-sectional dimensions of the mounting apertures 171 can be greater than the cross-sectional dimensions of the mounting apertures 173. Alternatively, the cross-sectional dimensions of the mounting apertures 171 can be less than the cross-sectional dimensions of the mounting apertures 173.

In one example, the mounting apertures 169 are on the same side of the centerline CL1 as the select pair of the first and second pairs 171 a-b of mounting apertures 171, and on the opposite side of the centerline CL1 from other pair of the first and second pairs 171*a-b* of mounting apertures 171. Further, the mounting apertures 169 can be on the same side of the common centerline CL1 as the select third mounting aperture 173. The mounting apertures 169, 171, and 173 can define geometrical transverse centerlines that are oriented along the transverse direction T. The transverse centerlines of the mounting apertures 169 can be offset toward the substrate centerline CL1 with respect to the centerlines of the mounting apertures 171 of the select pair. Alternatively, the transverse centerlines of the mounting apertures 171 of the select pair can be offset toward the centerline CL with respect to the centerlines of the mounting apertures 169. Alternatively still, the transverse centerlines of the mounting apertures 171 of the select pair can be equidistantly spaced from the centerline CL as the centerlines of the mounting apertures 169. The transverse centerlines of the select third mounting aperture 163 can be spaced closer to the centerline CL1 than it is to both the mounting apertures 169 and the select second pair of mounting apertures 171 along the longitudinal direction L.

The transverse centerline of the select mounting aperture 173 can be offset toward the substrate centerline CL1 with respect to both the centerlines of the mounting apertures 169 and the centerlines of the select pair of second mounting apertures 171. Alternatively, the transverse centerlines of the third mounting apertures 173 disposed on the substrate centerline CL1. The mounting apertures 169, 171, and 173 can be said to define a footprint of the host substrate 118, alone or in combination with the contact locations 177.

It is appreciated that the host substrate 118 defines a first surface and a second surface opposite the first surface so as to define a thickness along the transverse direction T. The host substrate 118 further defines first and second lateral sides opposite each other so as to define a width along a lateral direction A, wherein the width is greater than the thickness. The host substrate 118 further defines first and second longitudinal ends spaced from each other so as to define a length along a longitudinal direction L, wherein the length is greater than the width. The first and second pairs 171a and 171b of mounting apertures 171 can be disposed on opposite sides of the centerline CL1. The centerline CL1 can be equidistantly spaced from the first and second pairs 171a and 171b of mounting apertures 171. The mounting apertures 171 of the second pair 171b can be aligned with each other along the lateral direction A. The mounting apertures 171 of the first pair 171a can also be aligned with each other along the lateral direction A. The mounting apertures 169 can also be aligned with each other along the lateral direction A.

Respective centers of the mounting apertures 169 can be disposed between respective centers of the mounting apertures 171 of the select pair and the centerline CL1 with respect to the longitudinal direction L. The transverse centerlines of the mounting apertures 169 can be spaced closer to the centers of the mounting apertures 171 of the select pair of mounting apertures 171 than they are to the centerline CL1 along the longitudinal direction L. For instance, the centers of the mounting apertures 169 can be spaced from the centers of the mounting apertures 171 of the select pair a first distance along the longitudinal direction L, and spaced from the centerline CL1 a second distance along the longitudinal direction L. The second distance can be greater than five times the first distance. For instance, the second distance can be greater than 10 times the first distance. The mounting apertures 169 can be disposed between the mounting apertures 171 of the select pair of mounting apertures 171 with respect to the lateral direction A. The mounting apertures 171 of the select pair can be aligned with respective different ones of the mounting apertures 171 of the other pair along the longitudinal direction L.

The centerline CL1 can be equidistantly spaced from the first and second rows of contact locations 177 along the longitudinal direction L. One or both of the mounting apertures 169 and the select pair of mounting apertures 171 can be disposed between the select row of contact locations 177 and the centerline CL1 with respect to the longitudinal direction L. The other pair of mounting apertures 171 can be disposed between the other row of contact locations 177 and the centerline CL1 with respect to the longitudinal direction L. The mounting apertures 169 can have a smaller cross-sectional dimension than the mounting apertures of each of the mounting apertures 171 of the first and second pairs 171a and 171b, respectively. The mounting apertures 171 of each of the first and second pairs 171a and 171b can the same cross-sectional dimension.

The first mounting apertures 169 can be referred to as a first pair of mounting apertures of the host substrate 118 that are configured to receive mounting projections of the second electrical connector 154. The select pair of mounting apertures 171 can be referred to as a second pair of mounting apertures of the host substrate 118 that are configured to receive mounting projections of the second electrical connector 154. The other pair of mounting apertures 171 can be referred to as a third pair of mounting apertures of the host substrate 118 that are configured to receive mounting projections of the second electrical connector 154. The third pair of mounting apertures 173 can be referred to as a fourth pair of mounting apertures of the host substrate 118. In one example, the host substrate 118 has no mounting apertures configured to receive mounting projections of the second electrical connector 154 so as to secure the second electrical connector 154 to the host substrate 118 other than the first, second, third, and fourth pairs of mounting apertures. In one example, the first pair of mounting apertures of the host substrate 118 can be configured to receive respective ones of the first pair of mounting projections of the second electrical connector 154. The second pair of mounting apertures of the host substrate 118 can be configured to receive respective ones of the second pair of mounting projections of the second electrical connector 154. The third pair of mounting apertures of the host substrate 118 can be configured to receive respective ones of the third pair of mounting projections of the second electrical connector 154. The fourth pair of mounting apertures of the host substrate 118 can be configured to receive respective ones of the fourth pair of mounting projections of the second electrical connector 154.

Once the mounting projections of the second electrical connector 154 have been received in the mounting apertures of the host substrate 118, the mounting ends of the electrical contacts 155 can be soldered to respective ones of the contact locations 177, which can be configured as contact pads. Alternatively, the mounting ends of the electrical contacts can be configured as J-shaped leads that are compressed against contact pads that are defined by the contact locations 177. Alternatively still, the mounting ends of the electrical contacts can be configured as press-fit tails that are press fit into vias of the host substrate 118 that are defined by the contact locations 177.

Referring to FIG. 11A, the interconnect system 100 can include the interconnect module 102 and the host module 104 as described above. The host module 104 can include the host substrate 118. Alternatively or additionally, the host module 104 can include at least one host electrical connector. The at least one host electrical connector can include the first electrical connector 152 and the second electrical connector 154. The first and second electrical connectors 152 and 154 can be configured to be mounted to the host substrate 118. Alternatively, the first and second electrical connectors 152 and 154 can be mounted to the host substrate 118.

The first electrical connector 152 includes a first electrically insulative connector housing 148 and a first plurality of electrical contacts 150 that are supported by the connector housing. For instance, the first plurality of electrical contacts 150 can be arranged in rows that are oriented along the lateral direction A. The first connector housing 148 defines a receptacle that is configured to receive the first end of the module substrate 113 so as to mate the interconnect module 102 with the first electrical connector 152. In particular, the first end of the module substrate 113 is configured to be inserted into the receptacle of the first connector housing 148 in the forward direction so as to cause electrically conductive lands of the module substrate 113 to mate with respective ones of the first plurality of electrical contacts 150 of the first electrical connector 152.

The second electrical connector 154 includes a second electrically insulative connector housing 153 and a second plurality of electrical contacts 155 that are supported by the connector housing. For instance, the second plurality of electrical contacts 155 can be arranged in at least one row that is oriented along the lateral direction A. The second plurality of electrical contacts 155 can extend out of the second connector housing 153 along the transverse direction away from the host substrate 118. Thus, electrically conductive lands on a lower surface of the second end of the module substrate 113 can be brought down onto the respective ones of the second plurality of electrical contacts 155, so as to mate the interconnect module 102 with the second electrical connector 154.

The interconnect system 100 can include an anti-backout latch 160 designed to prevent the interconnect module 102 from being inadvertently unmated from the host module 104. The latch 160 can include a support member 162 that is configured to be placed in mechanical communication with the interconnect module 102, and at least one finger 164 that extends out or perpendicularly from the support member 162 and is configured to be placed in mechanical communication with the host module 104. For instance, the at least one finger 164 can extend down from the support member 162 along the transverse direction T. When the interconnect module 102 is mated with the at least one electrical connector of the host module 104, the latch 160 can be movable between a disengaged position and an engaged position. In particular, the latch 160 can be translatable along the transverse direction T between the disengaged position and the engaged position. For instance, the latch 160 can be translatable in the downward direction to move the latch 160 from the disengaged position to the engaged position, and in the upward direction to move the latch 160 from the engaged position to the disengaged position. When the latch 160 is in the engaged position, a first mechanical interference is defined between the latch 160 and the interconnect module 102 that limits rearward movement of the interconnect module 102 with respect to the latch 160 in the rearward direction. The first mechanical interference can include an abutment between the anti-backout latch 160 and the interconnect module 102.

Further, when the latch 160 is in the engaged position, a second mechanical interference is defined between the finger 164 and the host module 104 limits rearward movement of the latch 160 respect to the at least one electrical connector of the host module 104. The second mechanical interference can include an abutment between the anti-backout latch 160 and the host module 104. The limited rearward movements can prevent the interconnect module 102 from moving in the rearward direction with respect to the at least one electrical connector of the host module 104 a distance that would be sufficient to unmate the interconnect module 102 from the at least one electrical connector of the host module 104. For instance, the first and second mechanical interferences can substantially prevent rearward movement of the interconnect module 102 with respect to the anti-backout latch 160, and of the latch 160 with respect to the at least one electrical connector of the host module 104, respectively. When the latch 160 is in the disengaged position, at least the second mechanical interference is removed, such that the interconnect module 102 is movable in the rearward direction with respect to the at least one electrical connector of the host module 104 a sufficient distance so as to unmate the interconnect module 102 from the at least one electrical connector of the host module 104.

The latch 160 can include a pair of first and second fingers 164 that may be spaced apart from each other, oriented parallel to one another, and extend from the support member 162. Thus, the support member 162 can be connected between the fingers 164. For instance, the support member 162 can be connected between the fingers 164 along the lateral direction A. The support member 162 and the fingers 164 can be monolithic with each other. Alternatively, the support member 162 and fingers 164 can be attached to each other in any suitable manner as desired. The support member 162 can be configured as an upper cross-bar that is elongate along the lateral direction A. The fingers 164 can extend down from laterally opposed ends of the support member 162. For instance, the fingers 164 can be elongate along the transverse direction T. The interconnect module 102 can include a recess 166 that extends into the upper end of the module housing 146. The recess 166 can extend down into the upper end of the module housing 146 along the transverse direction T. The recess can extend through the upper end of the module housing 146 along the lateral direction A. The recess 166 can be sized to receive the support member 162. The interconnect module 102 can further include at least one channel 168, such as a pair of channels 168, that extends from the recess 166 through the module housing 146 along the transverse direction T. The host module 104 can similarly define channels 170 (FIGS. 11B and 11E) that each extend at least into or through respective laterally outer ends of the second connector housing 153. The channels 170 can be aligned with the at least one channel 168 (FIGS. 11A and 11B) along the transverse direction T.

During operation, the latch 160 can be translatable between the engaged position (FIG. 11B) and the disengaged position (FIG. 11A). For instance, the latch 160 can be translatable between the engaged position and the disengaged position along a direction angularly offset with respect to the rearward direction. The angularly offset direction can be the transverse direction T. In particular, as shown in FIGS. 11A and 11B, the latch 160 can be inserted into the interconnect system 100 (FIG. 11A) along the transverse direction T such that 1) the support member 162 seats in the recess 166, and the fingers 164 extend through the at least one channel 168 and the channels 170, respectively. Abutment between the support member 162 and the module housing 146 can define the first mechanical interference. Abutment between the fingers 164 and the second connector housing 153 can define the second mechanical interference. In particular, abutment between the fingers and laterally opposed ends of the second connector housing 153 can define the second mechanical interference. As will be described in more detail below, the laterally opposed ends of the connector housing are configured to attach to a securement member that, in turn, is configured to attach to the host substrate 118. In particular, the laterally opposed ends of the connector housing are configured to be received by respective securement members.

As shown in FIGS. 11A-11C, the support member 162 can further define at least one recess 163 that is configured to receive a complementary projection 165 (FIGS. 11A and 11B) of the module housing 146 when the support member 162 is seated in the recess 166. The at least one recess 163 can extend into the front end of the support member 162 in the rearward direction. For instance, the support member 162 can include a pair of recesses 163 that are spaced from each other along the lateral direction A. The recesses 163 can extend through the support member 162 along the transverse direction. The recesses 163 and the complementary projections 165 can have substantially the same size and shape, such that when the projections 165 interlock in the recesses 163, interference between the support member 162 and the module housing 146 prevent relative movement between the latch 160 and the interconnect module 102 (FIG. 11A) along the lateral direction A.

As shown in FIGS. 11A and 11B, the latch 160 can be removed from the host module 104 in the upward direction along the transverse direction T, thereby removing the second interference. In particular, the latch fingers 164 can be removed from the channels 170 so as to remove the second interference. Thus, the latch 160 does not prevent the interconnect module 102 from translating relative to the host module 104 in the rearward direction a sufficient distance so as to unmate the interconnect module 102 from at least one or both of the first electrical connector 152 and the second electrical connector 154. The latch 160 can further translated in the upward direction so as to remove the latch 160 from the interconnect module 102, thereby removing the first mechanical interference.

Referring now also to FIGS. 11A-11E, and as described above, the interconnect system 100 (FIG. 11A) can further include at least one securement member configured to be coupled to one of the first and second electrical connectors 152 and 154, and further configured to be secured to the host substrate 118 (FIG. 11A). Thus, the at least one securement member 172, 183 configured to attach a corresponding at least one of the first and second electrical connectors 152 and 154 to the host substrate 118. The securement member can include a securement tab that is configured to be secured in an aperture of the underlying host substrate 118. For instance, the securement tab can be welded in the aperture of the host substrate 118, which can be configured as a through hole plated with a metallic material. Alternatively, the securement tabs of all securement members described herein can be press-fit, latched, fastened using one or more fasteners, or secured in the aperture of the host substrate 118 or otherwise secured to the host substrate 118 in any suitable manner as desired. The securement member is further configured to attach to the corresponding connector housing, thereby further securing the connector housing to the underlying host substrate 118. It will be appreciated that the securement members are not electrical contacts, and are sized and shaped differently than the electrical contacts of the corresponding electrical connector. For instance, the securement tab can be thicker along a plane oriented in the lateral and longitudinal directions than the mounting ends of the electrical contacts that are mounted to the host substrate 118.

Figure 11D:
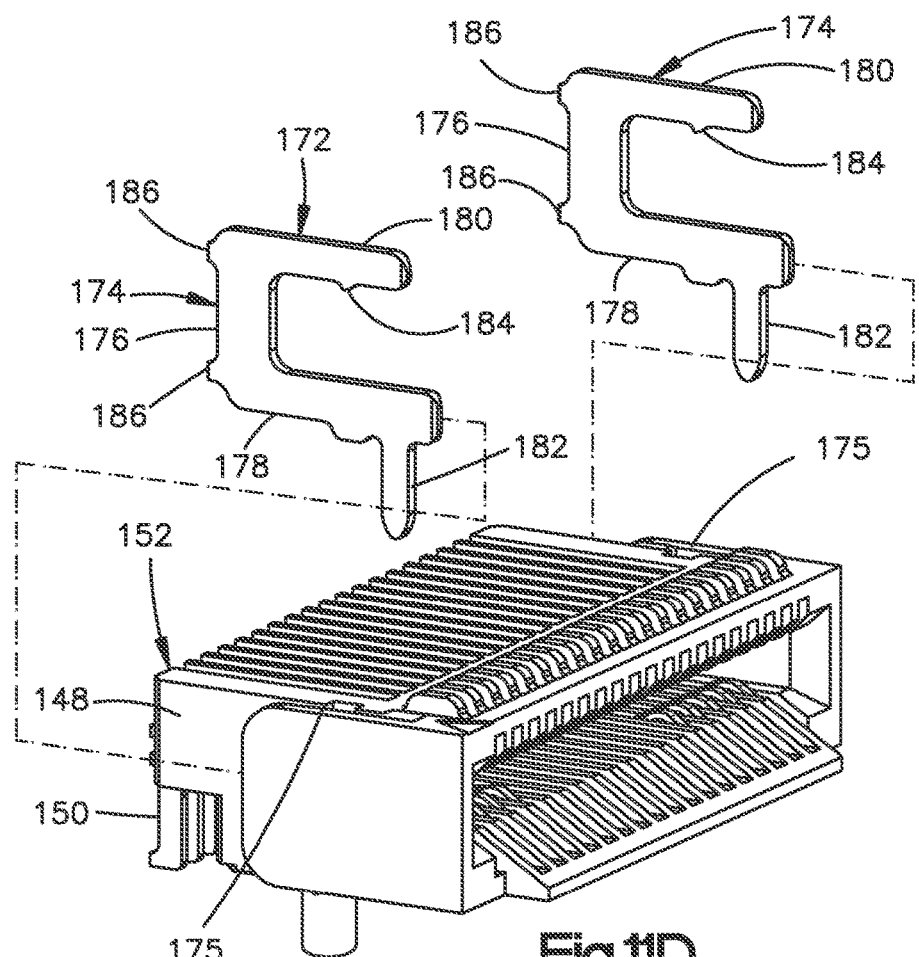
FIG. 11D is an exploded perspective view of a first electrical connector of the host module showing securement tabs configured to be secured to an underlying substrate.

As illustrated in FIG. 11D, the host module 104 (FIG. 11A), and thus the interconnect system 100 (FIG. 11A), can include a securement member 172 that is configured to further secure the first electrical connector 152 to the host substrate 118 (FIG. 11A). For instance, the securement member 172 can include a securement body 174 having an upstanding wall 176, and a lower wall 178 that extends from a lower end of the upstanding wall 176 in the rearward direction. The securement body 174 can further include an upper wall 180 that extends from an upper end of the upstanding wall 176 in the rearward direction. The upper wall 180 can be opposite the lower wall 178, and can be spaced from the lower wall 178 along the transverse direction T so as to define an opening therebetween. The lower wall 178 can extend to a location offset with respect to the upper wall 180 in the rearward direction. The upstanding wall 176, the upper wall 180, and the lower wall 178 can all be coplanar with each other along a plane defined by the transverse direction T and the longitudinal direction L. Further, the upstanding wall 176, the upper wall 180, and the lower wall 178 can all dimensioned greater in the plane than in the lateral direction A that is perpendicular to the plane.

The securement member 172 can further include a securement tab 182 that extends down from the securement body 174. For instance, the securement tab 182 can extend from the lower wall 178. The securement tab 182 is configured to be secured in an aperture of the underlying host substrate 118. For instance, the securement tab 182 can be welded in the aperture of the host substrate 118. The securement member 172 can be configured to be received in a slot 175 of the first connector housing 148 so as to attach the securement member 172 to the first electrical connector 152. For instance, the upstanding wall 176 is configured to be inserted into the slot 175.

The securement body 174 can include a retention bump 184 that is configured to engage the first connector housing 148 so as to secure the securement member 172 to the first electrical connector 152. For instance, the retention bump 184 can extend from the upper wall 180. In one example, the retention bump 184 can extend from the upper wall 180 toward the lower wall 178. Thus, the retention bump 184 can extend from the securement body 174 into the opening. The securement body 174 can further include at least one projection 186 that extends from the upstanding wall 176 in the forward direction. Thus, the projection 186 can extend away from the upstanding wall 176 in a direction away from the opening of the securement member 172. The projection 186 can lie in the same plane defined by the transverse direction T and the longitudinal direction L. In one example, the securement body 174 can include first and second ones of the projection 186 spaced from each other along the transverse direction.

It should be appreciated that the securement member 172 can include any number of the securement bodies 174 as desired. For instance, the securement member 172 can include a single securement body 174 configured to be coupled between the host substrate 118 and the first electrical connector 152 in the manner described above. Alternatively, the securement member 172 can include first and second securement bodies 174 that are each configured to be coupled between the host substrate 118 and the first electrical connector 152 in the manner described above. For instance, the first and second securement bodies 174 can attach to laterally outer ends of the first connector housing 148. In one example, the first plurality of electrical contacts 150 can be disposed between the first and second securement bodies 174.

Figure 11E:
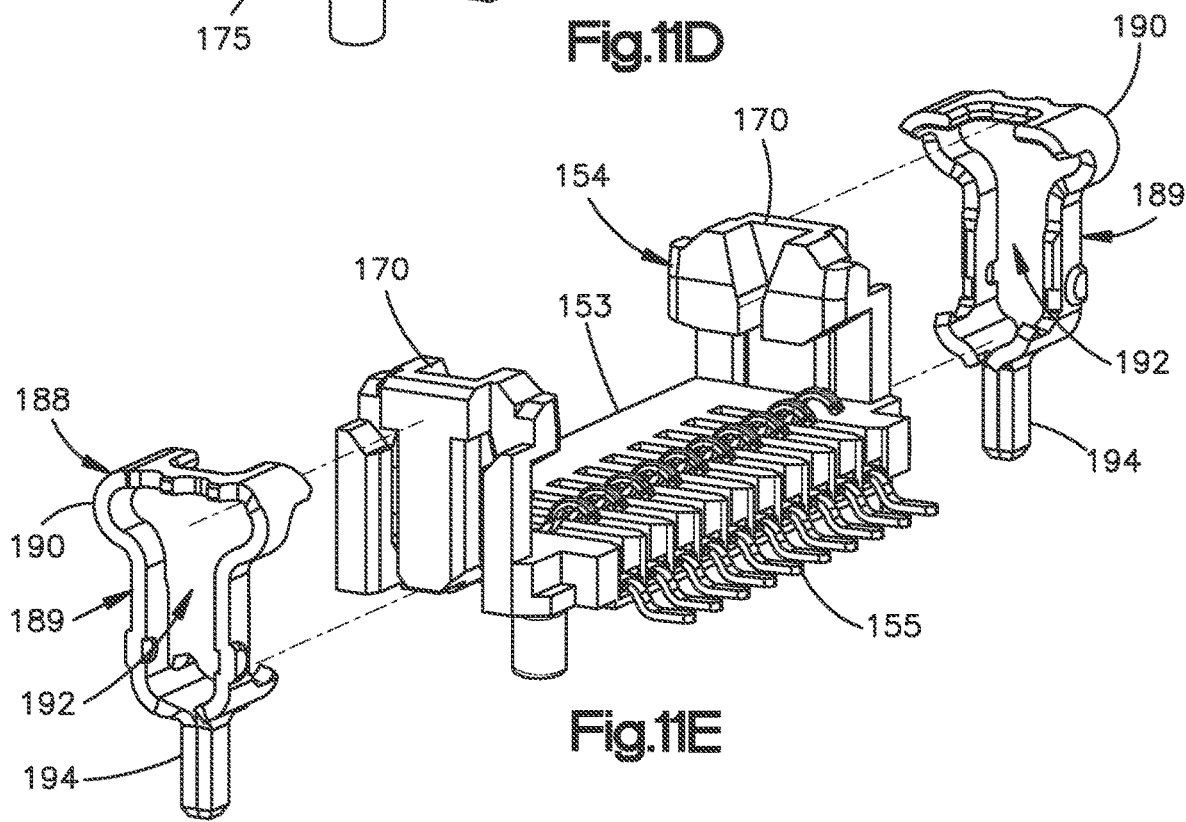
FIG. 11E is an exploded perspective view of a second electrical connector of the host module showing securement tabs configured to be secured to an underlying substrate.

Referring now to FIG. 11E, the host module 104 (FIG. 11A), and thus the interconnect system 100 (FIG. 11A), can include includes a second securement member 188 that is configured to further secure the second electrical connector 154 to the host substrate 118. In this regard, the securement member 172 configured to secure the first electrical connector 152 to the host substrate 118 can be referred to as a first securement member. The second securement member 188 configured to secure the second electrical connector 154 to the host substrate 118 can be referred to as a second securement member.

The second securement member 188 can include a second securement body 189 having an upper portion 190 that is configured to surround a portion of the second connector housing 153, so as to attach the second securement member 188 to the second electrical connector 154. In this regard, the upper portion 190 can be referred to as a saddle. For instance, the second securement member 188 can define an opening 192 that extends at least into or through the upper portion 190 and is sized to receive a portion of the second connector housing 153. The opening 192 can, for instance, extend into or through the upper portion 190 along the lateral direction A. For instance, the opening 192 can have a shape that is complementary to the portion of the second connector housing 153.

The second securement body 189 can further include a securement tab 194 that extends out from the upper portion 190. The securement tab 194 can, for instance, extend down from the upper portion 190 along the transverse direction T. The second securement member 188 is sized and shaped different than the second plurality of electrical contacts 155. For instance, when the second securement member 188 is attached to the second connector housing 153, the upper portion 190 is upwardly offset from the respective mating ends of the electrical contacts 155.

It should be appreciated that the second securement member 188 can include any number of the second securement bodies 189 as desired. For instance, the second securement member 188 can include a single securement body 189 configured be coupled between the host substrate 118 and the second electrical connector 154 in the manner described above. Alternatively, the second securement member 188 can include first and second securement bodies 189 that are each configured to be coupled between the host substrate 118 and the second electrical connector 154 in the manner described above. For instance, the first and second securement bodies 189 can attach to laterally outer ends of the second connector housing 153. In one example, the second plurality of electrical contacts 155 can be disposed between the first and second securement bodies 189.

Referring now to FIGS. 12A-12B, the interconnect system 100 (FIG. 12A) can include an anti-backout latch 230 that is configured to attach to the interconnect module 102 (FIGS. 12A and 12B). The interconnect module 102 can include a heat sink 122 that is supported by the module housing 146. In particular, the heat sink 122 can be secured to the module housing 146. Alternatively, the heat sink 122 can be monolithic with the module housing 146. Thus, it can be said that the heat sink 122 can define the module housing 146. It can also be said that the module housing 146 defines the heat sink 122. The heat sink 122 can include a base 233 and a plurality of upstanding fins 232 that extend from a base 233 (FIG. 12A). The fins 232 can be spaced from each other so as to define a plurality of recesses 234 disposed between respective adjacent ones of the fins 232. In particular, the fins 232 can be spaced from each other along the lateral direction A. The fins 232 can extend along respective planes that are oriented along the transverse direction T and the longitudinal direction L. In one example, the fins 217 can be plates as shown, although embodiments of the disclosure are not so limited. Thus, it can be said that the recesses 234 extend down from an upper surface of the heat sink 122 to a location between adjacent ones of the fins 232. A bottom end of the recesses 234 can be defined by the base 233 (FIG. 12A). The fins 232 can include first and second outermost ones of the fins 232 that define outer surfaces 236 that face away from the center of the module housing 146. The outer surfaces 236 can face away from the center of the heat sink 122 along the lateral direction A. Further, the outer surfaces 236 can face away from each other along the lateral direction A.

The heat sink 122 can define a latch-receiving recess 237 that is configured to receive the latch 230. In particular, the latch-receiving recess 237 can include a pair of channels 240 that extend into the heat sink 122 along the lateral direction, and a notch 238 that extends down into the upper end of the heat sink 122 along the transverse direction T. In particular, the notch 238 can extend into the upper surfaces of the fins 232. The notch 238 can further extend through the fins 232 along the lateral direction A. Further, the channels 240 can extend into respective ones of a pair of opposed walls of the heat sink 122. The opposed walls can be laterally opposed walls. For instance, the opposed walls can be defined by the outermost ones of the fins 232 along the lateral direction A. The channels 240 can extend into the laterally outer surfaces of the fins 232 along the lateral direction A. At least a portion up to an entirety of each of the channels 240 does not extend through the respective one of the fins 232 along the lateral direction. The channels 240 can extend through the fins 232 along the transverse direction T. The channels 240 and the notch 238 can be aligned with each other along a plane that is defined by the lateral direction A and the transverse direction T.

As shown in FIGS. 12A-12C, the latch 230 can include a support member 242 that is configured to be placed in mechanical communication with the interconnect module 102 (FIG. 12A). As shown in FIGS. 12A and 12B, the support member 242 is sized to seat against the upper ends of the fins 232 in the notch 238. The latch 230 can further include a pair of fingers 244 that extend out from the support member 242 and are configured to be placed in mechanical communication with the host module 104 (FIG. 12A). For instance, the fingers 244 can extend down from the support member 242 along the transverse direction T. The fingers 244 can be spaced from each other along the lateral direction A. The fingers 244 can be oriented along respective planes defined by the longitudinal direction L and the transverse direction T. Thus, each of the fingers 244 can be longer along the longitudinal direction L than it is wide along the lateral direction A. Further, each of the fingers 244 is taller along the transverse direction T than it is long along the longitudinal direction L. The fingers 244 can be resiliently supported by the support member 242, so as to define a spring force toward each other when biased away from each other. Further, the fingers 244 can each define distal ends that define projections 246. The projection 246 can be oriented so as to face each other. In particular, the projections 246 can face each other along the lateral direction A. As will be described, the fingers 244 can be resilient, such that the projections 246 are configured as clips that releasably secure the latch 230 to the heat sink 122, and in particular to the base 233 of the heat sink 122, when the latch 230 is in the engaged position. Further, the projections 246 can releasably secure the latch 230 to the heat sink 122 when the latch 230 is disposed in the channels 240 in the disengaged position.

As shown in FIG. 12A, when the interconnect module 102 is mated with at least one electrical connector of the host module 104, the latch 230 can be movable between the disengaged position and the engaged position (FIG. 12B). For instance, the latch 230 can be translatable along the transverse direction between the disengaged position and the engaged position. For instance, the latch 230 can be translatable in the downward direction to move the latch 230 from the disengaged position to the engaged position, and in the upward direction to move the latch 230 from the engaged position to the disengaged position. When the latch 230 is in the engaged position, a first mechanical interference is defined between the latch 230 and the interconnect module 102 that limits rearward movement of the interconnect module 102 with respect to the latch 230 in the rearward direction. The first mechanical interference can include an abutment between the anti-backout latch 230 and the interconnect module 102. In particular, the fingers 244 are configured to seat in respective ones of the channels 240, such that forward ends of the fins 232 that partially define the channels 240 also at least partially define the first mechanical interference. Further, the support member 242 is sized to be received in the notch 238, such that a forward end of the upper end of the module housing 146 that partially defines the notch 238 and the support member 242 also at least partially define the first mechanical interference.

The latch 230 and the heat sink 122 can include complementary locking members that engage each other so as to releasably lock the latch 230 in the engaged position. For instance, the latch 230 can include a locking projection 227 that extends from one or both of the fingers 244 toward the other of the fingers 244 along the lateral direction. The heat sink 122 can define a complementary locking recess 229 that is sized and configured to receive the locking projection 227 when the latch 230 is in the engaged position. The locking recess 229 can extend into or through the heat sink 122. Alternatively, the heat sink 122 can include the locking projection, and the latch 230 can include the locking recess. Further, the locking projection can extend out from one of the heat sink 122 and the latch 230 along the longitudinal direction L, and the locking recess can extend into or through the other of the heat sink 122 and the latch 230 along the longitudinal direction L (see FIG. 3L). Alternatively or additionally, the locking projection and the locking recess can be configured to engage each other when the latch 230 is in the disengaged position to prevent inadvertent movement of the latch 230 to the engaged position. The locking projection can be removed from the locking recess when it is desired to remove the latch 230 from the respective disengaged position or the engaged position. Thus, it can be said that one of the latch 230 and the heat sink 122 can include a locking projection, and the other of the latch 230 and the heat sink 122 can include a locking recess that receives the locking projection, thereby maintaining the latch 230 in at least one of the engaged position and the disengaged position. Alternatively, the latch 230 can be devoid of the respective locking member (see FIG. 12C).

Further, when the latch 230 is in the engaged position as shown in FIG. 12B, a second mechanical interference is defined between the fingers 244 and the host module 104 that limits rearward movement of the latch 230 with respect to at least one electrical connector of the host module 104. The second mechanical interference can include an abutment between the anti-backout latch 230 and the host module 104. The limited rearward movements can prevent the interconnect module 102 from moving in the rearward direction with respect to the at least one electrical connector of the host module 104 a distance that would be sufficient to unmate the interconnect module 102 (FIG. 12A) from the at least one electrical connector of the host module 104. For instance, the first and second mechanical interferences can substantially prevent rearward movement of the interconnect module 102 with respect to the anti-backout latch 230, and of the latch 230 with respect to the at least one electrical connector of the host module 104, respectively. In one example, the second mechanical interference can be defined by the fingers 244 and the second electrical connector 154. In particular, when the latch 230 is in the engaged position, the fingers 244 extend to a location adjacent the second electrical connector 154 in the forward direction. In particular, the fingers 244 can abut the second electrical connector 154, such as the second connector housing 153.

As described above, the fingers 244 can each define projections 246. The projections 246 can be configured as clips that secure the latch 230 to the module housing 146, and in particular to the heat sink 122, when the latch is in the engaged position. In particular, as the latch 230 is translated along the transverse direction T to the engaged position, the fingers 244 are configured to resiliently move away from each other as the projections 246 slide along the surfaces of the fins 232 that define the channels 240. The projections 246 ride along the channels until the projections 246 slide past the surfaces of the fins 232 and the base 233 in the downward direction. The fingers 244 then move toward each other along the lateral direction such that at least a portion of the projections 246 are aligned with the module housing 146 along the transverse direction. Thus, mechanical interference between the projections 246 and the module housing 146 resists movement of the latch 230 from the engaged position to the disengaged position. The mechanical interference between the projections 246 and the module housing 146 can be overcome by a first force when the latch 230 is moved upward from the engaged position to the disengaged position. Further, the projections 246 can ride along the channels until the projections 246 ride into respective pockets 235 that are disposed in the channels at a location spaced upward from the base 233 when the latch 230 is in the disengaged position. Interference between the projections 246 and the heat sink 122 when the projections 246 are disposed in the pockets 235 can resist movement of the latch 230 from the disengaged position to the engaged position. The mechanical interference can be overcome by a second force when the latch is moved down from the disengaged position to the engaged position. In one example, the first and second forces can be substantially equal (for instance 10% of each other). In another example, the first force can be greater than the second force (for instance, greater than 10% of the second force). In still another example, the second force can be greater than the first force (for instance, greater than 10% of the second force). In still another example, one of the first and second forces can be directed along the transverse direction T. Alternatively or additionally, the first force can include a separation of the fingers 244 away from the heat sink (and away from each other) along the lateral direction A so as to remove the mechanical interference (see projection 227 and recess 229). Alternatively or additionally still, the second force can include a separation of the fingers 244 away from the heat sink (and away from each other) along the lateral direction A so as to remove the mechanical interference (see projection 227 and recess 229).

As shown in FIG. 12A, when the latch 230 is in the disengaged position, at least the second mechanical interference is removed, such that the interconnect module 102 is movable in the rearward direction with respect to the at least one electrical connector of the host module 104 a sufficient distance so as to unmate the interconnect module 102 from the at least one electrical connector of the host module 104. When the latch 230 is in the disengaged position, the first mechanical interference can also be removed.

Figure 13A:
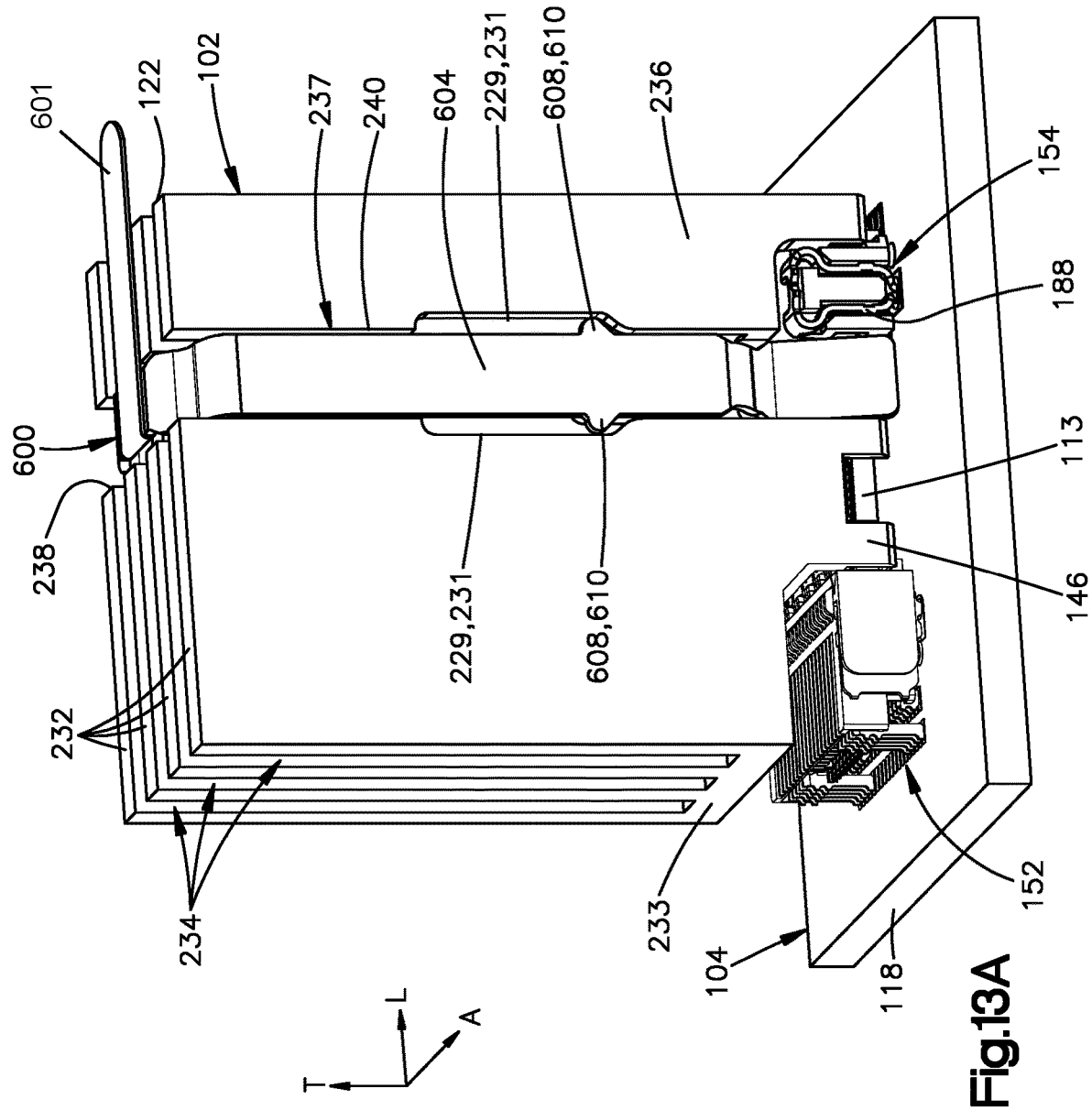
FIG. 13A is a perspective view of an interconnect system including an interconnect module, a host module, and an anti-backout latch constructed in accordance with another embodiment shown in an engaged position.
Figure 13B:
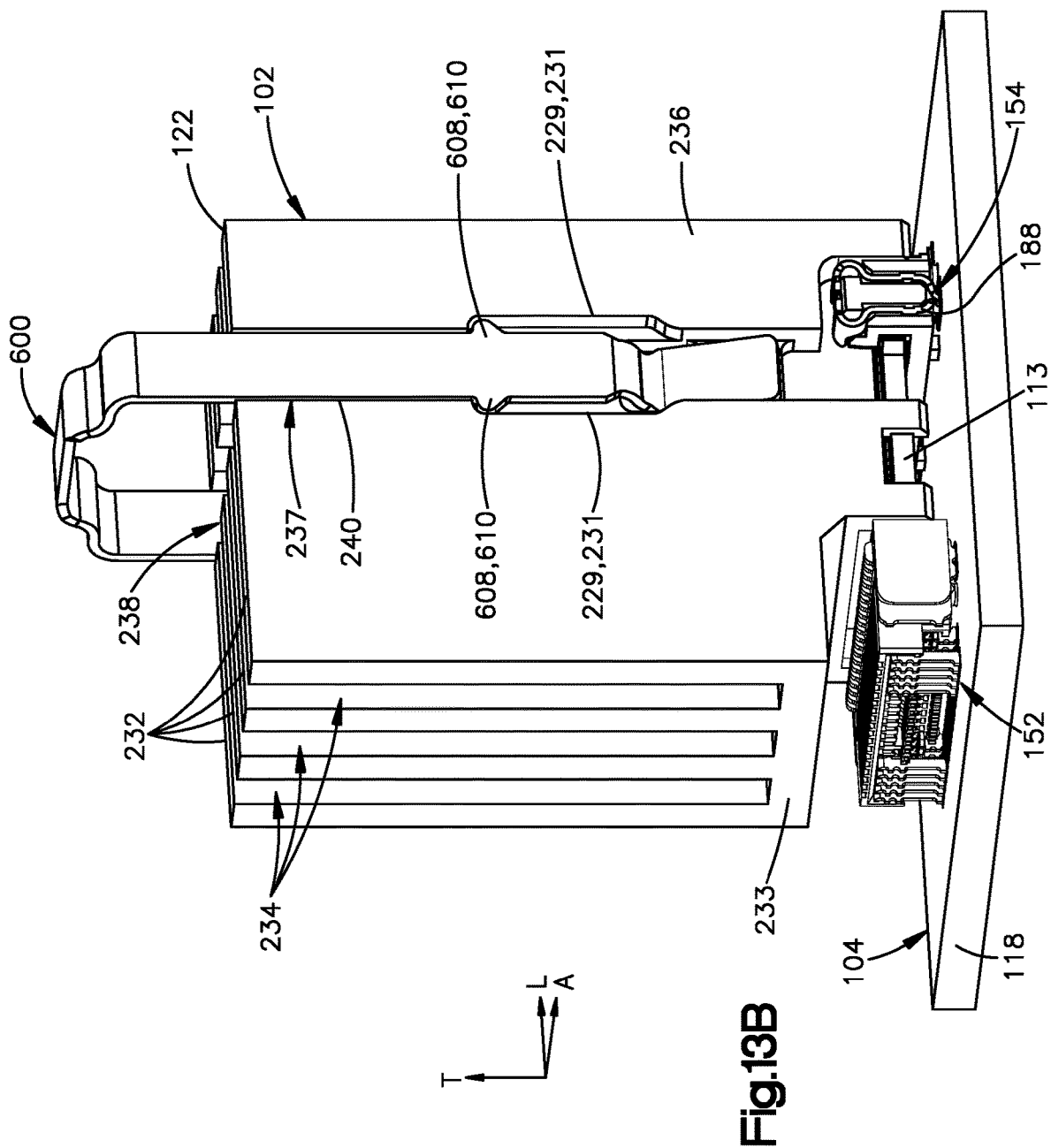
FIG. 13B is a perspective view of the interconnect system illustrated in FIG. 13A, showing the anti-backout latch in a disengaged position.

Referring now to FIGS. 13A-13F, the interconnect system 100 (FIGS. 13A-13C) can include an anti-backout latch 600 that is configured to attach to the interconnect module 102. The interconnect module 102 can include a heat sink 122 that is supported by at least one of the module housing 146 and the interconnect substrate 113. In particular, the heat sink 122 can be secured to at least one of the module housing 146 and the interconnect substrate 113. Alternatively, the heat sink 122 can be monolithic with the module housing 146. Thus, it can be said that the heat sink 122 can define the module housing 146. It can also be said that the module housing 146 defines the heat sink 122. The heat sink 122 can include a base 233 and a plurality of upstanding fins 232 that extend from a base 233 (FIGS. 13A-13C). The fins 232 can be spaced from each other so as to define a plurality of recesses 234 disposed between respective adjacent ones of the fins 232. In particular, the fins 232 can be spaced from each other along the lateral direction A. The fins 232 can extend along respective planes that are oriented along the transverse direction T and the longitudinal direction L. In one example, the fins 217 can be plates as shown, although embodiments of the disclosure are not so limited. Thus, it can be said that the recesses 234 extend down from an upper surface of the heat sink 122 to a location between adjacent ones of the fins 232. A bottom end of the recesses 234 can be defined by the base 233 (FIGS. 13A-13C). The fins 232 can include first and second outermost ones of the fins 232 that define outer surfaces 236 that face away from the center of the module housing 146. The outer surfaces 236 can face away from the center of the heat sink 122 along the lateral direction A. Further, the outer surfaces 236 can face away from each other along the lateral direction A.

The heat sink 122 can define a latch-receiving recess 237 that is configured to receive the latch 600. In particular, the latch-receiving recess 237 can include a pair of channels 240 that extend into the heat sink 122 along the lateral direction, and a notch 238 that extends down into the upper end of the heat sink 122 along the transverse direction T. In particular, the notch 238 can extend into the upper surfaces of the fins 232. The notch 238 can further extend through the fins 232 along the lateral direction A. Further, the channels 240 can extend into respective ones of a pair of opposed walls of the heat sink 122. The opposed walls can be laterally opposed walls. For instance, the opposed walls can be defined by the outermost ones of the fins 232 along the lateral direction A. The channels 240 can extend into the laterally outer surfaces of the fins 232 along the lateral direction A. At least a portion up to an entirety of each of the channels 240 does not extend through the respective one of the fins 232 along the lateral direction. The channels 240 can extend through the fins 232 along the transverse direction T. The channels 240 and the notch 238 can be aligned with each other along a plane that is defined by the lateral direction A and the transverse direction T.

The anti-backout latch 600 can be designed to prevent the interconnect module 102 from being inadvertently unmated from the host module 104. When the interconnect module 102 is mated with the at least one electrical connector of the host module 104, the latch 600 can be movable between a disengaged position and an engaged position. In particular, the latch 600 can be translatable along the transverse direction T between the disengaged position and the engaged position. For instance, the latch 600 can be translatable in the downward direction to move the latch 600 from the disengaged position to the engaged position, and in the upward direction to move the latch 600 from the engaged position to the disengaged position. The latch 600 can include a pull tab 601 that can be pulled to move the latch 600 from the engaged position to the disengaged position. When the latch 600 is in the engaged position, a first mechanical interference is defined between the latch 600 and the interconnect module 102 that limits rearward movement of the interconnect module 102 with respect to the latch 600 in the rearward direction. The first mechanical interference can include an abutment between the anti-backout latch 600 and the interconnect module 102.

As shown in FIGS. 13A-13F, the latch 600 can include a support member 602 that is configured to be placed in mechanical communication with the interconnect module 102 (FIGS. 13A-13C). The pull tab 601 can be attached to the support member 602. As shown in FIGS. 13A-13C, the support member 602 is sized to seat against the upper ends of the fins 232 in the notch 238. The support member 602 can have opposed end portions 602a and a middle portion 602b between the opposed end portions. The middle portion 602b can be offset from the end portions 602a with respect to the transverse direction T. For example, the middle portion 602b can be outwardly spaced relative to the end portions 602a. However, it will be understood that, in alternative embodiments, the support member 602 can have any other suitable configuration. For example, the middle portion 602b can be aligned with one or both of the end portions 602a with respect to the transverse direction T.

At least a portion of the support member 602 can be configured to seat against the upper ends of at least some of the fins 232 when the latch 600 is in the engaged position. For example, as shown in FIG. 13C, each end portion 602a can be configured to seat against the upper end of each of at least one fin 232, such as an outermost one of the fins 232. Moreover, the middle portion 602b can be spaced from one or more fins 232, such as a centermost one or ones of the fins 232 with respect to the transverse direction T.

The latch 600 can further include a pair of fingers 604 that extend out from the support member 602 and are configured to be placed in mechanical communication with the host module 104 (FIGS. 13A-13C). For instance, the fingers 604 can extend down from the end portions 602a of the support member 602 along the transverse direction T. The fingers 604 can be spaced from each other along the lateral direction A so as to define a space therebetween that is configured to receive at least a portion of the module housing 146. The fingers 604 can be oriented along respective planes defined by the longitudinal direction L and the transverse direction T. Thus, each of the fingers 604 can be longer along the longitudinal direction L than it is wide along the lateral direction A. Further, each of the fingers 604 is taller along the transverse direction T than it is long along the longitudinal direction L. The fingers 604 can be resiliently supported by the support member 602, so as to define a spring force toward each other when biased away from each other.

The latch 600 and the heat sink 122 can include complementary engagement features that engage each other. The complementary engagement features can engage one another so as to releasably secure the latch 600 to the heat sink 122 and restrict removal of the latch 600 from the heat sink 122. For instance, each of at least one of the fingers 604 can define an engagement feature that engages a complementary engagement feature of the heat sink 122 when the latch 600 is in the engaged position. Thus, when engaged, the complementary engagement features can define an interference that resists movement of the latch 600 from the engaged position to the disengaged position.

The at least one engagement feature of the latch 600 can define an engagement projection 606. Each of the at least one engagement projection 606 can be defined by one of the fingers 604. Each engagement projection 606 can extend inwardly towards the other finger 604. In some examples, each finger 604 can define an engagement projection 606, and the projections 606 can be oriented so as to face each other. In particular, the engagement projections 606 can face each other along the lateral direction A. Thus, the engagement projections 606 can project inwardly towards one another. As a result, a distance between the engagement projections 606 along the lateral direction A can be smaller than a distance between the fingers 604 along the lateral direction A at another location. As will be described, the fingers 604 can be resilient, such that the engagement projections 606 are configured as clips that releasably secure the latch 600 to the heat sink 122, and in particular to the base 233 of the heat sink 122, when the latch 600 is in the engaged position. Further, the engagement projections 606 can releasably secure the latch 600 to the heat sink 122 when the latch 600 is disposed in the channels 240 in the disengaged position.

In alternative embodiments, the heat sink 122 can include the at least one engagement projection, and the latch 600 can include the at least one engagement locking recess. Further, the engagement projection can extend out from one of the heat sink 122 and the latch 600 along the longitudinal direction L, and the engagement recess can extend into or through the other of the heat sink 122 and the latch 600 along the longitudinal direction L (see FIG. 3L). Alternatively or additionally, the engagement projection and the engagement recess can be configured to engage each other when the latch 600 is in the disengaged position to prevent inadvertent movement of the latch 600 to the engaged position. The engagement projection can be removed from the engagement recess when it is desired to remove the latch 600 from the respective disengaged position or the engaged position. Thus, it can be said that one of the latch 600 and the heat sink 122 can include an engagement projection, and the other of the latch 600 and the heat sink 122 can include an engagement recess that receives the engagement projection, thereby maintaining the latch 600 in at least one of the engaged position and the disengaged position. Alternatively, the latch 600 can be devoid of the respective engagement features.

The latch 600 and the heat sink 122 can include complementary securement features that engage each other so as to releasably secure the latch 600 to the heat sink 122. The complementary securement features restrict removal of the latch 600 from the heat sink 122, while allowing the latch 600 to be moved between the engaged position and disengaged position. The latch 600 can include at least one securement feature 608 that defines a securement projection 610. Each securement projection 610 can extend from a respective one of the fingers 604. In some examples, each securement projection 610 can extend from a respective one of the fingers 604 along the longitudinal direction L. Further, in some examples, the latch 600 can include a pair of securement projections 610 that extend from one of the fingers 604 and away from one another along the longitudinal direction L. Yet further, in some examples, the latch 600 can include at least one securement projection 610 or a pair of securement projections 610 for each of the fingers 604. In alternative examples, each securement projection 610 can extend inward from one of the fingers 604 along the lateral direction A as illustrated by the projections 227 in FIG. 12A.

The heat sink 122 can define at least one complementary securement feature 231 that defines a securement recess 229 that is sized and configured to receive a respective one of the projections 610 when the latch 600 is secured to the heat sink 122. Each securement recess 229 can extend into or through the heat sink 122. In some examples, each securement recess 229 can extend from one of the channels 240 into a respective one of the fins 232 along the longitudinal direction L. Further, in some examples, the heat sink 122 can define a pair of securement recesses 229 that extend from one of the channels 240 and away from one another along the longitudinal direction L. Yet further, in some examples, the heat sink 122 can define at least one securement recess 229 or a pair of securement recesses 229 for each of the channels 240. In alternative embodiments, each securement recess 229 can extend inward from one of the channels 240 along the lateral direction A as illustrated by the recesses 229 in FIG. 12A. Each corresponding securement projection 610 and securement recess 229 can be sized such that the securement projection 610 is translatable within the securement recess 229 along the transverse direction T to allow the latch 600 to move between the engaged and disengaged positions. Each securement recess 229 can be sized to limit upward movement of the corresponding projection 610 so as to prevent the latch 600 from being removed from the heat sink 122. Additionally or alternatively, each securement recess 229 can be sized to limit downward movement of the corresponding projection 610 so as to prevent the latch 600 from being moved beyond the engaged position.

In alternative embodiments, the heat sink 122 can include the securement projection, and the latch 600 can include the securement locking recess. Further, the securement projection can extend out from one of the heat sink 122 and the latch 600 along the lateral direction A, and the securement recess can extend into or through the other of the heat sink 122 and the latch 600 along the lateral direction A. The securement projection can be removed from the securement recess when it is desired to remove the latch 600 from the heat sink 122. Thus, it can be said that one of the latch 600 and the heat sink 122 can include a securement projection, and the other of the latch 600 and the heat sink 122 can include a securement recess that receives the securement projection, thereby securing the latch 600 to the heat sink 122. Alternatively, the latch 600 can be devoid of the respective securement features.

As shown in FIGS. 13A-13C, when the interconnect module 102 is mated with at least one electrical connector of the host module 104, the latch 600 can be movable between the disengaged position (FIG. 13B) and the engaged position (FIG. 13A). For instance, the latch 600 can be translatable along the transverse direction T between the disengaged position and the engaged position. For instance, the latch 600 can be translatable in the downward direction to move the latch 600 from the disengaged position to the engaged position, and in the upward direction to move the latch 600 from the engaged position to the disengaged position. When the latch 600 is in the engaged position, a first mechanical interference is defined between the latch 600 and the interconnect module 102 that limits rearward movement of the interconnect module 102 with respect to the latch 600 in the rearward direction. Thus, it can be said that the first mechanical interference is a longitudinal mechanical interference that is in the longitudinal direction. The first mechanical interference can include an abutment between the anti-backout latch 600 and the interconnect module 102. In particular, the fingers 604 are configured to seat in respective ones of the channels 240, such that forward ends of the fins 232 that partially define the channels 240 also at least partially define the first mechanical interference. Further, the support member 602 is sized to be received in the notch 238, such that a forward end of the upper end of the heat sink 122 that partially defines the notch 238 at least partially defines the first mechanical interference with the support member 602.

Further, when the latch 600 is in the engaged position as shown in FIG. 13A, a second mechanical interference is defined between the fingers 604 and the host module 104 that limits rearward movement of the latch 600 with respect to at least one electrical connector of the host module 104. Thus, it can be said that the second mechanical interference is a longitudinal mechanical interference that is in the longitudinal direction. The second mechanical interference can include an abutment between the anti-backout latch 600 and the host module 104. The limited rearward movements can prevent the interconnect module 102 from moving in the rearward direction with respect to the at least one electrical connector of the host module 104 a distance that would be sufficient to unmate the interconnect module 102 (FIG. 13A) from the at least one electrical connector of the host module 104. For instance, the first and second mechanical interferences can substantially prevent rearward movement of the interconnect module 102 with respect to the anti-backout latch 600, and of the latch 600 with respect to the at least one electrical connector of the host module 104, respectively.

In one example, the second mechanical interference can be defined by the fingers 604 and the second electrical connector 154. In particular, when the latch 600 is in the engaged position, the fingers 604 extend to a location adjacent the second electrical connector 154 in the forward direction. In particular, the fingers 604 can abut the second electrical connector 154, such as the second connector housing 153. In another example, the second mechanical interference can be defined by the fingers 604 and a securement member that secures the second electrical connector 154 to the substrate 118. The securement member can be configured as the securement member 188 as shown in FIG. 13A and as described above or can be configured as the securement member 500 discussed above in relation to FIGS. 3A-3L. In other words, the latch 600 can be used with the electrical connector 154 and securement member 500 of FIGS. 3A-3L. When the latch 600 is in the engaged position, the fingers 604 extend to a location adjacent the securement member in the forward direction. Thus, the fingers 604 can abut the securement member.

As described above, the fingers 604 can each define projections 606. The projections 606 can be configured as clips that secure the latch 600 to the module housing 146, and in particular to the heat sink 122, when the latch is in the engaged position. In particular, as the latch 600 is translated along the transverse direction T to the engaged position, the fingers 604 are configured to resiliently move away from each other as the projections 606 slide along the surfaces of the fins 232 that define the channels 240. The projections 606 ride along the channels until the projections 606 slide past the surfaces of the fins 232 and the base 233 in the downward direction. The fingers 604 then move toward each other along the lateral direction such that at least a portion of the projections 606 are aligned with the module housing 146 along the transverse direction T. Thus, a first transverse mechanical interference between the projections 606 and the module housing 146 resists movement of the latch 600 from the engaged position to the disengaged position.

The first transverse mechanical interference between the projections 606 and the module housing 146 can be overcome by a first force when the latch 600 is moved upward from the engaged position to the disengaged position. Further, the projections 606 can ride along the channels until the projections 606 ride into respective pockets (see e.g., pockets 235 in FIG. 12A) that are disposed in the channels at a location spaced upward from the base 233 when the latch 600 is in the disengaged position. A second transverse mechanical interference between the projections 606 and the heat sink 122 when the projections 606 are disposed in the pockets 235 can resist movement of the latch 600 from the disengaged position to the engaged position. The second transverse mechanical interference can be overcome by a second force when the latch is moved down from the disengaged position to the engaged position. In one example, the first and second forces can be substantially equal (for instance 10% of each other). In another example, the first force can be greater than the second force (for instance, greater than 10% of the second force). In still another example, the second force can be greater than the first force (for instance, greater than 10% of the second force). In still another example, one of the first and second forces can be directed along the transverse direction T. Alternatively or additionally, the first force can include a separation of the fingers 604 away from the heat sink (and away from each other) along the lateral direction A so as to remove the first transverse mechanical interference. Alternatively or additionally still, the second force can include a separation of the fingers 604 away from the heat sink (and away from each other) along the lateral direction A so as to remove the second transverse mechanical interference.

As shown in FIG. 13B, when the latch 600 is in the disengaged position, at least the second longitudinal mechanical interference is removed, such that the interconnect module 102 is movable in the rearward direction with respect to the at least one electrical connector of the host module 104 a sufficient distance so as to unmate the interconnect module 102 from the at least one electrical connector of the host module 104. When the latch 600 is removed from the heat sink 122, the first mechanical interference can also be removed.

Referring to FIGS. 14A-14F, the interconnect system 100 (FIGS. 14A-14C) can include an anti-backout latch 700 that is configured to attach to the interconnect module 102. The interconnect module 102 can include a heat sink 122 that is supported by at least one of the module housing 146 and the interconnect substrate 113. In particular, the heat sink 122 can be secured to at least one of the module housing 146 and the interconnect substrate 113. Alternatively, the heat sink 122 can be monolithic with the module housing 146. Thus, it can be said that the heat sink 122 can define the module housing 146. It can also be said that the module housing 146 defines the heat sink 122.

Figure 14A:
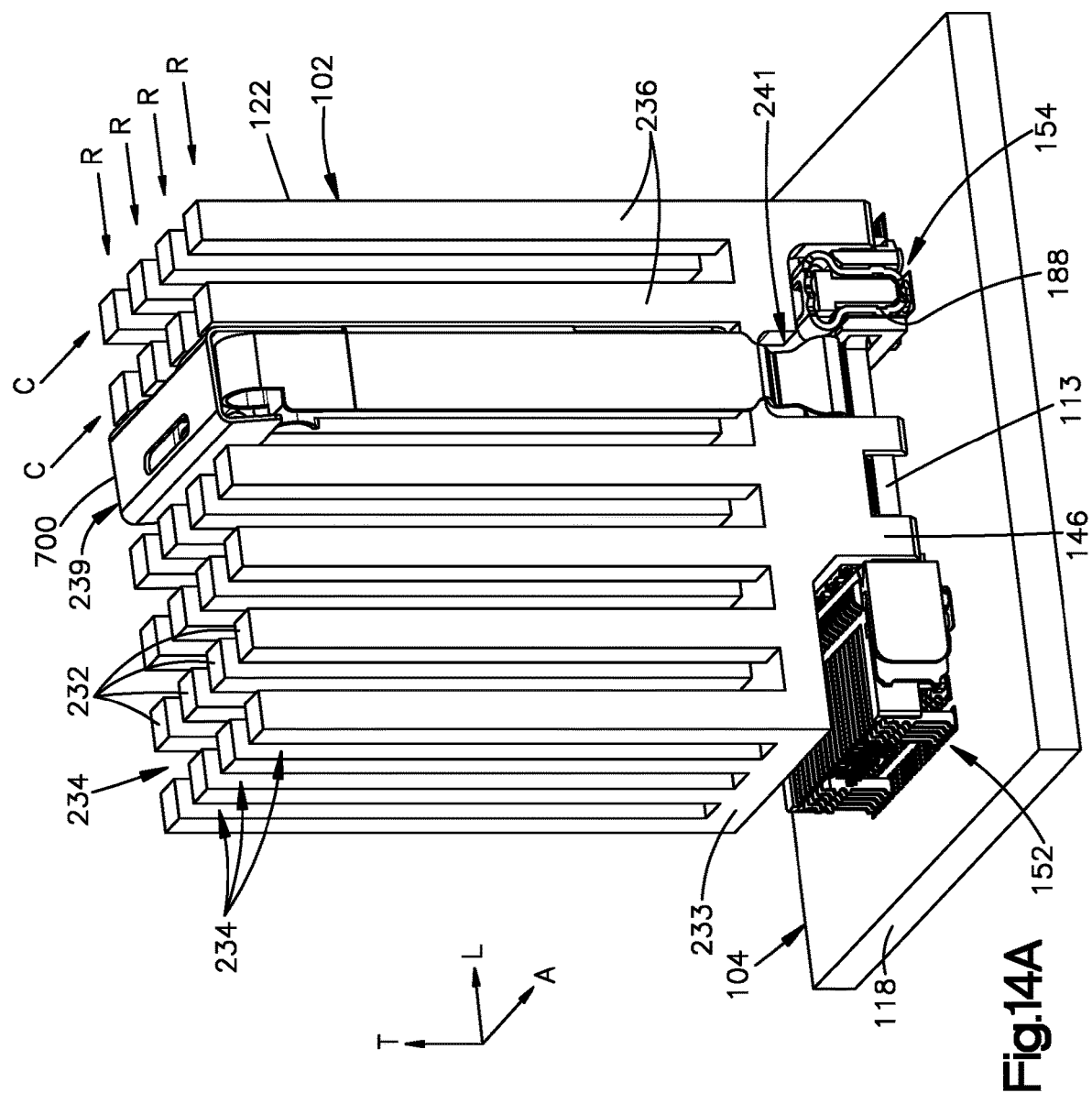
FIG. 14A is a perspective view of an interconnect system including an interconnect module, a host module, and an anti-backout latch constructed in accordance with another embodiment shown in an engaged position.
Figure 14B:
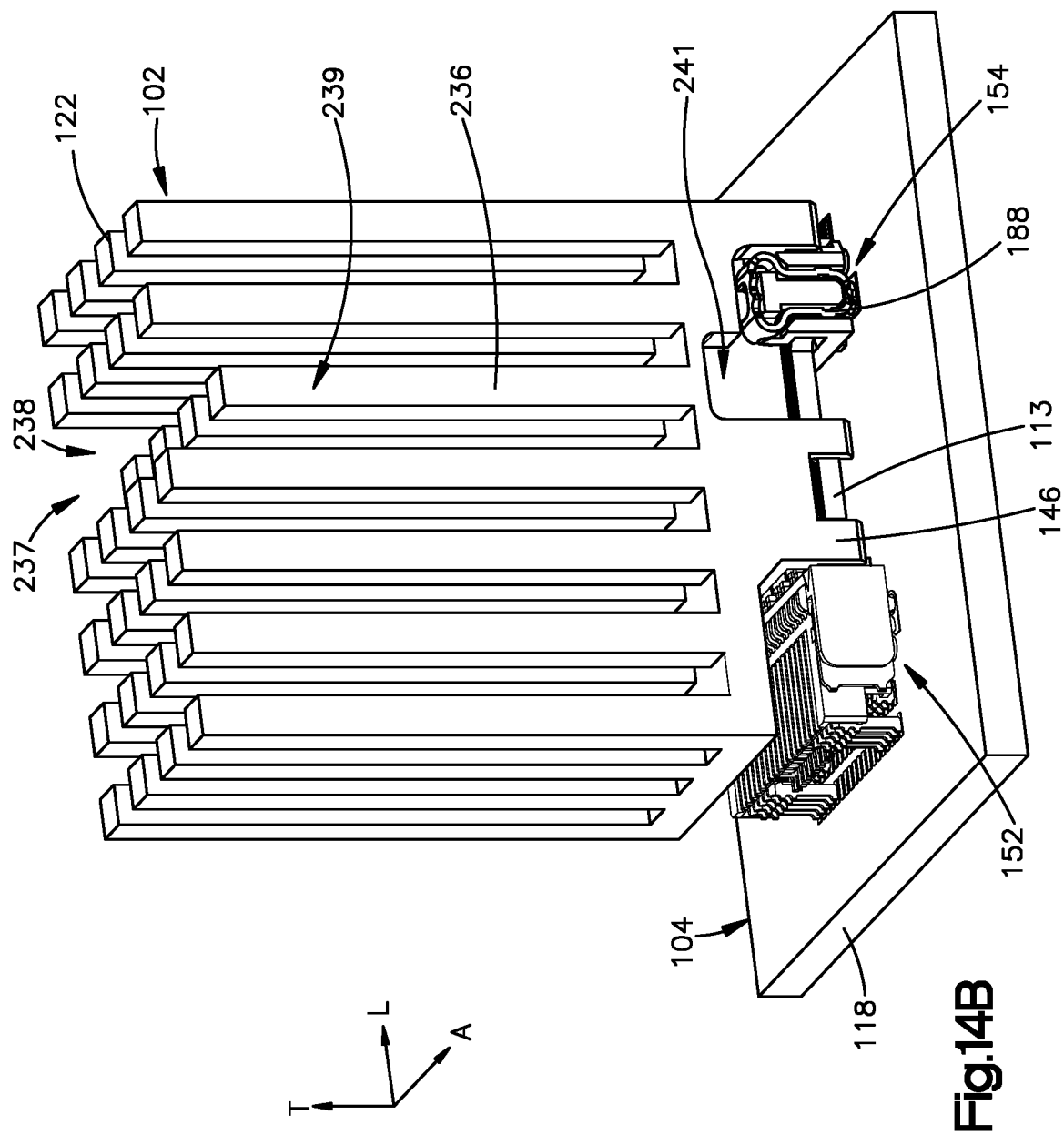
FIG. 14B is a perspective view of an interconnect system of FIG. 14A including an interconnect module, and a host module, without an anti-backout latch.

The heat sink 122 can include a base 233 and a plurality of upstanding fins 232 that extend from a base 233 (FIGS. 14A-14C). The fins 232 can be spaced from each other so as to define a plurality of recesses 234 disposed between respective adjacent ones of the fins 232. In particular, the fins 232 can be spaced from each other along the lateral direction A. The fins 232 can also be spaced from each other along the longitudinal direction L. Thus, the fins 232 can be arranged in an array of rows and columns, where the rows R are spaced from one another along the lateral direction L and the columns C are spaced from one another along the longitudinal direction A. In one example, the fins 217 can be pins as shown. Each pin is elongate along the transverse direction T. Thus, it can be said that the recesses 234 extend down from an upper surface of the heat sink 122 to a location between adjacent ones of the fins 232. A bottom end of the recesses 234 can be defined by the base 233 (FIGS. 14A-14C). In alternative embodiments, the fins 232 can be configured as plates that are spaced apart from one another along the longitudinal direction L, where each plate is oriented in a plane defined by the lateral and transverse directions, and the latch 700 can be configured to receive at least one of the plates. For example, each column can include a single fin that is configured as a plate.

The heat sink 122 can define at least one latch-receiving recess 237 that is configured to receive the latch 230. In particular, the at least one latch-receiving recess 237 can include a pair of recesses 241 that extend into the heat sink 122 along the lateral direction A, and a notch 238 that extends down into the upper end of the heat sink 122 along the transverse direction T. The recesses 241 can extend into respective ones of a pair of opposed walls of the heat sink 122. The opposed walls can be laterally opposed walls. For instance, the opposed walls can be defined by the base 233. The recesses 241 can extend into the laterally outer surfaces of the base 233 along the lateral direction A. At least a portion up to an entirety of each of the recesses 241 does not extend through the base 233 along the lateral direction A.

The notch 238 can be configured to receive at least a portion of the latch 700. The heat sink 122 can include a column 239 of fins 232 that defines a bottom of the notch 238. For example, the column 239 can include at least one fin 232 having a height along the transverse direction T that is less than a height along the transverse direction T of the fins 232 of adjacent columns. In one example, each fin 232 in the column 239 can have a height that is less than the height of the fins 232 of adjacent columns. Thus, it can be said that the notch 238 extends into the heat sink 122 along the transverse direction T. Further, it can be said that the notch 238 extends through the heat sink 122 along the lateral direction A. The column 239 can be configured to support the latch 700 when the latch is attached to the heat sink 122. The column 239 can include outermost fins 232 that define outer surfaces 236 that face away from the center of the module housing 146. The outer surfaces 236 can face away from the center of the heat sink 122 along the lateral direction A. Further, the outer surfaces 236 can face away from each other along the lateral direction A.

Figure 14F:
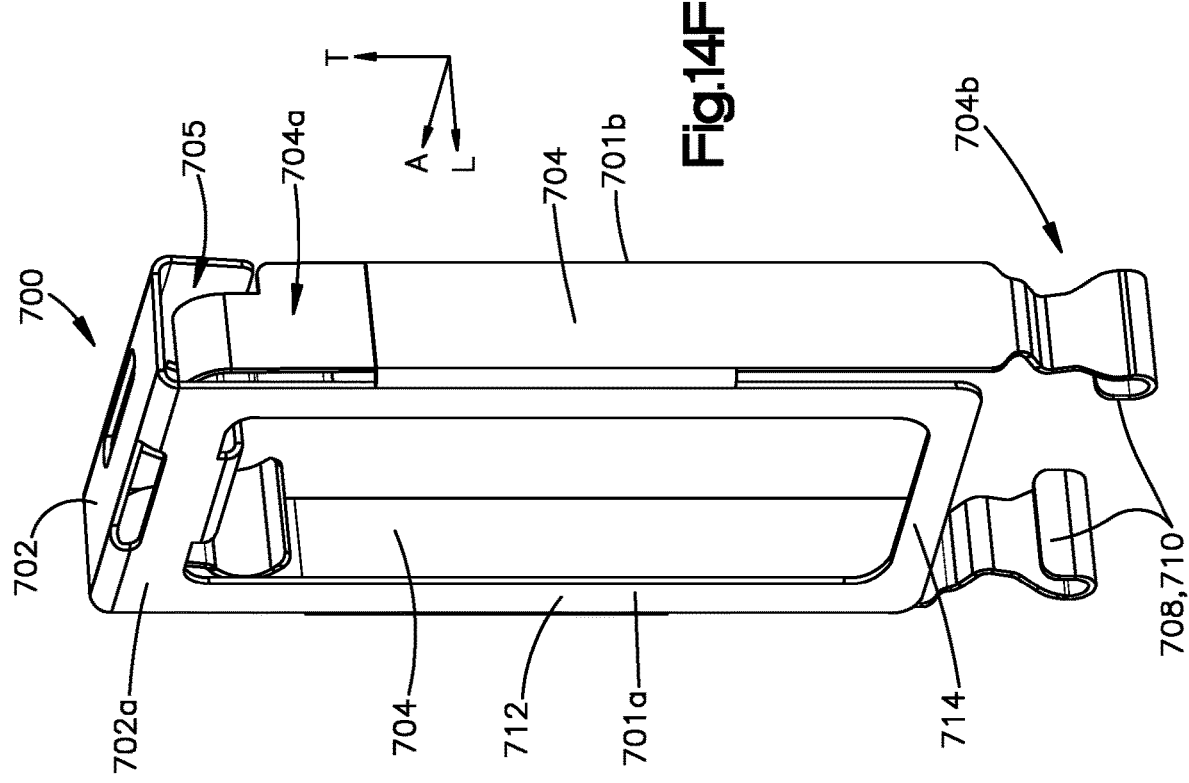
FIG. 14F is a front perspective view of the anti-backout latch of FIG. 14A.
Figure 14E:
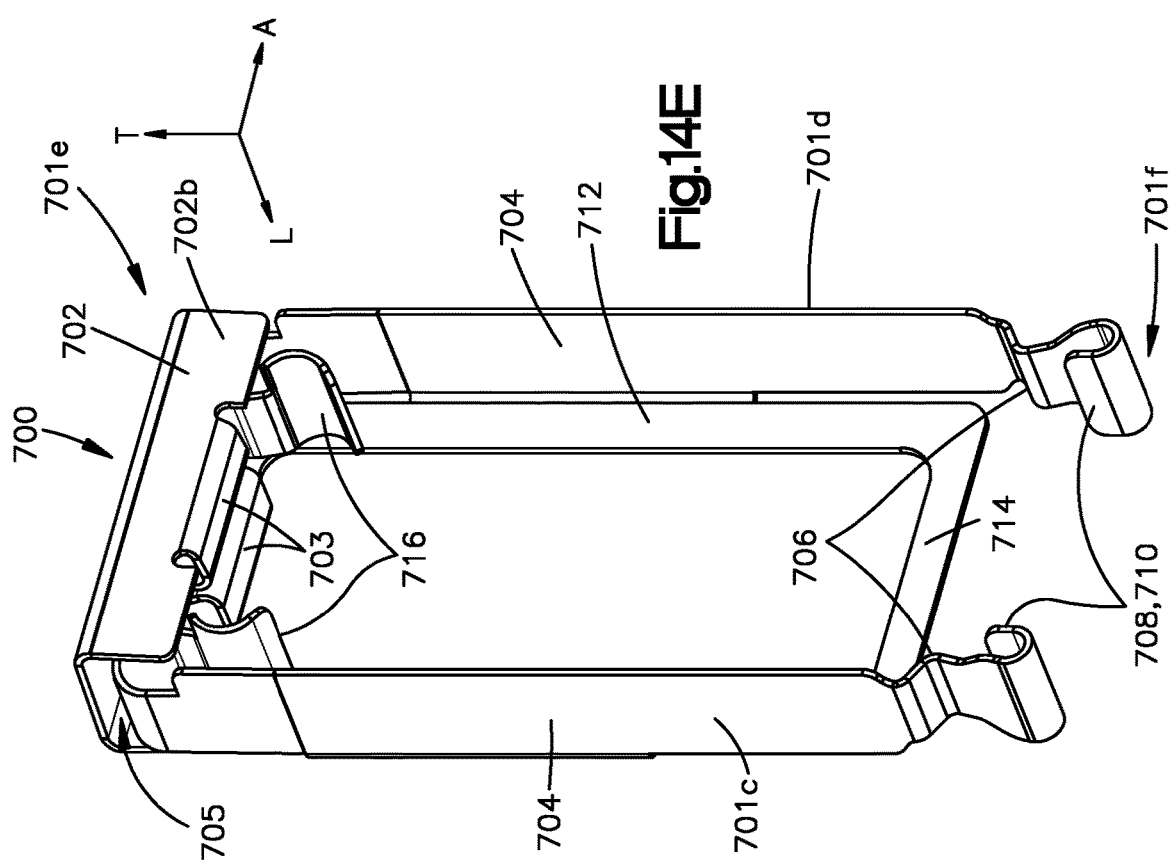
FIG. 14E is a rear perspective view of the anti-backout latch of FIG. 14A.

Referring to FIGS. 14E and 14F, the latch 700 can include a support member 702 that is configured to be placed in mechanical communication with the interconnect module 102. As shown in FIG. 14C, the support member 702 can be sized and configured to seat against the upper ends of the fins 232 of the column 239 in the notch 238 when the latch 700 is in the engaged position. The support member 702 can include at least one stop 703 that is configured to seat against the upper end of the fins 232 of the column 239 when the latch 700 is in the engaged position.

The support member 702 can have any suitable shape. In one example as shown in FIGS. 14E and 14F, the support member 702 can include opposed ends 702a and 702b that are spaced from one another along the longitudinal direction L so as to define a pocket 705 therebetween. The support member 702 can include a first stop 703 that extends from a first one of the opposed ends towards a second one of the opposed ends 702a and 702b. The support member 702 can optionally include a second stop 703 that extends from the second one of the opposed ends 702a and 702b towards the first one of the opposed ends 702a and 702b. The latch can include a bend for each stop 703 that adjoins the stop 703 to a respective one of the opposed ends 702a and 702b. At least a portion of each stop 703 can be oriented along a plane defined by the longitudinal direction L and lateral direction A. It will be understood that, in alternative embodiments, the support member 702 can be configured in another manner. For example, the support member 702 can include only one of the opposed ends 702a and 702b.

The latch 700 can include a pair of fingers 704 that are configured to be placed in mechanical communication with the host module 104 (FIGS. 14A-14D). The fingers 704 can extend away from the support member 702 along the transverse direction T. The fingers 704 can be spaced from each other along the lateral direction A. The fingers 704 can be oriented along respective planes defined by the longitudinal direction L and the transverse direction T. Thus, each of the fingers 704 can be longer along the longitudinal direction L than it is wide along the lateral direction A. Further, each of the fingers 704 is taller along the transverse direction T than it is long along the longitudinal direction L. Each finger 704 can have a proximal end 704a and a distal end 704b that are spaced from one another along the transverse direction T. Each finger 704 can be elongate from its proximal end 704a to its distal end 704b. Each proximal end 704a can define a free end that is free from attachment to the support member 702. Each distal end 704b can also define a free end that is free from attachment to any other structure.

The latch 700 and the heat sink 122 can include complementary engagement features that engage each other. The complementary engagement features can engage one another so as to releasably secure the latch 700 to the heat sink 122 and restrict removal of the latch 700 from the heat sink 122. For instance, each of at least one of the fingers 704 can define an engagement feature that engages a complementary engagement feature of the heat sink 122 when the latch 700 is in the engaged position. Thus, when engaged, the complementary engagement features can define an interference that resists movement of the latch 700 from the engaged position to the disengaged position.

The at least one engagement feature of the latch 700 can define an engagement projection 706. Each of the at least one engagement projection 706 can be defined by one of the fingers 704. Each engagement projection 706 can extend inwardly towards the other finger 704. In some examples, each finger 704 can define an engagement projection 706, and the projections 706 can be oriented so as to face each other. In particular, the engagement projections 706 can face each other along the lateral direction A. Thus, the engagement projections 706 can project inwardly towards one another. As a result, a distance between the engagement projections 706 along the lateral direction A can be smaller than a distance between the fingers 704 along the lateral direction A at another location. As will be described, the fingers 704 can be resilient, such that the engagement projections 706 are configured as clips that releasably secure the latch 700 to the heat sink 122, and in particular to the base 233 of the heat sink 122, when the latch 700 is in the engaged position. The at least one engagement feature of the heat sink 122 can be defined by a surface 243 (labeled in FIG. 14D) that defines the recess 241.

In alternative embodiments, the heat sink 122 can include the at least one engagement projection, and the latch 700 can include the at least one engagement locking recess. Further, the engagement projection can extend out from one of the heat sink 122 and the latch 700 along the longitudinal direction L, and the engagement recess can extend into or through the other of the heat sink 122 and the latch 700 along the longitudinal direction L (see FIG. 3L). Alternatively or additionally, the engagement projection and the engagement recess can be configured to engage each other when the latch 700 is in the disengaged position to prevent inadvertent movement of the latch 700 to the engaged position. The engagement projection can be removed from the engagement recess when it is desired to remove the latch 700 from the respective disengaged position or the engaged position. Thus, it can be said that one of the latch 700 and the heat sink 122 can include an engagement projection, and the other of the latch 700 and the heat sink 122 can include an engagement recess that receives the engagement projection, thereby maintaining the latch 700 in at least one of the engaged position and the disengaged position. Alternatively, the latch 700 can be devoid of the respective engagement features.

The latch 700 and the heat sink 122 can include complementary securement features that engage each other so as to releasably secure the latch 700 to the heat sink 122. The complementary securement features restrict removal of the latch 700 from the heat sink 122, while allowing the latch 700 to be moved between the engaged position and disengaged position. The latch 700 can include at least one securement feature 708 that defines a securement projection 710. Each securement projection 710 can be defined by a respective one of the fingers 604. In some examples, each securement projection 710 can be defined at a location that is distal to a projection 706 of the finger 704. For example, each securement projection 710 can be defined at a distal end of a respective one of the fingers 704. Each securement feature 708 can be configured to obstruct removal of the latch 700 from the heat sink 122 when the latch is in the disengaged position. Each securement feature 708 can be configured such that, when the latch 700 is in the disengaged position and the latch 700 is pulled upwards, the securement feature 708 grasps the heat sink 122 to prevent removal of the latch 700 from the heat sink 122. In some examples, each securement projection 710 can be configured as a hook that curves inwardly along the lateral direction A towards the other one of the fingers 704. Each hook can have a free end or tip that is spaced inwardly from other portions of the hook. In other examples, the latch 700 can include securement projections that extend from one of the fingers in the lateral direction A (e.g., see projections 227 of FIG. 12A) or in the longitudinal direction L (e.g., see projections 610 of FIG. 13A).

The at least one complementary securement feature 231 of the heat sink 122 can be defined by a surface 243 (labeled in FIG. 14D) that defines the recess 241. Each surface 243 can be configured to catch a respective one of the securement projections 710 when the latch 700 is moved from the engaged position (FIG. 14C) to the disengaged position (FIG. 14D). Each recess 241 can be sized and configured to receive a respective one of the securement projections 710 when the latch 700 is secured to the heat sink 122. Each corresponding securement projection 710 and recess 241 can be sized such that the securement projection 710 is translatable within the recess 241 along the transverse direction T to allow the latch 700 to move between the engaged and disengaged positions as shown in FIGS. 14C and 14D. In alternative embodiments, the securement projections and securement recess can be configured in another manner as described above in relation to FIGS. 12A-12C and 5A-5F.

The latch 700 can include at least one clip 716 that is configured to engage a proximal or upper end of at least one fin 232 of the heat sink 122. In some examples, the latch 700 can include a pair of clips 716, each configured to engage at least one of the fins 232 of the heat sink 122, such as an outermost one of the fins 232. Each clip 716 can extend inward from a proximal end 704a of one of the fingers 704 to a free end or a tip of the clip 716. Thus, the free end or tip of each clip 716 can be spaced inward of the proximal end 704a of the respective one of the fingers 704 along the lateral direction A. The free end or tip of each clip 716 is configured to resiliently move inward along the lateral direction A and away from the proximal end 704a of the respective finger 704 so as to receive a proximal end 704a of a respective one of the fins 232. In other words, the free end or tip of each clip 716 is configured to resiliently move away from the respective finger 704 so as to receive the proximal end 704a. Further, each clip 716 can be resiliently supported by a respective one of the fingers 704, so as to define a spring force that biases the free end or tip of the clip 714 towards the proximal end 704a of the finger 704 when moved away from one other. In one example, each clip 716 can extend into the pocket 705 of the support member 702.

With continuing reference to FIGS. 14E and 14F, the latch 700 can include a rigid body 712. The rigid body 712 can extend downward from the support member 702 along the transverse direction T. The rigid body 712 can terminate before the distal ends 704b of the fingers 704. The rigid body 712 can be oriented in a plane that extends along the lateral direction A and the transverse direction T. The rigid body 712 can extend between the pair of fingers 704 with respect to the lateral direction A. For example, the fingers 704 can extend from opposed lateral sides of the rigid body 712. The latch 700 can include bends that join the fingers 704 to the rigid body 712. The bends can be between the proximal and distal ends 704a and 704b of the fingers 704. The distal ends 704b of the fingers 704 can be free from attachment to the rigid body 712 such that the distal ends 704b can pivot away from one another as shown in FIG. 14D. The distal ends 704b can be resiliently supported by the rigid body 712, so as to define a spring force that biases the distal ends 704b towards each other when they are moved away from each other. The rigid body 712 is configured to limit torsion of the latch 700 in a plane that extends along the lateral direction A and transverse direction T. In other words, the rigid body 712 is configured to limit twisting of the latch 700 about an axis that extends through the latch 700 along the longitudinal direction L. The rigid body can be configured to restrict twisting of the anti-backout latch along at least a middle portion of the anti-backout latch that is midway between proximal and distal ends of the anti-backout latch.

The latch 700 can have a first end 701a and a second end 701b that are spaced from one another along the longitudinal direction L. The latch 700 can have a first side 701c and a second side 701d that are spaced from one another along the lateral direction A. The latch 700 an have a proximal end 701e and a distal end 701f that are spaced from one another along the transverse direction T. The latch 700 can define a height from the proximal end 701e to the distal end 701f, a width from the first side 701c to the second side 701d along the lateral direction A, and a thickness from the first end 701a to the second end 701b along the longitudinal direction L. The height can be greater than the width. The width can be greater than the thickness. The latch 700 can have a box-like shape. The latch 700 can be formed from a single piece of material such as sheet metal that is bent to the shape shown. However, it will be understood that in alternative embodiments, the latch 700 can be formed from multiple pieces of material that are attached to one another. The latch 700 can define an opening 718 between the fingers 704. The opening 718 can further be defined between the first end 701a and the second end 701b. The latch 700 can be sized and configured to receive at least one, such as a plurality, of fins 232 of the heat sink 122 in the opening 718 between the fingers 704. For example, the opening 718 can receive the column 239 of shortened fins 232 of the heat sink 122. Thus, the inner surfaces of the fingers 704 can be configured to abut the outer surfaces 236 of the outermost fins 232 in the column 239. When received in the opening, the at least one fin 232 can be in-line with the fingers 704 along the lateral direction A. It will be understood that, in various embodiments, the latch can include as few as one of the clips 716, the securement features 708, the projections 706, and the rigid body 712, up to all of these features.

As shown in FIGS. 14C-14D, when the interconnect module 102 is mated with at least one electrical connector of the host module 104, the latch 700 can be movable between the engaged position (FIG. 14C) and the disengaged position (FIG. 14D). For instance, the latch 700 can be translatable along the transverse direction T between the engaged position and the disengaged position. For instance, the latch 700 can be translatable in the downward direction to move the latch 700 from the disengaged position to the engaged position, and in the upward direction to move the latch 700 from the engaged position to the disengaged position. When the latch 700 is in the engaged position, a first mechanical interference is defined between the latch 700 and the interconnect module 102 that limits rearward movement of the interconnect module 102 with respect to the latch 700 in the rearward direction. Thus, it can be said that the first mechanical interference is a longitudinal mechanical interference that is in the longitudinal direction L. The first mechanical interference can include an abutment between the anti-backout latch 700 and the interconnect module 102. In particular, the rigid body 712 is configured to seat in respective ones of the recesses 234 between adjacent columns of fins 232, such that forward ends of the fins 232 that partially define the recess 234 also at least partially define the first mechanical interference. Further, the support member 702 is sized to be received in the notch 238, such that a forward end of the upper end of the heat sink 122 that partially defines the notch 238 at least partially defines the first mechanical interference with the support member 702.

Further, when the latch 700 is in the engaged position as shown in FIG. 14C, a second mechanical interference is defined between the fingers 704 and the host module 104 that limits rearward movement of the latch 700 with respect to at least one electrical connector of the host module 104. Thus, it can be said that the second mechanical interference is a longitudinal mechanical interference that is in the longitudinal direction. The second mechanical interference can include an abutment between the anti-backout latch 700 and the host module 104. The limited rearward movements can prevent the interconnect module 102 from moving in the rearward direction with respect to the at least one electrical connector of the host module 104 a distance that would be sufficient to unmate the interconnect module 102 (FIG. 14A) from the at least one electrical connector of the host module 104. For instance, the first and second mechanical interferences can substantially prevent rearward movement of the interconnect module 102 with respect to the anti-backout latch 700, and of the latch 700 with respect to the at least one electrical connector of the host module 104, respectively.

In one example, the second mechanical interference can be defined by the fingers 704 and the second electrical connector 154. In particular, when the latch 700 is in the engaged position, the fingers 704 extend to a location adjacent the second electrical connector 154 in the forward direction. In particular, the fingers 704 can abut the second electrical connector 154, such as the second connector housing 153. In another example, the second mechanical interference can be defined by the fingers 704 and a securement member that secures the second electrical connector 154 to the substrate 118. The securement member can be configured as the securement member 188 as shown in FIG. 14A and as described above or can be configured as the securement member 500 discussed above in relation to FIGS. 3A-3L. In other words, the latch 700 can be used with the electrical connector 154 and securement member 500 of FIGS. 3A-3L. When the latch 700 is in the engaged position, the fingers 704 extend to a location adjacent the securement member in the forward direction. Thus, the fingers 704 can abut the securement member.

As described above, the fingers 704 can each define projections 706. The projections 706 can be configured as clips that secure the latch 700 to the module housing 146, and in particular to the heat sink 122, when the latch is in the engaged position. In particular, as the latch 700 is translated along the transverse direction T to the engaged position, the fingers 704 are configured to resiliently move away from each other as the projections 706 slide along the outer surfaces 236 of the fins 232 in column 239. The projections 706 ride along the channels until the projections 706 slide past the surfaces 236 of the fins 232 in the downward direction. The fingers 704 then move toward each other along the lateral direction such that at least a portion of the projections 706 are aligned with the module housing 146 along the transverse direction T. Thus, a first transverse mechanical interference between the projections 706 and the module housing 146 resists movement of the latch 700 from the engaged position to the disengaged position.

In addition, as the latch 700 is translated along the transverse direction T to the engaged position, the free ends or tips of the clips 716 move inwardly towards one another so as to receive the proximal ends of respective fins 232. In particular, as the latch 700 is translated along the transverse direction T to the engaged position, the free ends or tips of the clips 716 are configured to resiliently move towards each other as the free ends or tips slide along the inner surfaces of the outermost fins 232 in column 239 such that the outermost fins are received in the clips 716. The latch 700 can be translated along the transverse direction T until the at least one stop 703 abuts the proximal end of each of at least one of the fins 232 in the column 239.

The first transverse mechanical interference between the projections 706 and the module housing 146 can be overcome by a first force when the latch 700 is moved upward from the engaged position to the disengaged position. Further, the projections 706 can ride along the outer surfaces 236 of the fins 232 in column 239 until the projections 706 ride into respective recesses 241. A second transverse mechanical interference between the projections 706 and the heat sink 122 when the projections 706 are disposed in the recesses 241 can resist movement of the latch 700 from the disengaged position to the engaged position. The second transverse mechanical interference can be overcome by a second force when the latch is moved down from the disengaged position to the engaged position. In one example, the first and second forces can be substantially equal (for instance 10% of each other). In another example, the first force can be greater than the second force (for instance, greater than 10% of the second force). In still another example, the second force can be greater than the first force (for instance, greater than 10% of the second force). In still another example, one of the first and second forces can be directed along the transverse direction T. Alternatively or additionally, the first force can include a separation of the fingers 704 away from the heat sink (and away from each other) along the lateral direction A so as to remove the first transverse mechanical interference. Alternatively or additionally still, the second force can include a separation of the fingers 704 away from the heat sink (and away from each other) along the lateral direction A so as to remove the second transverse mechanical interference.

As shown in FIG. 14D, when the latch 700 is in the disengaged position, at least the second longitudinal mechanical interference is removed, such that the interconnect module 102 is movable in the rearward direction with respect to the at least one electrical connector of the host module 104 a sufficient distance so as to unmate the interconnect module 102 from the at least one electrical connector of the host module 104. In the disengaged position, each of the at least one securement feature 708 of the latch 700 can abut a respective one of the surfaces 243 of the heat sink 122 so as define a third transverse mechanical interference that restricts removal of the latch 700 from the heat sink 122. The latch 700 can be removed from the heat sink 122 by moving the distal ends of the fingers 704 further away from one another so as to remove the third transverse mechanical interference. When the latch 700 is removed from the heat sink 122, the first mechanical interference can also be removed.

Referring now to FIGS. 2A-10C in general, the present disclosure further contemplates all methods of fabricating and using the components described herein, including the latches and securement members, and all modules and systems incorporating same.

It should be noted that the illustrations and discussions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

What is claimed:

1. An electrical connector comprising:
an electrically insulative connector housing;
a plurality of electrical contacts supported by the connector housing and configured to be mated with a first substrate when the first substrate travels in a forward direction with respect to the electrical connector; and
a securement member that is supported by the connector housing, the securement member has a base and a retention arm, the securement member further defining at least one mounting projection configured to be received in a mounting aperture of a second substrate so as to mount the electrical connector to the second substrate, wherein the retention arm is configured to urge the first substrate against the electrical contacts so as to mate the first substrate with the electrical contacts.

2. The electrical connector as recited in claim 1, wherein the securement member is attached to the connector housing.

3. The electrical connector as recited in claim 1, wherein the securement member is monolithic with the connector housing.

4. The electrical connector as recited in any one of claim 1, wherein the securement member comprises a pair of securement members that are supported by the connector housing and offset from each other along a lateral direction.

5. The electrical connector as recited in claim 4, wherein each of the pair of securement members defines first and second mounting projections.

6. The electrical connector as recited in claim 5, wherein the mounting projections of the securement members are arranged in a first pair and a second pair that is offset from the first pair along a longitudinal direction that is substantially perpendicular to the lateral direction.

7. The electrical connector as recited in claim 6, wherein the mounting projections of the first pair are aligned with each other along the lateral direction, and the mounting projections of the second pair are aligned with each other along the lateral direction.

8. The electrical connector as recited in claim 1, wherein the connector housing further comprises a pair of mounting projections that extend down along a transverse direction and is configured to be received in a respective mounting aperture of the second substrate so as to mount the electrical connector to the second substrate.

9. The electrical connector as recited in claim 8, wherein the mounting projections of the pair of mounting projections of the connector housing are aligned with each other along a lateral direction.

10. The electrical connector as recited in claim 9, wherein the electrical contacts are arranged in first and second rows that are oriented along the lateral direction and offset with each other along a longitudinal direction.

11. The electrical connector as recited in claim 10, wherein a centerline oriented along the lateral direction bisects the first and second rows the first and second pairs of mounting projections of the securement members are disposed on opposite sides of the centerline.

12. The electrical connector as recited in claim 11, wherein the mounting projections of the connector housing and the first pair of mounting projections of the securement members are on opposite sides of the centerline with respect to the second pair of mounting projections of the securement members.

13. The electrical connector as recited in claim 1, wherein the securement member defines a substrate receiving gap between the base and the retention arm, wherein the substrate receiving gap is configured to receive the first substrate when the first substrate is mated with the electrical connector.

14. The electrical connector as recited in claim 13, wherein the securement member further comprises a securement wall that extends between the base and the retention arm.

15. The electrical connector as recited in claim 13, wherein the retention arm is configured to provide a force to the first substrate that urges the substrate against the electrical contacts when the first substrate is received in the substrate receiving gap.

16. An interconnect system comprising:
the electrical connector as recited in claim 14; and
the first substrate that defines first and second lateral sides, and first and second notches in the first and second lateral sides, respectively, the notches having a length greater than that of the retention arms such that the retention arms are configured to pass through the notches.

17. The interconnect system as recited in claim 16, further comprising an anti-backout latch that is movable between an engaged position and a disengaged position, wherein when the first substrate is mated with the electrical contact, and the anti-backout latch is in the engaged position, the anti-backout latch interferes with the securement wall to prevent the first substrate from moving in a rearward direction opposite the forward direction a sufficient amount that would cause the first substrate to unmate from the electrical connector.

18. The interconnect system as recited in claim 17, wherein the latch comprises first and second latches that are configured to interfere with respective first and second ones of the securement wall.

19. The interconnect system as recited in claim 18, further comprising an interconnect module having a module housing, wherein the latch is translatable between the engaged position and the disengaged position in a recess defined by the interconnect module.

20. The interconnect system as recited in claim 19, wherein the interconnect module comprises a heat sink that extends from the module housing, and the recess is defined in the heat sink.

21. The interconnect system as recited in claim 16, further comprising a first electrical connector mounted to the second substrate, wherein the electrical connector is a second electrical connector that is mounted to the second substrate, and the first substrate is configured to travel in the forward direction with respect to the first and second electrical connectors so as to mate the first substrate simultaneously to each of the first and second electrical connectors.

22. An electrical connector comprising:
an electrically insulative connector housing;
a plurality of electrical contacts supported by the connector housing, the electrical contact having mounting ends configured to be mounted to a substrate, wherein the mounting ends are arranged in first and second rows that are oriented along a lateral direction and spaced from each other along a longitudinal direction that is substantially perpendicular with respect to the lateral direction, wherein the electrical contacts whose mounting ends are arranged in the first row are arranged in a respective repeating signal-signal-ground pattern, and the electrical contacts whose mounting ends are arranged in the second row are arranged in a respective repeating signal-signal-ground pattern; and
first, second, and third pairs of mounting projections that extend along a transverse direction so as to be received in respective mounting apertures of the substrate, thereby securing the electrical connector to the substrate, the transverse direction oriented substantially perpendicular to each of the lateral and longitudinal directions,
wherein:
1) the second and third pairs of mounting projections are disposed on opposite sides of a centerline that is oriented along the lateral direction equidistantly from the first and second rows,
2) the mounting projections of the third pair are aligned with each other along the lateral direction,
3) the mounting projections of the second pair are aligned with each other along the lateral direction,
4) the mounting projections of the first pair are aligned with each other along the lateral direction, and
5) respective centers of the mounting projections of the first pair are disposed between respective centers of the mounting projections of the second pair and the centerline with respect to the longitudinal direction.

23. The electrical connector as recited in claim 22, wherein the centers of the first pair are spaced closer to the centers of the second pair than they are to the centerline along the longitudinal direction.

24. The electrical connector as recited in claim 23, wherein the centers of the first pair are spaced from the centers of the second pair a first distance along the longitudinal direction, and spaced from the centerline a second distance along the longitudinal direction, the second distance being greater than five times the first distance.

25. The electrical connector as recited in claim 24, wherein the second distance is greater than 10 times the first distance.

26. The electrical connector as recited in claim 22, wherein the mounting projections of the first pair are disposed between the mounting projections of the second pair with respect to the lateral direction.

27. The electrical connector as recited in claim 22, wherein the mounting projections of the second pair are aligned with respective different ones of the mounting projections of the third pair along the longitudinal direction.

28. The electrical connector as recited in claim 22, wherein the mounting projections of one or both of the first and second pair of mounting projections are disposed between one of the rows and the centerline with respect to the longitudinal direction.

29. The electrical connector as recited in claim 28, wherein the third pair of mounting projections is disposed between the other of the rows and the centerline with respect to the longitudinal direction.

30. The electrical connector as recited in claim 22, wherein the mounting projections of the first pair have a smaller cross-sectional dimension than the mounting projections of each of the second and third pairs.

31. The electrical connector as recited in claim 22, wherein the mounting projections of each of the second and third pairs have the same cross-sectional dimension.

32. A substrate to which an electrical connector is configured to be mounted, the substrate comprising:
a first surface and a second surface opposite the first surface so as to define a thickness along a transverse direction;
first and second lateral sides opposite each other so as to define a width along a lateral direction that is substantially perpendicular to the transverse direction, wherein the width is greater than the thickness;
first and second longitudinal ends spaced from each other so as to define a length along a longitudinal direction that is that is substantially perpendicular to each of the transverse and lateral directions, wherein the length is greater than the width;
first, second, and third pairs of mounting apertures that extend at least into or through the substrate along the transverse direction so as to be configured to receive respective mounting projections of the electrical connector, thereby securing the electrical connector to the substrate,
wherein the substrate defines contact locations that are configured and positioned to establish electrical contact with electrical contacts of the electrical connector, and the contact locations are arranged in first and second rows that are oriented along the lateral direction and spaced from each other along the longitudinal direction,
wherein:
1) the second and third pairs of mounting apertures are disposed on opposite sides of a centerline that is oriented along the lateral direction equidistantly from the second and third pairs of mounting apertures with respect to the longitudinal direction,
2) the mounting apertures of the third pair are aligned with each other along the lateral direction,
3) the mounting apertures of the second pair are aligned with each other along the lateral direction,
4) the mounting apertures of the first pair are aligned with each other along the lateral direction,
5) respective centers of the mounting apertures of the first pair are disposed between respective centers of the mounting apertures of the second pair and the centerline with respect to the longitudinal direction, and 6) both the first pair of mounting apertures and the second pair of mounting apertures are disposed between one of the rows and the centerline with respect to the longitudinal direction.

33. The substrate as recited in claim 32, wherein the centers of the first pair are spaced closer to the centers of the second pair than they are to the centerline along the longitudinal direction.

34. The substrate as recited in claim 33, wherein the centers of the first pair are spaced from the centers of the second pair a first distance along the longitudinal direction, and spaced from the centerline a second distance along the longitudinal direction, the second distance being greater than five times the first distance.

35. The substrate as recited in claim 34, wherein the second distance is greater than 10 times the first distance.

36. The substrate as recited in claim 32, wherein the mounting apertures of the first pair are disposed between the mounting apertures of the second pair with respect to the lateral direction.

37. The substrate as recited in claim 32, wherein the mounting apertures of the second pair are aligned with respective different ones of the mounting apertures of the third pair along the longitudinal direction.

38. The substrate as recited in claim 32, wherein the centerline is equidistantly spaced from the first and second rows along the longitudinal direction.

39. The substrate as recited in claim 32, wherein the third pair of mounting apertures is disposed between the other of the rows and the centerline with respect to the longitudinal direction.

40. The substrate as recited in claim 32, wherein the mounting apertures of the first pair have a smaller cross-sectional dimension than the mounting apertures of each of the second and third pairs.

41. The substrate as recited in claim 32, wherein the mounting apertures of each of the second and third pairs have the same cross-sectional dimension.

42. An anti-backout latch for an interconnect system that has an interconnect module configured to mate with first and second electrical connectors, the anti-backout latch comprising:
  a support member;
  a pair of fingers that extend away from the support member along a transverse direction and are spaced from each other along a lateral direction, perpendicular to the transverse direction, so as to define an opening therebetween that is configured to receive at least one fin of a heat sink of the interconnect module, the fingers being resiliently supported so as to define a spring force towards each other when biased away from each other, each of the fingers defining:
    an engagement feature that is configured to engage a complementary engagement feature of the interconnect module so as to maintain the anti-backout latch in an engaged position, wherein when the anti-backout latch is in the engaged position, the pair of fingers defines a mechanical interference that restricts backout of the interconnect module from at least one of the first and second electrical connectors; and
    a securement feature disposed at a location that is distal to the engagement projection, the securement feature being configured to engage a complementary securement feature of the interconnect module so as to restrict removal of the anti-backout latch from the interconnect module when the anti-backout latch is in a disengaged position, wherein when the anti-backout latch is in the disengaged position, the mechanical interference is removed.

43. The anti-backout latch of claim 42, wherein each securement feature includes a hook that is curved inwardly towards the other one of the fingers.

44. The anti-backout latch of claim 42, wherein the engagement feature of each finger defines a securement projection that extends inwardly towards the other finger.

45. The anti-backout latch of claim 42, wherein the support member includes at least one stop that is configured to seat against the upper end of at least one fin of the heat sink when the anti-backout latch is in the engaged position.

46. The anti-backout latch of claim 42, wherein the support member includes opposed ends are spaced from one another along a longitudinal direction, perpendicular to both the lateral direction and transverse direction, and the support member includes a first stop that extends from a first one of the opposed ends towards a second one of the opposed ends, the first stop configured to abut at least one fin of the heat sink when the anti-backout latch is in the engaged position.

47. The anti-backout latch of claim 42, wherein the latch includes at least one clip that is configured to engage a proximal end of at least one fin of the heat sink.

48. The anti-backout latch of claim 47, wherein each clip extends inward from a proximal end of one of the fingers to a free end of the clip.

49. The anti-backout latch of claim 48, wherein each clip is resiliently supported by a respective one of the fingers so as to define a spring force that biases the free end of the clip towards a proximal end of the finger when the free end is moved away from the proximal end.

50. The anti-backout latch of claim 42, wherein the latch includes a rigid body that extends downward from the support member along the transverse direction and the rigid body limits torsion of the latch in a plane that extends along the lateral direction and the transverse direction.

51. The anti-backout latch of claim 50, wherein the rigid body extends between the pair of fingers with respect to the transverse direction.

52. The anti-backout latch of claim 50, wherein the fingers extend from opposed lateral sides of the rigid body.

53. The anti-backout latch of claim 50, wherein distal ends of the fingers are free from attachment to the rigid body such that the distal ends are configured to pivot away from one another.

54. The anti-backout latch of claim 50, wherein the rigid body is configured to be received between adjacent fins of the heat sink.

55. An interconnect system comprising:
  an interconnect module configured to mate with first and second electrical connectors of a host module that are mounted onto a host substrate, the first electrical connector spaced from the second electrical connector in a forward direction, the interconnect module including a module substrate, an optical engine supported by the module substrate, and a heat sink that at least partially surrounds the optical engine; and
  the anti-backout latch of claim 42, the anti-backout latch being configured to be placed in mechanical communication with the interconnect module so as to define a first mechanical interference between the anti-backout latch and the interconnect module that limits rearward movement of the interconnect module with respect to the anti-backout latch in a rearward direction that is opposite the forward direction, wherein the anti-backout latch is configured to be movable between an engaged position and a disengaged position when the interconnect module is mated with the first and second electrical connectors, whereby when the anti-backout latch is in the engaged position, the at least one finger defines a second mechanical interference with the support surface so as to prevent the interconnect module from moving in the rearward direction with respect to the host module a distance that would be sufficient to unmate the interconnect module from at least one of the first and second electrical connectors, and whereby when the anti-backout latch is in the disengaged position, at least the second mechanical interference is removed, such that the interconnect module is movable in the rearward direction with respect to the at least one electrical connector a sufficient distance so as to unmate the interconnect module from the at least one electrical connector.

56. The interconnect system of claim 55, wherein the heat sink defines a pair of recesses that extends into the heat sink along the lateral direction on opposed sides of the heat sink, each recess configured to receive a respective one of the engagement members when the anti-backout latch is in the engaged position.

57. The interconnect system of claim 55, wherein the heat sink defines a pair of recesses that extends into the heat sink along the lateral direction on opposed sides of the heat sink, each recess configured to receive a respective one of the securement features when the anti-backout latch is in the engaged position and in the disengaged position.

58. The interconnect system of claim 57, wherein each recess is sized and configured to receive a respective one of the securement features when the anti-backout latch is secured to the heat sink such that the securement features are translatable within the recesses along the transverse direction to allow the anti-backout latch to move between the engaged and disengaged positions.

59. The electrical connector as recited in claim 1, wherein the at least one mounting projection comprises a plurality of mounting projections that extend from the base.

* * * * *